Feb. 9, 1954 G. R. STIBITZ 2,668,661

COMPLEX COMPUTER

Original Filed April 19, 1941 51 Sheets-Sheet 1

INVENTOR
G. R. STIBITZ
BY John [signature]
ATTORNEY

Feb. 9, 1954 | G. R. STIBITZ | 2,668,661

COMPLEX COMPUTER

Original Filed April 19, 1941 | 51 Sheets-Sheet 2

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 4

INVENTOR
G. R. STIBITZ
BY John A. Hall
ATTORNEY

| | MULTIPLIER DIGIT | | | | REAL - COLUMN SHIFT | | | | | | | | | | | IMAGINARY - COLUMN SHIFT | | | | | | | | | | |
|---|---|---|---|---|---|---|---|---|---|---|---|---|---|---|---|---|---|---|---|---|---|---|---|---|---|---|
| | F | G | D | E | | | | | | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 9 | 7 | 4 | 3 | | 0 | 0 | 0 | 0 | 0 | 0 | 0 | 0 | 0 | 2 | 3 | 0 | 0 | 0 | 0 | 0 | 0 | 0 | 0 | 0 | 7 | 5 |
| 8 | 6 | 6 | 4 | | 0 | 0 | 0 | 0 | 0 | 0 | 0 | 0 | 2 | 3 | 4 | 0 | 0 | 0 | 0 | 0 | 0 | 0 | 0 | 7 | 5 | 3 |
| 7 | 4 | 7 | 4 | | 0 | 0 | 0 | 0 | 0 | 0 | 0 | 2 | 3 | 4 | 5 | 0 | 0 | 0 | 0 | 0 | 0 | 0 | 7 | 5 | 3 | 2 |
| 6 | 5 | 8 | 5 | | 0 | 0 | 0 | 0 | 0 | 0 | 2 | 3 | 4 | 5 | 5 | 0 | 0 | 0 | 0 | 0 | 0 | 7 | 5 | 3 | 2 | 8 |
| 5 | 5 | 2 | 6 | | 0 | 0 | 0 | 0 | 0 | 2 | 3 | 3 | 5 | 5 | 4 | 0 | 0 | 0 | 0 | 0 | 7 | 5 | 3 | 2 | 8 | 7 |
| 4 | 4 | 3 | 7 | | 0 | 0 | 0 | 0 | 2 | 3 | 4 | 5 | 5 | 4 | 6 | 0 | 0 | 0 | 0 | 7 | 5 | 3 | 2 | 8 | 7 | 6 |
| 3 | 3 | 5 | 7 | | 0 | 0 | 0 | 2 | 3 | 4 | 5 | 5 | 4 | 6 | 7 | 0 | 0 | 0 | 7 | 5 | 3 | 2 | 8 | 7 | 6 | 4 |
| 2 | 2 | 7 | 6 | | 0 | 0 | 2 | 3 | 4 | 5 | 5 | 4 | 6 | 7 | 0 | 0 | 0 | 7 | 5 | 3 | 2 | 8 | 7 | 6 | 4 | 0 |
| 1 | | | | | 0 | 2 | 3 | 4 | 5 | 5 | 4 | 6 | 7 | 0 | 0 | 0 | 7 | 5 | 3 | 2 | 8 | 7 | 6 | 4 | 0 | 0 |
| 0 | | | | | 2 | 3 | 4 | 5 | 5 | 4 | 6 | 7 | 0 | 0 | 0 | 7 | 5 | 3 | 2 | 8 | 7 | 6 | 4 | 0 | 0 | 0 |
| | TO COUNTING RELAYS | | | | TO ADDEND RELAYS - REAL SUMMING CIRCUIT | | | | | | | | | | | TO ADDEND RELAYS - IMAGINARY SUMMING CIRCUIT | | | | | | | | | | |

VALUES REGISTERED IN MULTIPLIER DIGIT AND COLUMN SHIFT SWITCHES AS THE LAST DIGIT OF FACTOR D OF THE FOLLOWING PROBLEM IS ENTERED $(.23455467 + i.75328764) \times (.67765443 + i.12345678) =$ INVENTOR
G. R. STIBITZ
BY [signature]
ATTORNEY Feb. 9, 1954 G. R. STIBITZ 2,668,661

COMPLEX COMPUTER

Original Filed April 19, 1941 51 Sheets-Sheet 6

INVENTOR
G. R. STIBITZ
BY John A. Hall
ATTORNEY

FIG. 10

| | 1 | 2 | 3 | 4 | 5 | 6 | 7 | 8 | 9 | 10 |
|---|---|---|---|---|---|---|---|---|---|---|
| 9 | 9TH LEVEL CONTROL | 8TH DIGIT FACTOR F | 8TH DIGIT FACTOR G | 8TH DIGIT FACTOR D | = SIGN | DIGITS 1-8 IMAGINARY NUMBER-QUO. | 7TH DIGIT REAL NUMBER PRODUCT | 6TH DIGIT IMAGINARY NUMBER PRODUCT | 8TH DIGIT IMAGINARY NUMBER PRODUCT | BLANK |
| 8 | 8TH LEVEL CONTROL | 7TH DIGIT FACTOR F | 7TH DIGIT FACTOR G | 7TH DIGIT FACTOR D | 8TH DIGIT FACTOR E | DECIMAL POINT | 6TH DIGIT REAL NUMBER PRODUCT | 5TH DIGIT IMAGINARY NUMBER PRODUCT | 7TH DIGIT IMAGINARY NUMBER PRODUCT | BLANK |
| 7 | 7TH LEVEL CONTROL | 6TH DIGIT FACTOR F | 6TH DIGIT FACTOR G | 6TH DIGIT FACTOR D | 7TH DIGIT FACTOR E | WHOLE NUMBER IMAGINARY QUOTIENT | 5TH DIGIT REAL NUMBER PRODUCT | 4TH DIGIT IMAGINARY NUMBER PRODUCT | BLANK | BLANK |
| 6 | 6TH LEVEL CONTROL | 5TH DIGIT FACTOR F | 5TH DIGIT FACTOR G | 5TH DIGIT FACTOR D | 6TH DIGIT FACTOR E | SIGN IMAGINARY NUMBER QUOTIENT | 4TH DIGIT REAL NUMBER PRODUCT | 3RD DIGIT IMAGINARY NUMBER PRODUCT | BLANK | BLANK |
| 5 | 5TH LEVEL CONTROL | 4TH DIGIT FACTOR F | 4TH DIGIT FACTOR G | 4TH DIGIT FACTOR D | 5TH DIGIT FACTOR E | DIGITS 1-8 REAL NUMBER QUOTIENT | 3RD DIGIT REAL NUMBER PRODUCT | 2ND DIGIT IMAGINARY NUMBER PRODUCT | BLANK | BLANK |
| 4 | 4TH LEVEL CONTROL | 3RD DIGIT FACTOR F | 3RD DIGIT FACTOR G | 3RD DIGIT FACTOR D | 4TH DIGIT FACTOR E | DECIMAL POINT | 2ND DIGIT REAL NUMBER PRODUCT | 1ST DIGIT IMAGINARY NUMBER PRODUCT | BLANK | BLANK |
| 3 | 3RD LEVEL CONTROL | 2ND DIGIT FACTOR F | 2ND DIGIT FACTOR G | 2ND DIGIT FACTOR D | 3RD DIGIT FACTOR E | WHOLE NUMBER REAL QUOTIENT | 1ST DIGIT REAL NUMBER PRODUCT | DECIMAL POINT | BLANK | BLANK |
| 2 | 2ND LEVEL CONTROL | 1ST DIGIT FACTOR F | 1ST DIGIT FACTOR G | 1ST DIGIT FACTOR D | 2ND DIGIT FACTOR E | SIGN REAL NUMBER | DECIMAL POINT | WHOLE NUMBER IMAGINARY NUMBER PRODUCT | BLANK | BLANK |
| 1 | 1ST LEVEL CONTROL | SIGN AND DECIMAL POINT FACTOR F | SIGN AND i DECIMAL POINT FACTOR G | SIGN AND DECIMAL POINT FACTOR D | 1ST DIGIT FACTOR E | BLANK | WHOLE NUMBER REAL NUMBER PRODUCT | SIGN IMAGINARY NUMBER PRODUCT | BLANK | BLANK |
| 0 | 0 LEVEL CONTROL | BLANK | BLANK | × OR / SIGN | SIGN AND i DECIMAL POINT FACTOR E | BLANK | SIGN REAL NUMBER PRODUCT | 8TH DIGIT REAL NUMBER PRODUCT | BLANK | BLANK |

INVENTOR
G. R. STIBITZ
BY John A. Hall
ATTORNEY

INVENTOR
G. R. STIBITZ
BY [signature]
ATTORNEY

INVENTOR
G. R. STIBITZ
BY [signature]
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 11

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 12

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 13

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 14

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 15

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 17

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 19

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 20

INVENTOR
G. R. STIBITZ
BY [signature]
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 22

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 23

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 25

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 26

INVENTOR
G. R. STIBITZ
BY John A. Hall
ATTORNEY

INVENTOR
G. R. STIBITZ
BY [signature]
ATTORNEY

INVENTOR
G. R. STIBITZ
BY [signature]
ATTORNEY

INVENTOR
G. R. STIBITZ
BY John A. Hall
ATTORNEY

INVENTOR
G. R. STIBITZ
BY [signature]
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 32

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 33

INVENTOR
G. R. STIBITZ
BY [signature]
ATTORNEY

Feb. 9, 1954 G. R. STIBITZ 2,668,661

COMPLEX COMPUTER

Original Filed April 19, 1941 51 Sheets-Sheet 34

INVENTOR
G. R. STIBITZ
BY
ATTORNEY

Feb. 9, 1954

G. R. STIBITZ

COMPLEX COMPUTER 2,668,661

Original Filed April 19, 1941

51 Sheets-Sheet 35

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 37

INVENTOR
G. R. STIBITZ
BY John A. Hall
ATTORNEY

INVENTOR
G. R. STIBITZ
BY John A. Hall
ATTORNEY

INVENTOR
G. R. STIBITZ
BY John A. Hall
ATTORNEY

Feb. 9, 1954 G. R. STIBITZ 2,668,661

COMPLEX COMPUTER

Original Filed April 19, 1941 51 Sheets-Sheet 40

INVENTOR
G. R. STIBITZ
BY [signature]
ATTORNEY

INVENTOR
G. R. STIBITZ
BY John A. Hall
ATTORNEY

INVENTOR
G. R. STIBITZ
BY John A. Hall
ATTORNEY

INVENTOR
G. R. STIBITZ
BY John C. Hall
ATTORNEY

Feb. 9, 1954 G. R. STIBITZ 2,668,661

COMPLEX COMPUTER

Original Filed April 19, 1941 51 Sheets-Sheet 44

INVENTOR
G. R. STIBITZ
BY John A. Hall
ATTORNEY

INVENTOR
G. R. STIBITZ
BY John A. Hall
ATTORNEY

INVENTOR
G. R. STIBITZ
BY
ATTORNEY

INVENTOR
G. R. STIBITZ
BY
ATTORNEY

INVENTOR
G. R. STIBITZ
BY John A. Hall
ATTORNEY

INVENTOR
G. R. STIBITZ
BY John A. Hall
ATTORNEY

INVENTOR
G. R. STIBITZ
BY John A. Hall
ATTORNEY

INVENTOR
G. R. STIBITZ
BY John A. Hall
ATTORNEY

Patented Feb. 9, 1954 2,668,661

UNITED STATES PATENT OFFICE 2,668,661

COMPLEX COMPUTER

George R. Stibitz, Boonton, N. J., assignor to Bell Telephone Laboratories, Incorporated, New York, N. Y., a corporation of New York Continuation of abandoned application Serial No. 389,321, April 19, 1941. This application November 23, 1944, Serial No. 564,853

48 Claims. (Cl. 235—61)

This is a continuation of application Serial No. 389,321, filed April 19, 1941, which has since become abandoned.

This invention relates to calculating methods and apparatus and particularly to systems of electrical control whereby the various mathematical operations required are performed with rapidity and without the use of counting wheels, gear trains and similar mechanical elements.

An object of the invention is to provide a rapidly operating and economical arrangement in which all calculating movements are confined to simple operations of electromagnetic circuit makers and breakers.

Another object of the invention is the use of calculating methods which may be translated into simple and small movements of electromagnetic apparatus for the control of electrical circuits.

Another object is to achieve simplicity and economy through the avoidance of the use of complicated mechanical movements and expensive precision built machine elements.

A further object is to provide a calculating mechanism operated by remote control and particularly a common calculating device which may be operated from any one of a plurality of distant control stations.

Another object of the invention is to provide electrical means for performing the simple algebraic operations of addition, subtraction, division and multiplication.

Another object is to provide a calculating device which may be activated by the registration therein of the problem to be solved and which will thereafter perform a series of operations and record the result without further attendance.

Another object of the invention is to provide means for performing the simple algebraic operations on complex numbers. In its specific embodiment the device of the present invention is arranged to operate on complex numbers having a real and an imaginary component.

Another object is to provide a calculating device for performing the operations of multiple algebra and particularly the operations wherein the divisor as well as the dividend in division and the multiplier as well as the multiplicand in multiplication may be compound numbers.

Another object of the invention is to provide means for automatically carrying out certain algebraic operations required by the relation between the various units of the compound numbers employed.

In accordance with this invention a system of electrical circuits and simple switching devices is provided to perform the simple algebraic operations of addition, subtraction, multiplication and division of compound numbers and specifically of that type of compound numbers known to the mathematician as complex numbers. The device of the present invention is popularly known as the "complex computer" since its function in its specific embodiment shown herein is to perform these simple algebraic operations on the mathematician's complex numbers. In one of its broad aspects the present invention is a device which will perform algebraic operations on any type of compound numbers made up of two or more units each having its own peculiar system of multiplication tables, such by way of example as the numbers representing amounts in British currency, or some of the peculiar systems of weights and measures.

In another of its broad aspects the present invention is a device which will perform the simple algebraic operations by the switching of electrical circuits in contradistinction to the movements of number wheels, gear trains and such like mechanical elements even when moved by electromagnetic means.

The device of the present invention is an electrical system comprising an assembly of well-known devices used generally in the communication arts and connected in a new combination in pursuance of the several objects above stated. Certain elements of the present invention are taken from the printing telegraph art, others from the telephone exchange switching art and the large number of relays employed are of the type particularly designed for use in telecommunication switching devices and circuits. By means of these well-known devices connected in a novel circuit arrangement, a calculating device is provided by which problems in complex numbers may be rapidly and accurately solved and whereby the investigation of many problems in electrical theory which heretofore have been avoided because of the great disparity between the effort required and the value of the result may now be pursued.

In its physical aspects the present invention takes the form of a conveniently located apparatus rack similar to those employed in telephone and other telecommunication installations and an operator's station located at any more or less remote point. The operator's station may comprise a standard teletypewriter instrument in the form of a keyboard and printer. The operation consists of writing out the problem by the usual manipulation of the keys. The record thus made is immediately printed so that the operator may observe the data in the form in which it is entered into the device. Thereafter, and in due time the result will also be printed by the printer.

A feature of the invention is the use of a four-place permutation code for representing the digits of the decimal system characterized by the fact that the code for each such digit is the inverse of the code of the nine's complement thereof. Such a code is particularly useful in a calculating device where all the simple algebraic operations may be reduced to arithmetical addition. Since the complements of numbers are widely used in such operations it becomes especially convenient to translate a number into its complement by merely inverting its code. By using the two digits of the binary system as the elements of the permutation code these may be represented electrically by the plus and minus poles of a battery whereby it at once becomes apparent that by reversing the polarity of the battery the code may be inverted. A feature of the invention is therefore a means for changing the representation of a number to a representation of its complement by a simple switching operation.

Another feature of the invention is the use of two permutation codes for performing operations in addition, a four-place code for representing the digits of the decimal system in both the augend and the addend and a five-place code for representing the digits of the decimal system in the sum, the said codes being characterized by the fact that the actual addition of the elements of an augend code and an addend code in accordance with the arithmetical principles used in the binary numbering system will produce a true sum in the code used for that part of the problem. Thus the codes employed have a greater significance than the mere representation of digital symbols for they are useful as well as operators. It may therefore be stated that another feature of the invention is the use of numbers in another numbering system as codes for the representation of the digits of the decimal system, whereby the elements of the said codes may be subjected to calculating operations in accordance with the manner in use in such other numbering system. Thus the codes may be used for the dual purpose of representing the digits of the decimal system and for solving arithmetical problems.

Another feature of the invention is the use of simple two-positional electromagnetic devices for performing arithmetical addition. Thus where the augend and the addend digits are each represented by a four-place permutation code and the sum digits are represented by a five-place permutation code, there will be four relays for the augend, four relays for the addend and five relays for the sum for each digital place in the numbers to be handled. The sum relays will be operated in accordance with the operated or non-operated positions of the other relays in the same column. Where the binary system is used, then the sum relay will be operated when either the augend or the addend relay in the same column is operated and will be non-operated when both the augend and addend relays are in the same operated or non-operated positions. The operation of the fifth relay in the sum relays will represent a decimal system carry-over as when the sum is greater than can be represented by a single digit. Proper connections for representing a carry-over in the binary system of calculation are provided.

Another feature of the invention is a means to automatically differentiate between a number to be added to another in a problem of addition and the same number which is appearing as the complement of another number for solving a problem of subtraction by the method of addition. In the latter case the mathematical conception known as the fugitive one must be accounted for. Means for automatically capturing the fugitive one and returning it to its proper place is provided.

A feature of the invention is a means for registering the digits of the decimal system by selectively operating sets of permanently paired contacts and means controlled by said contacts for establishing predetermined different circuit conditions in other apparatus elements in accordance with a permutation code. Thus for any one digital place in any one of the factors of a problem to be solved there are ten sets of permanently paired contacts, one set corresponding to each of the ten digits of the decimal system. In the specific embodiment of the present invention herein disclosed, each set of contacts controls a set of four conductors extending, in one direction to the printing register switch whereby a printed record of the digit registered may be had, in another direction to the multiplying digit switch for the purpose of using the digit as an operator and in some cases to a distributing means for further extension as required to the column shift switch. These four conductors are electrically characterized in accordance with a four-place permutation code in response to the particular one of the ten sets of permanently paired contacts individual thereto, and this electrical characterization is employed at these other points for the purposes indicated. While any arbitrary code will serve for these purposes, the presently used codes taken from the binary numbering system and having especially useful arrangements of the elements are used for the purposes hereinbefore described.

Another feature of the invention is the means for automatically translating the code when the sum established on the sum relays is transferred to the augend relays. Economy of apparatus is achieved by employing codes on the augend and addend relays which differ from the codes used on the sum relays. It therefore becomes necessary to translate as the sum is found on the sum relays and is then transferred to the augend relays for the purposes of starting another operation. This feature of the automatic translation of information from one code to another is of considerable importance in connection with the economic aspects of the device.

Another feature of the invention is calculation by electrical circuit selection rather than by mechanical movement of gear wheels and trains. In accordance with this feature the complex time sequences present in conventional calculating machines are entirely eliminated and in their place there is substituted a step-by-step method of circuit operation, each of which operations depends on the successful completion of a previous operation. There are no interrelated and interdependent movements which have to be carefully charted to become understandable. Each operation herein is a separate operation and is only related to the next in that the next cannot be carried out until the first has been completed. A feature of the invention is therefore a self-proving circuit arrangement for a device employing a great plurality of different circuits whereby the operation of any one circuit is proof that all previous circuit operations have been successful.

Another feature of the invention is a calculating device in which all calculation is carried out in accordance with the principles of the binary numbering system and particularly in accordance with the rules governing the operations of addition in the binary system. The binary system having but two digits, generally represented by 0 and 1, may be easily represented by relay action where the relay in non-operated condition will represent one digit and in operated condition the other digit. By the use of a plurality of relays one for each digital place in a number the observation of those relays which are operated will reveal the value of the number represented thereby. By the use of a plurality of such groups of relays the augend, the addend and the sum in a problem of addition may be represented. With such relays interconnected in a network responsive in accordance with the principles of addition in the binary system, such problems may be performed with accuracy and rapidity.

The fundamental principle of operation in the device of the present invention is the use of means operable when the sum relays have been operated to release the augend relays and to transfer the sum thus found to such augend relays whereby a new or a repeated operation of the addend relays will produce a new sum. The augend relays thus constitute an accumulator and the operation of the device becomes one of gradual accumulation in the augend relays. Each new operation of the addend relays then provides a new increment to the value registered in the augend relays.

Another feature of the invention is the parallel use of a plurality of sets of calculating relays simultaneously operated under a common control. It will appear hereinafter that in many of the problems entered in the device there will be multiplication of two factors by a common multiplier. These operations are carried on simultaneously and under the common control of a counting device which is steered by the multiplier.

Another feature of the invention is a calculating device arranged to start its calculating operations as soon as sufficient information is entered to allow a partial solution to be found. This feature is particularly marked in the case of a problem of division where a calculation involving only the factors of the divisor must be made, whence operation of the device starts as soon as these factors have been entered and before any information concerning the dividend has been registered.

In accordance with this feature the problem is entered in the device much as a problem in long division is written down by a schoolboy, the divisor first.

Another feature of the invention is an automatic keyboard, automatic in the sense that the problem must be stated by the manipulation of the keys in the proper order, otherwise the device will fail to operate. Where a key is wrongly depressed it will have no effect and will not cause a registration. Other than depressing a wrong sign key or a wrong value key the problem cannot be mutilated. Each key as it is depressed appears to instantly return to normal, yet in fact it is locked in the depressed position and is only released when the operation which it is designed to control has been successfully and completely accomplished.

Another feature of the invention is a printer which will operate to print before the operator each character of the problem as it is registered and each character of the solution as it is found, with automatic means operated to properly space the portions of the problem and to insert the appropriate mathematical signs and symbols.

Another feature of the invention is the use of the augend element in a summing device as an accumulator. The usual practice in calculating devices is to use a separate accumulator or to employ the sum element as an accumulator. Applicant, however, uses the augend element for this purpose and thereby gains certain advantages in speed, economy of apparatus and simplification of circuit arrangement.

In accordance with this feature the addend element of the summing device is set to represent a given numerical value whereupon under control of the augend and the addend elements the sum elements will be set to represent the sum represented by such addend and augend elements. On the initial operation the augend element will be set to represent zero so that the sum element will immediately be controlled to represent the same numerical value as that represented by the addend element. Thereupon the sum element will be temporarily locked in position, the augend element will be released and then reoperated to represent the exact numerical value represented by the sum element. Thereupon the sum element will be released, ready to respond to a new summing operation. The particular point to be noted is that the sum as soon as it is found is transferred to the augend element of the device, which thus constitutes an accumulator.

A feature of the invention may therefore be said to be the dual use of a registering means both as an augend register and as an accumulator.

Another feature of the invention is a means for simultaneously registering a digit and the nine's complement thereof. This is a direct result of the four-place code used to transmit numerical information from one point to other points within the device. Ordinarily it would only be necessary to electrically characterize the four conductors (of the four-place code transmitting channels) in the permutations of the codes, but in accordance with the present feature the remaining conductors are also electrically but differently characterized so that in accordance to the response desired the electrical characterization will represent either the digit or the nine's complement thereof. In the illustrative embodiment of the invention there are a group of ten selectively operable sets of permanently paired contacts to which four conductors are multipled. The operation of any one set of these contacts (for any one of the ten decimal digits) will ground certain of these four conductors and connect battery to the remainder. Response to the grounded conductors will represent the registered digit and response to the battery connected conductors will represent the nine's complement thereof. Thus the digit and its nine's complement are simultaneously represented by the registration and either the one or the other is rendered effective by the control of the response thereto.

Another feature of the invention is a simple provision for carry-overs in calculation. Where the calculations are made on the basis of the binary system, there must be four sets of relays corresponding to four binary denominational places, which may be expressed as corresponding to the values 1, 2, 4 and 8 for each decimal denominational place. Where a plurality of such decimal denominational places are used in the calculator, the summing relays are effectively placed in a chain of four times the number of places and the carry-overs are effectively alike along the chain regardless of whether the relay pair is the first, the intermediate or the last of a group of four representing one decimal denominational place. In accordance with this feature each calculating pair of relays (consisting of one augend and one addend relay) is provided with contacts to control an incoming carry 0, an outgoing carry 0, an incoming carry 1 and an outgoing carry 1 lead. The carry-over between binary denominational places is therefore handled in the same manner and by exactly similar means as the carry-over between decimal denominational places.

Another feature of the invention is the use of a common counting means for simultaneously controlling the operation of a plurality of summing devices. In the performance of problems of multiplication and division of complex numbers, or more generally, compound numbers, it frequently happens that two separate factors each have to be multiplied by the same multiplier. Hence economy of time may be gained by employing two calculating devices and operating them simultaneously under control of a single counting means set in accordance with the digits of the common multiplier. In accordance with this feature two multiplicand storing means herein designated column shift switches are employed to feed, in proper columnar order, the two multiplicand values to the two corresponding calculating devices. There is also provided a multiplier digit switch for each multiplier factor which controls step by step or digit by digit a common counting relay arrangement which simultaneously controls the two calculating devices so that through a single operation two separate calculations may be made.

In the specific embodiment herein disclosed there are two calculating or summing arrangements, one for accumulating the real value of the calculated complex number and the other for accumulating the imaginary value of the calculated complex number. Each of these calculating arrangements consists generally of a column shift switch for feeding the digital values in proper columnar order to the addend element of the summing relays and a control means for repeatedly performing a summing operation. This summing operation consists of a cycle comprising a first step in which the sum relays are operated under control of the augend and the addend relays, a second step in which the sum relays are locked in their operated positions, a third step in which the augend relays are offered release and thereupon operated to represent the value held by the locked sum relays and a fourth step in which the sum relays are offered release before reoperation in the following cycle. This cycle of operations is under control of and is counted by the common counting means. Although the numbers represented in the real and the imaginary column shift switches and the values being accumulated in the corresponding accumulators may be different, nevertheless the steps of the summing cycle in each such calculator are simultaneously performed under control of a single element.

Another feature of the invention is a switching means interposed between the entry registers and the column shift switches whereby the factors appearing in the column shift switches may be rapidly interchanged, that is, the factors which during one calculating stage appear in the real and the imaginary column shift switches respectively may be changed to appear in the imaginary and the real column shift switches respectively. By means of this arrangement the real and the imaginary values of the result in a problem in complex numbers may be separately and simultaneously accumulated.

A feature of the invention is an arrangement of counting relays operating on a code basis. These relays will count the number (in the decimal system) of times any given phenomenon occurs as for instance the number of serially related impulses in a train and will exhibit the result in code. The relays may also be operated in code and then counted down through successively lower order codes until a predetermined code (representing zero, for instance) has been reached.

A feature of the invention is therefore a set of counting relays which may be counted down or counted up. In the illustrative embodiment of the present invention the counting relays are used in both manners. In a problem of multiplication by successive additions the counting relays are set by a multiplier digit and are then counted down until the multiplicand has been added to an accumulated value the number of times indicated by the multiplier digit. Since the multiplier digit is transmitted from the entry register to the multiplier digit switch by code, the counting relays are thus set by code and then counted down through the codes representing the various successively lower decimal numbers until the value represented by such setting is exhausted. In a problem of division where the divisor is subtracted a number of times from the dividend until the value in the dividend is exhausted, the number of times this operation is performed is counted by the counting relays. Thus the relays are set and reset step by step to exhibit successively higher code combinations until the operation is complete, whereupon the result in code is transmitted to a point where it may be usefully employed. In the specific embodiment of the present invention the number attained in this counting up process is transmitted by code to the printing switch wherefrom it is sent to the printer and recorded as a digit of the quotient.

A feature of the invention is therefore a single set of counting relays used variously to count up from a given point or to count down to such a point. The same set of such relays may by used to count up a given number and to then transmit information regarding that number in code for any useful purpose and to count down from a number transmitted to it in code.

Another feature of the invention is a set of counting relays having a control path for the transmission of a train of serially related impulses and another control path for the simultaneous transmission of code impulses, which may be used as incoming and outgoing paths or as outgoing and incoming paths respectively. That is, when the counting relays are controlled over one of said paths the result of their action is given out over the other of said paths, and either path may be used for either purpose.

A feature of the invention is a method of control of counting relays. In counting up so that the result exhibited over the code path advances step by step from zero to a number indicating the number of operations involved, the actual operation of the relays is by a counting down process. Thus in the specific embodiment of the invention herein disclosed the relays are normally set in a code higher than any number which will be encountered in practice and are then counted down, the results exhibited, however, advancing from a normal zero to any one of the other ten digital values of the decimal system. Thus the relays are normally set at sixteen (in the natural binary system—or thirteen in the code employed herein) and when counting up in the decimal system actually count down in their code system.

Another feature of the invention is a counting relay arrangement in which two sets of code relays are employed with a set of circuit connections controlled by one set for controlling the other set always at one less in code than the first set. Therefore when these relays are counted down the process is a step-by-step resetting of each set of relays. When the first set of relays is set at a predetermined value in code the second set will be set at one less than that value. Thereafter the first set is released and then reset at a value corresponding to the second set. Following this the second set is released and then reset at a value one less than the first set. Thus as the sets of relays are counted down by conventional methods the values which they in their combinational operated and non-operated positions represent, decreases step by step.

Another feature of the invention is a calculating device for performing a plurality of calculating operations in accordance with a selectively predetermined pattern and making a summation of the results of the said various operations. In accordance with this feature the invention comprises the combination of progress circuits responsive to the completion of one calculating operation for automatically starting another calculating operation, a master pattern controlling means for selectively controlling said progress circuits and accumulators for receiving, accumulating and storing the results of said train of calculating operations.

Another feature is a calculating device in which a calculated result is derived from the entered information and stored while other results are being calculated, said first result being later used in conjunction with said other results to calculate a final result.

Another feature of the invention is the control of the printer which is arranged to respond to signals sent thereto in serial order and to successively print the various mathematical signs and the digits of the factors. In multiplication the digits of a factor are calculated simultaneously and are simultaneously transmitted to a corresponding plurality of contact sets in the printing switch which thereupon acts to connect the said sets to the printer successively. In division, however, the digits of the quotient are calculated successively and therefore are transmitted to the printing switch successively. Hence, this printing switch uses a single contact set for a plurality of such digits and the printer responds to the successive receipt of such digits as they are calculated.

Another feature of the invention is the use of a proof circuit as an element in the control of a calculator whereby faulty operation is avoided through the requirement by the control circuit that the proper operation of all elements is assured before the control will signal an advance in the operation. In the illustrative embodiment of this invention, this proof circuit is in the form of a chain circuit wherein a large plurality of elements each control a link and it is not until every link without exception is closed that the proof circuit will signal an advance in the operation. More specifically the summing cycle control which is the heart of the calculator is under control of a circuit which is only completely closed when a magnet for every decimal denominational order concerned in a calculation is properly operated. By way of example when two factors each involving eleven decimal denominational orders are to be multiplied by a single digit of a multiplier factor, then the summing cycle control circuit depends for its operation on the closure of twenty-three contacts in series, one for each of the said decimal denominational orders, and one for said multiplier digit.

The drawings consist of fifty-one sheets having fifty-five figures, as follows:

Fig. 10 is another chart showing the arrangement of the printing cross bar switch and explaining the functions of the various cross-point contact sets thereof;

Figure 11:
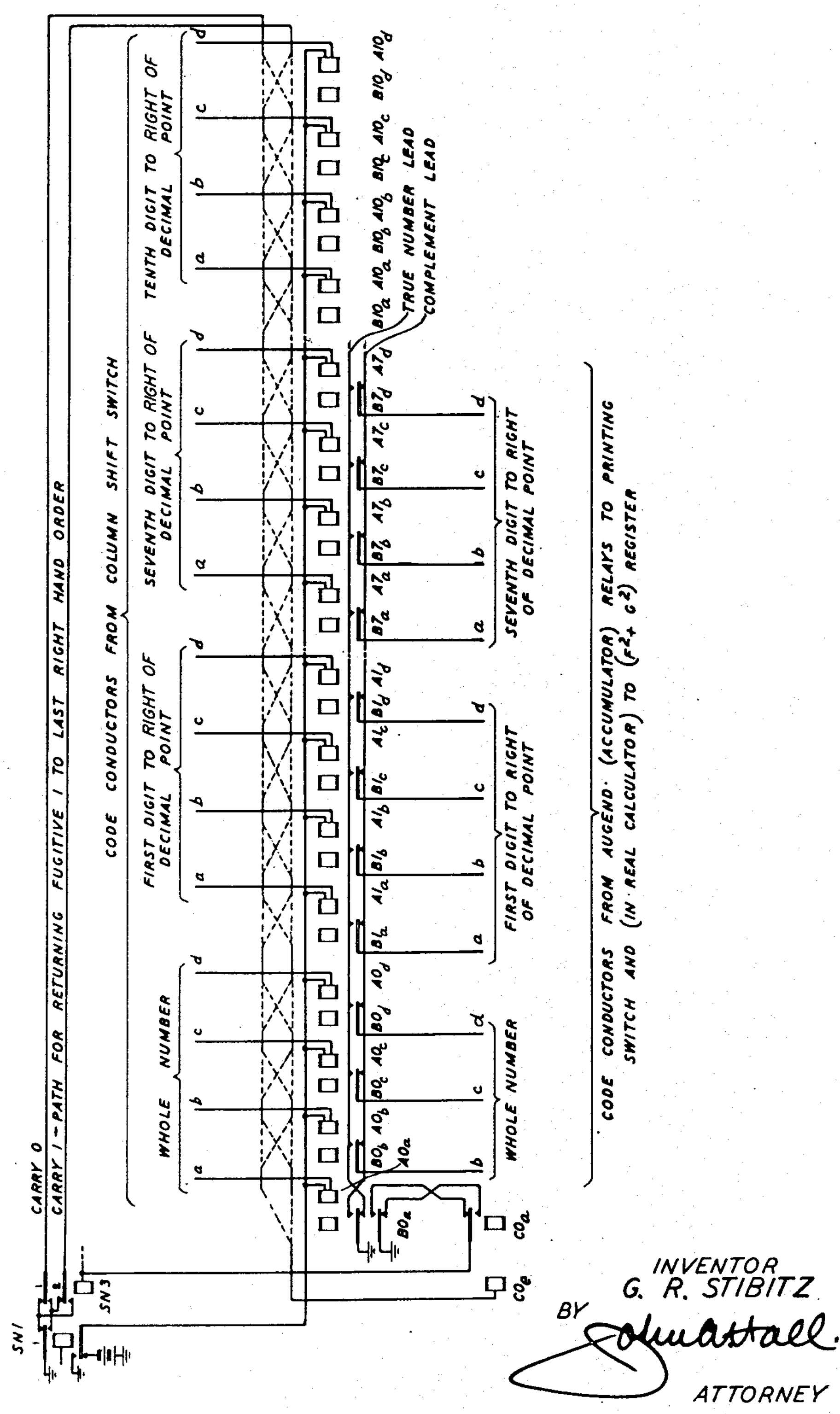
Figure 12:
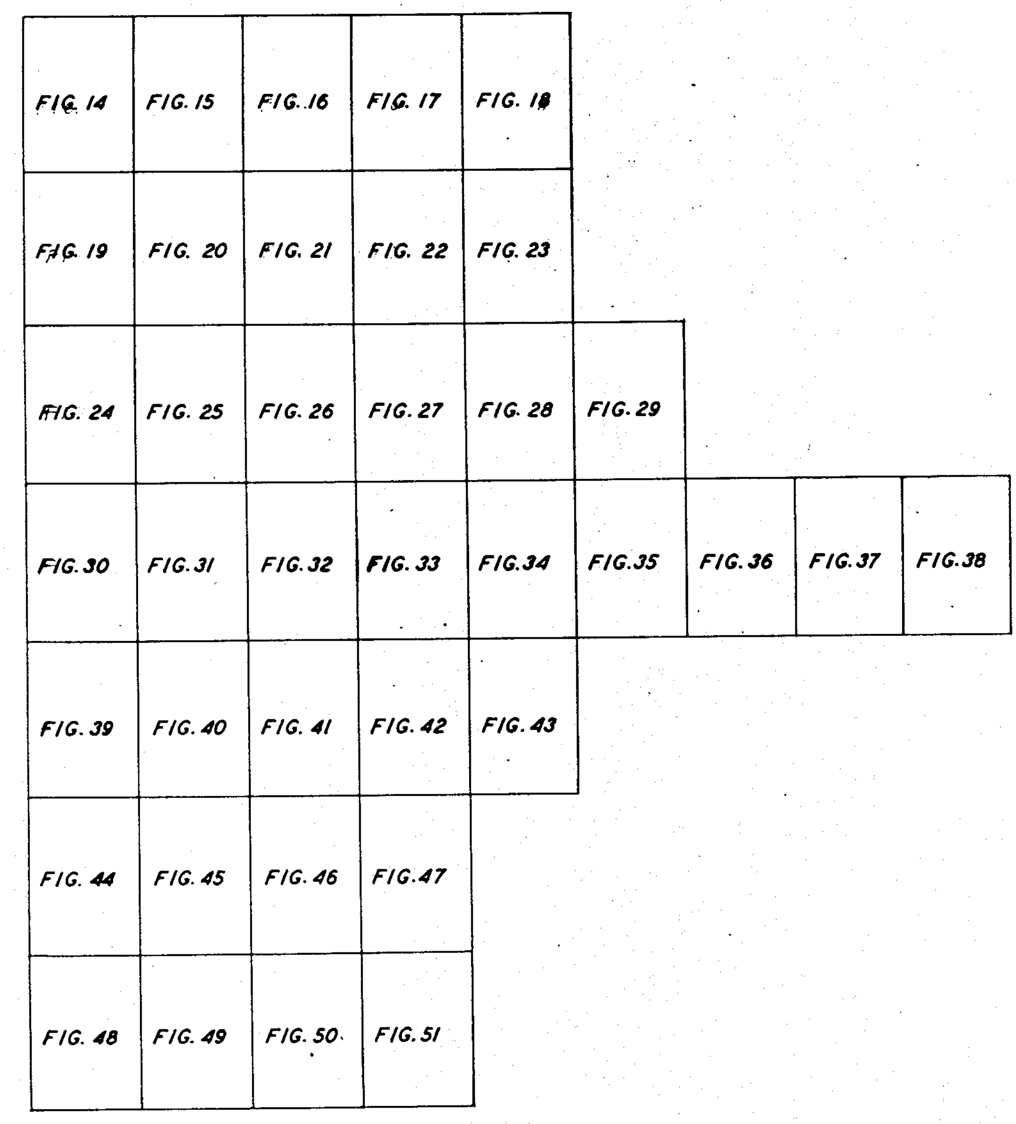
Figure 13:
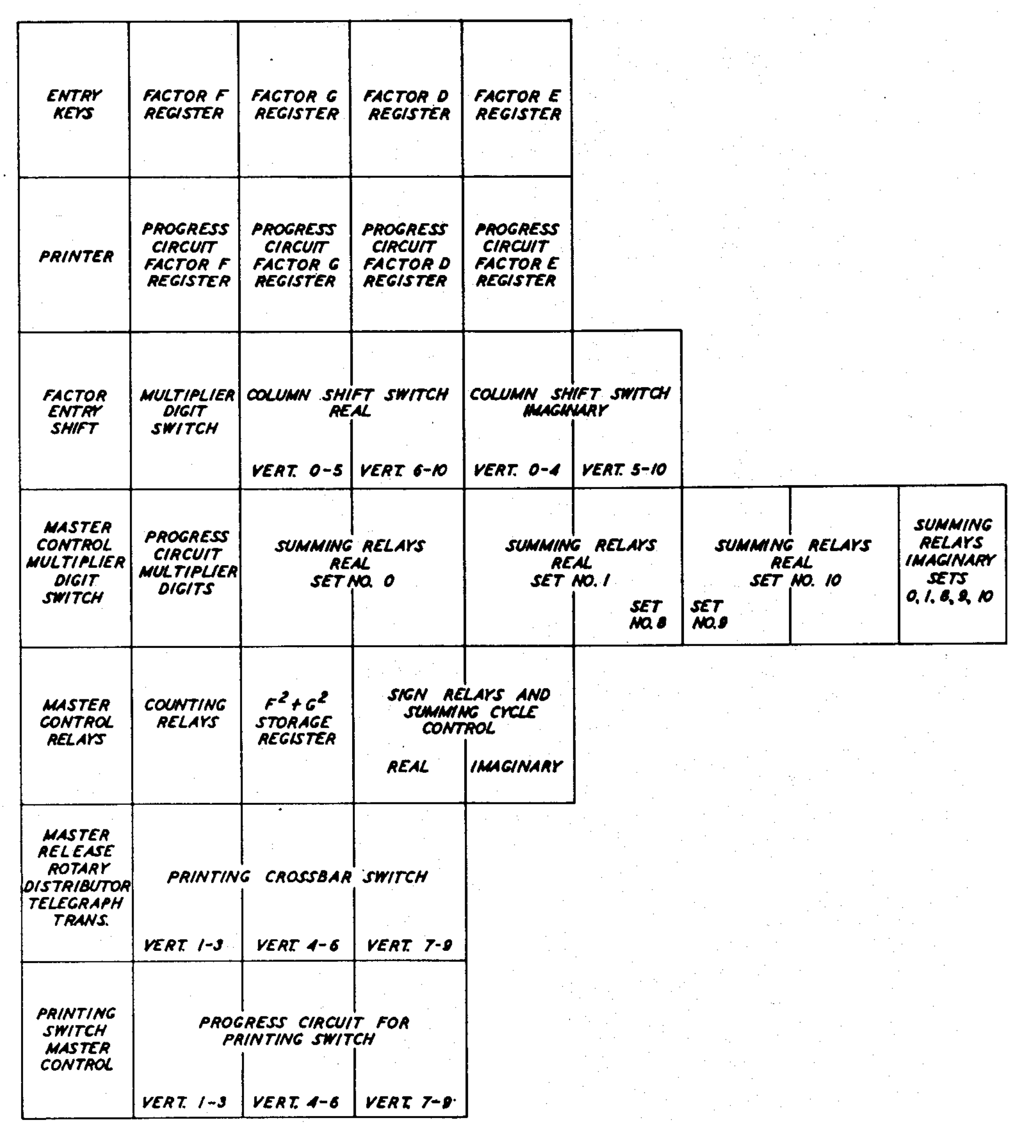
Figure 14:
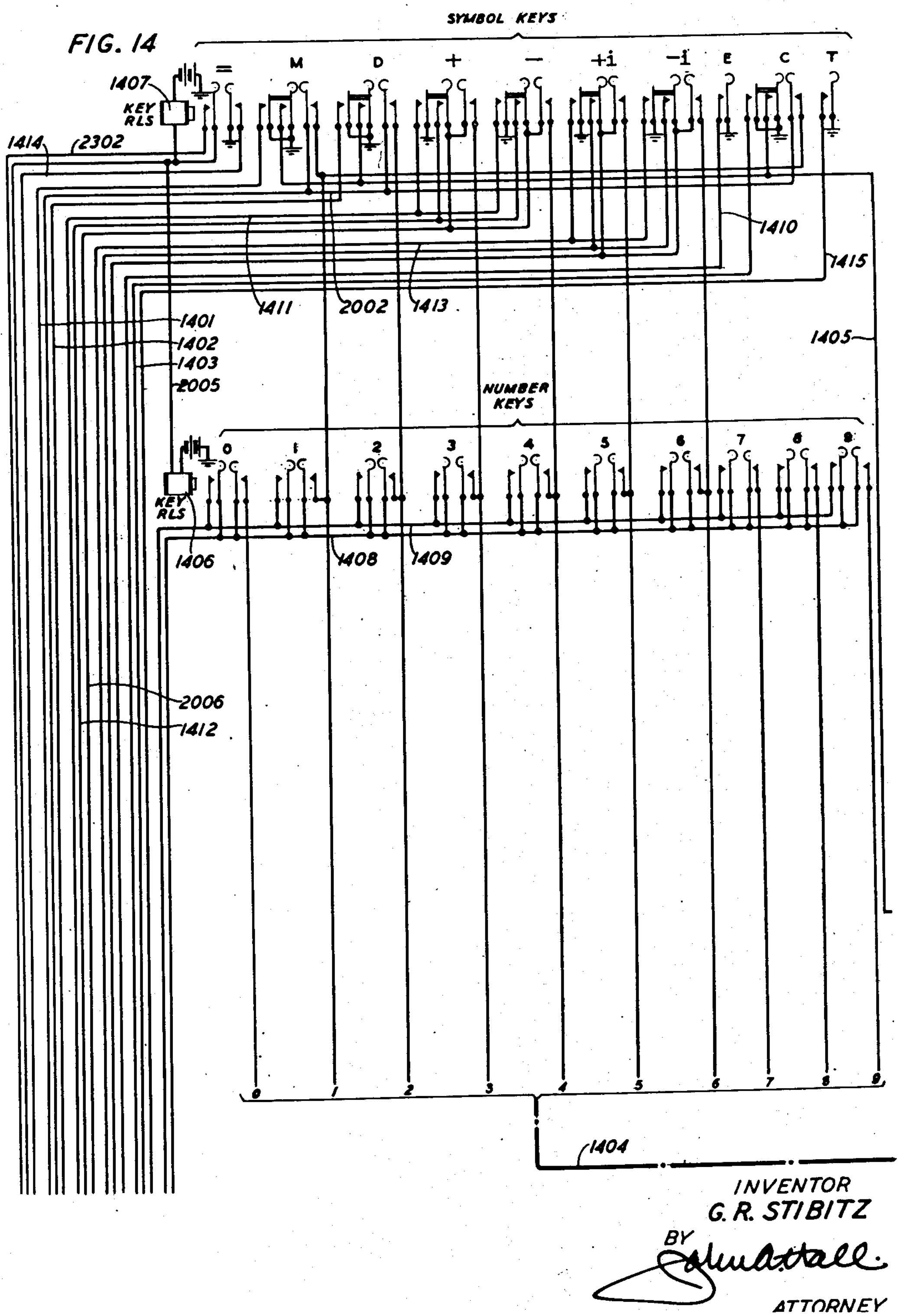
Figure 19:
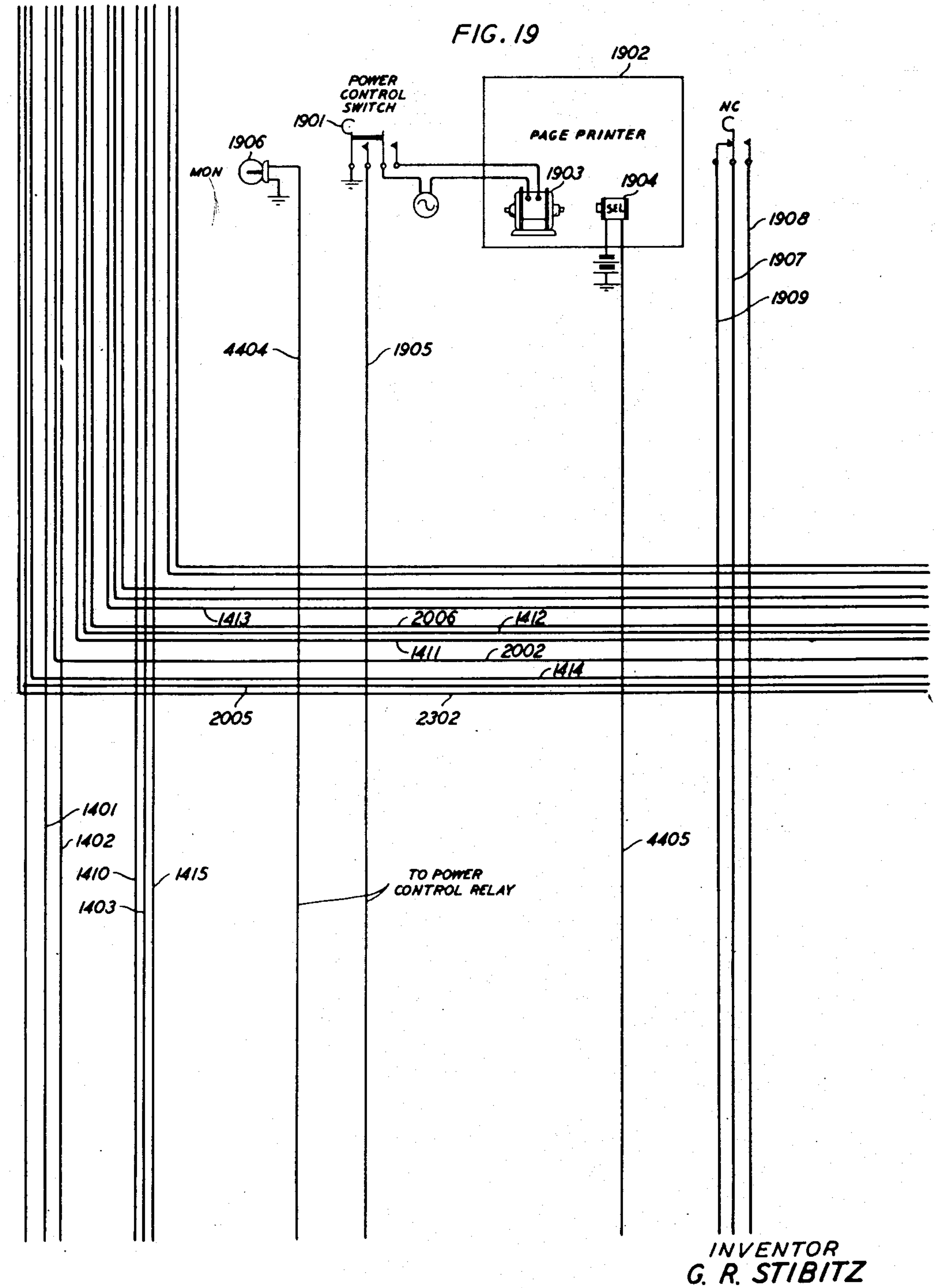
Figure 24:
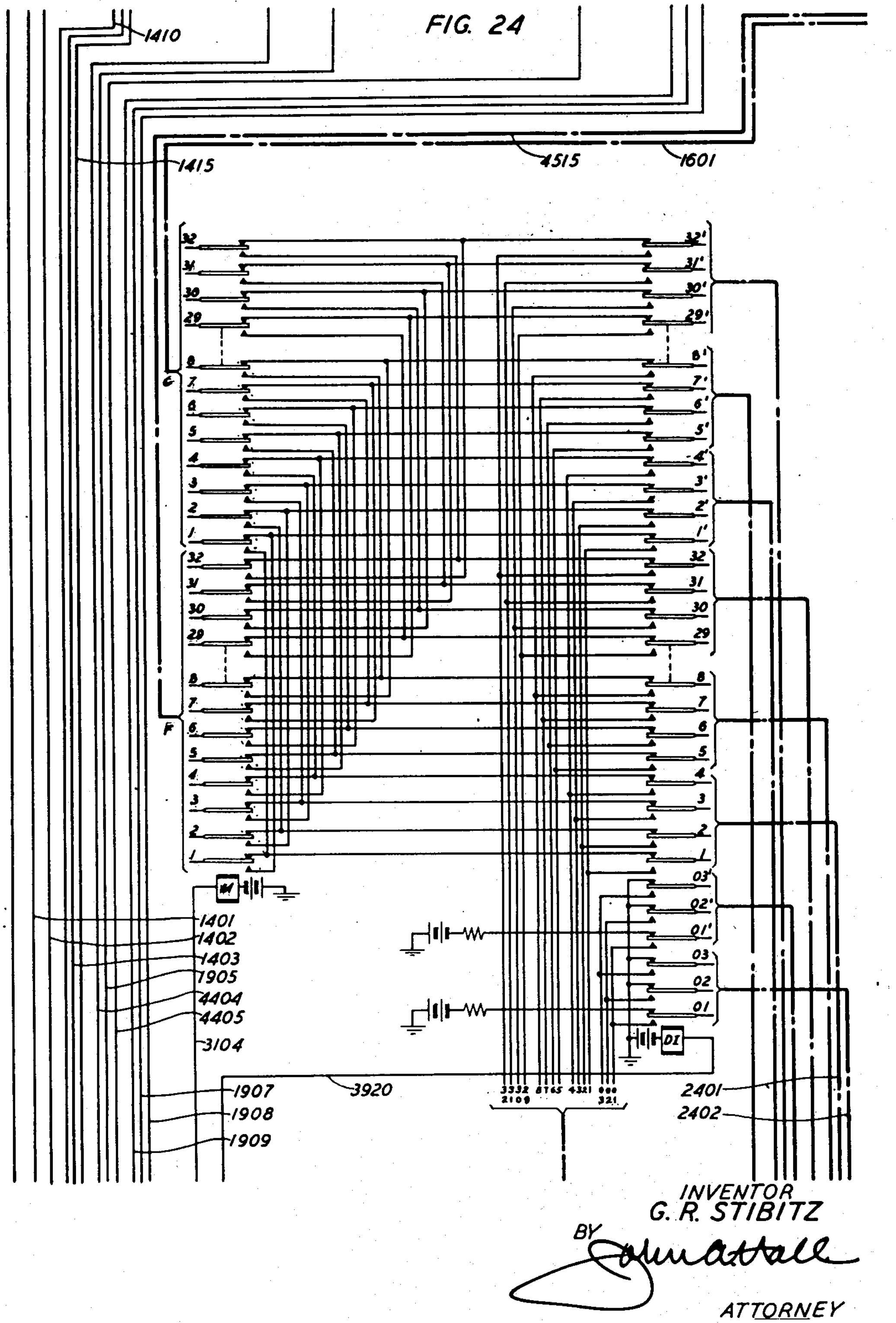
Figure 25:
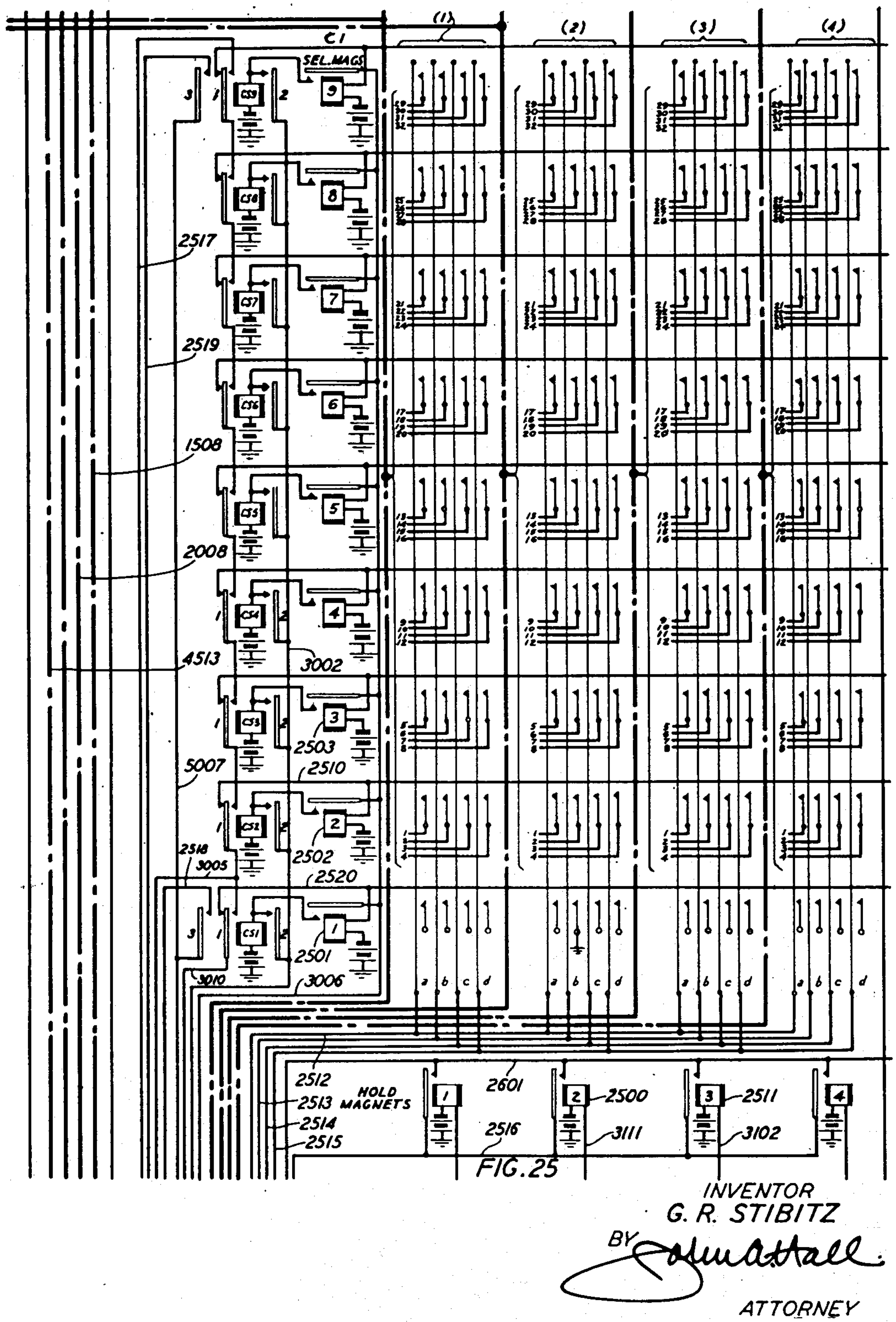
Figure 26:
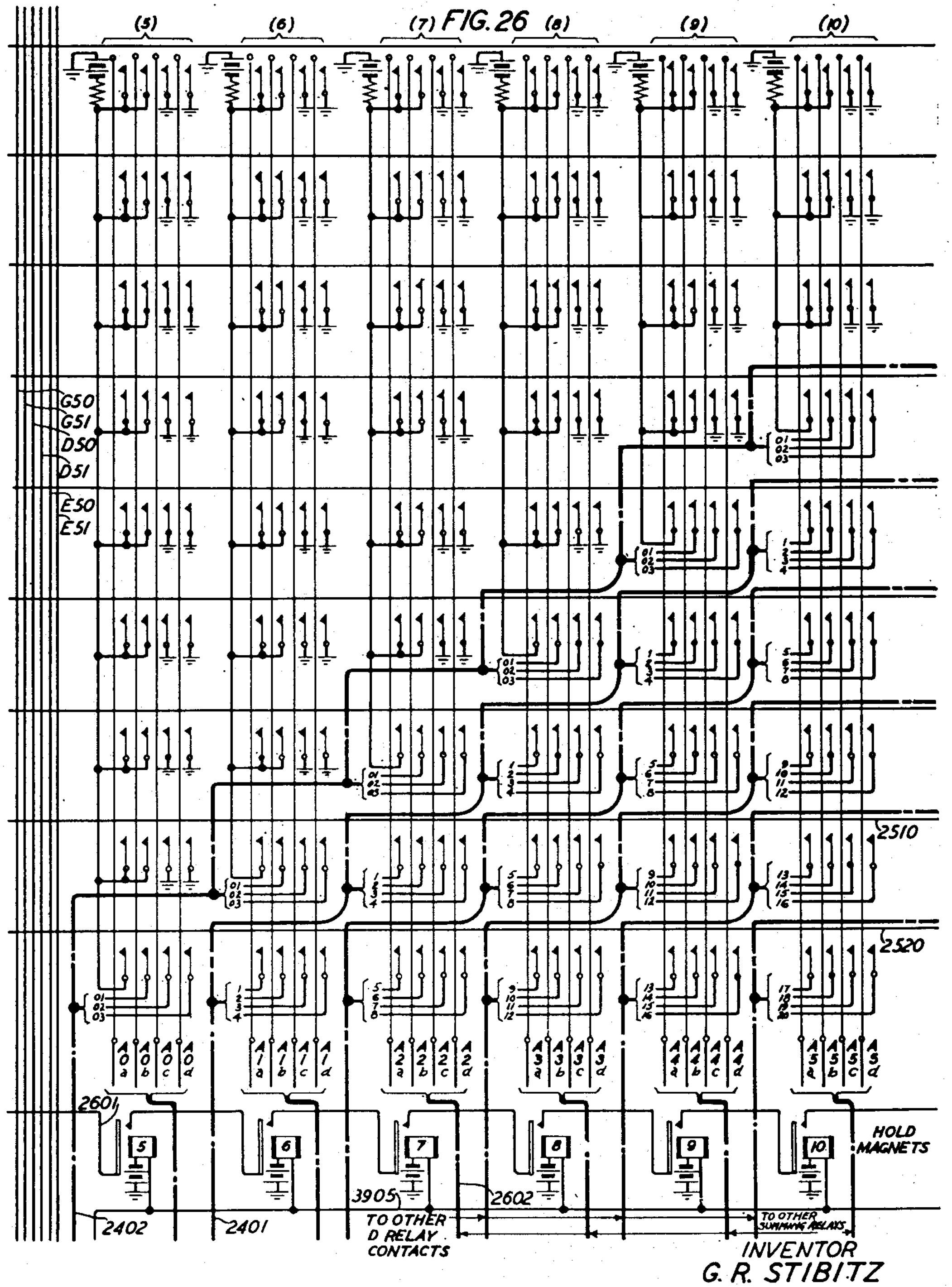
Figure 27:
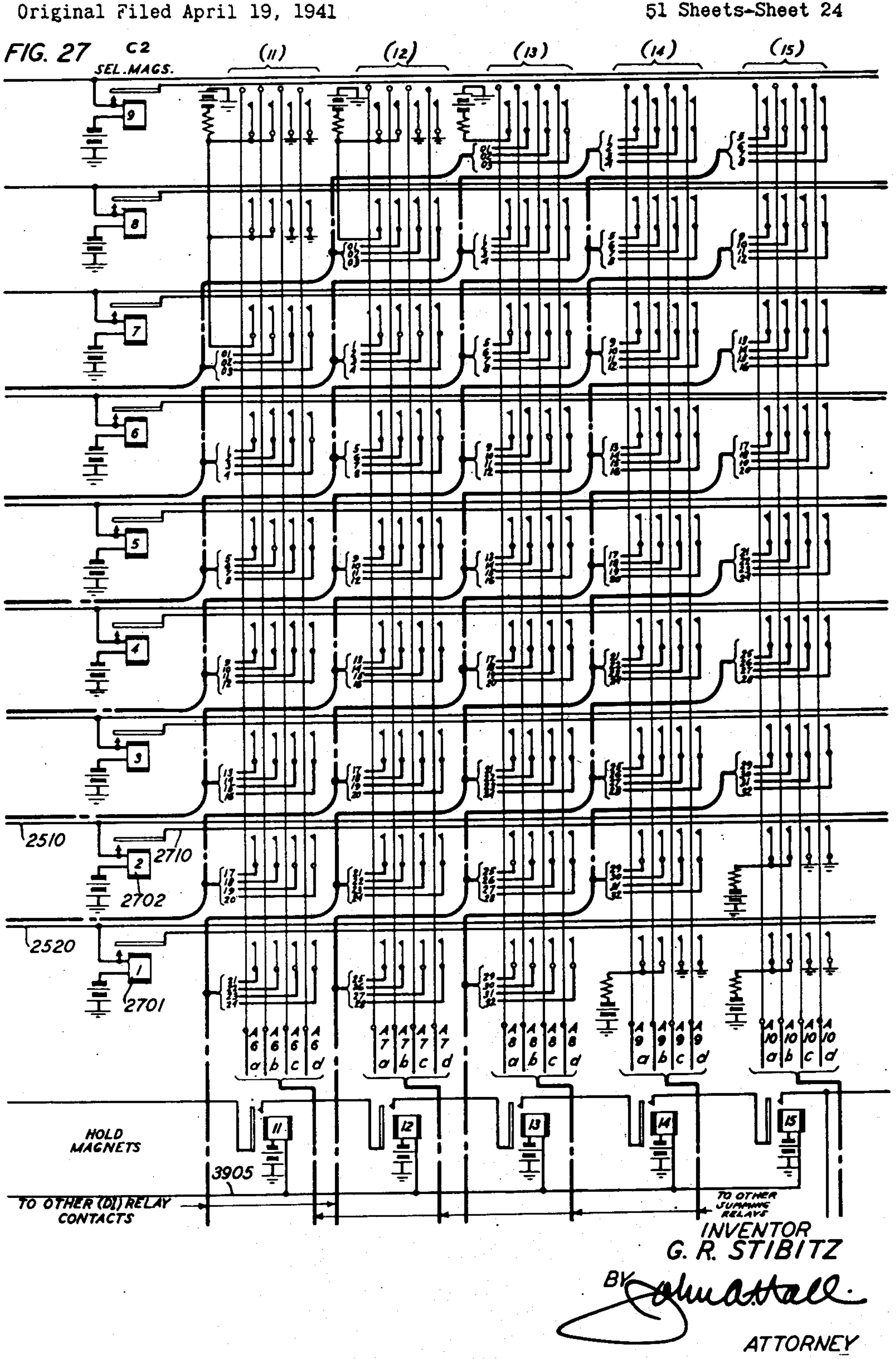
Figure 28:
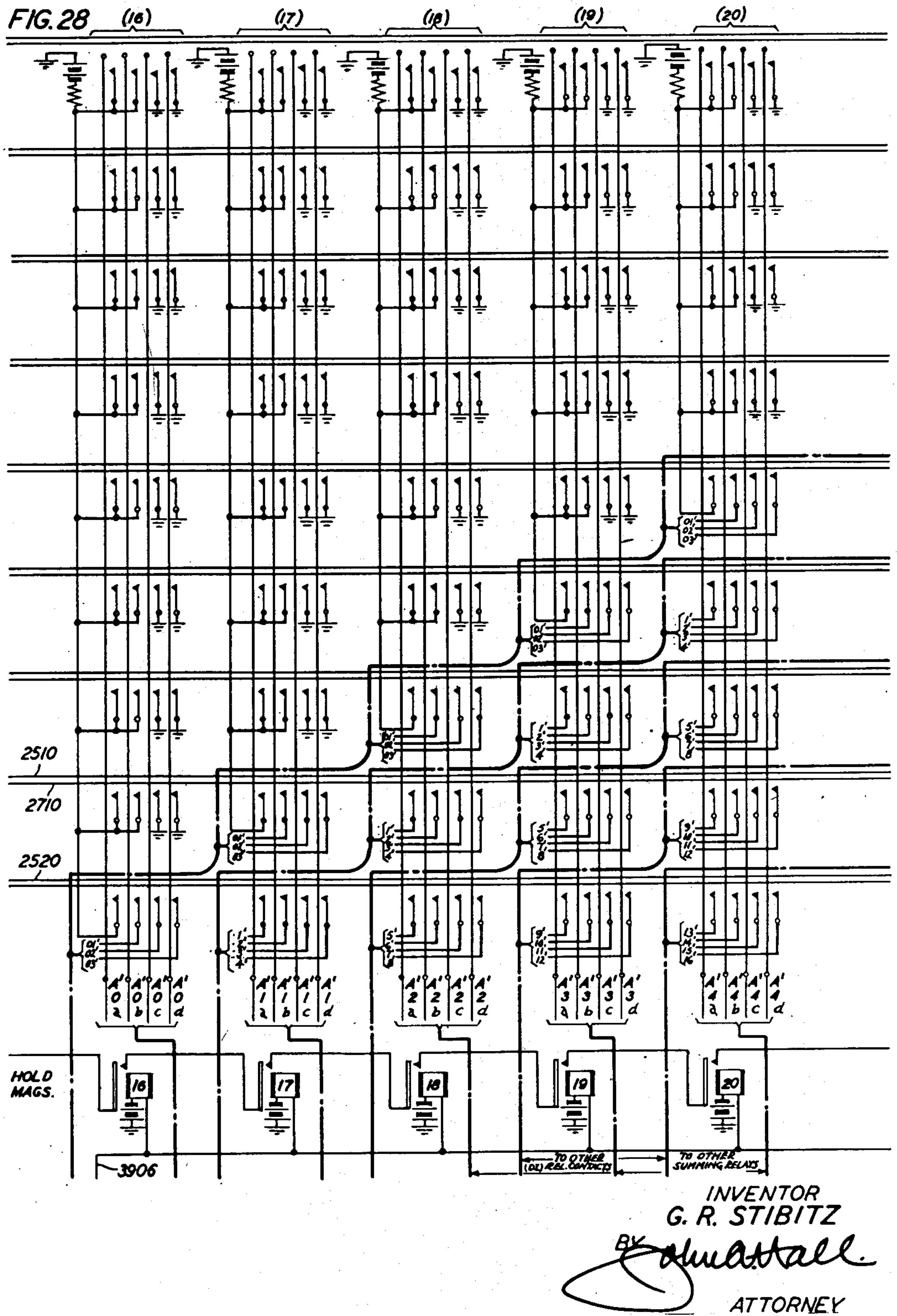
Figure 29:
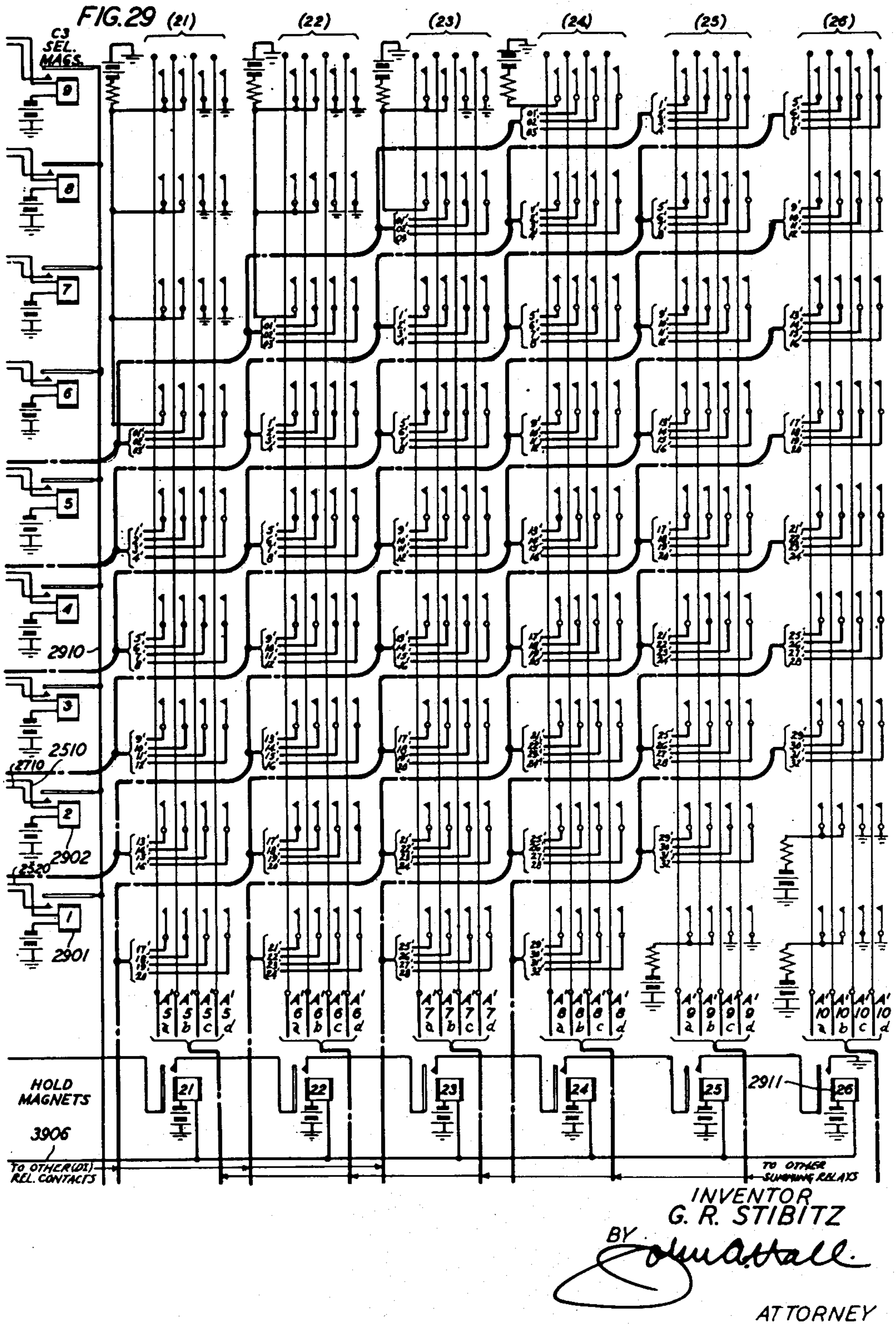
Figure 30:
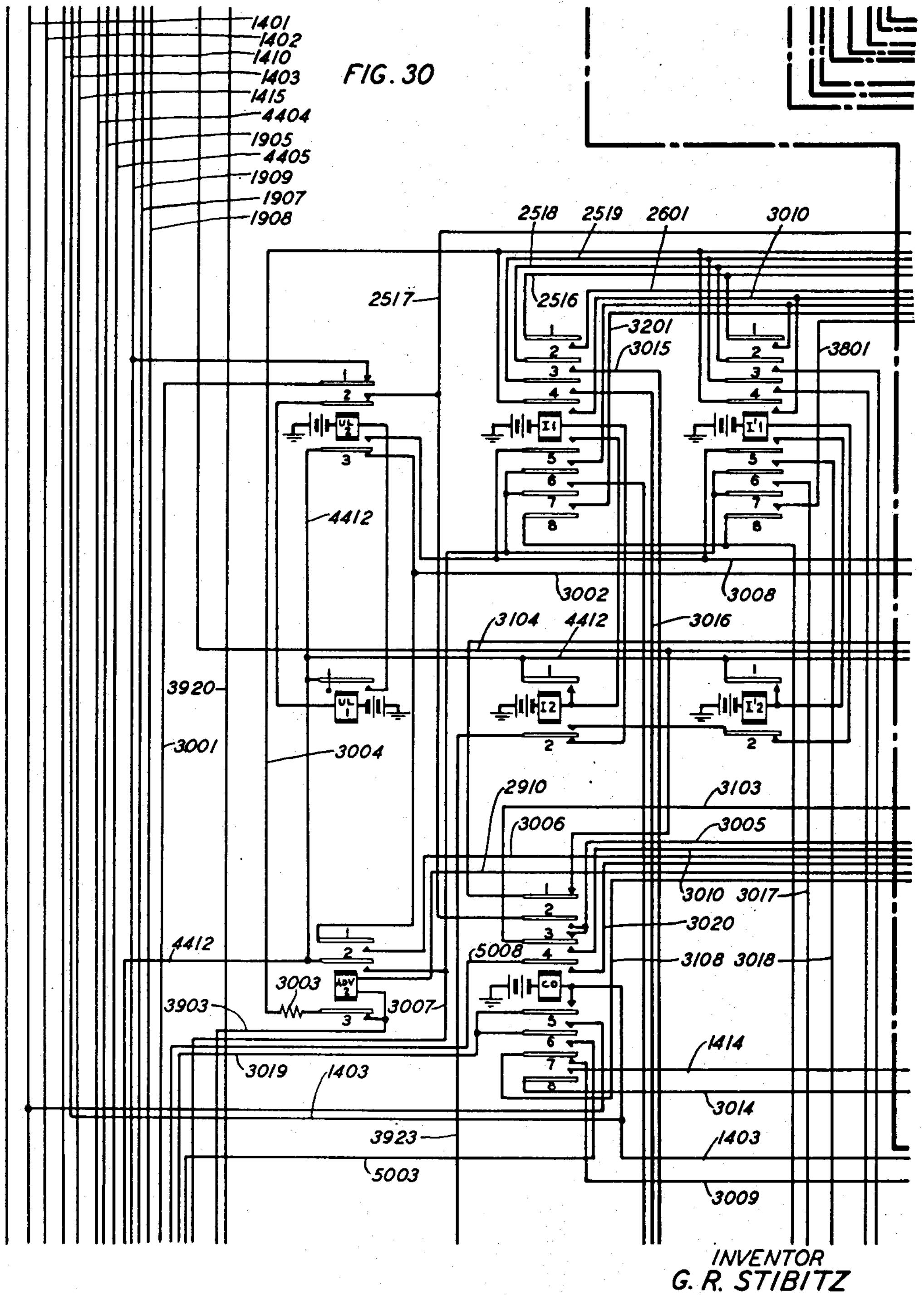
Figure 31:
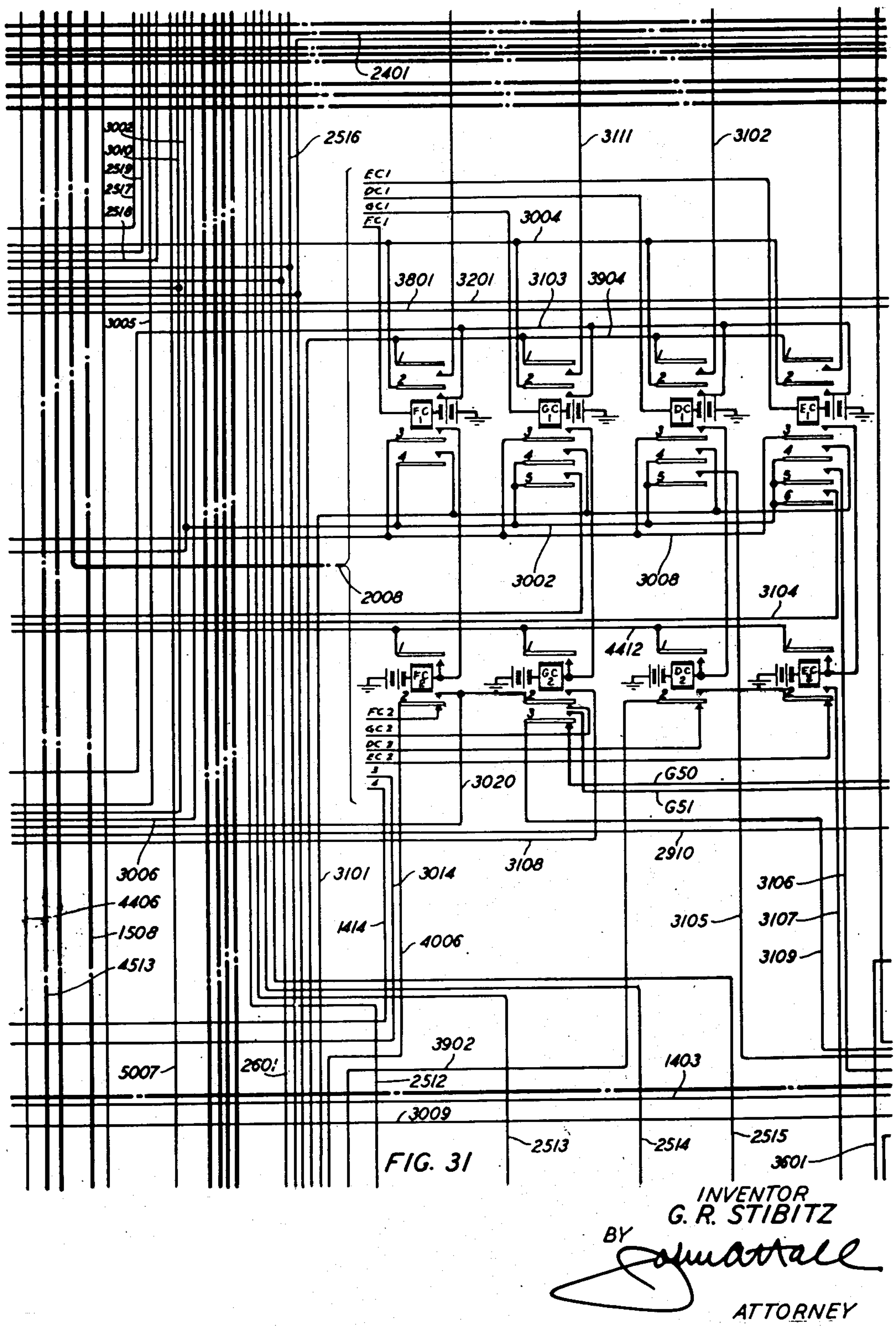
Figure 32:
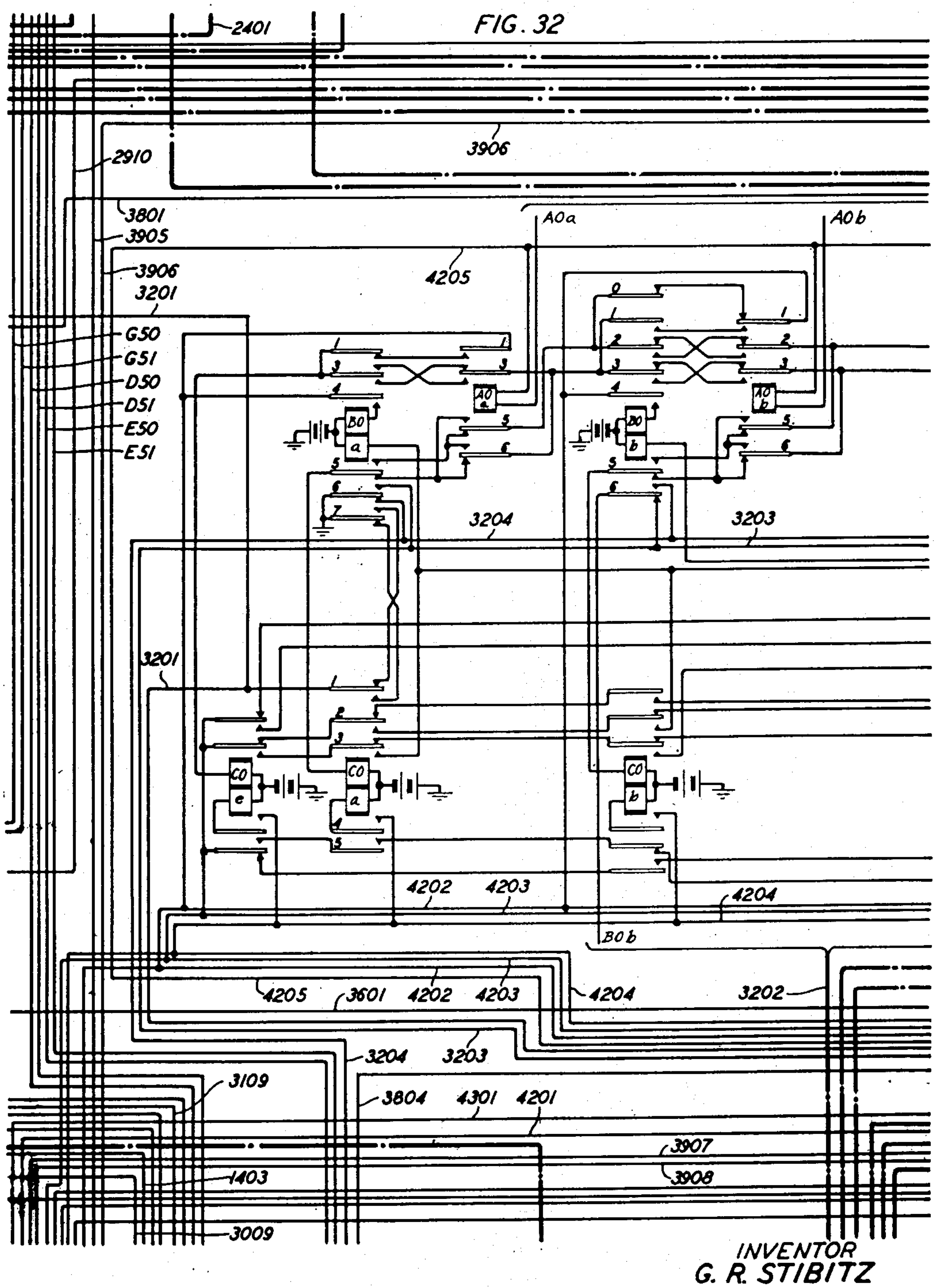
Figure 33:
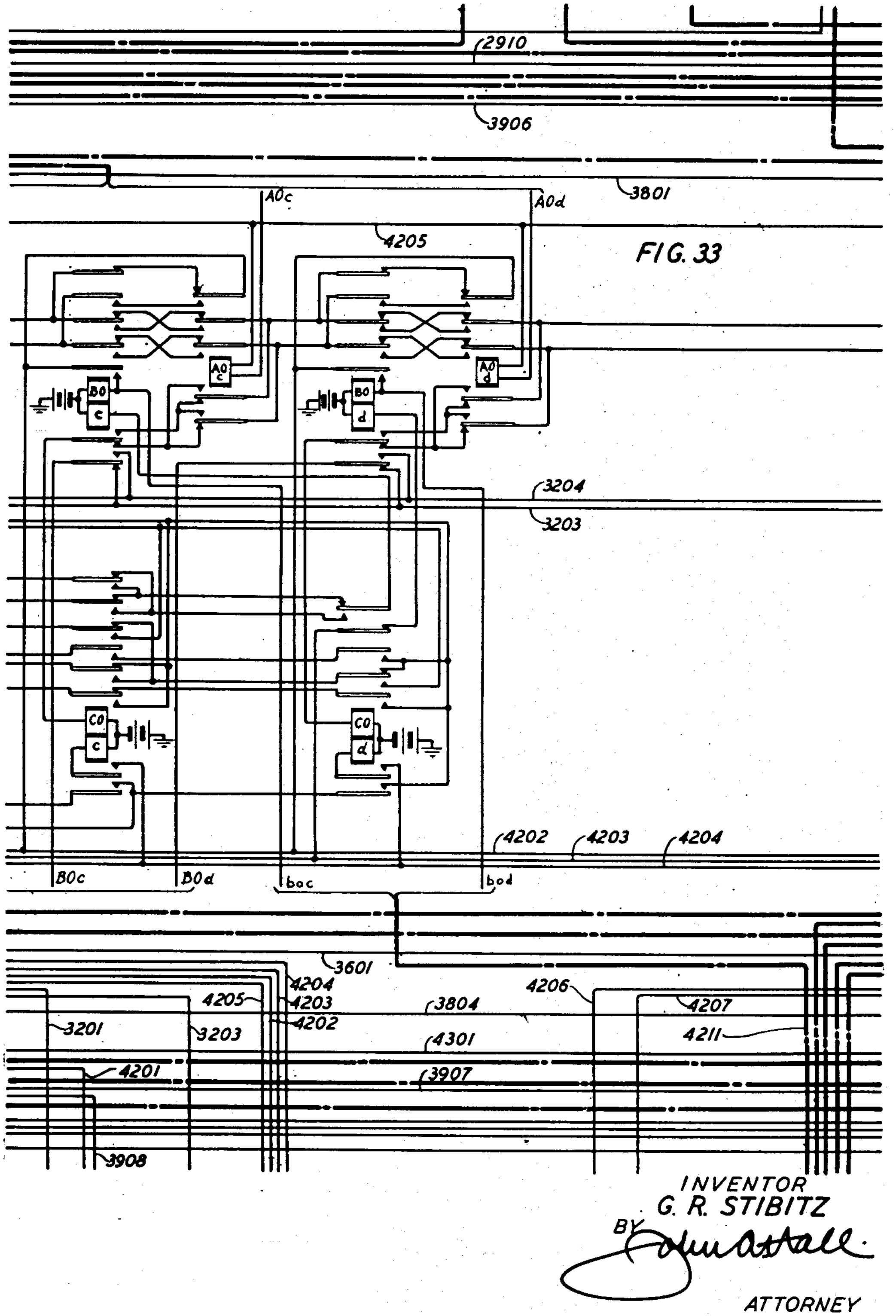
Figure 34:
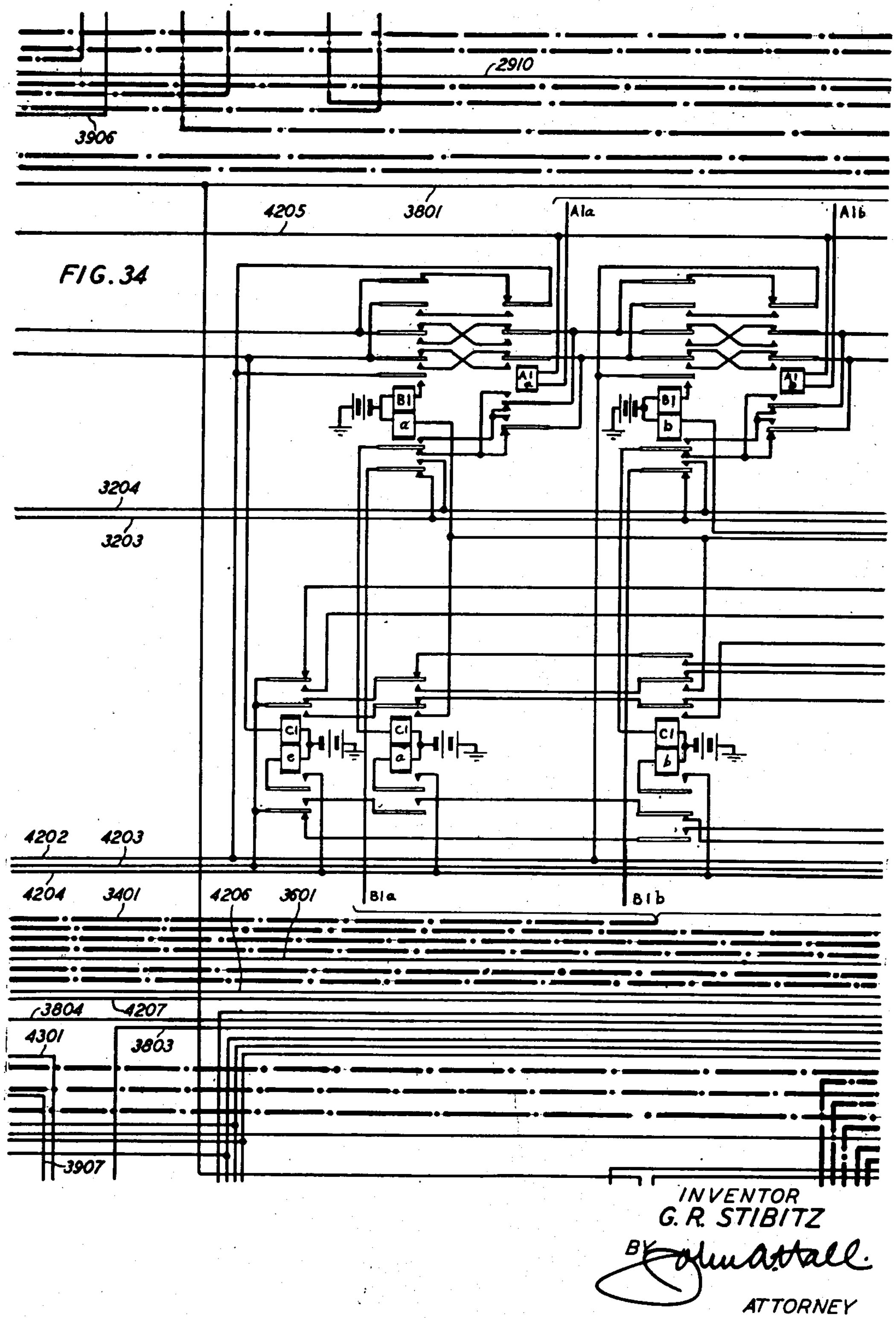
Figure 35:
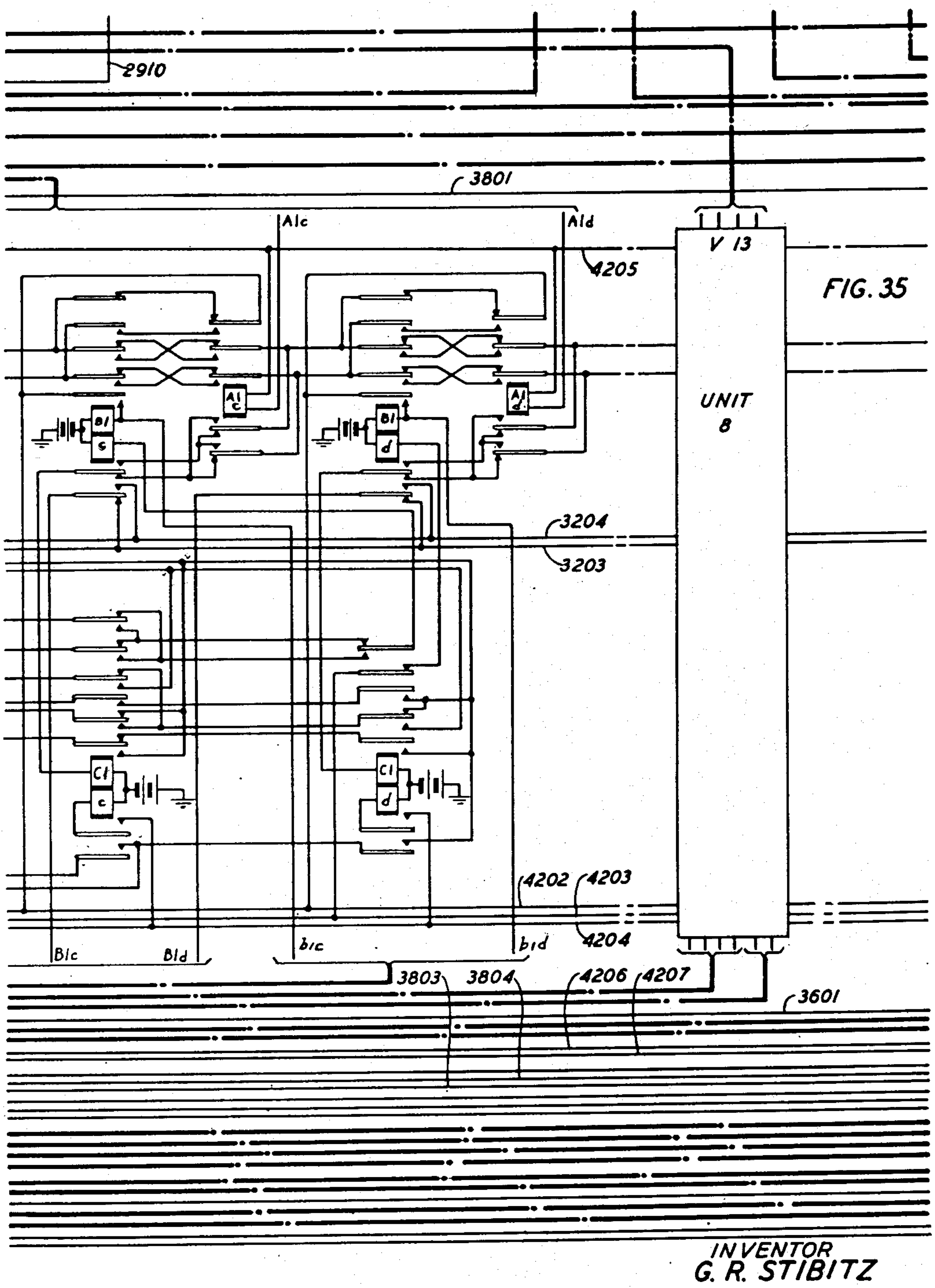
Figure 36:
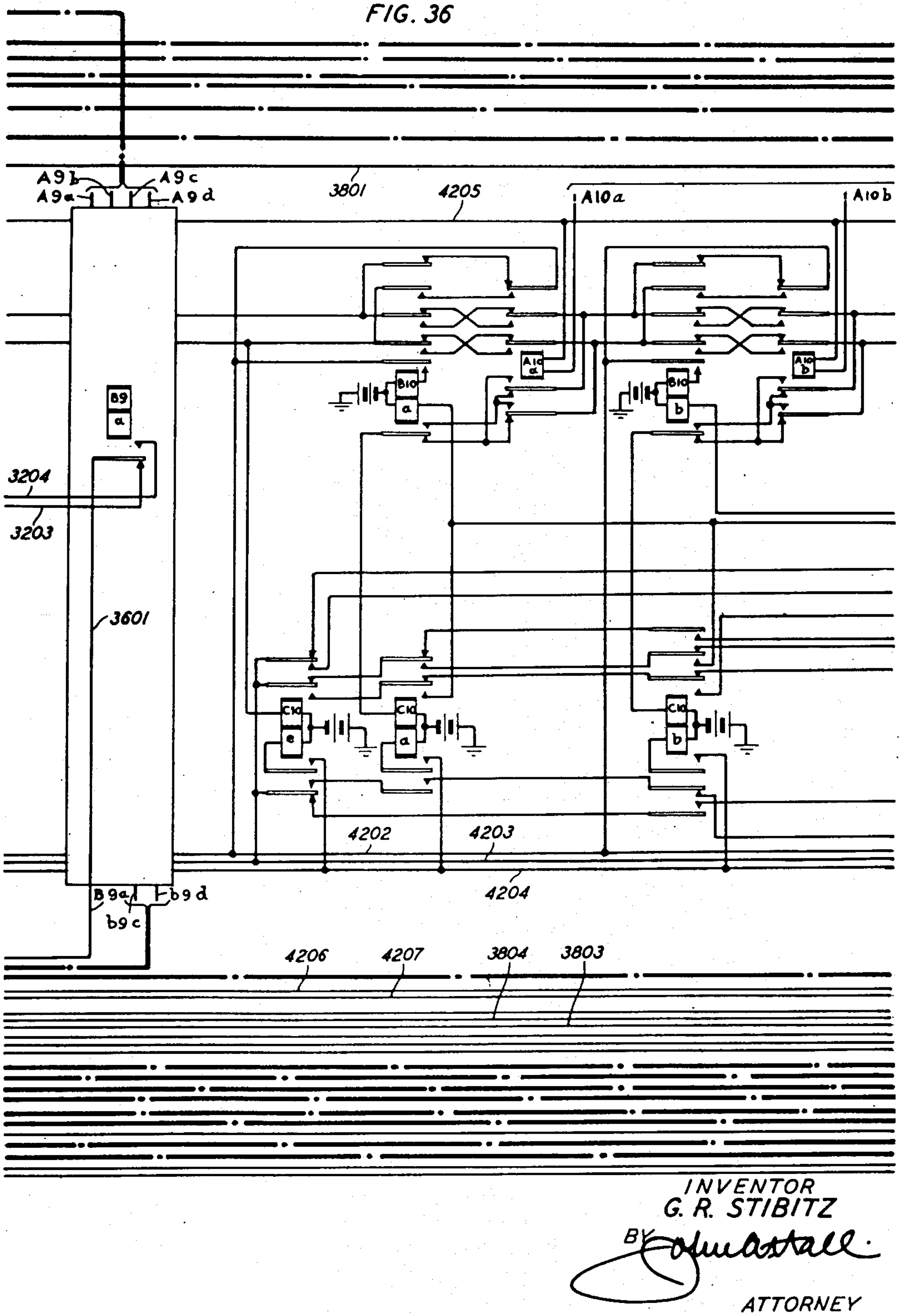
Figure 37:
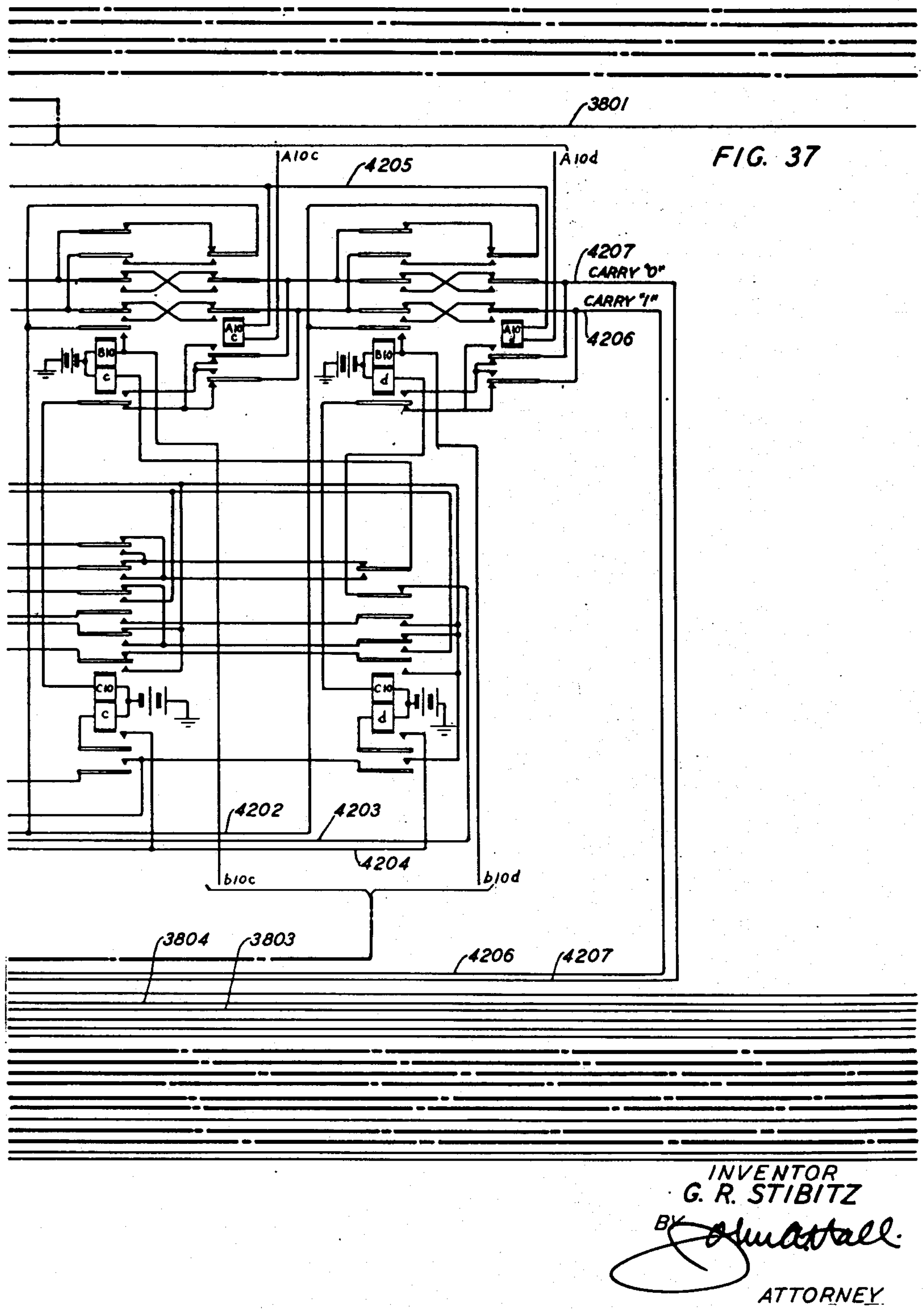
Figure 38:
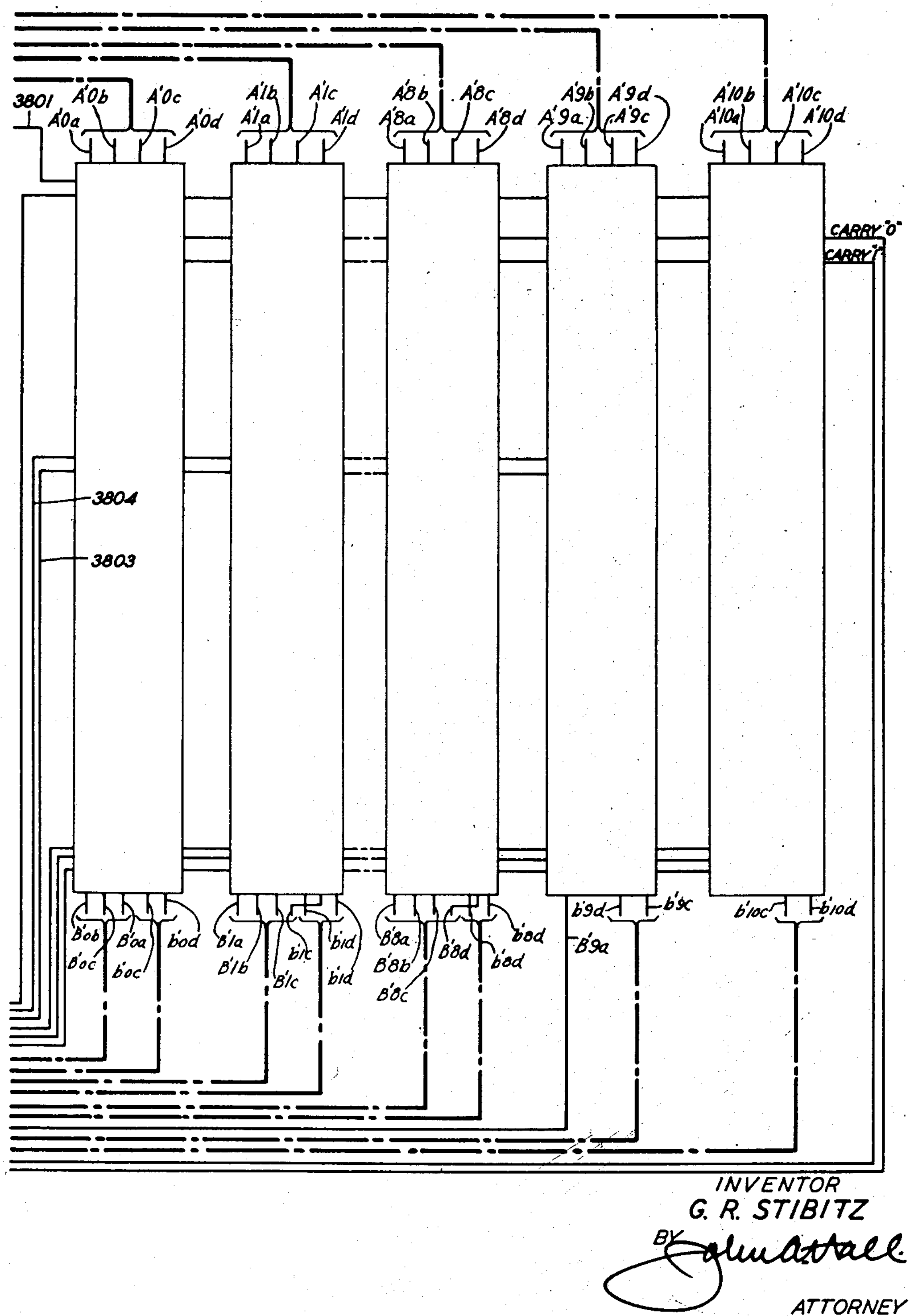
Figure 39:
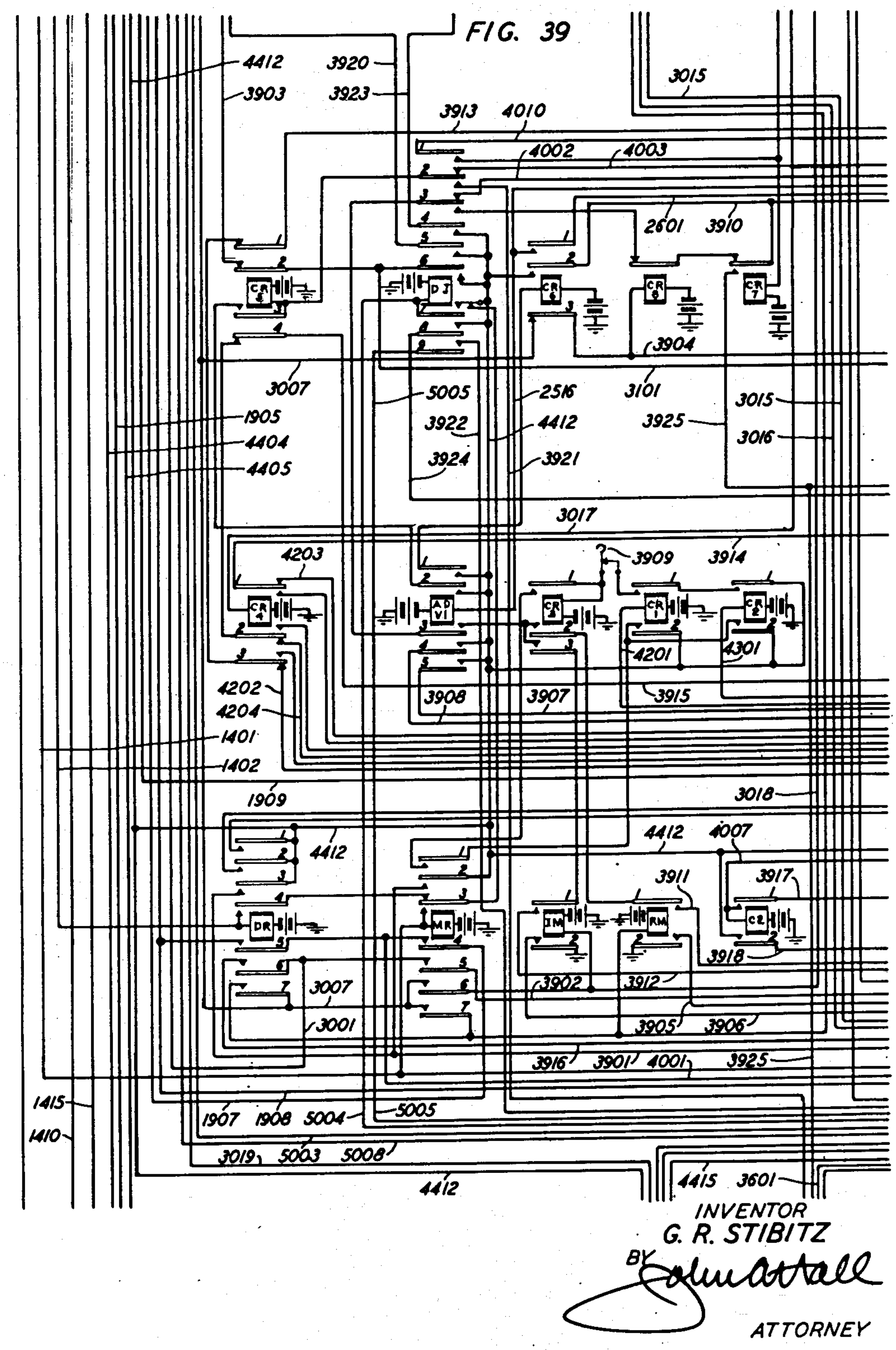
Figure 40:
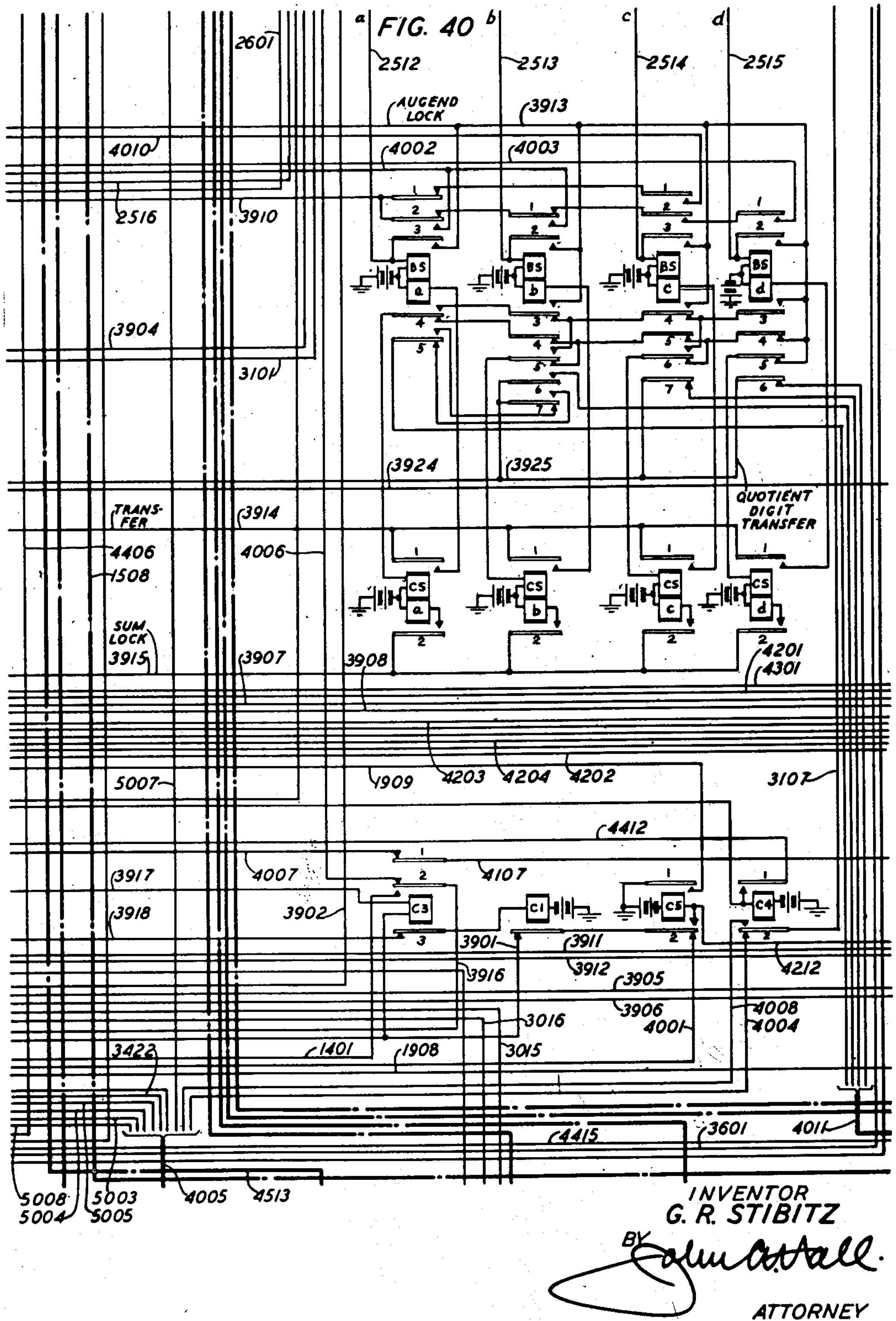
Figure 41:
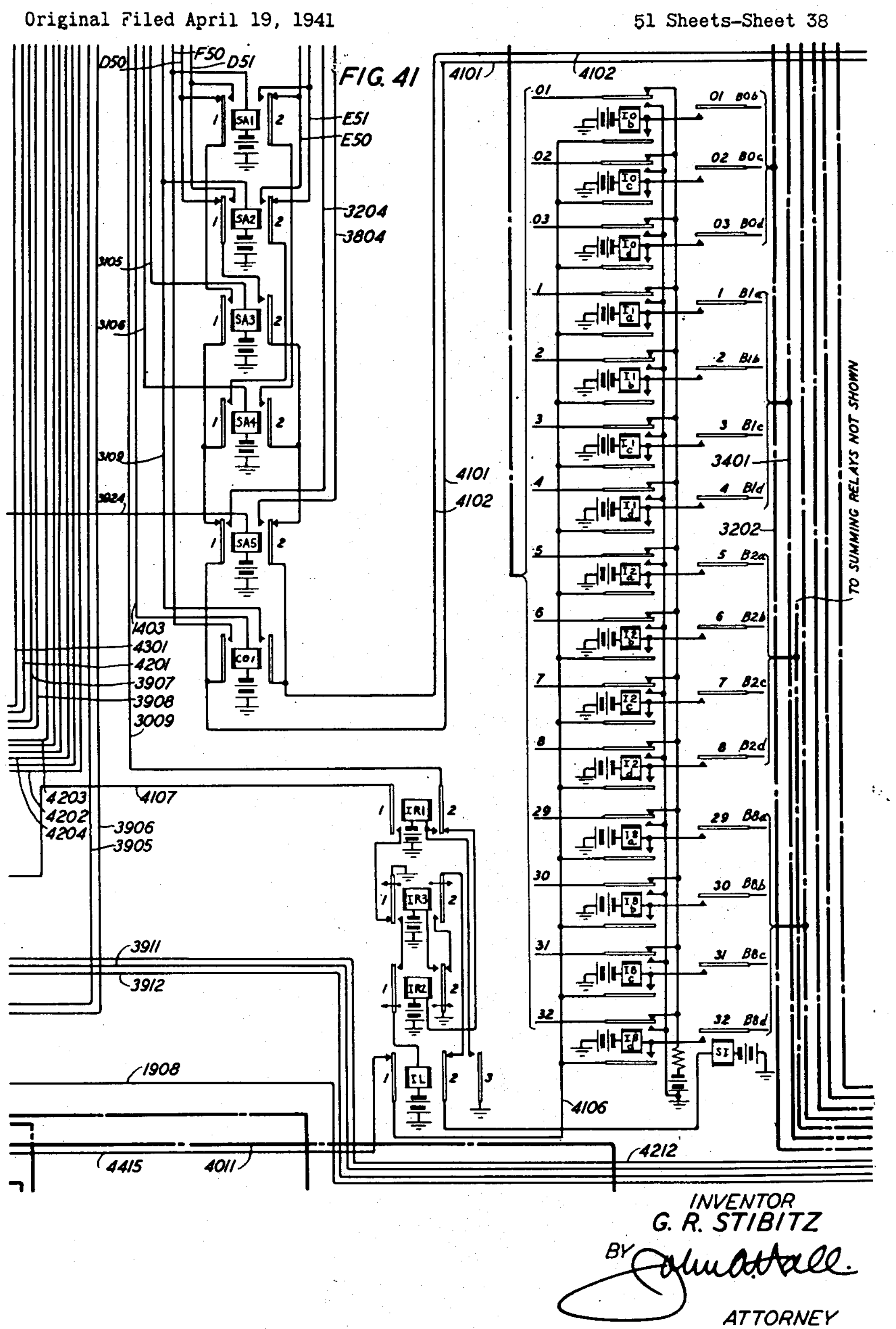
Figure 42:
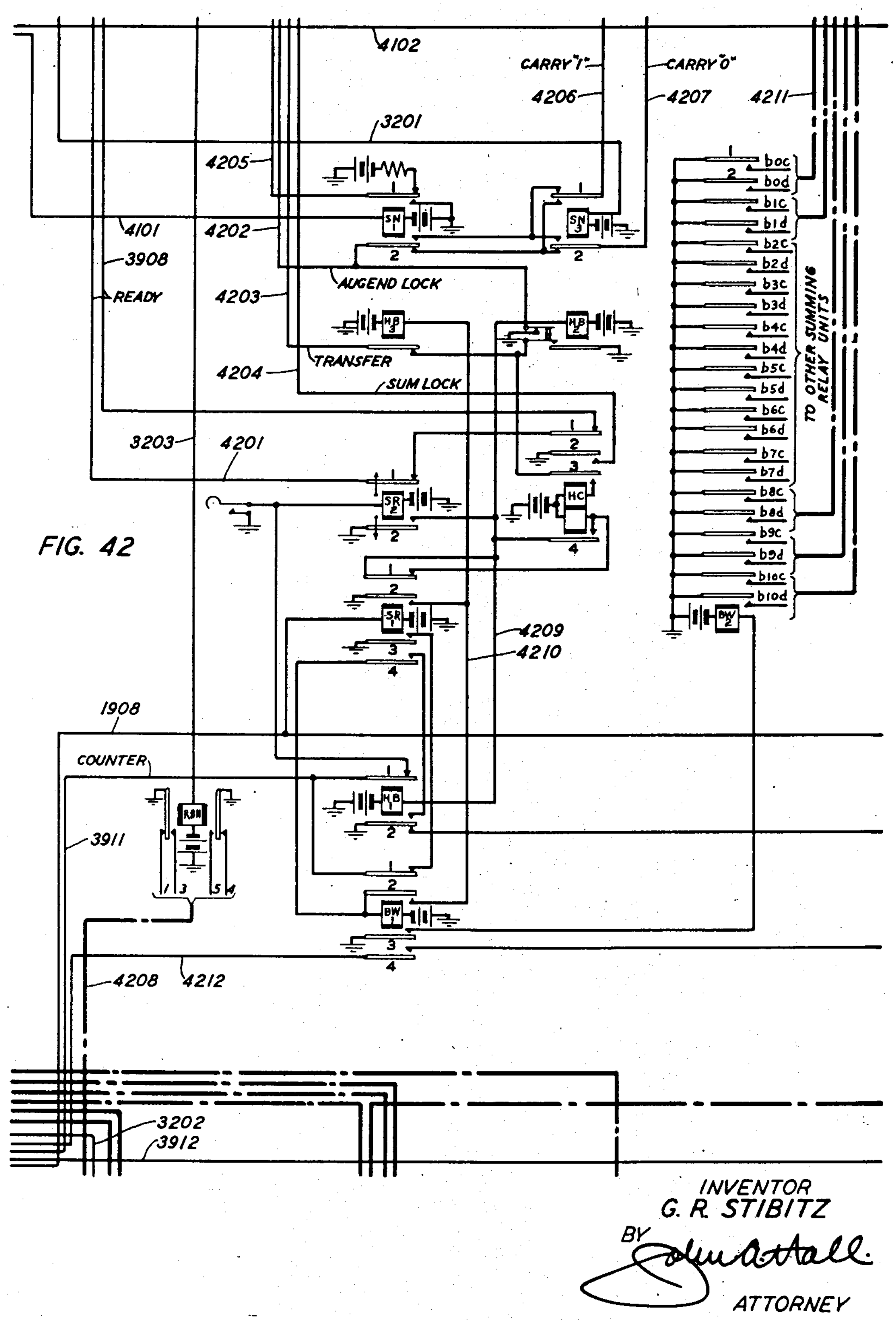
Figure 43:
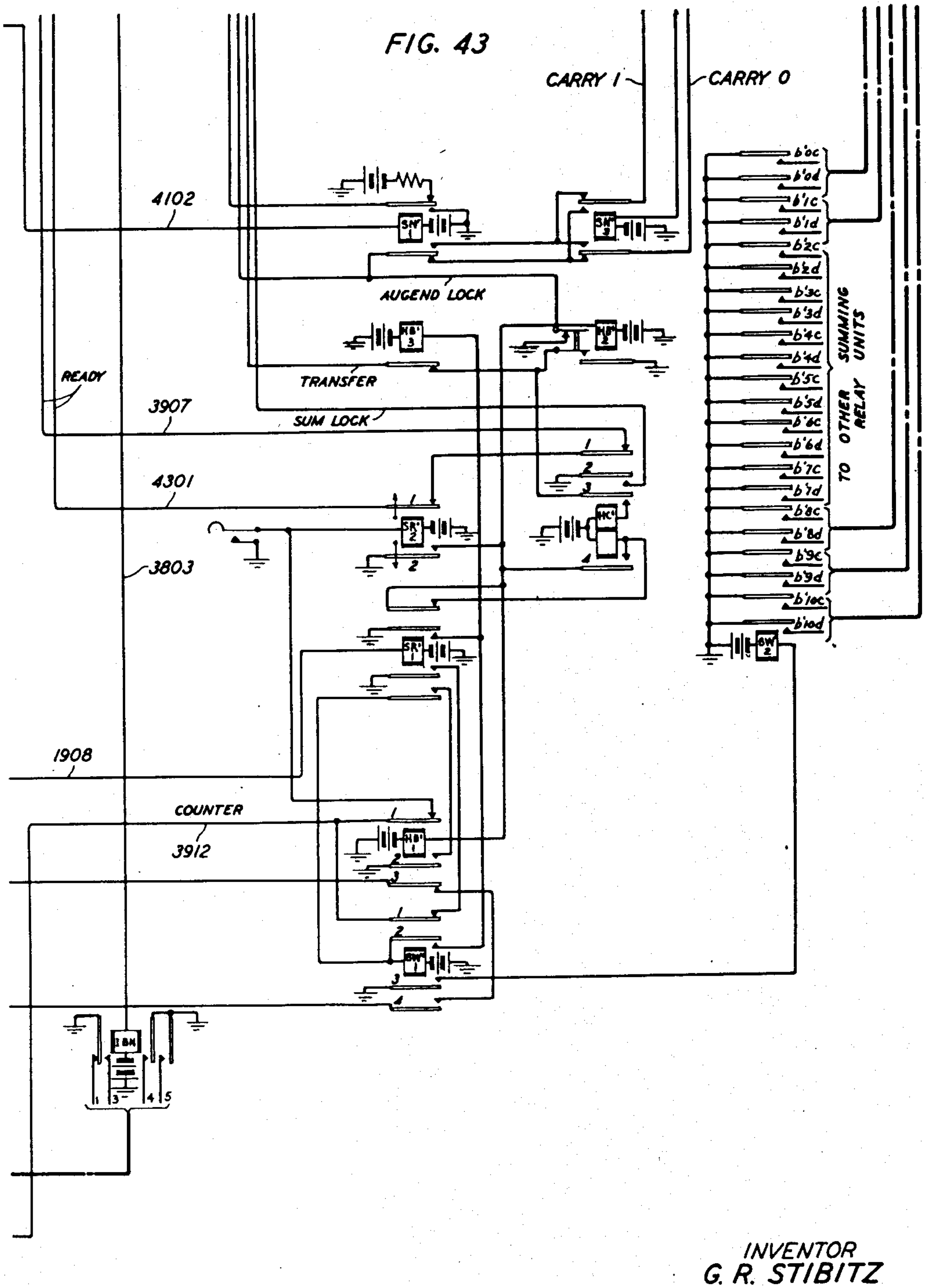
Figure 44:
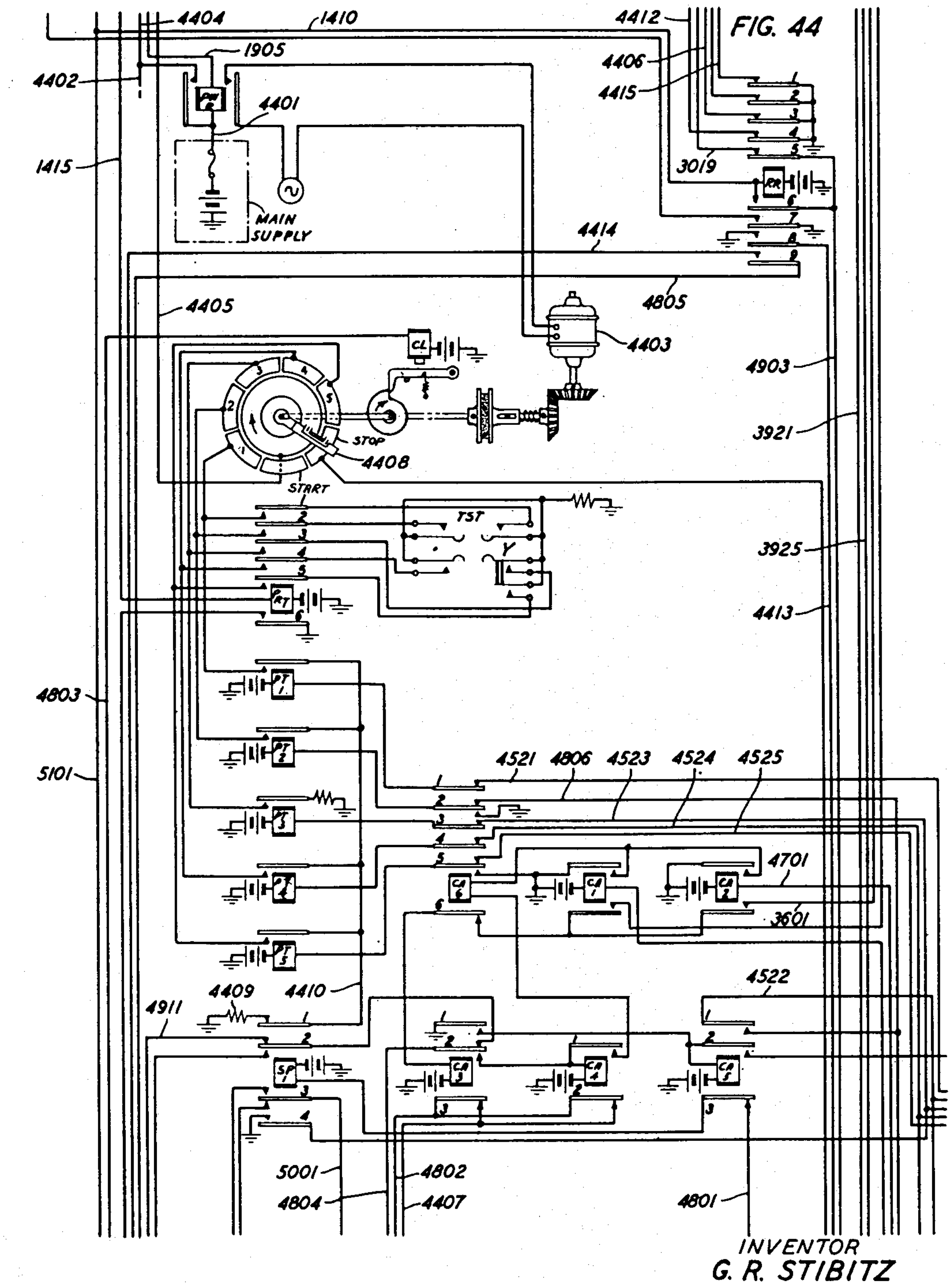
Figure 45:
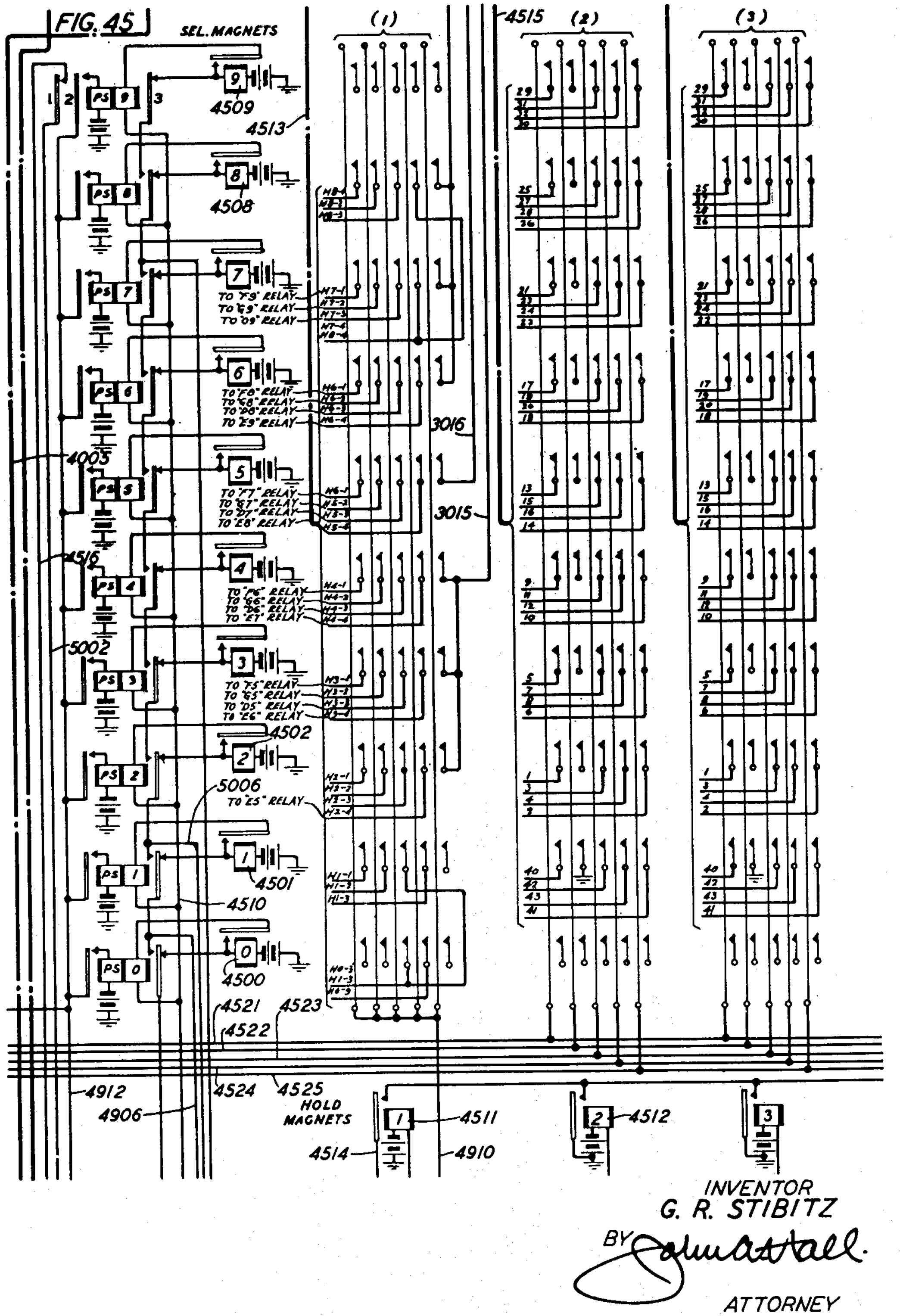
Figure 46:
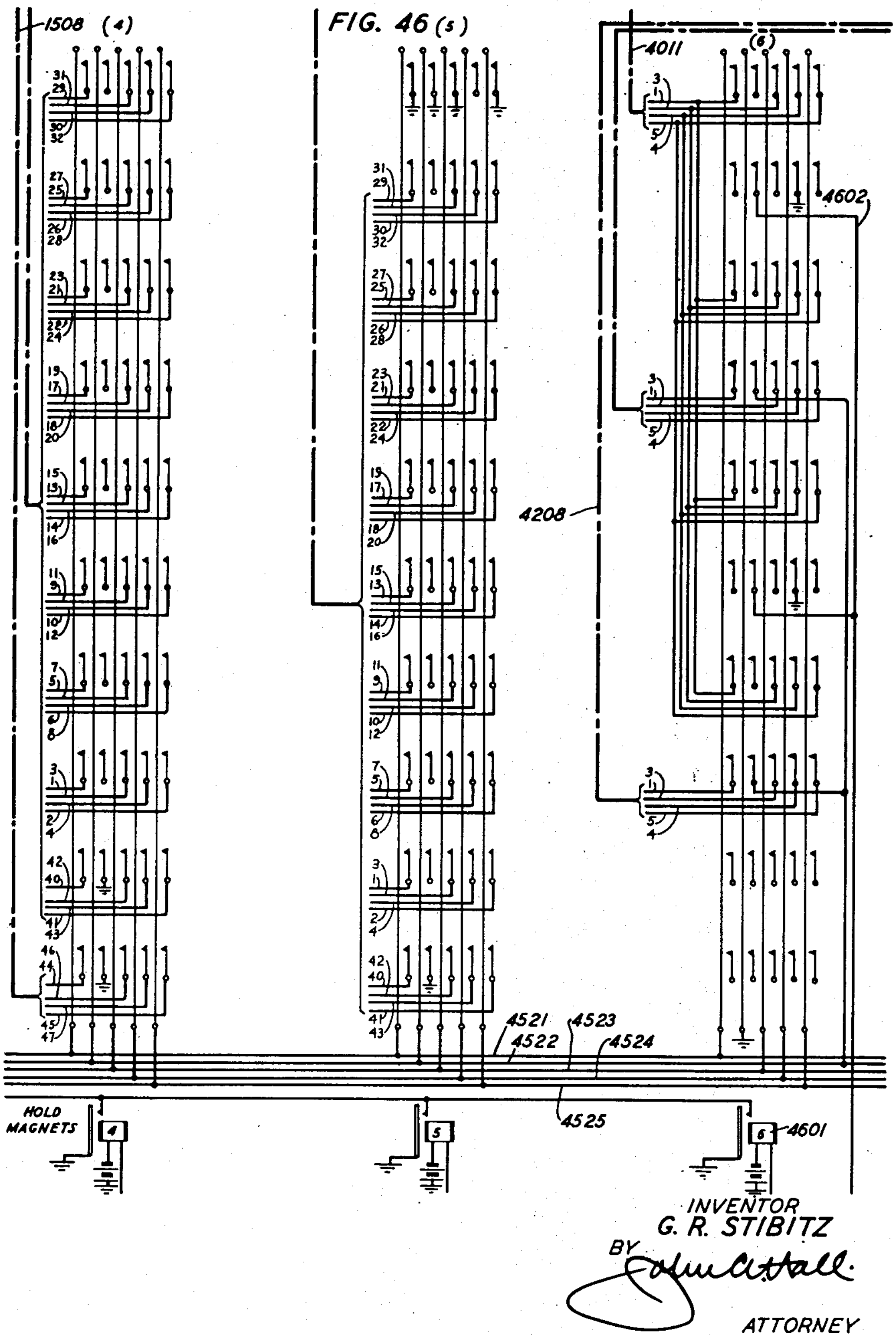
Figure 47:
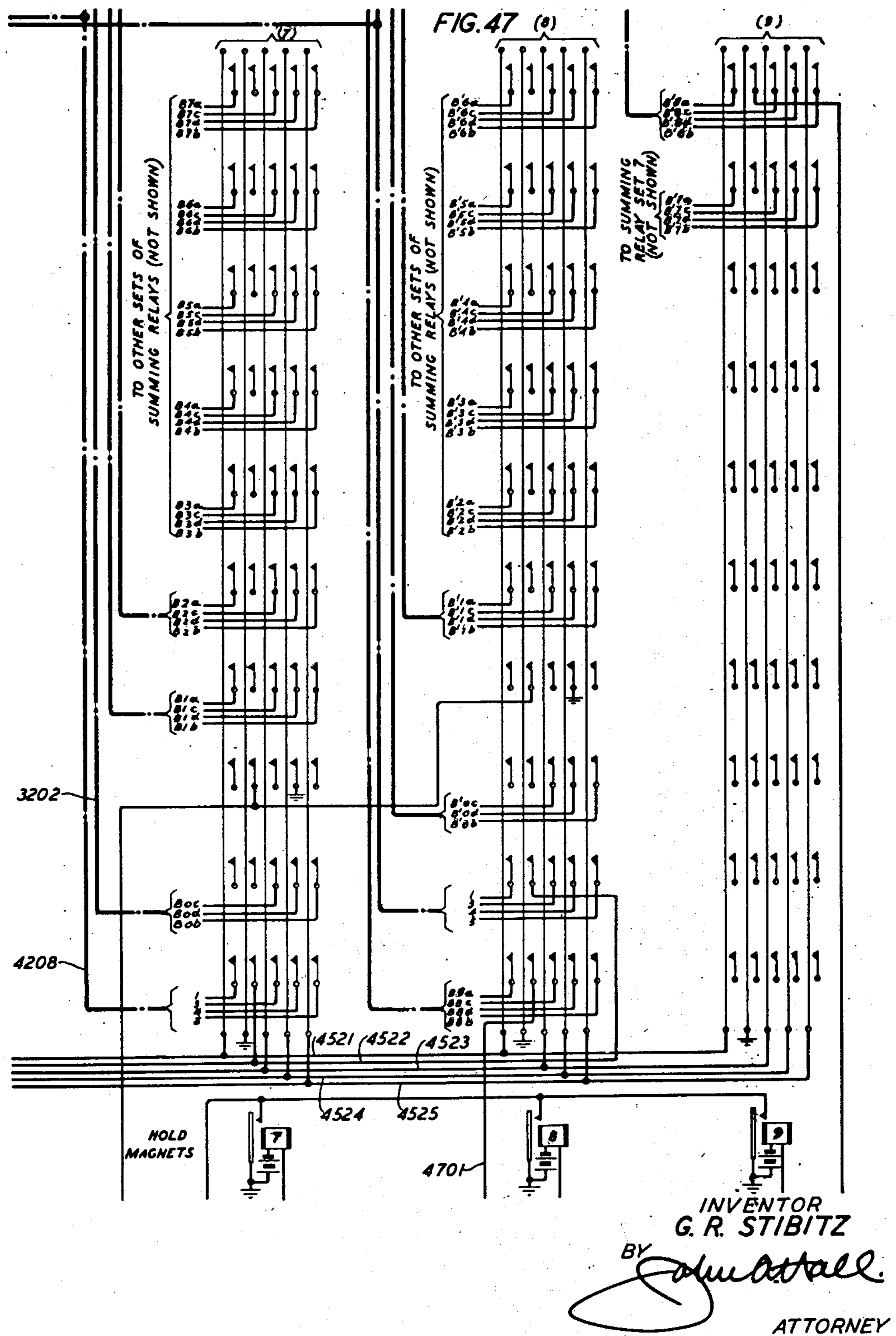
Figure 48:
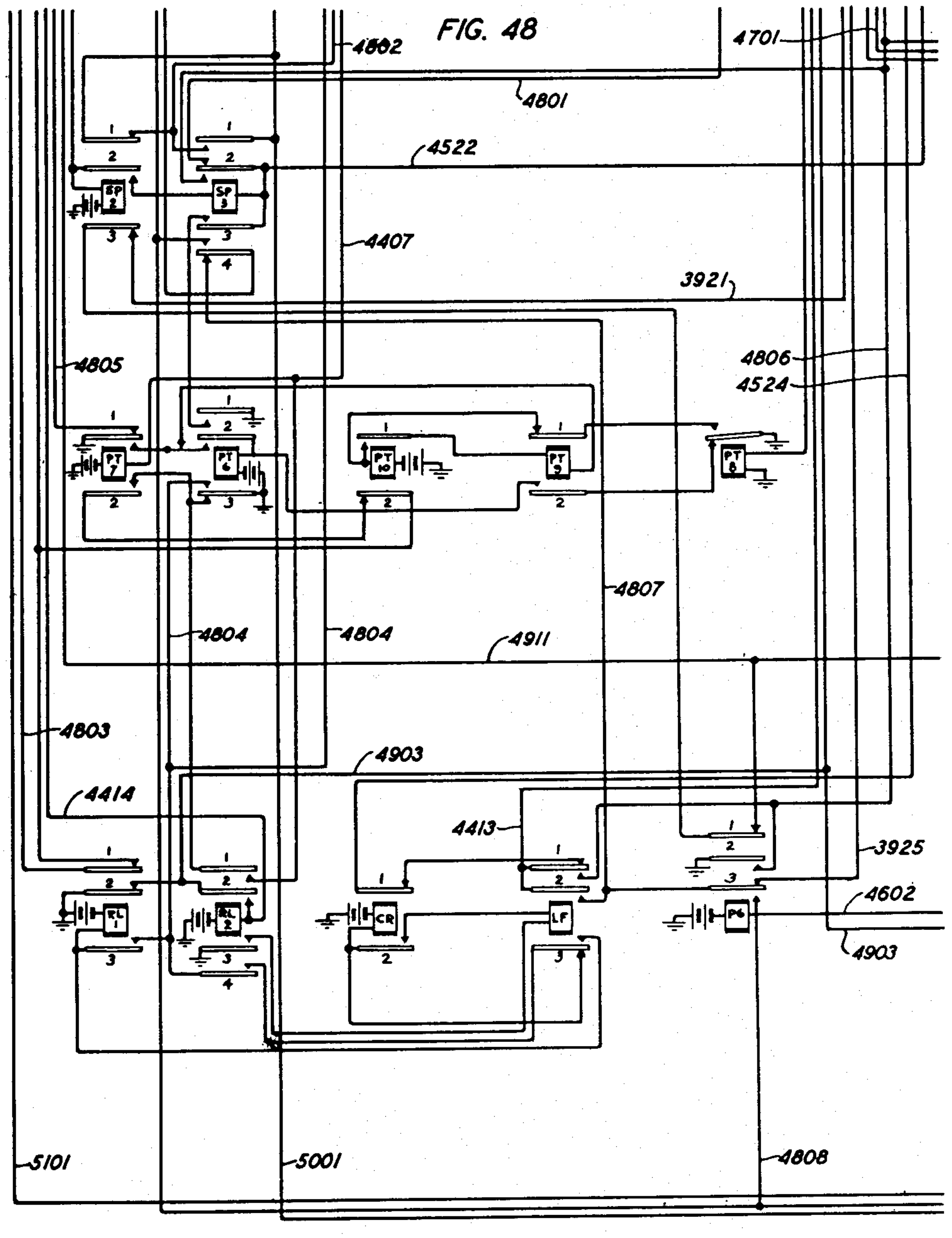
Figure 49:
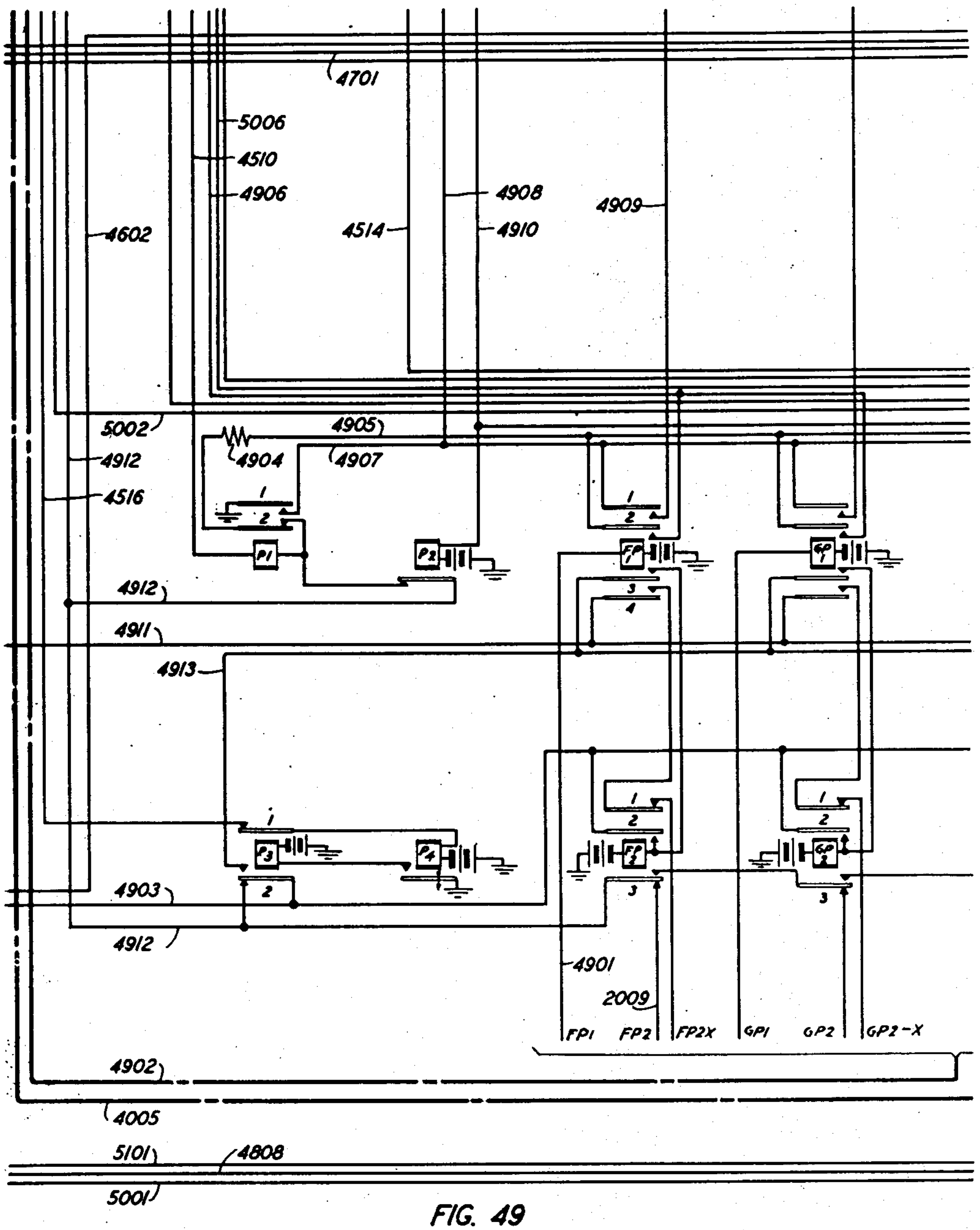
Figure 50:
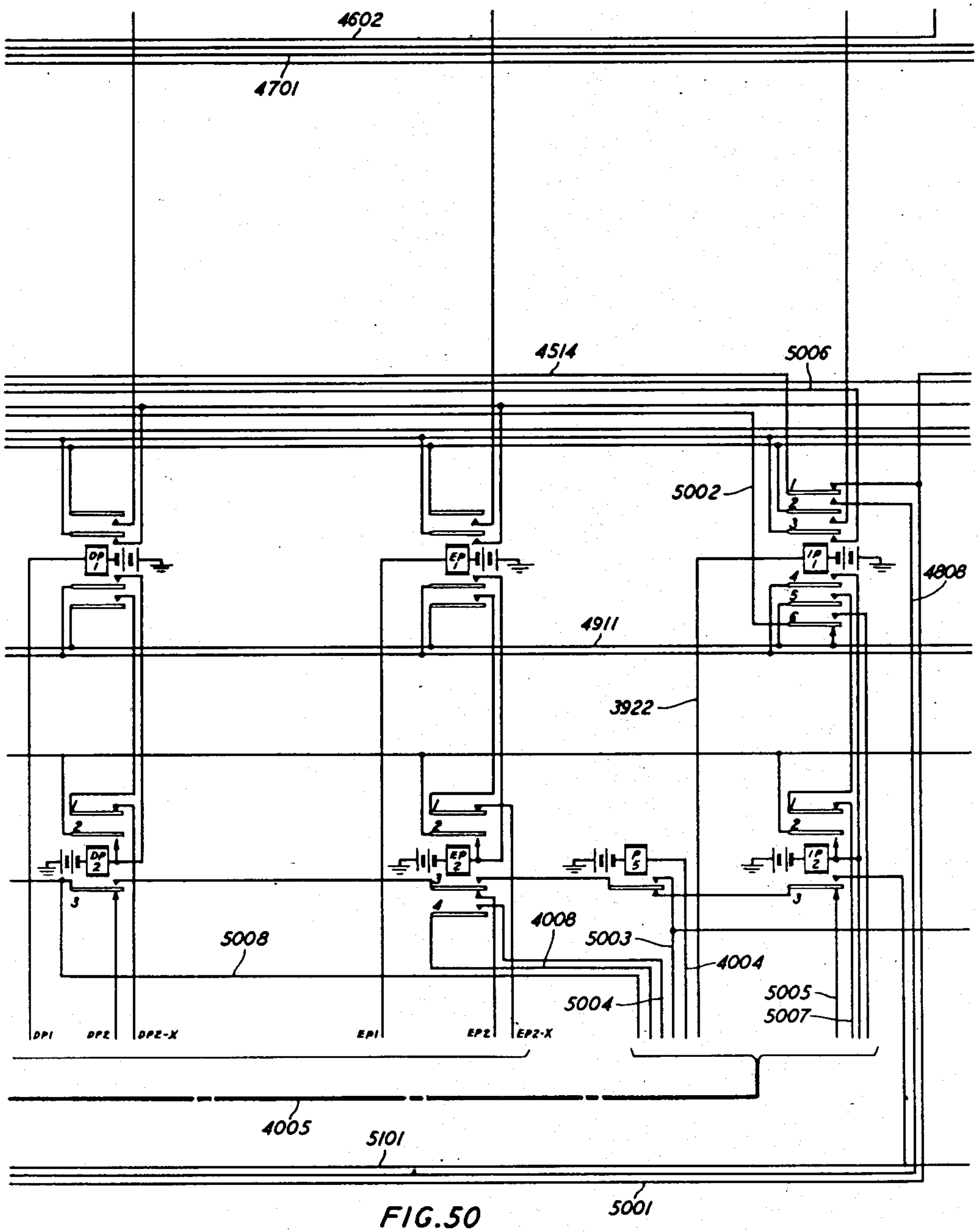
Figure 51:
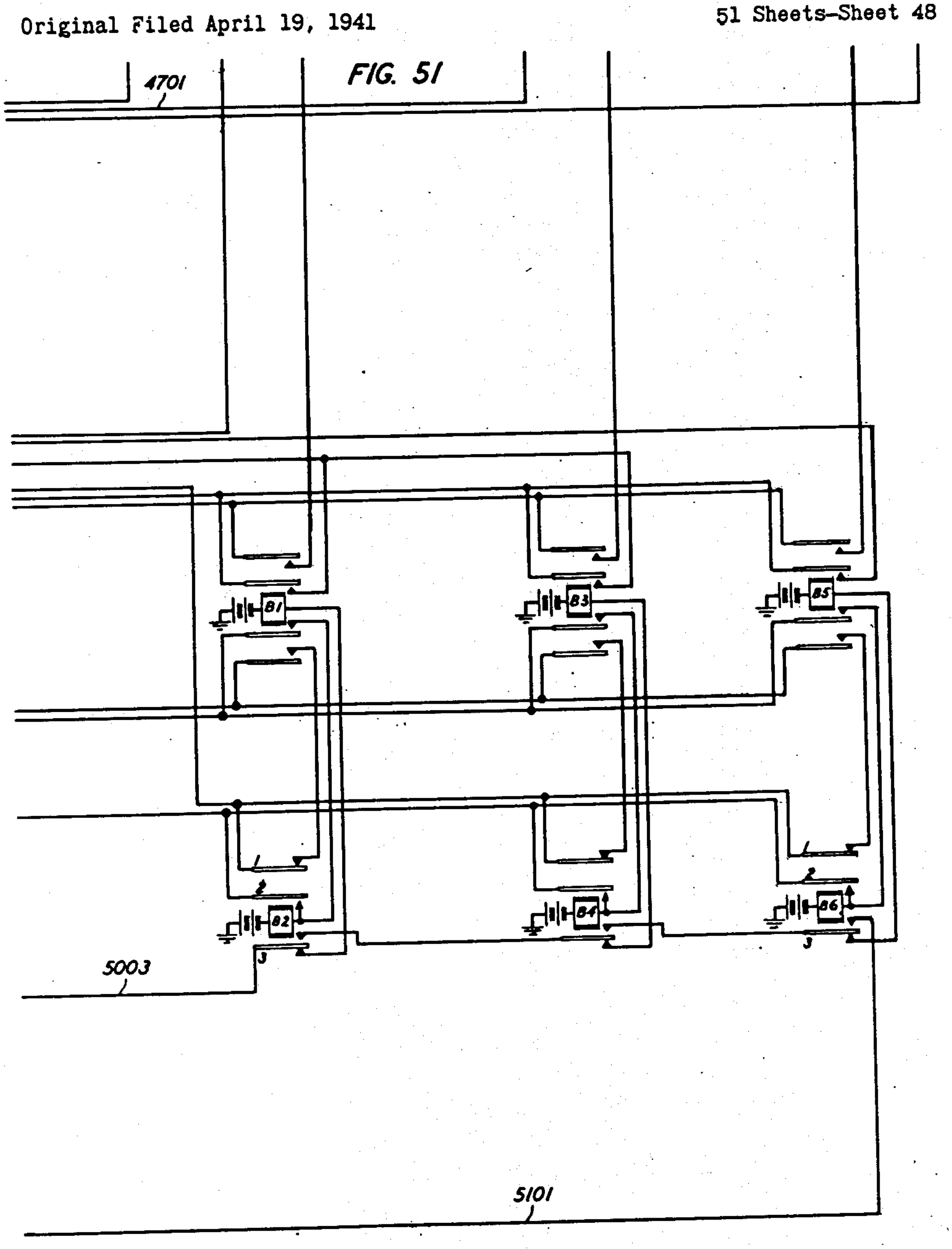
Figure 52:
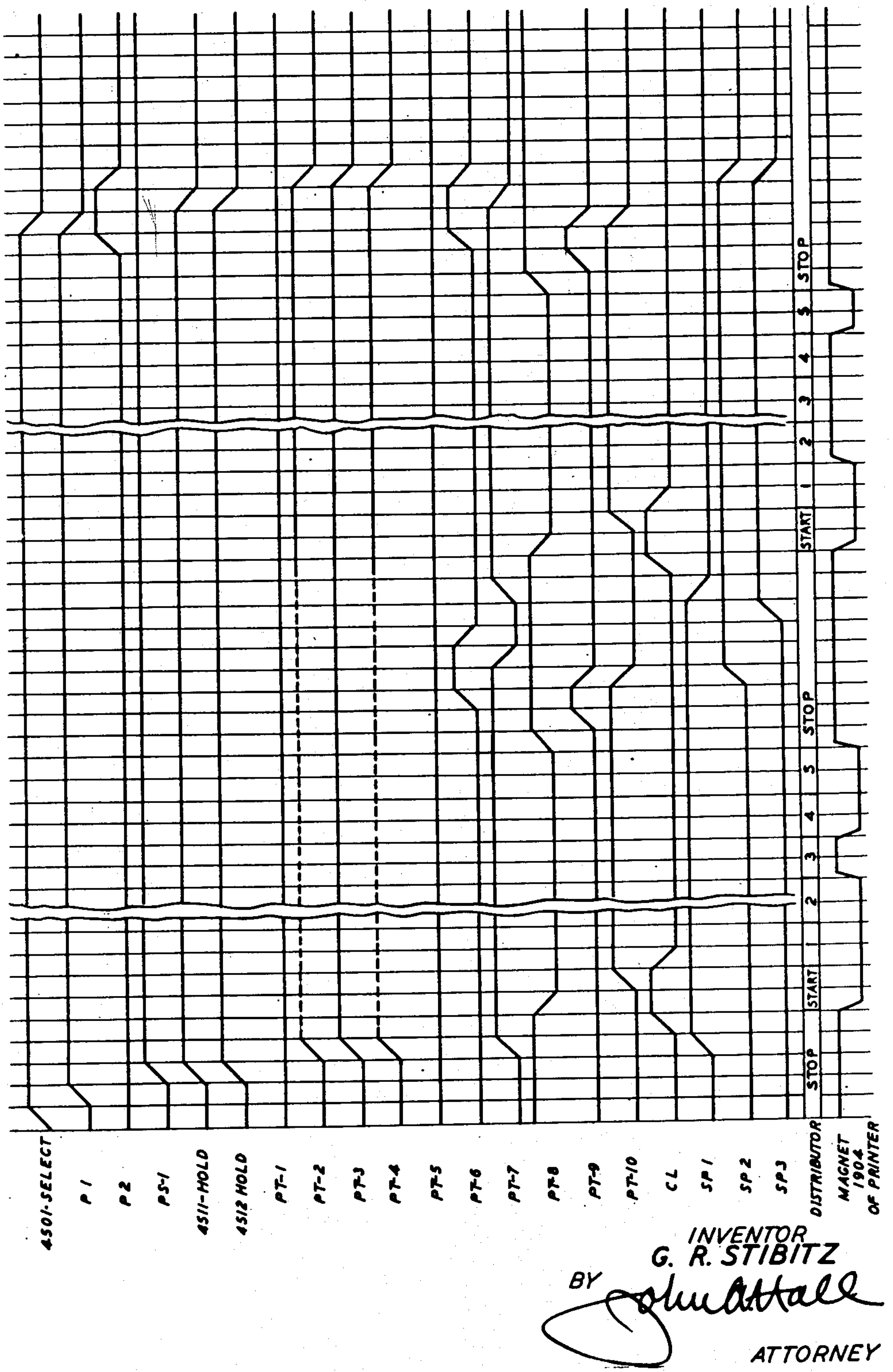
Figure 53:
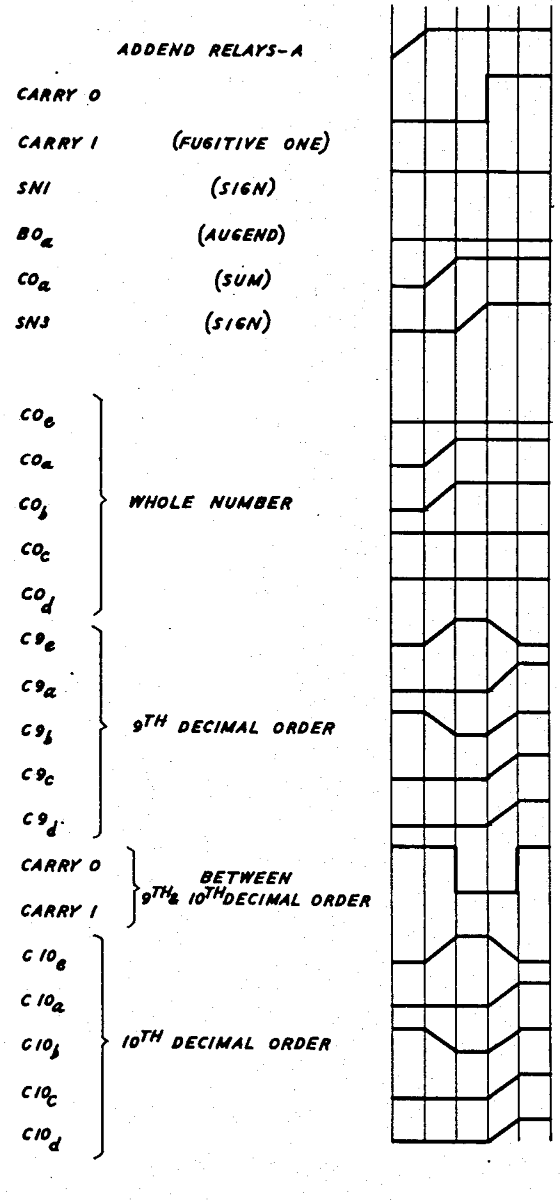
Figure 54:
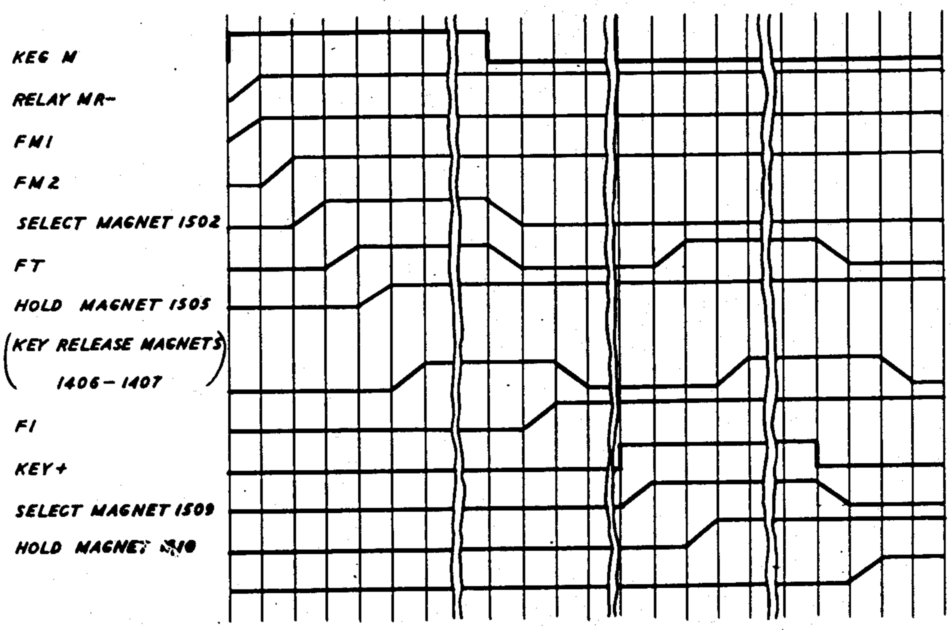
Figure 55:
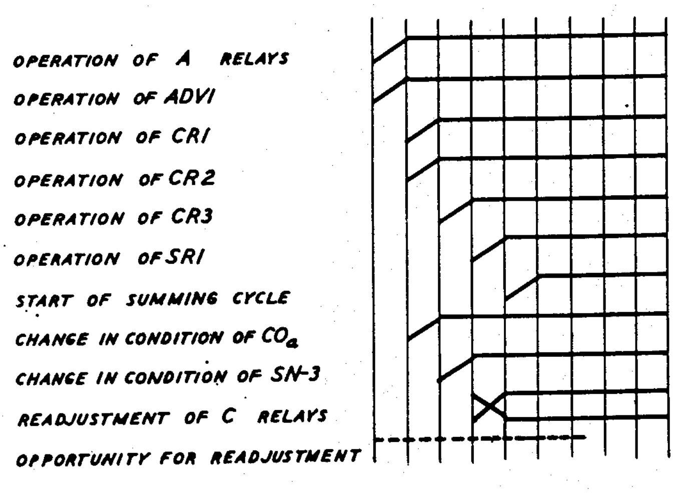

Fig. 11 is a skeleton circuit diagram showing the sign relays and indicating how they control the path for returning the fugitive one to the extreme right-hand calculator unit and indicating schematically the carry chain, this figure also showing how the final result is always in the form of a factor whose whole number is less than five, and explaining the functions of the various cross-point contact sets thereof;

Fig. 12 is a diagram showing how Figs. 14 to 51, inclusive, may be arranged to form a complete circuit diagram of the device of the present invention;

Fig. 13 is a diagram similar to the diagram of Fig. 12 except that each rectangle contains a descriptive caption descriptive of what each figure contains in place of the figure numbers used in Fig. 12;

Fig. 14 shows the entry keys used at the operator's station;

Figs. 15, 16, 17 and 18 show the registers for factors F, G, D and E, respectively;

Fig. 19 shows the printer which records the problem posed by the operation of the keys of Fig. 14 and the solution thereto calculated by the device;

Figs. 20, 21, 22 and 23 show the progress circuit divided into the parts thereof corresponding to the registers for factors F, G, D and E, respectively;

Fig. 24 is the factor entry shifting circuit, whereby the factors entered into the column shift switches are changed as the calculation of the solution proceeds;

Fig. 25 is the multiplier digit switch from which the counting relays are set digit by digit;

Figs. 26 and 27 show the column shift switch for the real factor calculator, Fig. 26 showing verticals 0 to 5, inclusive thereof and Fig. 27 showing verticals 6 to 10, inclusive thereof;

Figs. 28 and 29 show the column shift switch for the imaginary factor calculator, Fig. 28 showing verticals 0 to 4, inclusive thereof and Fig. 29 showing verticals 5 to 10, inclusive thereof;

Fig. 30 shows that portion of the master control circuit having to do with the multiplier digit switch;

Fig. 31 shows the progress circuit for the multiplier digit switch;

Figs. 32 and 33 show a set of summing relays for the whole number decimal order of the real factor calculator;

Figs. 34 and 35 show a set of summing relays for the first place (after the decimal point) decimal order of the real factor calculator and an indication of a similar set of summing relays for the eighth place decimal order of said real factor calculator;

Figs. 36 and 37 show an indication of a set of summing relays for the ninth place and in detail a set of summing relays for the tenth place decimal order of the real factor calculator;

Fig. 38 shows an indication of sets of summing relays for the whole number, the first, eighth, ninth and tenth place decimal orders of the imaginary factor calculator;

Fig. 39 shows the master control relays originally operated from the keys of Fig. 14 and which control the over-all operation of the device;

Fig. 40 shows the counting relays, set by the multiplier digit switch in a problem of multiplication and which count the number of subtractions in a problem of division;

Fig. 41 is a storage register which is used to store the value of $F^2+G^2$ after it has been calculated and to hold such value until it is used at a later stage in the calculations;

Figs. 42 and 43 show the sign relays and the summing cycle control relays, Fig. 42 being used for the real factor calculator and Fig. 43 being used for the imaginary factor calculator;

Fig. 44 shows the master release relay and the rotary distributor telegraph transmitter;

Figs. 45, 46 and 47 show the printing cross bar switch, verticals 1, 2 and 3 thereof being shown in Fig. 45, verticals 4, 5 and 6 thereof being shown in Fig. 46 and verticals 7, 8 and 9 thereof being shown in Fig. 47;

Fig. 48 shows the printing switch master control circuit;

Figs. 49, 50 and 51 show the progress circuit for the printing switch, the separate figures showing that portion of the progress circuit corresponding to the verticals shown in Figs. 45, 46 and 47, respectively;

Fig. 52 is a sequence chart to show a cycle of operations involved in a printing operation;

Fig. 53 is a sequence chart prepared to show the operation of the sign relays;

Fig. 54 is a sequence chart showing the operation of the progress relays upon entry of the factors; and Fig. 55 is a sequence chart showing in more detail the opportunity for readjustment in the sum relays as the carry is changed after the addend relays are operated as in the fourth example given just before Table 6.

THE APPARATUS

The apparatus used in constructing the device of the present invention is mostly standard communication apparatus, details of which may be found in the following references.

The printing telegraph receiver is shown in Patent 2,247,408, A. H. Reiber, July 1, 1941, and in the Bell Laboratories Record, volume 17, No. 2, pages 53 to 59, October 1938 and No. 8, pages 257 to 259, April 1939.

The transmitter distributor is disclosed in Patents 1,311,915, P. M. Rainey, August 5, 1919; 2,154,952, E. F. Watson, April 18, 1939; 2,055,567, E. F. Watson, September 29, 1936; and in the Bell Laboratories Record, vol. 17, No. 2, pages 53 to 59, October 1938.

The keyboard is generally of the type shown in Patent 1,378,950 to A. D. Hargan, May 24, 1921.

The cross bar switch is shown in Patents 1,953,503, April 2, 1934; 2,021,329, November 19, 1935; and 2,040,334, May 12, 1936, all issued to J. N. Reynolds.

The relays are shown in the following patents: 1,156,671, E. B. Craft, October 12, 1915; 1,633,576, C. H. Franks, June 28, 1927; 1,652,489, E. D. Mead, December 13, 1927; 1,652,490, D. D. Miller, December 13, 1927; 1,652,491, D. D. Miller, December 13, 1927; 2,178,656, P. W. Swenson, November 7, 1939; 2,323,961, F. A. Zupa, July 13, 1943.

Other apparatus is of conventional design.

*Theory of calculation*

The device of the present invention is primarily intended for the multiplication and division of complex numbers, that is compound numbers where there is a peculiar relation between the components of such numbers. This peculiar relation in the mathematician's complex number is in the factor $i$ by which the second component is multiplied and by reason of which it is characerized as an imaginary number. When two imaginary numbers are multiplied together, the product becomes a real number and therefore must be transferred to and combined with the value of the real components.

While theoretically the calculating device should be arranged to automatically make such an interchange or shift between values in two separate calculations such a shift may be avoided through an algebraic operation. Fundamentally, the operation of the specific embodiment of the present invention is based on the following two formulae $$(D+iE)\times(F+iG)=(FD-GE)+i(GD+FE)$$

$$\frac{D+iE}{F+iG}=\frac{FD+GE}{F^2+G^2}+\frac{i-GD+FE}{F^2+G^2}$$

It will be noted that, with the exception of differences in sign, the real component in both the product and the quotient consists of the sum of two products of the numbers which are registered, that is $$FD+GE$$

and that likewise the numerical value of the imaginary component in both the product and the quotient consists of the sum of two products of the numbers which are registered, that is $$GD+FE$$

It will be noted now, while its significance will be explained hereinafter, that the number D is common to the first component of both these sums and that the number E is common to the second component of both these sums.

The fact, which has hereinbefore been noted, that both components of the quotient in the problem in division, have a common denominator, is again noted, particularly to point out that this common denominator $$F^2+G^2$$

contains only real numbers.

Therefore, it appears that the product and the quotient in these two problems may be found by two parallel calculations without the necessity of carrying over values from one to the other. The device therefore carries on its functions in accordance with a simple form of multiple algebra.

It should now be noted that all algebraic operations may be performed by the simple operation of addition, a fact which is common knowledge in the calculating machine art.

Subtraction is performed by stating the minuend as an augend and by stating the complement of the subtrahend as an addend so that the sum indicates the value of the remainder.

Multiplication is performed by adding the multiplicand to itself the number of times indicated by the multiplier so that the product is in reality an accumulated sum.

Division is performed by subtracting the divisor from the dividend repeatedly until the ultimate remainder becomes zero, the number of times this operation is performed being counted and the count thus obtained becoming the quotient. Since each such subtraction may be performed by the operation of adding the complement of the subtrahend it follows that division then becomes a problem in addition.

The present device is based on these considerations and while the solution of any one problem as written out by a mathematician appears to involve a complicated mass of various alegbraic operations, the device is controlled to take each element of the problem in an orderly sequence, to perform a very simple problem in addition and to store the result for later use.

As an example the sum of the squares of two numbers, let us say the sum of the squares of three and four, is performed in seven simple steps. Three is added (a first time) to zero, producing a sum of three which is stored. Three is then added (a second time) to this stored or accumulated number and a new sum of six is produced and stored. Three is then added (a third time) to the stored number six and a new sum of nine is produced and stored. Three having been added three times, it has been squared so that now four is added (a first time) to the stored number nine and a new sum of thirteen is produced and stored. Four is now added (a second time) to the stored number thirteen and a new sum of seventeen is produced and stored. Four is now added (a third time) to the stored number seventeen and a new sum of twenty-one is produced and stored. Four is now added (a fourth time) to the stored number twenty-one and a new sum of twenty-five is produced and stored. Four having now been added four times, it has been squared so that the problem has been completed.

Thus an operation which on inspection appears to be complicated is reduced to a plurality of simple like operations. The fact that the number of such simple operations may become large is of no consequence since under electrical control they may be performed rapidly whereby the ultimate result may be reached in a very short time interval.

It may be said that the fundamental principle of calculation is one of simultaneous and gradual accumulation of two values.

Also to be considered under the general heading of theory of calculation is the system of calculation employed herein. The binary system of enumeration using a radix two is peculiarly adapted to mechanical or electrical calculation, for the two digits of such a system may be represented by any two contrasting conditions such as the operation or non-operation of a relay or the plus and minus poles of a battery.

Likewise the formation of a number greater than can be expressed by a single digit in the binary system results in the use of a simple binary carry over all needs for which are satisfied by the alternative electrical characterization of either a "carry 0" or a "carry 1" conductor. A pair of such conductors are employed between each order, both binary and decimal.

It may also be noted that in such mechanical or electrical calculation the use of the nine's complement leads to less complication than the use of the ten's complement. The main difficulty of this expedient lies in the fugitive one.

*The fugitive one*

The movement of the fugitive one may be clearly shown as follows. Given the problem in subtraction

| | |
|---|---|
| 456789 | Minuend |
| 123456 | Subtrahend |
| 333333 | Remainder |

Performing this operation by the method of addition the nine's complement of 123456 is put down as:

| | |
|---|---|
| 456789 | —Augend |
| 876543 | —Addend |
| 1333332 | Sum |

Here a one has become fugitive from the last right-hand column and has entered a new column at the extreme left. It must be returned to its proper place—thus:

```
1333332
↓
└────→1
333333
```

*Manipulation of the device from the operator's station*

The illustrative embodiment of the present invention is a calculating device designed to solve problems of the type:

$$(\pm D \pm iE)+(\pm F \pm iG)=$$
$$(\pm D \pm iE)-(\pm F \pm iG)=$$
$$(\pm D \pm iE)\times(\pm F \pm iG)=$$
$$(\pm D \pm iE)\div(\pm F \pm iG)=$$

where D and F are real numbers and $iE$ and $iG$ are imaginary numbers, the symbol $i$ representing $\sqrt{-1}$.

A keyboard having twenty keys arranged in two rows and marked as follows, is provided:

| | | | | | | | | | |
|---|---|---|---|---|---|---|---|---|---|
| = | M | D | + | − | +i | −i | E | C | T |
| 0 | 1 | 2 | 3 | 4 | 5 | 6 | 7 | 8 | 9 |

By means of this keyboard the problem data may be entered into the device. For example let us suppose the problem $$(2+i3)\times(4+i5)=$$

is to be entered. The keys would then be pressed in the following order $$M+2+i3+4+i5=$$

The operator's station is also provided with a printing telegraph receiver known as a page printer upon which the record of the problem is printed. In response to the operation of the keys in the order set out above the following record will appear $$+.20000000+i.30000000\times +.40000000+i.50000000=$$

after a very short interval the answer to this problem will appear as $$-0.7000000+i0.22000000$$

Again let it be assumed that we wish to solve the problem $$\frac{-7+i22}{4+i5}=$$

The keys would then be pressed in the following order

D +4 +i 5 − 0 7 +i 2 2 =

The following record will then be printed $$+.40000000+i.50000000 \backslash -.07000000+i.22000000=$$

and in a short interval the printer would record the answer as $$+0.20000000+i0.30000000$$

Certain aspects of the facts set out above require further explanation and this will be given hereinafter.

The two strips of keys described above are mechanically locking keys provided with a magnetic release and are so wired into the circuit of the system that the depression of the keys will be ineffective unless operated in the proper order. For example it is always necessary to first depress a key which will determine the nature of the operation to be undertaken. The key M, sets the device to do a problem in multiplication and the key D one in division. If a problem in addition or subtraction is to be undertaken the key C is first depressed. Following the depression of key D, M or C then either the + or − key is operated followed thereafter by one or more of the digit keys. The device as constructed is arranged for eight digit numbers and is further arranged so that if less than eight digits are registered then when additional directions are given as for instance by the depression of the $+i$ key, the remaining places will be automatically filled with ciphers. Thus in the example above when the keys $$M + 2 +i$$

are depressed the printer will produce the notation $$+.20000000$$

Any key which is wrongly depressed will remain in a depressed position without effecting the operation or the result. Depression of a proper key at this time will release the wrongly depressed key and the recording of the problem may proceed. Suppose for example that a number $$+.23456789$$

has been recorded. This is the full eight places provided and therefore if another digit key is depressed it will be wrongly depressed. If now the key 3 is depressed it will not cause any operation but will remain in such a depressed condition. Thereafter if the key $+i$ is depressed the digit 3 key will be released and the operation may be resumed. Thus means are provided to insure the operation of the keys in the proper order.

When the keys are properly manipulated the operation consists in the registration of the information indicated by the key after which a signal is returned to the keyboard to release the key which has been depressed.

It will be noted above that while the first problem given by way of example as $$(2+i3)\times(4+i5)=$$

was stated in the form of whole numbers, the device, nevertheless, recorded this problem in decimal form, as $$+.20000000+i.30000000\times +.40000000+i.50000000=$$

Thus each number is recorded as a decimal so as to avoid the necessity of holding it until all digits have been recorded so as to get the number of significant places to start the record. By recording the number as a decimal and since provision is made for eight places in the recording mechanism, the operator need not be concerned when she presses the key for recording what number of significant digits the number to be recorded contains because the apparatus is arranged to fill in ciphers to the eighth place automatically.

As a result of this arrangement when the operations of multiplication and division are to be reduced to simple arithmetical additions, consideration must first be given to the effect of the decimal. This means that the addition must begin with a shift since $.1\times.1=.01$ The device, as herein disclosed, provides four storage devices in which the information entered is registered. As will appear hereinafter these storage devices are known as the F, G, D and E registers and are sequentially rendered available in that order. Actually in the problems $$(\pm D\pm iE)+(\pm F\pm iG)=$$
$$(\pm D\pm iE)-(\pm F\pm iG)=$$
$$(\pm D\pm iE)\times(\pm F\pm iG)=$$

the factors D and E will be registered in the F and G registers since in addition it makes no practical difference whether the augend or the addend is stated first and in multiplication it makes no practical difference whether the multiplicand or the multiplier is stated first. Likewise since in subtraction, as practiced on the device of the present invention, the signs of the two factors of the subtrahend are merely changed and the operation then performed is one of addition it makes no practical difference whether the minuend or the subtrahend is stated first. However in division there is a practical reason why the divisor should be stated first, and for that reason the four registers are arranged in the order F, G, D and E.

When a problem in division is stated as $$(D+iE)\div(F+iG)=$$

this may be changed by algebra into the expression $$\frac{D+iE}{F+iG}=\frac{FD+GE}{F^2+G^2}+i\frac{FE-GD}{F^2+G^2}$$

and it will be noted that each new factor of the complex number is in the form of a fraction having the common denominator $(F^2+G^2)$. Now F and G are the numerical factors of the divisor in the problem and therefore it is of advantage to register these values first so that the device may be undertaking the calculation of the sum of the squares during the time the remainder of the problem is being registered by the operator. This is a time saving expedient and is the reason for making the registers available in an order different from that in which the problems are usually stated. It results in the D and E factors being registered in the F and G registers in problems of addition, subtraction and multiplication but does not affect the result.

When the problem has been completely recorded the calculating operations which depend upon the registration of the factor E take place. If the full eight digits of the factor E are registered manually the calculating operations start as soon as the registration of the eighth digit has been completed. In case less than eight digits are registered by the operator, operation of the calculating circuits ceases until the "=" key is depressed whereupon the unfilled places of this factor are automatically filled with ciphers and then as the last place is thus filled the calculating operations are resumed and are completed.

When the device is placed in condition for operation and the M or the D key is depressed, the information which will later lead to the printing of the corresponding × or ÷ symbol is stored in the F register. Next the positive or negative key to mark the character of the F factor is depressed and corresponding information is also stored in the F register. Thereafter the digits of the factor F are entered into the F register in order. As pointed out hereinbefore, the register is capable of storing an eight digit number, so that if less than this number of digits are registered by the operator, the remaining places will be automatically filled with ciphers. The completion of the registration of the F factor by the operator is marked by the depression of the $+i$ or the $-i$ key to characterize the nature of the G factor.

The depression of the $+i$ or $-i$ key advances the keyboard from association with the F register to the G register and the registration of the numerical value of the G factor may proceed even though the automatic supply of missing ciphers in the F register is now in operation.

In like manner the D and E factors are registered. Lastly the key marked = is depressed after which the device will operate automatically to solve the problem and to print the result. During this period any key which might be depressed will be ineffective either to register any information or to affect the result with the single exception of the key marked E. This key denotes an error and will not only stop the operation but will effectively return the device to normal from which an entirely new problem may be entered and solved.

It is to be noted that the operational sign (+ − × ÷) is not entered by the operator between the factors E and F but that such a sign as it appears on the printed record is automatically supplied in accordance with the first key which is depressed at the beginning of the problem.

*General operation*

Figure 1:
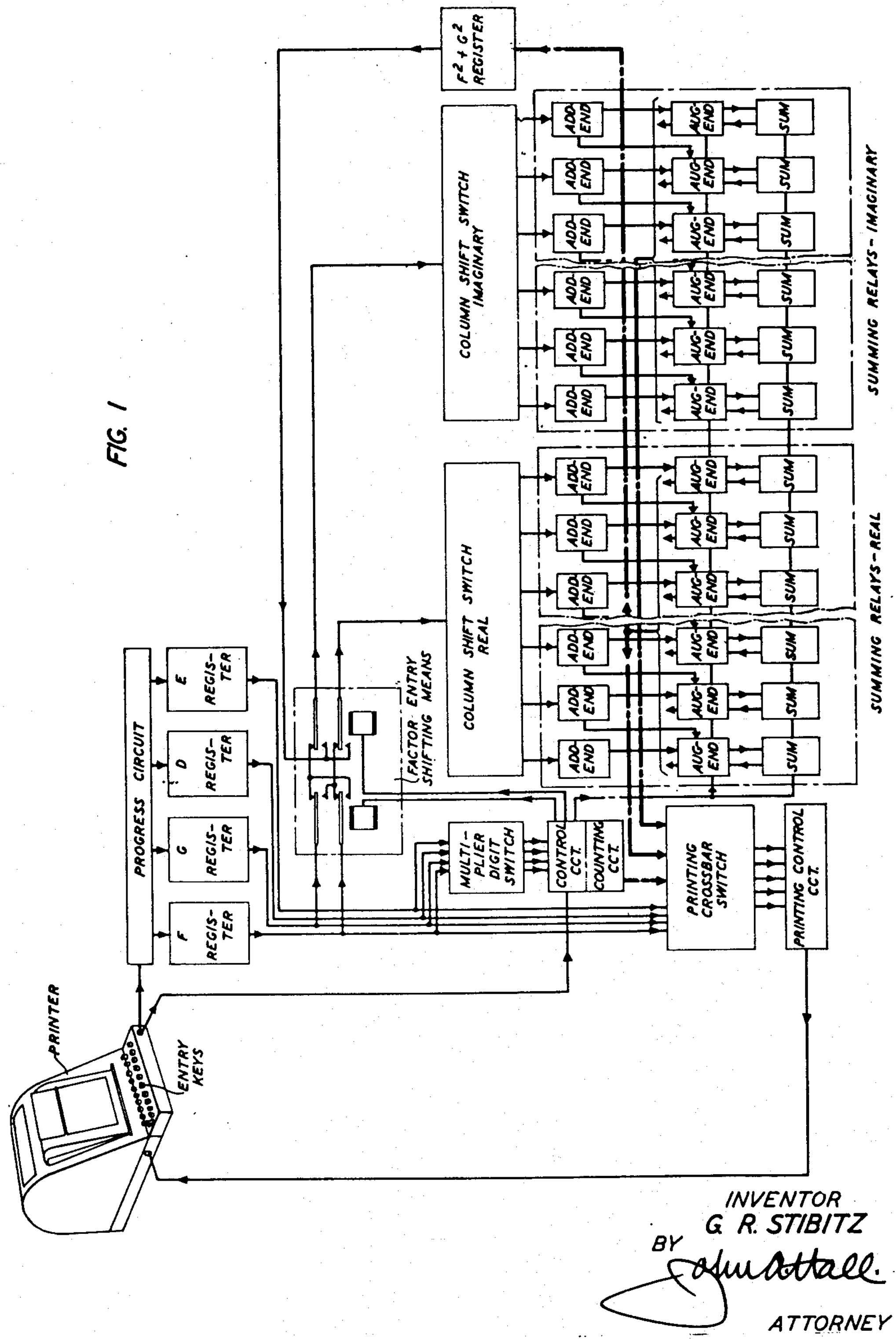
Fig. 1 is a schematic circuit diagram by which the general organization of circuits may be explained and the general mode of operation may be outlined.

The general operation of the device may be seen from the schematic of Fig. 1. In the upper left-hand corner there is a representation of the apparatus located at the operator's station. This consists generally of a standard printing telegraph receiver known as a page printer and a set of keys one for each of the decimal digits and one for each of the operational signs and other controls. The problem is written up on these keys through sequential depression of the keys in the proper order. These keys operate through the progress circuit to register the factor values in the F, G, D and E registers. Each of these registers transmits the values registered therein in code to the printing cross bar switch which by certain auxiliary circuits, here designated the printing control circuit, controls the printer to record the problem as it is being registered in the factor registers. Certain of the keys also affect the control circuit so that the different operations called for by the different algebraic operations will be performed in the proper sequence.

The values registered in the F, G, D and E registers likewise appear in code in the multiplier digit switch and variously, under control of the factor entry shifting means, the values registered in the F and G registers and certain derived values $(F^2+G^2)$ appear in the real and the imaginary column shift switches. The heart of the calculator is in the summing means comprising generally a set of augend relays, a set of addend relays and a set of summing relays. All calculation is reduced to a series of summing operations in which the addend relays are operated in accordance with the values entered in the column shift switches and the values expressed by these addend relays are added to the values accumulated and expressed by the augend relays, the sum being registered on the sum relays. At the completion of this summing operation the sum now registered on the relays is translated and transferred to the augend relays (which act as an accumulator) ready for a new summing operation. The final results of any calculation are transferred to the printing cross bar switch whereupon the printer is operated to record the sum, the product, the quotient or the remainder as the case may be.

It has been said above that all calculations are reduced to a series of summing operations and while this is true, a better picture may be given by saying that all calculations are the result of a counted number of summing operations. Thus the multiplication of two numbers is the addition of one of the numbers to a gradually accumulating value a counted number of times, the count being controlled by the other number. Even in addition a first number is added to a second number which has been accumulated by counting this operation one times.

An important feature of the present invention is the counting circuit set in accordance with the values registered on the multiplier digit switches. This counting circuit is used in every calculating operation since it is the means which controls the cycle of operations of the summing relays.

It will be seen from Fig. 1 that the present invention consists of the combination of computing means and control means for shifting factors for entry into the calculating means whereby a large number of separate calculations are automatiquence and a predetermined pattern, the final result being a gradually accumulated value derived from a great number of simple summing operations. The control circuit is in effect a steering means for it controls the sequence and the pattern of operations, operating the factor entry shifting means at the proper times so that the addend relays are fed the proper values in the proper sequence.

*Sequence of operations—multiplication*

As soon as the first three factors (of eight digits each) are properly entered on the F, G and D registers and while the E factor is being registered or even if it is not registered, the computing control circuit directs the multiplication of the factor F by the factor D in the real summing relays and the multiplication of the factor G by the factor D in the imaginary relays. As it will appear hereinafter, as the digits of the various factors are entered on the F, G, D and E entry registers, these values simultaneously appear on the Multiplying Digit Selector Switches and on the Printing Switch. The digits of the F factor also appear on the Real Column Shift Switch and the digits of the G factor appear on the Imaginary Column Shift Switch. Each digit and each algebraic symbol registered on the Entry Switches as it simultaneously appears on the Printing Switch is printed on the Printer before the Operator.

When the registration of the D factor is completed so that its appearance in the Multiplying Digit Selector is complete then the values registered in the Column Shift Switches are added together the number of times indicated by the values registered in the D multiplier switch. The sequence of this operation is to first add to zero (or to any value which may have been left in the augend relays) the value registered in the lowest level of the column Shift switch, repeatedly the number of times indicated by the first digit of the D factor. At the completion of this operation, in a manner to be more fully described hereinafter, the value registered in the next higher level of the Column Shift switch is added, to the now accumulating values in the augend relays, repeatedly the number of times indicated by the next digit of the D factor.

When the F factor and the G factor have been thus completely multiplied by the D factor then the connections between the Real Column Shift Switch and the F Entry Register and the Imaginary Column Shift Switch and the G entry Register are reversed so that the Real Column Shift Switch will now have a record of the values of factor G and the Imaginary Column Shift will now have a record of the values of factor F. When this reversal has been made the record of the factor E (if it has been completely registered by now or if not as soon as it has been so registered) is employed as a multiplier. Thereupon the accumulation in the augend relays is changed step by step until the factors G and F are now completely multiplied by the factor E. This completes the calculation.

Thereupon the record registered on the augend relays is transferred to the printing switch and the solution of the problem is printed before the operator.

*Sequence of operations—division*

In the operations of division the calculating operations begin earlier than in the operations of multiplication since the first value to be determined is the sum of the squares of the values of F and G. Therefore, as soon as the F and G factors are both completely registered the F factor will appear on both the F multiplier vertical of the Multiplying Digit Selector Switch and on the Real Column Shift Switch. Any accumulation on the real augend relays is automatically removed so that the value of $F^2$ will not be mutilated. Thereupon F is multiplied by F as before. When this has been completed the F factor is removed from the Real Column Shift Switch and the value of G is placed thereon. Now with the value of G also appearing on the Multiplying Digit Switch, the multiplication of G by itself proceeds step by step and the record on the augend relays is gradually increased. At the end of this operation the values of $F^2+G^2$ on the augend relays is transferred to a special set of storage relays for use at a later stage. The augend relays are cleared and returned to a zero reading in preparation for the determination of the real factor $FD+GE$.

Now the same operations as heretofore carried out in the problem of multiplication are repeated until the real augend relays have the value of $FD+GE$ and the imaginary augend relays have the value of $-GD+FE$.

Thereafter the value of $F^2+G^2$ is transferred to the Real Column Shift Switch and subtracted (its complement is added) step by step from the value on the augend relays until this value is exhausted. As each digit of the quotient is thus determined it is transmitted to the Printing Switch and such value is printed. No other record of the digits of the quotient is made.

When the eight digits of the real factor of the quotient have been determined then the value of $(F^2+G^2)$ which also appears in the Imaginary Column Shift Switch is used to diminish the value of the imaginary factor now recorded in the augend relays and the digits of the quotient are determined and recorded by the printer one by one.

In both multiplication and division, when the last digit of the product or the quotient has been printed the apparatus is released and the record on the F, G, D and E Entry switches as well as elsewhere is thus automatically ereased.

With the key NC in its forward position each problem will be solved separately. With the key NC in its mid-position (as indicated) the final result of a problem in multiplication will be left recorded on the augend relays and another problem in multiplication, addition or subtraction will be solved and the result added thereto. A quotient cannot be determined and added to a previous accumulation for reasons stated hereinbefore.

*Sequence of operation—addition or subtraction*

Addition and subtraction will both be treated under one heading since the operations are exactly the same. In addition the signs of the factors are recorded as they appear in the problem but in subtraction the signs of the subtrahend are reversed.

Now it should be noted that there is no peculiarity about the problems of addition or subtraction of complex numbers—the operations being so simple and elementary that it is not contemplated that the device would ever be used for such a purpose. The device, however, is capable of performing these operations, though in a somewhat roundabout manner.

$$(F+iG)\times(1+i0)=F+iG$$

The complex number $(F+iG)$ entered is thereby multiplied by one and stored in the augend relays.

Thereafter the number to be added is entered in the same manner so that it in turn is multiplied by one and then added to the value stored in the augend relays—the result that is printed being the sum (or the remainder) desired to be found. As many numbers as desired may thus be added together.

*Code representation of numbers*

An outstanding feature of the present invention is the use of codes for transferring mathematical information from the entry registers to the other parts of the device, the codes having the additional virtue of being numbers in another system of enumeration whereby the elements of the codes may be subjected to the processes of calculation in accordance with the rules of such system. Specifically, the codes used consist of binary numbers and their use is arbitrary in that non-corresponding numbers are used. Thus the code for zero is actually the binary number for three, and the code for nine is the binary number for twelve. It will appear that the binary numbers used as codes are shifted by three in each instance whereby a set of codes having an especially convenient arrangement is produced. Consider the following table:

TABLE 1

| | | | |
|---|---|---|---|
| 0 | 0 0 0 0 | | |
| 1 | 0 0 0 1 | | |
| 2 | 0 0 1 0 | | |
| 3 | 0 0 1 1 | 0 | |
| 4 | 0 1 0 0 | 1 | |
| 5 | 0 1 0 1 | 2 | |
| 6 | 0 1 1 0 | 3 | 0 |
| 7 | 0 1 1 1 | 4 | 1 |
| 8 | 1 0 0 0 | 5 | 2 |
| 9 | 1 0 0 1 | 6 | 3 |
| 10 | 1 0 1 0 | 7 | 4 |
| 11 | 1 0 1 1 | 8 | 5 |
| 12 | 1 1 0 0 | 9 | 6 |
| 13 | 1 1 0 1 | | 7 |
| 14 | 1 1 1 0 | | 8 |
| 15 | 1 1 1 1 | | 9 |
| 16 | 1 0 0 0 0 | | 10 |
| 17 | 1 0 0 0 1 | | 11 |
| 18 | 1 0 0 1 0 | | 12 |
| 19 | 1 0 0 1 1 | | 13 |
| 20 | 1 0 1 0 0 | | 14 |
| 21 | 1 0 1 0 1 | | 15 |
| 22 | 1 0 1 1 0 | | 16 |
| 23 | 1 0 1 1 1 | | 17 |
| 24 | 1 1 0 0 0 | | 18 |

The first and the second columns contain the decimal system numbers and their natural binary equivalents. The third column shows the ten digits of the decimal system each set opposite a binary number which is used as a code herein and the fourth column are numbers set opposite binary numbers in another arrangement.

The binary numbers representing codes for the decimal digits of the third column have the peculiar arrangement whereby each is the inverse of its nine's complement. Thus the code for zero is 0011 and the code for its nine's complement nine is 1100. Similarly the code for three is 0110 and the code for its nine's complement six is 1001. This peculiarly happy relationship holds throughout for the ten decimal system digits and through the use of these codes great simplification of the circuit arrangement for calculation can be made for it is a simple matter to invert the code of any number in order to represent the nine's complement thereof.

As it will appear hereinafter in greater detail it is easier to use the nine's complement of a number and to deal with the fugitive one than it is to try to deal with the true or ten's complement of a number. The subtractive carry or borrowing operation is entirely avoided whereby all calculations become straightforward and no extra steps need be taken ordinarily involved in such borrowing operations.

Now it may be noted that the addition of any two numbers by the binary addition of their codes produces a sum which is coded according to the fourth column of Table 1. Thus

| | | | | | | |
|---|---|---|---|---|---|---|
| 0 | 1 | 1 | 1 | = | 4 | (3d column) |
| 1 | 0 | 0 | 0 | = | 5 | (3d column) |
| 1 | 1 | 1 | 1 | = | 9 | (4th column) |

so that the sum is expressed by a different code than that used for either the augend or the addend. It will appear hereinafter that the sum when found is immediately translated back into the code used for the augend and the addend through a simple crcuit arrangement so that this sum code is only transiently employed.

However, it must be noted that the augend-addend code may be considered a four place permutation code and the sum code may be considered a five place permutation code and so considered it will be apparent that all single digit numbers will have a cipher in the first of the five places whereas all two digit numbers, such as sixteen by way of example, will have a one in the first of the five places. Thus by the use of this group of binary numbers as codes, the carry-over of one from the first place (counting from the left) will act as a signal that a decimal number greater than can be expressed by a single digit has been reached.

In a similar manner it may also be noted that the codes for the ten digits are divided into two groups of five each, the group 0 to 4 having a cipher in the first of the four places of its permutation code and the group 5 to 9 having a one in that place. It will later appear that this fact is utilized as a signal that a number is under or over five.

Figure 2:
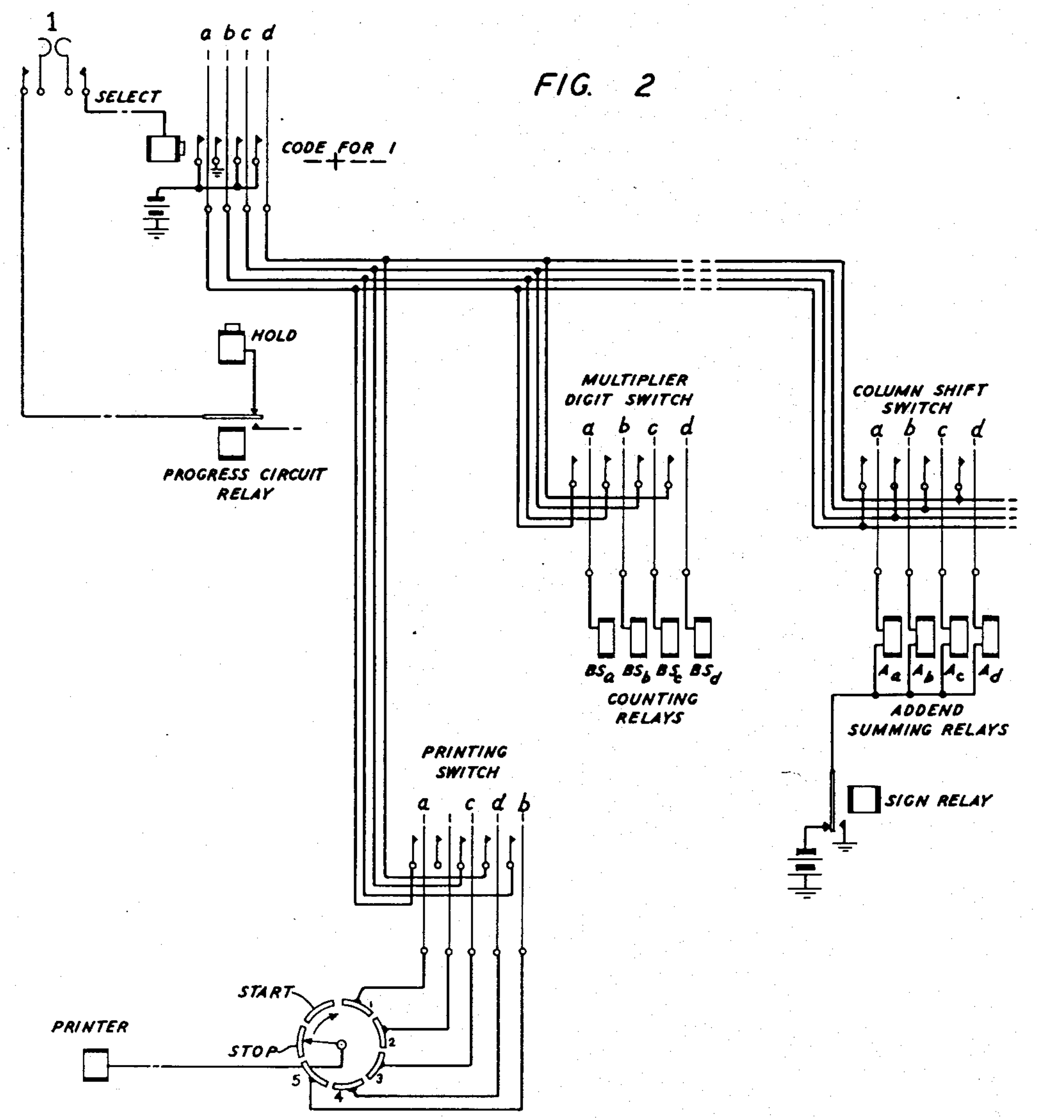
Fig. 2 is a schematic circuit diagram showing how the entry keys register the necessary mathematical information in the entry registers and how this information is transmitted in code therefrom to different parts of the device for use thereat.

In somewhat more detail than indicated in Fig. 1, the general scheme of operation may be seen in Fig. 2. Here one of the digit keys (1) is shown as controlling the select and hold magnets of the cross bar switch representing one of the factor registers. Through the operation of these two magnets a particular set of permanently paired contacts is operated to electrically characterize the four code conductors *a*, *b*, *c* and *d* leading as shown to the printing switch. The progress circuit is a means whereby each entry key operated in sequence will operate the next succeeding hold magnet thereby progressing from decimal order place to place, at each of which places a new set of code conductors is electrically characterized in code in accordance with the particular select magnet operated and therefore in accordance with the particular set of permanently paired contacts operated along the line of said code conductors.

In the example chosen for Fig. 2 the code conductors are characterized for the digit 1, that is the conductors *a*, *c* and *d* are connected to battery and the conductor *b* is connected to ground. As will appear in more detail hereinafter the connection of battery to conductors *a*, *c* and *d* is ineffective in the printing switch and in the multiplier digit switch, for at these points only ground connections to the code conductors will cause any operations. However, the addend relays of the summing means will respond to either battery or ground. Normally these addend relays are connected to battery by the sign relay so that those which are connected to grounded code conductors will be operated. However if the sign relay has been operated then the common connection to the addend relays will be changed from battery to ground so that the individual addend relays will now respond to battery connected code conductors. Thus in the case illustrated when the sign relay is in its normal position only addend relay $A_b$ will operate but when the sign relay is operated then addend relays $A_a$, $A_c$ and $A_d$ will operate. Thus in one case the addend relays will be operated to represent the digit 1, and in the other case the addend relays will be operated to represent the digit 8, which is the nine's complement of one and which added will produce the same numerical result as the algebraic addition of $-1$. It is thus seen that after entry by the entry key the value represented by the key is registered and then transmitted from the point of registry simultaneously in code both in its positive and its negative form, or otherwise stated in its ordinary form and in the form of its complement. It is only in the summing relays that the complemental form is used, from which it results that if the key shown is depressed and this is characterized as negative by the prior depression of the — key the digit will be printed as 1, the counting relays if using this as a multiplier will be set to count 1 but the summing relays will have the complement 8 entered in the addend relays thereof.

*The summing relays*

Figure 3:
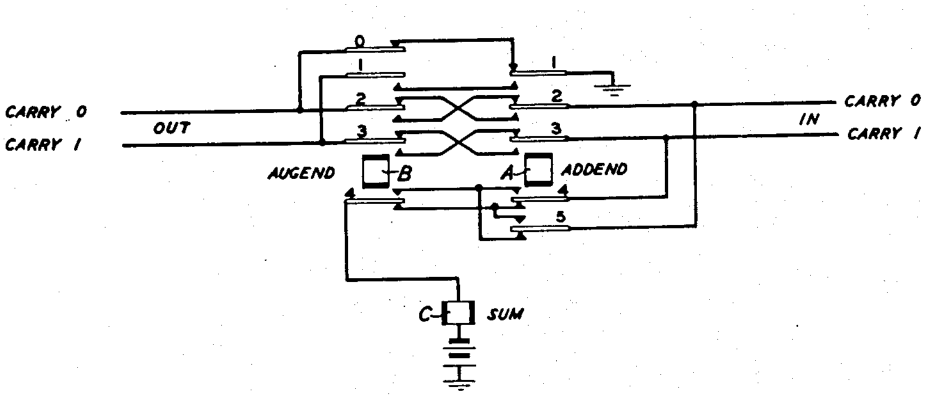
Fig. 3 is a schematic circuit diagram showing the fundamental summing circuit consisting of an augend, an addend and a sum relay together with the carry-in and the carry-out leads.

Fig. 3 is a circuit diagram showing the fundamental circuit arrangements for calculating used in the present invention. This consists of three relays, one termed an augend relay which represents a number to which another is to be added, a second termed an addend relay which represents a number to be added to the first and a third termed a sum relay. Each of these relays when not operated represents the value 0 and when operated represents the value 1. The operation of the three is in accordance with the binary system wherein $0+0=0$, $0+1=1$, $1+0=1$ and $1+1=10$. There are entering this circuit from the right two carry-in leads denoted respectively carry 0 and carry 1. Likewise there are relay is therefore responsive to three conditions, that of the carry-in leads, that of the addend relay and that of the augend relay. The following table will give a complete description of the action of this unit circuit, 0 and 1 representing the electrical characterization of the corresponding carry leads and the nonoperated and the operated condition respectively of the corresponding relays.

TABLE 2

| | | | | | | | | |
|---|---|---|---|---|---|---|---|---|
| Carry-In-Lead | 0 | 0 | 0 | 0 | 1 | 1 | 1 | 1 |
| Augend Relay | 0 | 1 | 0 | 1 | 0 | 1 | 0 | 1 |
| Addend Relay | 0 | 0 | 1 | 1 | 0 | 0 | 1 | 1 |
| Sum Relay | 0 | 1 | 1 | 0 | 1 | 0 | 0 | 1 |
| Carry-Out Lead | 0 | 0 | 0 | 1 | 0 | 1 | 1 | 1 |

By way of example the first column shows nothing being entered by way of carry, neither the augend nor the addend relay operated and therefore the sum relay not operated and the carry-out 0 lead electrically characterized. In Fig. 3, the carry-in 0 lead will be grounded and this may be traced through armature 5 and back contact of the addend relay to the back contact of armature 4 of the augend relay. But this relay is not operated so the circuit to the sum relay is incomplete and the sum relay is therefore not operated. Another circuit may be traced from ground, armature 1 and back contact of the addend relay, back contact and armature 0 of of the augend relay to the carry-out 0 lead, whereby all conditions of the first column of Table 2 are fulfilled. The other seven combinations are as readily apparent.

Figure 4:
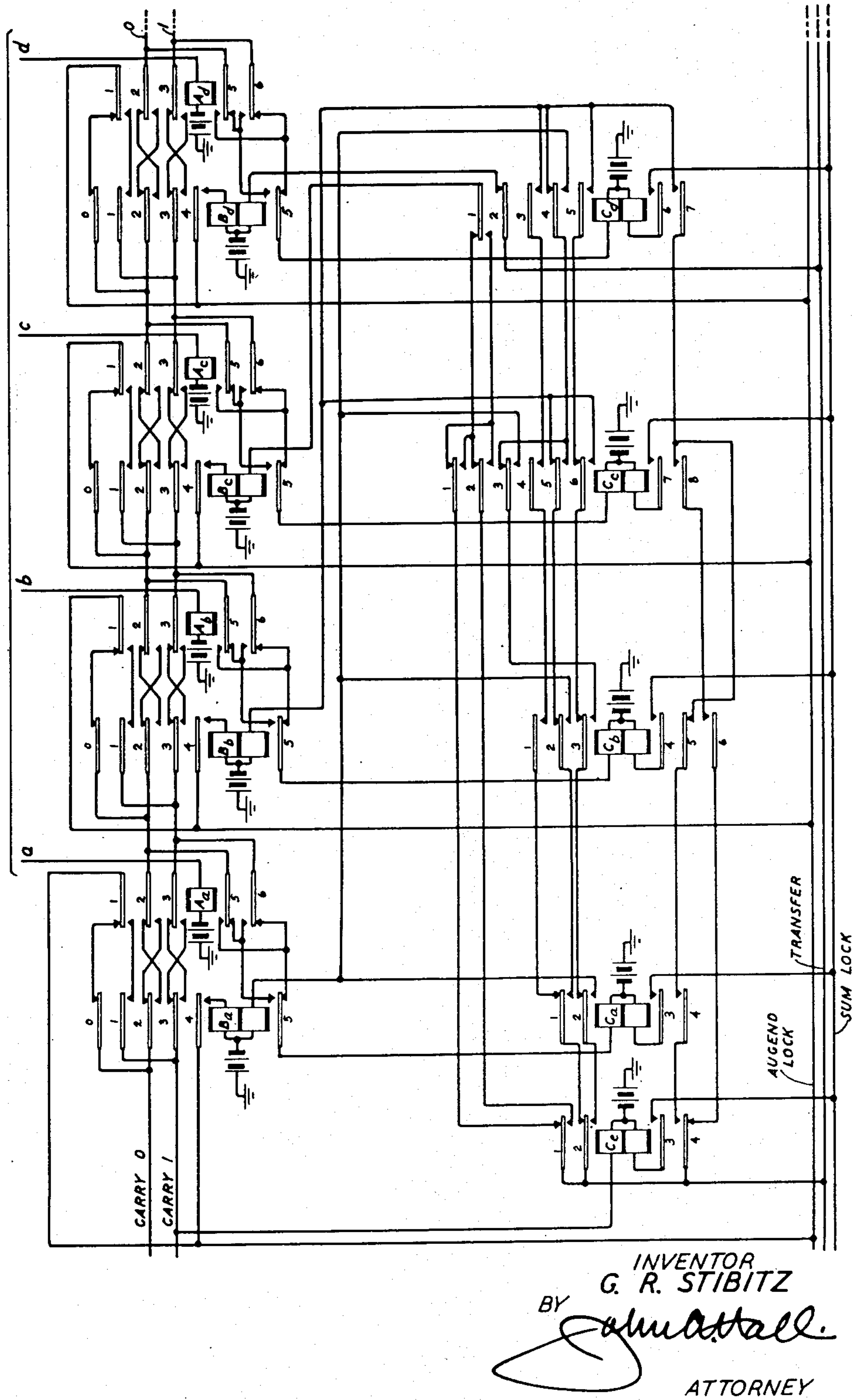
Fig. 4 is a schematic circuit diagram showing a decimal summing circuit made up fundamentally of four of the summing circuits such as that of Fig. 3.

Now each decimal order is represented by a combination essentially comprising four of the unit circuits such as Fig. 3, the combination being here shown as Fig. 4. The lowest binary order consists of the relays $A_d$, $B_d$ and $C_d$ and the highest binary order consists of the relays $A_a$, $B_a$ and $C_a$.

The ten decimal digits (0 being considered a digit) may be represented by a four place code and hence four binary summing circuits and an extra sum relay designated $C_e$ are combined in a decimal order circuit as shown in Fig. 4. For such a code, certain of the binary numbers are employed in accordance with the following table.

TABLE 3

| Codes for Augend and Addend Relays | | | | Decimal Numbers | Codes for Sum Relays | | | | | Sum Relay Codes Translated back to Operation of Augend Relays | | | |
|---|---|---|---|---|---|---|---|---|---|---|---|---|---|
| *a* | *b* | *c* | *d* | | *e* | *a* | *b* | *c* | *d* | *a* | *b* | *c* | *d* |
| 0 | 0 | 1 | 1 | 0 | 0 | 0 | 1 | 1 | 0 | 0 | 0 | 1 | 1 |
| 0 | 1 | 0 | 0 | 1 | 0 | 0 | 1 | 1 | 1 | 0 | 1 | 0 | 0 |
| 0 | 1 | 0 | 1 | 2 | 0 | 1 | 0 | 0 | 0 | 0 | 1 | 0 | 1 |
| 0 | 1 | 1 | 0 | 3 | 0 | 1 | 0 | 0 | 1 | 0 | 1 | 1 | 0 |
| 0 | 1 | 1 | 1 | 4 | 0 | 1 | 0 | 1 | 0 | 0 | 1 | 1 | 1 |
| 1 | 0 | 0 | 0 | 5 | 0 | 1 | 0 | 1 | 1 | 1 | 0 | 0 | 0 |
| 1 | 0 | 0 | 1 | 6 | 0 | 1 | 1 | 0 | 0 | 1 | 0 | 0 | 1 |
| 1 | 0 | 1 | 0 | 7 | 0 | 1 | 1 | 0 | 1 | 1 | 0 | 1 | 0 |
| 1 | 0 | 1 | 1 | 8 | 0 | 1 | 1 | 1 | 0 | 1 | 0 | 1 | 1 |
| 1 | 1 | 0 | 0 | 9 | 0 | 1 | 1 | 1 | 1 | 1 | 1 | 0 | 0 |
| | | | | 10 | 1 | 0 | 0 | 0 | 0 | 0 | 0 | 1 | 1 |
| | | | | 11 | 1 | 0 | 0 | 0 | 1 | 0 | 1 | 0 | 0 |
| | | | | 12 | 1 | 0 | 0 | 1 | 0 | 0 | 1 | 0 | 1 |
| | | | | 13 | 1 | 0 | 0 | 1 | 1 | 0 | 1 | 1 | 0 |
| | | | | 14 | 1 | 0 | 1 | 0 | 0 | 0 | 1 | 1 | 1 |
| | | | | 15 | 1 | 0 | 1 | 0 | 1 | 1 | 0 | 0 | 0 |
| | | | | 16 | 1 | 0 | 1 | 1 | 0 | 1 | 0 | 0 | 1 |
| | | | | 17 | 1 | 0 | 1 | 1 | 1 | 1 | 0 | 1 | 0 |
| | | | | 18 | 1 | 1 | 0 | 0 | 0 | 1 | 0 | 1 | 1 |
| | | | | 19 | 1 | 1 | 0 | 0 | 1 | 1 | 1 | 0 | 0 |

leading from this circuit at the left, two carry-out leads denoted respectively carry 0 and carry 1. Normally the carry 0 leads both in and out are grounded (electrically characterized). The sum The first four columns are headed "Codes for Augend and addend relays" and show that there are four such relays (designated *a*, *b*, *c* and *d*) in each set for representing the decimal numbers 0 to 9. It may be noted that the code for each number is the inverse of its nine's complement, and it may further be noted that these codes are binary numbers but not the corresponding numbers.

The next main heading shows five columns (*e*, *a*, *b*, *c* and *d*) and represents a five place code for the sum relays. A simple trial will show that the sum of any two numbers of the four place code will produce the five place code for such sum. For instance

| | | | | | | |
|---|---|---|---|---|---|---|
| | 1 | 0 | 0 | 0 | = | 5 |
| | 1 | 0 | 1 | 0 | = | 7 |
| 1 | 0 | 0 | 1 | 0 | = | 12 |

The sum having been calculated by the operation of the sum relays according to this code, then the operated sum relays will control circuits to operate the augend relays in accordance with the codes in the last four columns. It will be noted that the last four place codes for 10 to 19 inclusive, are the same as the codes for 0 to 9 inclusive, respectively, and that there is, therefore, an automatic reduction of ten so that if, for example, the value 12 is registered on the sum relays the value 2 (or the units digit only) will be transferred back to the augend relays.

The operation of the summing device may be followed from Fig. 4, which shows a complete summing circuit for one decimal order. In this circuit there are four sets of addend, augend, and sum relays, here designated $A_a$, $A_b$, $A_c$, $A_d$, $B_a$, $B_b$, $B_c$, $B_d$, $C_a$, $C_b$, $C_c$ and $C_d$ and a fifth sum relay designated $C_e$. The fifth sum relay $C_e$ is connected to the carry (out) 1 lead so that whenever a number greater than (decimal) nine is registered on the sum relays this relay will be operated (in accordance with the sum codes in Table 3). Each of the addend relays is controlled over one of the four conductors *a*, *b*, *c* and *d* coming from the top of the diagram. These conductors come from the column shift switches which in turn derive their electrical characterization from the factor registers. It is enough to say here that each decimal order summing device is operated over a set of four conductors in accordance with the four place codes for the augend and addend relays. Thus the addend relays are operated over these four conductors.

The augend relays are operated in accordance with a sum previously determined and hence the augend relays hold a value to which another value is to be added. Under control of a circuit which will be fully set forth hereinafter, the sum relays become operated in accordance with the condition of their corresponding augend and addend relays, and in accordance with the information contained in Table 2. The carry over between binary orders is provided by the circuits between the carry (in) 0 and carry (in) 1 leads and the carry (out) 0 and carry (out) 1 leads hereinbefore described. The carry-over between decimal orders is of the same nature, the carry (out) 0 and carry (out) 1 leads of one decimal order being connected to the carry (in) 0 and the carry (in) 1 leads of the next decimal order, whereby a carry 1 between decimal orders operates the first binary order relay of the next decimal order. The fifth sum relay $C_e$ is operated over this same carry (out) 1 lead but has nothing otherwise to do with the carry over, its sole function being to participate in the registration of a sum in a five place code and to control the translation thereof back to the four place code.

Now the sum relays having been operated (and locked) the augend relays are offered release. That is, their locking circuits are opened so that any one which now has no other circuit for maintaining it operated will return to normal. Thereupon the augend (B) relays are operated in accordance with the value now standing on the sum relays.

This may be explained by using the sum (12) heretofore noted. The augend relays have been operated in accordance with the code for 5, that is, the relay $B_a$ will be operated and the relays $B_b$, $B_c$ and $B_d$ will not be operated. The addend relays have been operated in accordance with the code for 7, that is, the relays $A_a$ and $A_c$ are operated and relays $A_b$ and $A_d$ are not operated. Accordingly, the sum relays have been operated in accordance with the (five place) code for 12, that is, relays $C_e$ and $C_c$ are operated and relays $C_a$, $C_b$ and $C_d$ are not operated. Now in accordance with Table 3, this should result in the operation of relays $B_b$ and $B_d$ leaving relays $B_a$ and $B_c$ unoperated. This is, relay $B_a$ will be released and relays $B_b$ and $B_d$ will be operated.

This condition may be tested (figuratively speaking) by tracing the circuits of the augend relays backwards. Thus, the upper winding of relay $B_a$ (heretofore operated) is opened at its armature 4 to offer release to this relay. The lower winding of $B_a$ extends to the front contact of armature 2 of relay $C_a$ where the circuit is open, also to the front contact of armature 2 of relay $C_b$ where the circuit is open, also to the front contact and operated armature 3 of relay $C_c$ and thence to the front contact of armature 3 of relay $C_b$ where the circuit is open and also to the front contact of armature 4 of relay $C_d$ where the circuit is open. Thus, there being no circuit completed for the lower winding of relay $B_a$ this relay will release.

The lower winding of relay $B_b$ may be traced to the front contact and armature 6 of relay $C_c$ (which is operated), the back contact and armature 3 of relay $C_b$ (which is not operated), the back contact and armature 2 of relay $C_a$ (which is not operated), the front contact and armature 2 of relay $C_e$ (which is operated), to a lead which is now grounded temporarily for the particular purpose of transferring the registration of the sum relays to the augend or accumulator relays. Thus relay $B_b$ becomes operated.

In a similar manner it will be found that all possible circuits for relay $B_c$ are now open and that one circuit for relay $B_d$ is closed. Thus relays $B_b$ and $B_d$ are operated to register on the augend relays the units digit of the value 12. The tens digit has been carried over to the next decimal order through the grounding of carry (out) 1 lead.

Figure 5:
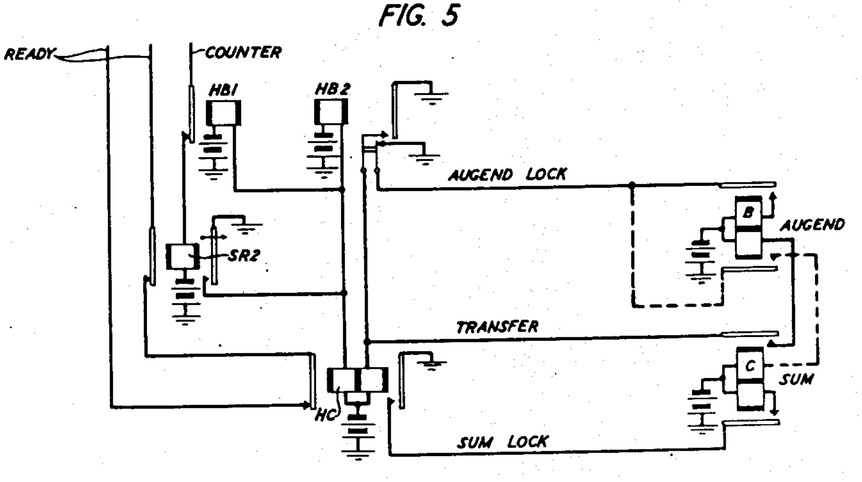
Fig. 5 is a schematic circuit diagram showing the essentials of the control of the summing circuit and how the cycle of operations thereof is produced.

Fig. 5 is a schematic circuit diagram to help explain the operation of the summing relays. In this drawing only a single pair of augend and sum relays are shown, together with a group of common control relays. Under normal conditions the augend relay if operated on the last succeeding cycle of operations will be locked to ground supplied over a common conductor here marked "Augend Lock." The sum relay is controlled through its operating winding by the augend relay (and the addend relay) from the ground on the augend lock conductor, which incidentally also supplies ground to the carry leads. Now when a value is entered and the corresponding addend relay, in conjunction with the carry-in leads and the augend relay, determines the operation of the sum relay, the device is ready for an accumulating operation. After the counter has been set, a circuit including the two leads here marked "Ready" is completed, and if this circuit is closed within that part of the circuit shown, then the lead coming from the counter is grounded. This causes the operation of the slow release relay SR2 which immediately operates relays HB1, HB2 and HC. Relay HB1 opens the circuit of SR2 so that this relay now acts through its slow releasing characteristics to time the operation. Relays SR2 and HC both open the circuit through the "ready" conductors so that when the release of SR2 is followed by the release of HC the closure of this circuit will constitute a signal into the common control that the operation has been fully completed.

Relay HB2 controls a make-before-break spring combination whereby a ground is placed on the transfer conductor before the ground is removed from the augend lock conductor. Also the ground on the transfer conductor is supplied to the holding winding of relay HC to insure that the ground which this relay places on the sum lock conductor will not be removed until after the augend lock conductor is regrounded and the transfer conductor is freed of ground. Thus the accumulating step consists of the grounding of the sum lock conductor followed almost immediately by the grounding of the transfer conductor and very shortly thereafter by the opening of the normal ground connection to the augend lock conductor.

After a short interval, measured by the slow releasing characteristics of relay SR2, relays HB1 and HB2 are released. Relay HB2 in moving toward release first closes ground to the augend lock conductor and then removes ground from the transfer conductor. This in turn releases relay HC so that in time ground is also removed from the sum lock conductor. Since relay HC, although released by relay SR2, cannot release until ground is taken off the transfer conductor it follows that the sum lock conductor cannot be freed until after the transfer conductor is cleared. These overlapping time relations are shown by the time chart of Fig. 6, the effort there being to illustrate the overlapping relations at the expense of verity in actual time values.

Now it will be seen that first, the sum lock conductor is grounded to lock in all the operated sum relays, that thereafter ground is placed on the transfer conductor to operate the augend relays through circuits controlled by the sum relays and to thereafter open the locking circuits of the augend relays and thus offer them release so that those augend relays which were previously operated and which under the new pattern will not be operated may now release. This is followed in a time interval measured by the slow releasing characteristics of relay SR2 by first the closure of the ground to the augend lock conductor, second, the removal of ground from the transfer conductor and lastly the removal of ground from the sum lock conductor, whereby the sum relays are offered release in the same manner as the augend relays were offered release previously. This transfer operation is very rapid, the whole operation taking place in the matter of a few milliseconds.

It will appear hereinafter that after the counter conductor is grounded this action will take place repeatedly, for as soon as relay HB1 releases the action is repeated. However, the counter, comprising a set of relays connected to the augend lock conductor, the transfer conductor and the sum lock conductor in exactly the same manner as the summing relays will control the ground on the counter conductor so that when the predetermined count has been made the relay SR2 will not again be operated. A short interval thereafter relay HC will release and the circuit through the "ready" conductors will be closed to signal the start of a new operation. The augend relays thus constitute an accumulator but differ from prior art accumulators in that they alternately act to hold an augend in a summing operation and then to hold the sum thus determined.

*The counting relays*

Figures 7, 9:
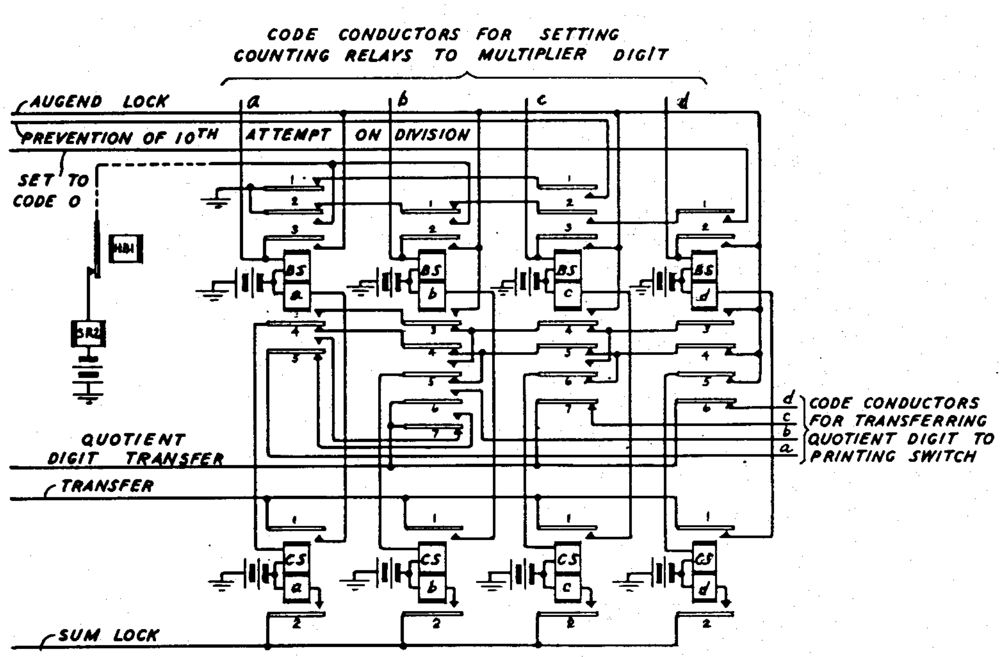
Fig. 7 is a detailed circuit diagram of the counting relays with the outside and control connections thereto shown schematically.
Fig. 9 is a chart for explaining the functions of the multiplier digit and the column shift switches.

Fig. 7 is a complete circuit diagram of the counting relays with indications of controls from outside the circuit. This combination of relays comprises two sets of relays, the BS and the CS sets, each having four relays designated *a*, *b*, *c* and *d*, respectively, and corresponding closely in their circuit arrangements and operations to the B and C (augend and sum relays) of the summing circuits. The BS relays control circuits whereby the CS relays are always reset at one less in code than the BS relays. For instance if the BS relays are set to represent in code the decimal digit 8, then the CS relays will immediately (under control of the BS relays) be set to represent in code the decimal digit 7.

There are four conductors *a*, *b*, *c* and *d* by means of which the code representation on a multiplier digit switch is transferred to the counting relays. It will appear hereinafter that when a multiplying operation is to be performed, these four conductors are transiently connected to the corresponding four code conductors from a factor register by the temporary operation of the multiplier digit switch. Thereupon the BS relays will be set in accordance with the code found thereon and the CS relays will be immediately set at one less. For instance by referring to Table 3 it will be noted that the code for 8 is 1011 and the code for 7 is 1010. Therefore the $BS_a$, $BS_c$ and $BS_d$ relays will be operated and locked to the augend lock conductor. Now a circuit may be traced from this augend lock conductor through the front contact and armature 4 of relay $BS_c$ (operated), the back contact and armature 3 of relay $BS_b$ (non-operated), the front contact and armature 4 of relay $BS_a$ (operated) to the operating winding of relay $CS_a$. The circuit for relay $CS_b$ will be found open at armature 5 of $BS_c$. The circuit for relay $CS_c$ may be traced through armature 6 and front contact of $BS_c$ and armature 3 and front contact of $BS_d$ to ground on the augend lock conductor. The circuit for relay $CS_d$ will be found open at armature 5 of relay $BS_d$. Thus relays $CS_a$ and $CS_c$ will be operated to represent 7 or one less than 8 which is represented by the combination of BS relays operated.

Now let it be assumed that the slow release relay SR2 is operated as previously described. First the sum lock conductor will be grounded, after which the transfer conductor will be grounded. This will result in the locking in of the operated CS relays ($CS_a$ and $CS_c$) and then the extension of ground through armature 1 of each one which is operated to the lower winding of the corresponding BS relay. Thus relays $BS_a$ and $BS_c$ will be energized through their lower windings. Now when this is followed by the removal of ground from the augend lock conductor thus offering release to the BS relays only, relay $BS_d$ will release—thus reducing the representation on the BS relays from 8 to 7.

Following this action upon the release of SR2, the ground will be first replaced on the augend lock conductor, then the ground will be removed from the transfer conductor and lastly the ground will be taken off the sum lock conductor. Upon the replacement of ground on the augend lock conductor it will be found that circuits may be traced therefrom over the contacts and armatures of the BS relays to energize relays $CS_a$ and $CS_d$ so that later when the CS relays are offered release by the removal of ground from the sum lock conductor relay $CS_c$ will release thus leaving only $CS_a$ and $CS_d$ operated so as to represent the digit 6 (code 1001). Thus each cycle of operation of the counting relays results first in a change in the code representation by the BS relays to one less than before, followed by a similar action by the CS relays.

Now when the BS relays were transiently energized to represent 8, a circuit was established from ground armature 2 and front contact of $BS_a$ to the conductor leading to relay SR2. Upon inspection, it will be found that this circuit controlled also by armature 1 and front contact of $BS_b$ will be closed for all digits 1 to 9 but will be opened when the representation of the BS relays has been reduced to 0. Thus the counting relays will count down from 8 (or any other number to which they have been set) to 0, and the "count 1," "count 2" and so forth noted in the problem hereinbefore cited correspond to the steps 8 to 7, 7 to 6 and so forth.

When a problem in division is being worked out, the action of the counting relays is the same except that the effect is different. In this case by a means which will be clearly described hereinafter the augend lock conductor is opened and all of the BS relays are released. This would place a representation of 13, according to the four place code used, on the BS relays and would result in the immediate (when the augend lock conductor is closed to ground) operation of all the CS relays. This in turn would place a representation of 12 on the CS relays so that the steps of operation of the counting relays would be 13 to 12, 12 to 11, 11 to 10 and so forth. However, the four code conductors leading from the counting relays to the printing switch are arranged within the contacts and armatures of the BS relays to count up from zero; that is, the action of the counting relays in changing from a representation of 13 to 12 would appear on the four conductors leading to the printing switch as a change from 0 to 1 (0011 to 0100). For instance, if the result of the first action in the problem in division is to leave the BS relays undisturbed (after they have all been released) then the outgoing *a* conductor may be traced through armature 5 and back contact of relay $BS_a$ to an open point at the front contact of armature 7 of $BS_b$. Likewise the outgoing *b* conductor may be traced to an open point at the front contact of armature 6 of $BS_b$. The outgoing *c* conductor may be traced through the back contact and armature 7 of relay $BS_c$ to the quotient digit transfer conductor. Likewise the outgoing *d* conductor may be traced through a back contact and armature 6 of $BS_d$ to the quotient digit transfer conductor so that after the action is complete as will be described and the quotient digit transfer conductor is momentarily grounded, the *c* and *d* conductors of the four *a*, *b*, *c* and *d* will be electrically characterized to represent 0 (code 0011). The following table explains the action of the counting relays for division.

TABLE 4

| Count | BS Relays | | | | CS Relays | | | | Characterization of Code Conductors to Printing Switch | | | |
|---|---|---|---|---|---|---|---|---|---|---|---|---|
| | *a* | *b* | *c* | *d* | *a* | *b* | *c* | *d* | *a* | *b* | *c* | *d* |
| 0 | 0 | 0 | 0 | 0 | 1 | 1 | 1 | 1 | 0 | 0 | 1 | 1 |
| 1 | 1 | 1 | 1 | 1 | 1 | 1 | 1 | 0 | 0 | 1 | 0 | 0 |
| 2 | 1 | 1 | 1 | 0 | 1 | 1 | 0 | 1 | 0 | 1 | 0 | 1 |
| 3 | 1 | 1 | 0 | 1 | 1 | 1 | 0 | 0 | 0 | 1 | 1 | 0 |
| 4 | 1 | 1 | 0 | 0 | 1 | 0 | 1 | 1 | 0 | 1 | 1 | 1 |
| 5 | 1 | 0 | 1 | 1 | 1 | 0 | 1 | 0 | 1 | 0 | 0 | 0 |
| 6 | 1 | 0 | 1 | 0 | 1 | 0 | 0 | 1 | 1 | 0 | 0 | 1 |
| 7 | 1 | 0 | 0 | 1 | 1 | 0 | 0 | 0 | 1 | 0 | 1 | 0 |
| 8 | 1 | 0 | 0 | 0 | 0 | 1 | 1 | 1 | 1 | 0 | 1 | 1 |
| 9 | 0 | 1 | 1 | 1 | 0 | 1 | 1 | 0 | 1 | 1 | 0 | 0 |

It may be noted that here as elsewhere + may be used to represent 1 and − may be used to represent 0 whereby the code 0011 for zero may also be written as − − + +.

Another point in connection with the counting relays which may be mentioned here and whose usefulness will appear hereinafter is a circuit from armature 2 and back contact of $BS_a$, armature 1 and back contact $BS_b$, armature 2 and front contact of $BS_c$ and armature 1 and front contact of $BS_d$ which is closed when the BS relays are set to represent 0 (0011).

There is also another circuit which may be traced from armature 1 and back contact of $BS_a$ through the armature 1 and front contact of $BS_c$ which is closed on a problem in division when the BS relays are first reduced to that point where $BS_a$ is not operated and $BS_c$ is operated. An inspection of Table 4 will show that this first occurs when the BS relays reach count 9. This is used to prevent a tenth attempt since no digit can be greater than 9. It will appear hereinafter that in division the divisor is repeatedly subtracted from the dividend and that always one more attempt at subtraction is made than is possible at which time the operation of a sign relay shows that a negative remainder has been produced. However, since no digit greater than 9 can be had it is useless to make a tenth attempt and therefore this circuit is provided to save the time such an attempt would take.

Figure 8:
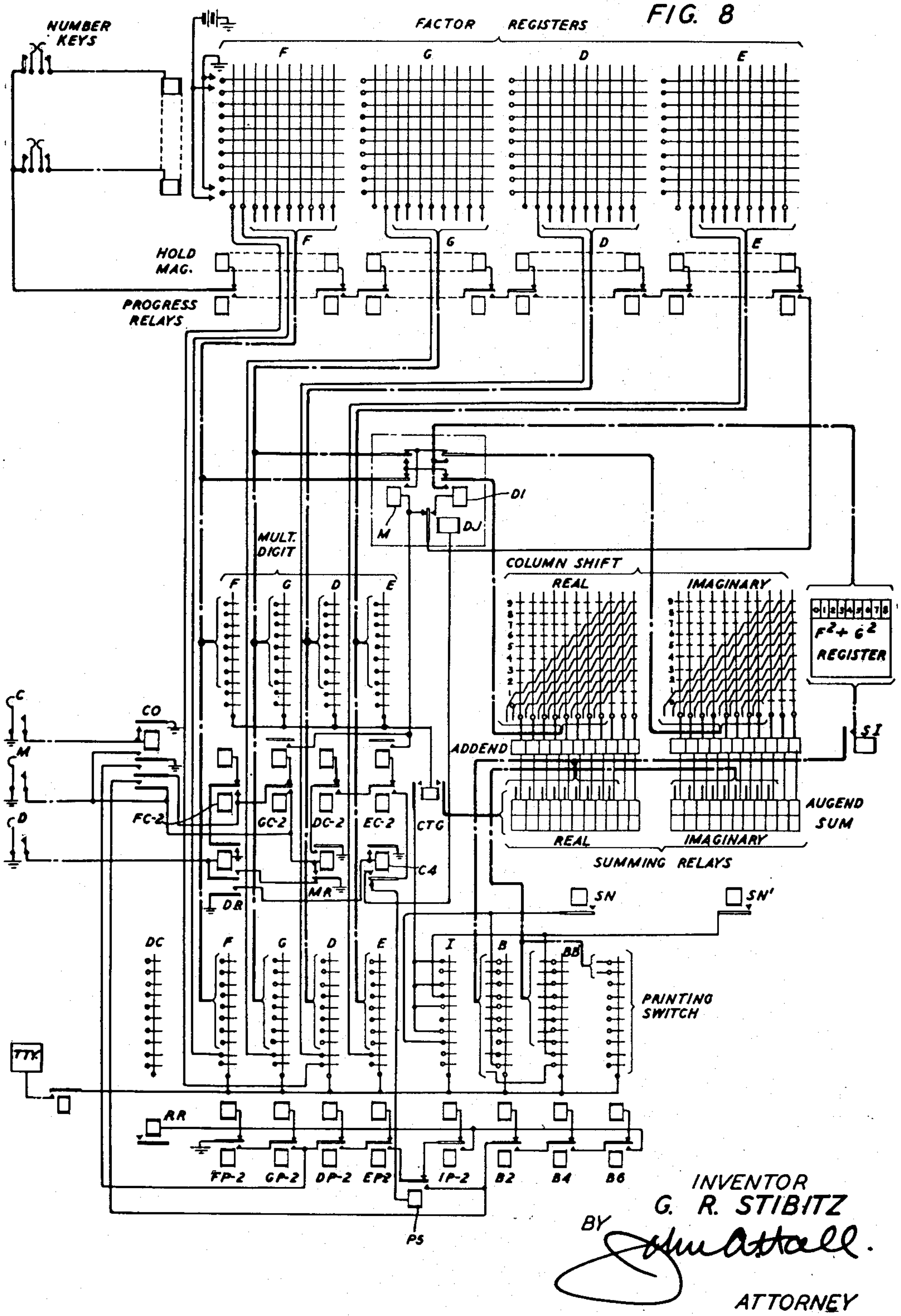
Fig. 8 is a schematic circuit diagram for explaining the general sequence of operations in the different algebraic treatment of the factors entered in the entry registers.

Fig. 8 is a schematic circuit diagram showing in very sketchy form the essentials of the control whereby the device of the present invention is caused to perform a plurality of switching operations in a predetermined sequence. It has been stated hereinbefore that there are essentially three different operations, that of multiplying, that of dividing and that of adding (subtracting is the same as adding). There are three keys provided for signaling these operations, the M, the D and the C keys, respectively. In this figure these keys are shown in the body of the diagram for convenience rather than grouped with the number keys and each directly operates a relay which locks and therefore remains operated until released. The M key operates relay MR, the D key operates relay DR and the C key operates relay C0. It will also be noted that the C0 relay operates the MR relay since, as stated hereinbefore, the operation of addition is essentially performed by multiplying the factors by one and leaving the product thus determined registered in the augend or accumulator relays, so that the next factor in addition (the addend) may be calculated in the same manner and then added to the previously determined product stored in the accumulator.

Now in accordance with the plan of operations indicated in Fig. 8, if a problem in multiplication is to be solved, the M key is first depressed and this results in the operation of the MR relay, which through the back contact of a relay DC2 in a progress circuit prepares to transfer the digits of the factor D from the multiplier digit switch to the counting relays. It will be remembered that in the problem $$(D+iE)\times(F+iG)=$$

the first step is to register the factor F in the real column shift switch and the factor G in the imaginary column shift switch (to supply the addend relays) and to then simultaneously multiply these by the factor D so as to accumulate the value DF in the real accumulator and the value DG in the imaginary accumulator.

The number keys working through a progress circuit are depressed and thereby enter the factors F, G, D and eventually E in the factor registers. The F register is normally associated with the real column shift switch through the contacts of relay M and the G register is normally associated with the imaginary column shift switch through the contacts of relay M so that as soon as these factors are registered the corresponding addend relays may be operated. Then as soon as the factor D is entered, the first digit thereof is transferred to the counting relays and the calculation begins. At the end of the calculation of DF and DG and when the last digit of the factor E, and thereafter the key for = is depressed, the progress circuit associated with the entry registers extends a circuit through the back contact of the DJ relay to operate the M relay. Thereby the factor F is switched from the real to the imaginary column shift switch and the factor G is switched from the imaginary to the real column shift switch. At the same time a progress circuit controlled by relay DC2 now switches a circuit from the D to the E multiplier digit switch so that now the calculation of EG and EF may proceed. The value —EG will be added in the real accumulator to the value DF previously stored there and the value EF will be added in the imaginary calculator to the value DG previously stored there. The result will be $$(DF-EG)+i(DG+EF)$$

and thus the problem $$(D+iE)\times(F+iG)=$$

will have been solved. At this time the printing control progress circuit operates and relay B6 in operating closes a circuit for the release relay RR which puts the printer in condition to record the next problem, and restores all circuits to normal.

In this problem in multiplication, it should be noted that the relay C4 is not operated, and that therefore relay P5 is operated. Therefore, when the printer has been operated to take off the record of the second, third, fourth and fifth verticals of the printing cross bar switch corresponding to the factors F, G, D and E, respectively, the progress circuit controlled by the P2 relays (FP2, GP2, DP2 and EP2) will skip the sixth vertical used for printing the quotient in a problem in division and operate directly through the progress relay B2 for the seventh vertical. This action is indicated by the circuit from the front contact of relay EP2 through the armature and front contact of P5 to the armature of B2. It may also be noted that the progress circuit controlled by DC2 and EC2 extends through an armature of relay C4 when C4 is energized to operate relay DJ but in this problem in multiplication since C4 is not operated, DJ does not respond after the D and E multiplier digit switches have been operated to condition the counting relays.

In a problem in addition or subtraction, the key C is operated. This operates the relay C0 which in turn operates the MR relay to cause the same operations as those just described. However, in a problem in addition no factor is entered in the D and E registers so that the counting relays cannot be set from the D and E verticals of the multiplier digit switch as described. In place of this and as will be fully described hereinafter, the counting relays will be set to the value $D=1$ by a special contact set in the D multiplier digit switch.

In this operation it should also be noted that the progress circuit of the printing cross bar switch is controlled by relay C0 so that after the factors F and G have been recorded, the fourth, fifth and sixth verticals are skipped and the product verticals are directly entered. Thus, if the problem is to add $(2+i3)$ to $(4+i5)$ the record as printed by the printer will appear as follows:

+.40000000+$i$.50000000 +0.40000000+$i$0.50000000
+.20000000+$i$.30000000 +0.60000000+$i$0.80000000

The four factors in the first line mean that (+.40000000+$i$.50000000) has been multiplied by (1) to produce the product (+0.40000000+$i$0.50000000).

The four factors in the second line mean that (+.20000000+$i$.30000000) has been multiplied by (1) and the product (+0.20000000+$i$0.30000000) has been added to the previously accumulated product (+.40000000+$i$0.50000000) to produce the sum (+0.60000000+$i$0.80000000).

In the entry of such a problem in addition the entry of factors F and G is followed by the depression of the = sign key and thereafter the entry of the factors D and E is again followed by the depression of the = sign key. The = sign, however, is not printed, the sum appearing as the third and fourth factors of the last line printed.

If, as another example, the product $$(4+i5)\times(2+i3)$$

is calculated and then the number $(6+i7)$ is added to the previously found product, the record will appear as follows:

+.40000000+$i$.50000000×+.20000000
+$i$.30000000=−0.07000000
+$i$0.22000000+.60000000+$i$.70000000
+0.53000000+$i$0.92000000

In a problem of division, and as it has been set forth hereinbefore, the first operation resulting from the depression of key D and the operation of relay DR is the calculation of the value of $F^2+G^2$. Therefore, as soon as the factor F has been recorded, this value is transferred to the addend relays of the real calculator and the counting relays are set to the value of F under control of the back contact of FC2. When $F^2$ has thus been calculated, the M relay is operated from the progress circuit (front contact of FC2) thus changing the representation in the real column shift switch from the factor F to the factor G and at the same time setting the counting relays to the value of the G factor. Thus $G^2$ is calculated and added to the value $F^2$ already stored in the accumulator relays. When this calculation is complete the value $F^2+G^2$ is transferred to and stored in the $F^2$ and $G^2$ register for use at a later stage when the $D^1$ relays are operated as will be described. At the same time the augend relays of the real calculator are set to a representation of 0 and the augend relays of the imaginary calculator having been set to 0 when the D key was depressed and the DR relay operated, the calculators are in condition for further operations. It may be noted that when the DR relay was operated, relay C4 operated and locked. Now after $F^2+G^2$ has been calculated, the progress circuit through the contacts of FC2 and GC2 causes the operation of MR which in turn releases DR and thus starts a multiplying operation which will be the same as heretofore described, resulting in the calculation of $(DF+EG)+i(-DG+EF)$ certain signs being changed in a manner which will be more fully described hereinafter.

At the end of this operation the progress circuit will complete the circuit heretofore described through the contacts of C4 to operate DJ whereby the value of $F^2+G^2$ is now introduced into both the real and the imaginary column shift switches to be used as an addend (its sign is changed so that it becomes a problem in subtraction and the addend is in reality a subtrahend). In this case the counting relays are not set in accordance with any values registered in the multiplier digit switches but merely act as a means for counting the number of times the addend is added to the value held in the augend or accumulator relays until the value registered therein changes to a negative value thus indicating that on the last subtraction the dividend (the value held in the accumulator originally equal to $(DF+EG)$ in the real augend relays or $(-DG+EF)$ in the imaginary relays) has been exhausted by the divisor $(F^2+G^2)$. As this negative number is produced, the consequent operation of a sign relay stops the operation and the number of subtractions performed before the sign relay operated which are registered in the counting relays are transferred to the sixth vertical of the printing switch where this number is printed as a digit of the quotient. It should be noted here the C4 being locked in relay P5 is released so that the progress in the printing switch is from the fifth to the sixth vertical to print the quotient after the recording of the problem. After the first such operation in which the whole number (the single digit to the left of the decimal point in the real factor of the quotient) is determined and printed, the printer will automatically print the decimal point and the device, through the operation of the column shift switch will repeat the subtractions to determine one at a time the eight digits of the real factor of the quotient. Thereafter the various digits of the imaginary factor of the quotient are likewise sequentially determined and recorded by the printer.

It is to be noted that in a problem of multiplication the real and imaginary factors of the product are simultaneously determined and when so determined are simultaneously held registered in the real and imaginary accumulators and are extended to the printing cross bar switch until under control of the printing control switch each digit of the product is taken off and printed in sequence. In division, however, each digit of the quotient is separately determined and then printed as determined, no registration of these digits being made but only the recording of each by the printer. This is true even though the same value $F^2+G^2$ is registered in both the real and the imaginary column shift switches. Stated in another way, the value $(-DG+EF)$ registered in the imaginary augend relays is held undisturbed until after all the digits of the real factor of the quotient have been determined and recorded.

*The multiplier digit and the column shift switches*

Fig. 9 is a diagram showing how the switches of the devices known as the multiplier digit switches and the column shift switches will be electrically characterized at the instant that the last digit of the third factor has been entered in the D factor register. Each cross-point is here shown as a rectangle in which a numeral has been placed corresponding to the code which will be found at this point as the last digit of the third factor of the following problem is registered:

$$(.23455467+i.75328764)\times(.67765443+i.12345678)=$$

Each cross-point is a set of four permanently paired contacts and each such cross-point may be energized (the contacts closed) through first the energization of a select magnet controlling the horizontal row in which it is located followed by the energization of a hold magnet controlling the vertical row in which is is located. This energizes the cross-point and this operation is not affected by the subsequent release of the select magnet. The final release of the cross-point is affected by the simple release of the hold magnet.

As soon as the condition depicted in Fig. 9 is established the select magnet of the horizontal row numbered 2 is energized. This conditions any and all cross-points whose hold magnets are now energized to operate, so at this point, as will be brought out hereinafter, the hold magnets for vertical rows 3 and 5 to 26, inclusive are simultaneously operated. The number 2 cross-points of verticals 3 and 5 to 26, inclusive are therefore operated and following this the select magnet of the number 2 horizontal is released. The cross-point of number 3 vertical connects to the counting relays and since this is characterized by the code for 6 the counting relays will be set to count down 6 and the hold magnet for this vertical alone will be released. The addend relays of the real calculator are operated to represent the number 00234554670 and the addend relays of the imaginary calculator are operated to represent the number 00753287640. Thereupon these numbers will be each successively added to whatever value (presumably zero to start) may be registered in the augend relays six times. At the end of this operation all the holding magnets for verticals 5 to 26, inclusive, are released and immediately thereafter the select magnet for number 3 horizontal is operated followed by the operation of the hold magnets for verticals 3 and 5 to 26, inclusive. This results in setting the counting relays to the value 7, whereupon the hold magnet for vertical 3 is released. The addend relays for the real calculator are now operated to represent the number 00023455467 and the addend relays of the imaginary calculator are operated to represent the number 00075328764. It is to be noted that on this operation the addend columns are shifted one place to the right which means that when the multiplicand is to be multiplied by the second digit of the multiplier it must be shifted one place to the right of the decimal point.

The remaining operations will be apparent from the above description. One point, however, may well be explained at this time. It will have been noted hereinbefore that the factors which are registered each have eight digits. The column shift switches and the summing relay circuits each have eleven digital places. This provides for one place to the left of the decimal point for a whole number and two extra places to the extreme right which never appear in the final result as printed but which are used here for calculating carry-overs so that the error in the last right-hand digital place will be insignificant. The actual multiplication of .23455467 by .67765443 produces a product of

.1589470112026881

The product calculated by the summing relays and for lack of more than two extra places at the right for calculating carry-overs will be .1589470095. The first eight places of these two figures will be .15894701 (true) as against .15894700∓ (calculated), the symbol (∓) indicating that the next place figure though not recorded is five or more. Also it will be noted that whereas the factor in the real calculator is actually .23455467 it is first registered in the addend relays as 00234554670 which making allowances for the final automatic insertion of the decimal point will be .023455467, the number therefore having been automatically shifted to the right one place. This is to allow for the mathematical conception expressed by .1×.1=.01.

*Printing*

In Fig. 1 the printing switch is shown as a rectangle from which a rotary distributor is operated to send the conventional signal to the printing telegraph receiver. In Fig. 2 there is an indication of how the four code conductors *a*, *b*, *c* and *d* from the entry registers and elsewhere are connected into the cross bar contact sets to produce the five place telegraph codes. It may be here further explained that there is a direct correspondence between the augend-addend four place codes and the telegraph codes whereby the four place codes form a subcombination of the five place telegraph codes. This will be apparent from the following table:

TABLE 5

| Character Printed or Function Performed | Telegraph Code | | | | | Augend-Addend Code | | | |
|---|---|---|---|---|---|---|---|---|---|
| | 1 | 2 | 3 | 4 | 5 | *a* | *b* | *c* | *d* |
| 0 | − | − | + | + | − | − | − | + | + |
| 1 | − | − | − | − | + | − | + | − | − |
| 2 | − | − | − | + | + | − | + | − | + |
| 3 | − | − | + | − | + | − | + | + | − |
| 4 | − | − | + | + | + | − | + | + | + |
| 5 | + | − | − | − | − | + | − | − | − |
| 6 | + | − | − | + | − | + | − | − | + |
| 7 | + | − | + | − | − | + | − | + | − |
| 8 | + | − | + | + | − | + | − | + | + |
| 9 | + | − | − | − | + | + | + | − | − |
| × | + | + | + | + | − | + | − | + | + |
| \ | − | + | + | − | − | − | − | + | − |
| +. | − | + | + | + | − | − | − | + | + |
| −. | + | + | − | − | + | + | + | − | − |
| +*i*. | − | + | − | + | + | − | + | − | + |
| −*i*. | + | + | + | − | − | + | − | + | − |
| + | + | + | − | + | − | + | − | − | + |
| − | − | + | + | − | + | − | + | + | − |
| = | + | + | + | − | + | + | + | + | − |
| . | − | + | − | + | − | − | − | − | + |
| +*i* | + | + | − | − | − | + | − | − | − |
| −*i* | − | + | + | + | + | − | + | + | + |
| ∓ | − | + | − | − | + | − | + | − | − |
| Y | + | − | + | − | + | + | + | + | − |
| Carriage Return | − | − | − | + | − | − | − | − | + |
| Line Feed | − | + | − | − | − | − | − | − | − |
| Space | − | − | + | − | − | − | − | + | − |

An examination and comparison of the codes will show the four place elements in the five place code as follows:

| | | | | | |
|---|---|---|---|---|---|
| Five place code | 1 | 2 | 3 | 4 | 5 |
| Four place elements | *a* | | *c* | *d* | *b* |

This relationship is also clearly shown in the connections of the code wires in the cross bar contact set of the printing switch of Fig. 2. Through this correspondence of the codes no special translation from one code to the other is necessary since by the proper connection of the code wires and the local supply of the proper electrical characterization of the second place of the five place code, the rotary distributor telegraph transmitter will produce the proper sequence of space (−) and mark (+) pulses. It may be noted that in general each of the telegraph codes for a number is characterized by a space signal (−) in the second place and for a sign such as +*i* by a mark signal (+).

The printing cross bar switch is depicted in Fig. 10 in the form of a coordinate array of rectangles corresponding in position to the horizontal and vertical positions of the contact sets of such a switch. Each of these boxes in Fig. 10 contains a label which indicates the function of that contact set. In general, it may be stated that a control means is provided whereby the various contact sets are successively operated so that the codes standing thereon are successively transferred to the rotary distributor for transmission to the printer. Generally speaking also, this control means consists of a progress circuit whereby on the completion of one operation of the transmitter the contact set which has just participated in an operation is dismissed and the next in order set is then connected in circuit. The progress circuit for advancing from vertical to vertical has been shown schematically and described in connection with Fig. 8. Another progress circuit for advancing from horizontal to horizontal and which will be fully described hereinafter is also provided. Thus, the operation is started by operating the contact set for the number 2 vertical at the first level whereupon the sign and the decimal point for factor F is printed. Thereupon this contact set is dismissed and that for the number 2 vertical at the second level is operated to cause the printing of the first digit of the factor F. The movement starts at the second vertical and proceeds upwardly through the first to the ninth levels and thence to the third vertical where it again moves upwardly step by step. The only variation of this orderly progress is in the cases already noted. Thus, in a problem in division the contact sets of the second through the sixth verticals are sequentially scanned. In a problem of multiplication the second, third, fourth, fifth, seventh, eighth and ninth verticals are involved and in a problem in addition or subtraction the second, third, seventh, eighth and ninth verticals are used.

The first vertical is a control means and one contact set in this vertical is always operated on the level corresponding to the level of the printing set being at that time operated. Thus, each time a select magnet is operated, the hold magnet of the first vertical as well as the hold magnet of some other vertical is operated. Thus, by way of example, when the whole number of the real quotient in a problem of division is to be printed, the select magnet of the third level is operated. Thereafter the hold magnets of the first and the sixth verticals are simultaneously operated.

It may be noted that certain of the contact sets are marked "blank." These are not in use but are present in the switch simply because the switch is a standard piece of apparatus used in communication systems having 100 contact sets arranged in ten levels on ten verticals.

*Method of capturing the fugitive one*

In the examples given heretofore it appears that the fugitive one is a value which has escaped from the extreme right-hand column and which later appears in a column to the extreme left beyond any column used. For practical purposes the method used to capture this fugitive is to chase it ever to the left until it passes beyond the capability of the machine or the device to register it, and then to supply a one to be added to the extreme right. In the electrical device of the present invention there are provided two paths to the extreme right, one known as the "carry 0" and the other known as the "carry 1." The fugitive one is figuratively chased into the latter of these two paths whence it is returned and automatically added to the value in the extreme right-hand column. Thus, where the value .04 is to be subtracted from the value .08 the nine's complement of .04 will be stated as .95 if the machine has no register to the left beyond the decimal point so that the result becomes $$\begin{array}{r} .08 \\ .95 \\ \hline .03 \end{array}$$

and through the automatic addition to the extreme right-hand column of one, becomes $$\begin{array}{r} .03 \\ .01 \\ \hline .04 \end{array}$$

If the machine has one register to the left beyond the decimal point then the operation becomes $$\begin{array}{r} 0.08 \\ 9.95 \\ \hline 0.03 \end{array}$$

and the one which should have appeared in a second column to the left of the decimal point, disappears simply because there is no means present to register it. It may be considered then that the fugituve one has been chased into the "carry 1" path and hence is automatically added to the result, as $$\begin{array}{r} 0.03 \\ 0.01 \\ \hline 0.04 \end{array}$$

*Determination of signs*

Where two paths, a "carry 0" and a "carry 1" are provided one of which must become effective on each operation, it will be readily apparent that in performing an operation in addition where the addend is the complement of some number and therefore represents a subtrahend, that such an operation results in the selection of the "carry 0" path and indicates that the subtrahend has been larger than the minuend so that the remainder is a minus number or negative quantity. The sum in this case is the complement of the negative remainder. Thus $$\begin{array}{l} 0.08 \\ 9.90 = \text{complement of } .09 \\ \hline 9.98 = \text{complement of } .01 \end{array}$$

and since no attempt has been made to put a value in another column to the left of 9., the "carry 0" path will be selected with the result that the sign will be reversed. This, as it will appear hereinafter, will result in the printing of a minus sign and the inversion of the codes for 9.98 to cause the printing of —0.01.

It will also appear that the above noted special effects of the selection of the "carry 0" and "carry 1" paths become manifest when the addend of the actual operation is representative of a subtrahend—that is algebraically it is the addition of a negative quantity. The means employed to produce these effects may be illustrated by the explanation of the following problem and by the help of the skeleton circuit diagram of Fig. 11.

*The problem*

$$(4+i5)\times(2+i3)$$

Keys depressed as follows:

$$M \quad + \quad 4 \quad +i \quad 5 \quad + \quad 2 \quad +i \quad 3 \quad =$$

Printer reproduces as follows:

$$+.40000000+i.50000000\times+.20000000 +i.30000000=-0.07000000+i0.22000000$$

The problem solved is:

$$(4+i5)\times(2+i3)=(-7+i22)$$

The factors are:

$$F=.40000000$$
$$G=.50000000$$
$$D=.20000000$$
$$E=.30000000$$

According to the equation $$(F+iG)\times(D+iE)=(FD-GE)+i(GD+FE)$$

the device will calculate on:

| The real calculator | The imaginary calculator |
|---|---|
| +F | +G |
| +D times | |
| and add to these values | |
| −G | +F |
| +E times | |
| producing | |
| $(FD-GE)$ | $+i(GD+FE)$ |

The calculation is performed as follows:

| Real | | | | Imaginary | Computing Relays |
|---|---|---|---|---|---|
| | 0.00000000 | | Augend | 0.00000000 | (B) |
| | 0.04000000 | (1) | Addend | 0.05000000 | (A) |
| | 0.04000000 | | Sum | 0.05000000 | (C) |
| | | | becomes new | | transferred to |
| Count 1 | 0.04000000 | | Augend | 0.05000000 | (B) |
| | 0.04000000 | | Addend | 0.05000000 | (A) |
| | 0.08000000 | | Sum | 0.10000000 | (C) |
| | | | becomes new | | transferred to |
| Count 2 | 0.08000000 | | Augend | 0.10000000 | (B) |
| | 9.94999999 | (2) | Addend | 0.04000000 | (A) |
| | 10.02999999 | | | | |
| | ---------1 | (3) | | | |
| | 0.03000000 | | Sum | 0.14000000 | (C) |
| | | | becomes new | | transferred to |
| Count 1 | 0.03000000 | | Augend | 0.14000000 | (B) |
| | 9.94999999 | | Addend | 0.04000000 | (A) |
| | 9.97999999 | | Sum | 0.18000000 | (C) |
| | | | becomes new | | transferred to |
| Count 2 | 9.97999999 | (4) | Augend | 0.18000000 | (B) |
| | 9.94999999 | | Addend | 0.04000000 | (A) |
| | 19.92999998 | | | | |
| | ---------1 | (5) | | | |
| | 9.92999999 | | Sum | 0.22000000 | (C) |
| | | | becomes new | | transferred to |
| Count 3 | 9.92999999 | (6) | Augend | 0.22000000 | (B) |

(1) Shifted one place to right to allow for multiplication by fraction.
(2) 9.94999999 is nine's complement of .05 and represents −.05.
(3) (5) The fugitive one is captured and added to the last figure to the right, over the "carry one" path.
(4) The value 9.97999999 is the nine's complement of .02000000 and would be printed as −0.02000000. In this case however the value 9.97999999 stands on the augend relays but is not printed.
(6) 9.92999999 is nine's complement of −.07 and will be printed as −0.07000000.

Looking now at Fig. 11, it will be noted that there are two sign relays marked SN1 and SN3. SN1 is operated when a negative sign is registered, as for instance for the factor G (−.50000000)

The two relays SN1 and SN3 control the carry 0 and carry 1 paths leading as shown to the extreme right-hand order and entering the carry chain through the armatures of $A10_d$. The carry 0 path is normally grounded through the back contacts of SN1 and SN3 but when one of these relays becomes operated the carry 1 path is grounded instead. Thus, when (Note 2 above) the factor −.05 is to be added to the value .08 (so far accumulated) the relay SN1 is operated thus reversing the normal connections of the addend relays and making them respond to the battery or complemental code and hence the value 9.94999999 appears on these relays and the carry 1 conductor from relay SN3 is grounded so that a fugitive one is captured and returned to the last place on the right.

Now every negative number placed on the addend relays must begin with a nine, as 9.00000000 which is the complement of 0.99999999

(the largest number which may be registered as a factor) or as 9.99999998 which is the complement of

.00000001

(the smallest number which may be registered as a factor). Therefore in every case where the normal plus sign has been changed to minus, relay SN1 will be energized to switch the ground from the carry 0 lead to the carry 1 lead extending to the extreme right-hand pair of calculating relays. But this carry 1 lead should not be grounded unless there is to be a carry-over (constituting the capture and return of the fugitive one). Hence, provision is made to also operate the companion relay SN3 to switch the ground back from the carry 1 to the carry 0 lead. This provision is found in a circuit through an armature of relay $B0_a$ and an armature of relay $C0_a$ shown here in Fig. 11. When both these relays are in the same position, as where both are in their normal non-operated position or both are in their operated position, then relay SN3 will remain non-operated and the carry 1 lead will be grounded, but when either is operated while the other is non-operated relay SN3 will respond and the carry 0 lead will be grounded, now through the front contacts of SN1 and SN3.

The effect of this circuit in operating relay SN3 may be illustrated in four of the possible combinations involving the sign relays. Thus, as a first example note (in the problem above) the addition $$\begin{array}{r} 0.00000000 \\ 0.04000000 \\ \hline 0.04000000 \end{array}$$

In this case SN1 is not operated (because the factor 0.04000000 is a positive number and now since neither $B0_a$ nor $C0_a$ is operated (see the codes in Table 3), the SN3 relay is not operated. Therefore the carry 0 lead remains grounded.

As a second example note the problem 0.08000000
9.94999999
__________
10.02999999
1
__________
0.03000000

In this case SN1 is operated since the addend 9.94999999 is the complement of −0.05000000. However, in this case $B0_a$ and $C0_a$ are both non-operated and hence SN3 will not be operated with the result that the carry 1 lead is grounded.

As a third example note the addition 9.97999999
9.94999999
__________
19.92999998
1
__________
9.92999999

Here the relay SN1 is operated because the addend is the complement of a negative number. Also, both $B0_a$ and $C0_a$ are operated so that SN3 is non-operated and hence the carry 1 path is grounded.

As a fourth example, consider the addition 0.03000000
9.94999999
__________
9.97999999

Here relay SN1 is operated because the addend is the complement of a negative number. $B0_a$ will be non-operated but $C0_a$ will be operated and therefore since SN3 is now also operated, the carry 0 path will be grounded.

It may be noted in considering the operation of the sign relays SN1 and SN3 that the first is operated as a result of the character of the factors entered and if operated will cause the carry 1 lead to be grounded even before the A (addend) relays are operated. The state of the SN3 relay is determined by the $B0_a$ and $C0_a$ relays (see Fig. 11). Since only a 0 or a 9 may be made to appear in the A0 relays it may be stated in general that when the addend represents a positive number the $B0_a$ and $C0_a$ relays are either both operated or both non-operated and hence the SN3 relay will not be operated. The addend being positive the SN1 relay will not be operated and hence the carry 0 path will be grounded. When the addend is negative (SN1 operated) then the $A0_a$ relay will be operated and thus will change the relation between $B0_a$ and $C0_a$ whereby SN3 will be operated so that again the carry 0 path will be grounded.

The operation of the sign relays and the consequent circuit changes are depicted in the sequence chart Fig. 53. In the above problem the B or augend relays are standing at the values 0.0300000000 and the A relays are entirely released. It is assumed at the beginning of this diagram that the addend −.05 has been entered but the actual calculation has not started. Therefore, the SN1 relay has been operated and since the SN3 relay has not yet been operated the carry 1 conductor is grounded. In order to show the circuit reactions the C relays for the whole number and for the ninth and tenth decimal orders are shown. Also the carry 0 and carry 1 conductors between these two right-hand orders are shown in order to show the readjustment of the C relays. It will be understood that as a result of the operation of the addend relays the sum will temporarily (during the third interval of the chart) become 9.9800000000 but that a readjustment as shown will take place during the fourth interval so that the sum becomes 9.9799999999

Fig. 55 is a sequence chart which, like Fig. 54 shows certain operations under this example four, is intended to demonstrate that there is ample opportunity after the addend relays have been operated for readjustment of the sum relays before the summing cycle has started and the sum lock conductor is grounded.

The following table will give a complete explanation of the possibilities, 0 meaning that the relay is non-operated and 1 meaning that the relay is operated:

TABLE 6

| Example Given Above | Relay SN1 | Relay SN3 | Relay $B0_a$ | Relay $C0_a$ | Carry |
|---|---|---|---|---|---|
| 1 | 0 | 0 | 0 | 0 | 0 |
| 2 | 1 | 0 | 0 | 0 | 1 |
| 3 | 1 | 0 | 1 | 1 | 1 |
| 4 | 1 | 1 | 0 | 1 | 0 |
| | 1 | 1 | 1 | 0 | 0 |
| | 0 | 0 | 1 | 1 | 0 |
| | 0 | 1 | 0 | 1 | 1 |
| | 0 | 1 | 1 | 0 | 1 |

Not all of the above combinations, though theoretically possible are practical because only a 0 in the case of a positive number or a 9 in case of a negative number may be made to appear in the whole number place of the addend.

It may be mentioned at this point that the device is not expected in normal operation to build up in this whole number denominational position a large value. By way of example, a problem using the largest values that may be registered would be:

$$+.99999999+i.99999999\times+.99999999+i.99999999=$$

and the result, as produced by the device would appear as $$+0.00000000+i.1.99999994\pm$$

whereby it appears that a value of nearly 2 is about the greatest which would appear in this position.

However, by a process of accumulation, as when this problem is solved again and the result added to what was held in the augend relays, the value in this position may be raised. In such a case the result would appear as $$+0.00000000+i3.99999991$$

If this same problem is again registered for solution and the result added to the accumulation above, the new result will appear as $$+0.00000000-i4.00000013$$

the imaginary value now being expressed as the complement, so that the actual result is $$+0.00000000+i5.99999986$$

instead of $$+0.00000000-i4.00000013$$

as printed.

The means by which this printing of the complement is attained is also shown in Fig. 11. Here the $B0_a$ relay controls an armature which grounds either one of two leads. From the codes hereinbefore set forth it is noted that in the *a* place of all numbers from 0 to 4, inclusive a 0 or — appears and that in this same place in all numbers 5 to 9, inclusive a 1 or + appears. Thus whenever the whole number decimal order of the accumulator holds a number 0 to 4 the $B0_a$ relay will be in non-operated position and therefore the lead connected to the back contact and here designated the true number lead will be grounded. This lead goes to front contacts of all other B or augend relays which will control printing and hence will transfer the codes to the printing swtich. Thus, if the whole number is 0, the $B0_a$ and $B0_b$ relays will be in non-operated position and the $B0_c$ and $B0_d$ relays will be in operated position. Hence the *c* and *d* leads of the whole number extending to the printing switch will be grounded and thus the four place code − − + + will be transmitted to the printer as − − + + −. By the same token, if the whole number in the augend relays has become 5 or more the $B0_a$ relay will be operated and the complement lead instead of the true number lead will be grounded, thus transmitting to the printing switch grounds on those code leads controlled by non-operated relays. It is to be noted that this method of transmitting a complement differs from the method used in transmission from the factor registers to the addend relays, as indicated by the lower armature of SN1.

In connection with the carry leads as shown in Fig. 11 and the operation of the relay SN3 the following may be noted. The grounds for the operation of the sum (c) relays comes from the carry leads (see Fig. 3), either locally from a branch of the augend lock conductor or from the sign relays. The local ground is effective when the A and B relays are alike either operated or non-operated while the through carry ground coming from a right-hand denominational order is effective when the A and B relays are different. It follows then that the ground from the sign relays extends into this circuit network only so far as there are combinations in the A and B relays to operate the C relays to represent nines including the extreme right-hand decimal denominational order and counting toward the left. Therefore any adjustment of these values as the result of the operation of SN3 cannot reach the whole number (except in the one case where every one of the eleven digits is a 9) so that the output of the sign relays cannot affect their operation. What happens by way of adjustment may be shown in connection with the fourth example, above. Before the addend relays are operated the SN1 relay is operated, the SN3 relay is not operated and the carry 1 lead is effective. Upon the operation of the addend relays this carry 1 lead will start to produce the sum $$\begin{array}{r} 0.0300000000 \\ 9.9499999999 \\ 1 \\ \hline 9.9800000000 \end{array}$$

(the ninth and tenth orders being here shown for the sake of accuracy). However, the local ground from the augend lock conductor is effective from the third (from the left) binary order of the third (from the left) decimal order since both relays $A2_c$ and $B2_c$ are operated and hence immediately upon the operation of the addend relay the SN3 relay operates as a result of which the ground will be transferred from the carry 1 to the carry 0 lead. In the third decimal order the $C2_c$ relay will release and the $C2_d$ relay will operate to change the representation from 8 to 7. In the fourth to the eleventh orders the $C4_c$ (by way of example) will release and the $C4_a$, $C4_b$, $C4_c$ and $C4_d$ relays will operate to change the representation from 0 to 9 so that the result is actually $$\begin{array}{r} 0.0300000000 \\ 9.9499999999 \\ 0 \\ \hline 9.9799999999 \end{array}$$

Figure 6:
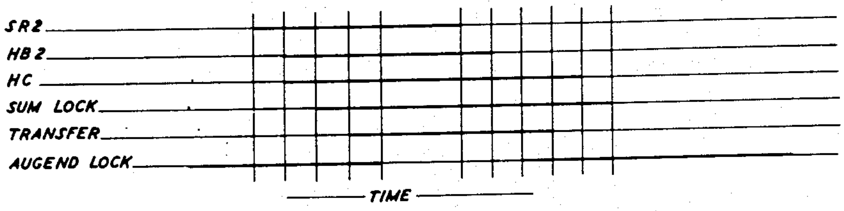
Fig. 6 is a time chart showing the overlapping time elements involved in the control of the summing relays.

This adjustment is so rapid that the change from the carry 1 to the carry 0 lead is made almost before the sum relays in the right-hand orders can become firmly operated; at any rate the adjustment is completed before the summing cycle can be started so that by that time the sum relays are firmly operated (even though adjustment could be tolerated to nearly the beginning of the third interval Fig. 6 of the summing cycle).

With this explanation of certain salient features of the invention by which a clear understanding of the invention may be had, the description will be completed with the following detailed description.

It should be noted in the following description that the system of designating the individual elements of the circuit is based primarily on the engineering specifications for the device. In this specification the various relays are designated by both letters and numerals which have come to have certain significance to the engineers. Thus a relay designated ADV1 or ADV2 generally means advance 1 or advance 2, MR means multiplying relay, DR means dividing relay and so on. In order to render the specification easier to read by the engineers, these designations are used. Where conductors are designated by numerals the number used will be a four-digit number the first two digits of which will be the number of the figure in which the conductor was started. For instance a common conductor carrying a master ground and which appears in numerous figures is conductor 4412 starting from armature 4 of the master release relay RR in Fig. 44.

*Entry of problem data*

When the device of the present invention is taken for use the device is placed in service by the operation of the power control switch 1901 (Fig. 19). This closes an obvious local circuit for operating the printer 1902 here shown as a rectangle with the schematic indication of a motor 1903 and a selector magnet 1904 within this rectangle. The power control switch 1901 also grounds lead 1905 which may be traced to Fig. 44 where it will operate the power relay PWR. This relay acts to connect the main power supply lead 4401 through its left-hand armature to lead 4402 which here represents all points in the circuit where a battery is shown. Relay PWR also closes an obvious local circuit for motor 4403 to operate the rotary distributor of the telegraph transmitter. The main battery supply lead 4402 has a branch extending over lead 4404 to a monitoring signal lamp 1906 at the operator's station by which the operator may know that the device is properly conditioned for service (or is in service at another station if more than one operator's station is provided). Telegraph signals are transmitted from the rotary distributor (Fig. 44) over line wire 4405 to the selector magnet 1904 in the printer 1902 (Fig. 19). The device having now been put in service the operator will manipulate the keys to record a given problem. The NC key if left in its normal position will condition the circuits so that the values accumulated will be retained in the augend relays so that if another problem in addition or multiplication is written up on the keys its result will be added to the values already accumulated and the result printed will be the total, that is, the last previous result plus the result of the present calculation. If the key NC is operated, however, so that conductor 1907 is connected to conductor 1908 instead of to conductor 1909, then each problem will be solved separately and no accumulation from problem to problem will be made. Key NC in its alternate position provides for operating relay SR1 (Fig. 42) and SR'1 (Fig. 43) to automatically reset the augend relays to represent zero thus wiping out any value accumulated therein. The effect of the operation of the key NC to its alternate position will be explained in detail hereinafter (in the last three paragraphs of the description of the operations under the heading "Printing of solution" and just preceding the heading "Division"). Let it first be assumed that key NC is left in its normal position where accumulation will take place.

The registration of the problem proper starts with the depression of key M, key D or key C, which over conductor 1401, 1402 or 1403 respectively operates relay MR (Fig. 39), DR (Fig. 39) or C0 (Fig. 30) respectively. Each of these relays will lock to a ground controlled by the release relay RR (Fig. 44) so that it will remain operated, except as otherwise noted, until the end of the operation. Relay DR locks through its armature 4 and the back contact and armature 3 of relay MR which is connected through the normally closed contacts of armature 7 of relay DJ to conductor 4412 leading through back contact and armature 4 of the release relay RR to ground. Relay MR locks through its armature 3 and the circuit just traced. Relay C0 locks through its armature 5, conductor 3019, back contact and armature 5 of the release relay RR to ground.

For a problem in multiplication the key M is depressed. Besides operating the relay MR, this key also grounds the number 1 conductor of the group 0 to 9 inclusive which over multiple connection 1404 leads to a like numbered armature of the F register multi-contact relay FM2 and thence to a like numbered select magnet of the F entry register and to like arrangements on the G, D and E registers.

Figure 20:
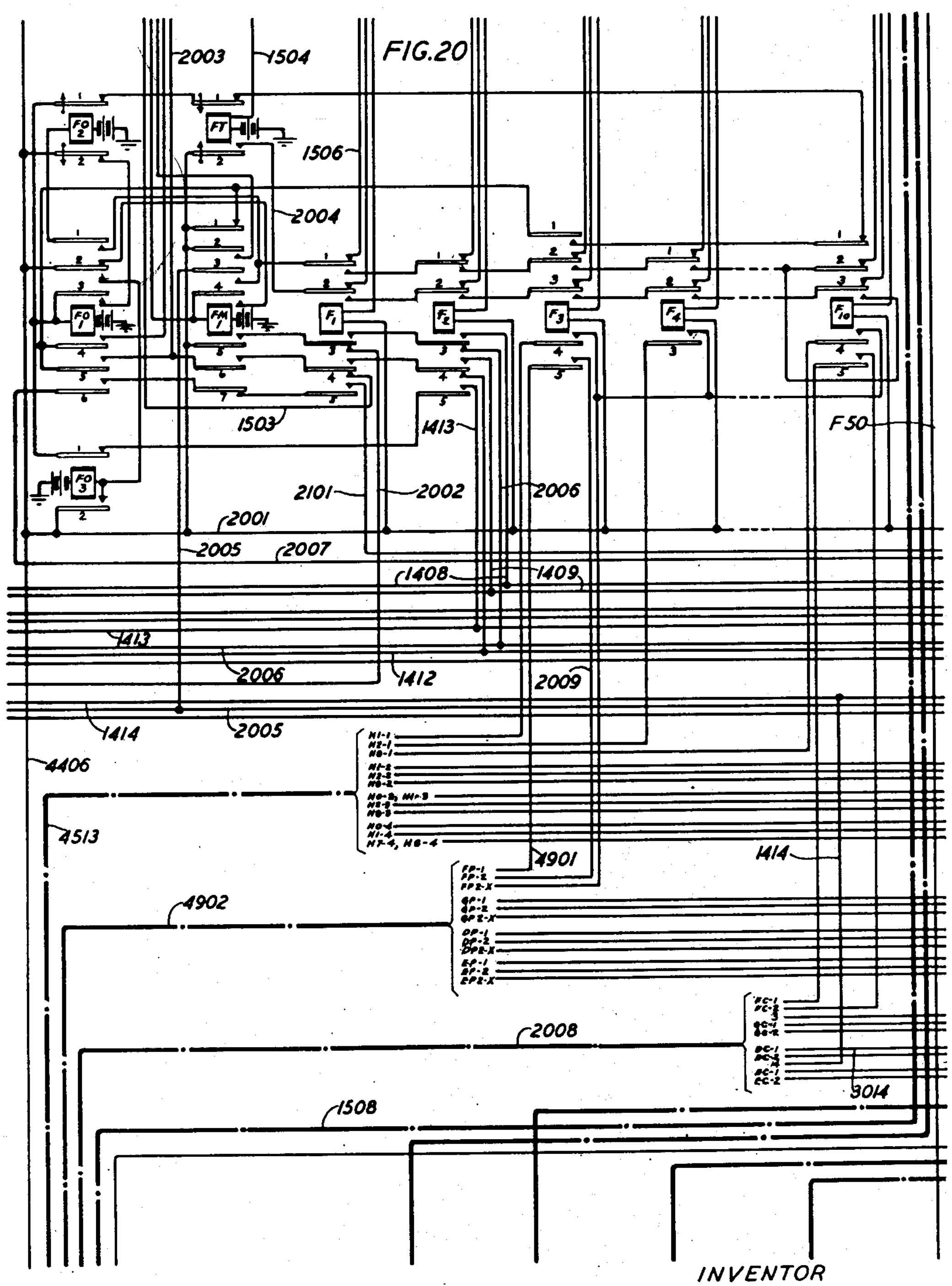
Figure 21:
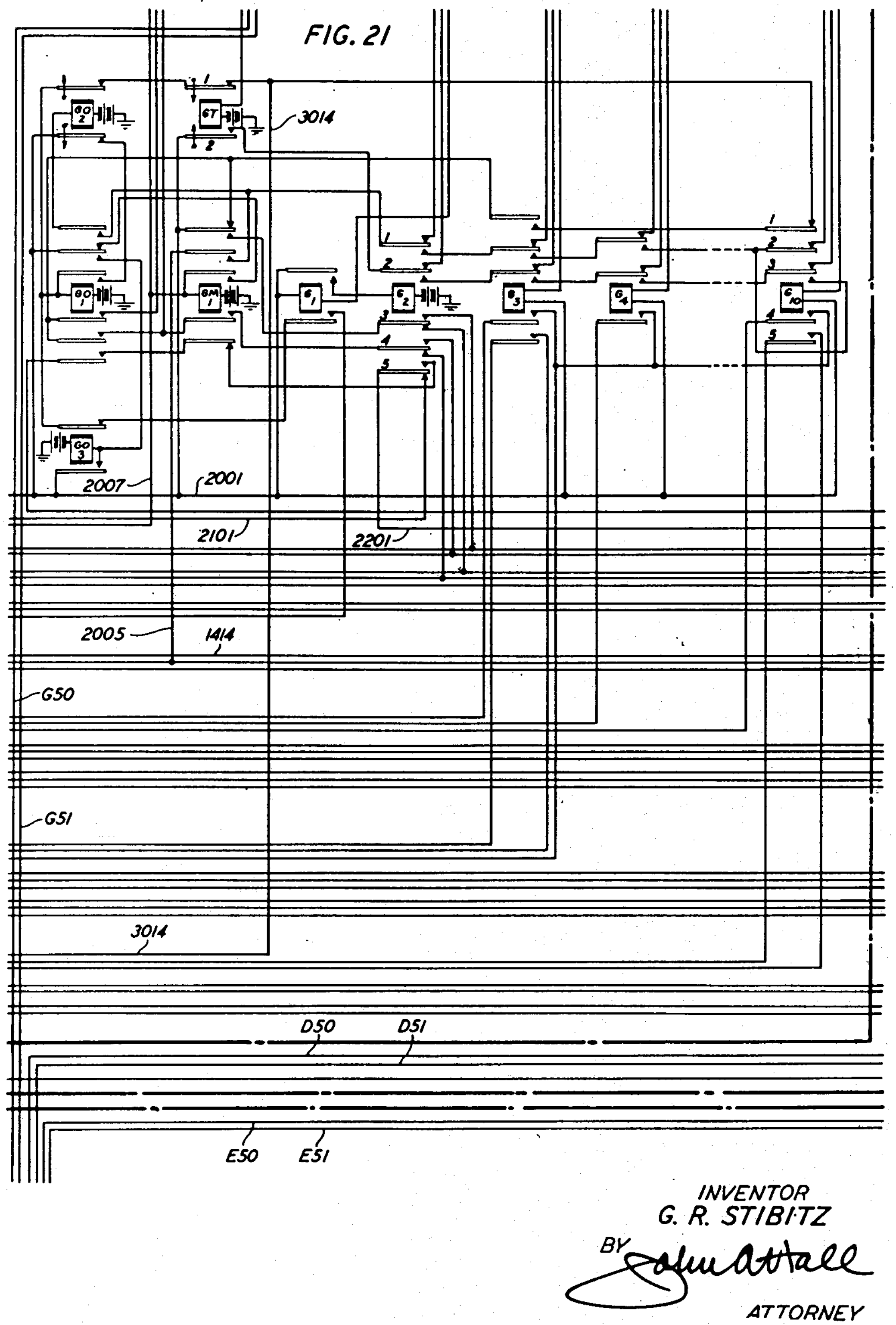
Figure 22:
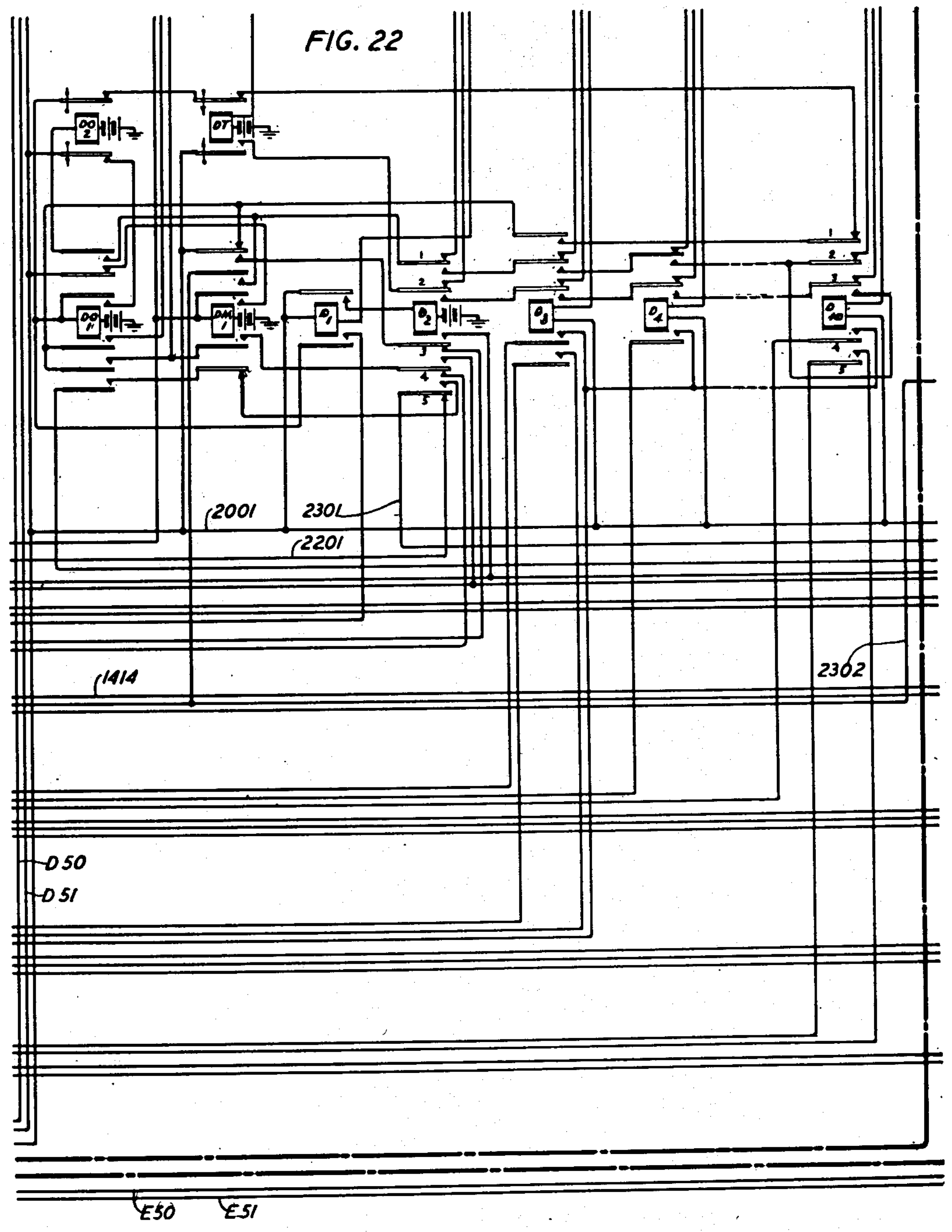
Figure 23:
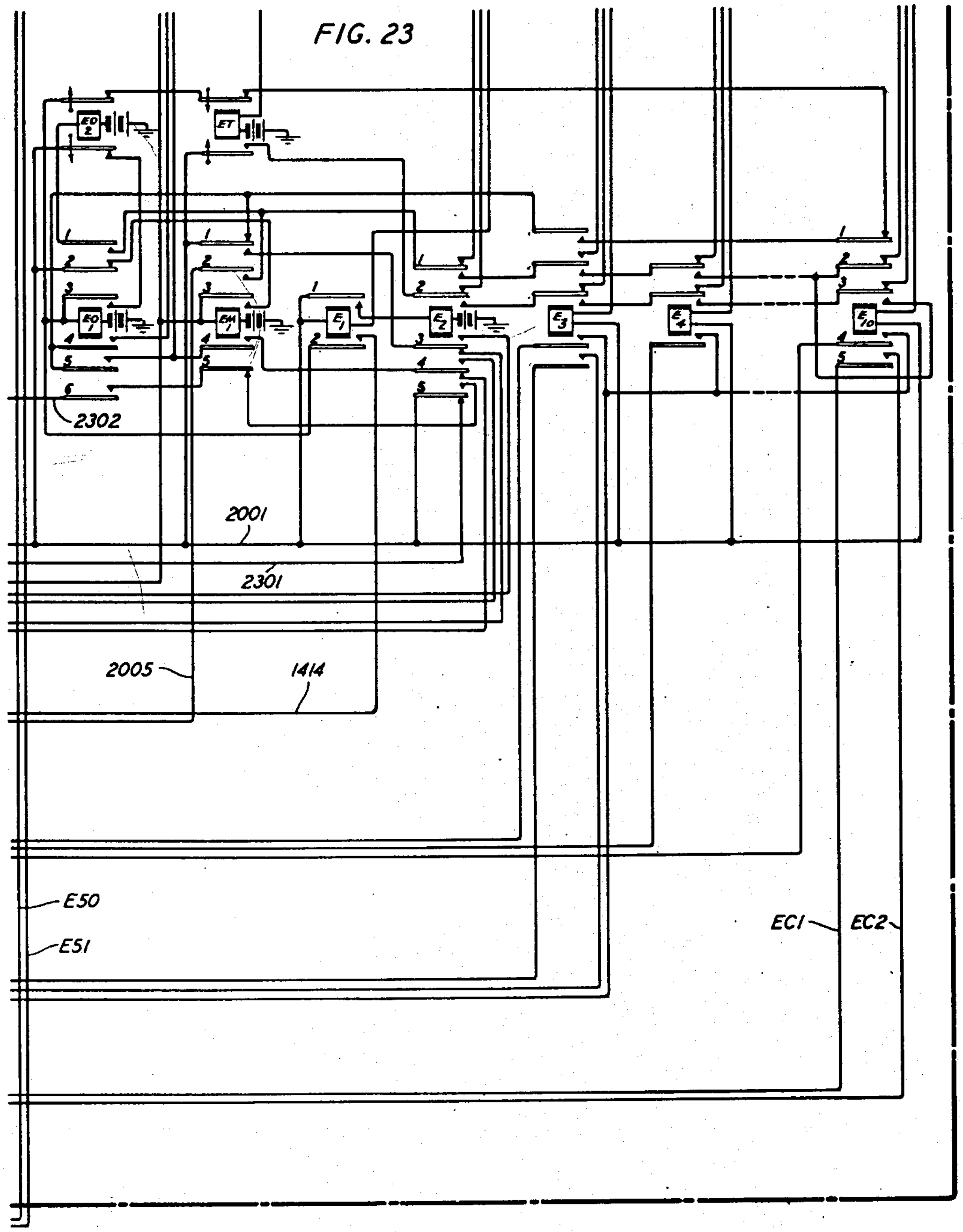

Each of keys M, D and C places a ground on conductor 1405 which may be traced through armature 11 and back contact of relay FM2, conductor 1501 to the winding of relay FM1 (Fig. 20). Relay FM1 connects ground (from conductor 4406 and conductor 2001) through armature 5 and front contact of relay FM1, armature 3 and back contact of relay F1, conductor 2002, right-hand contacts of the key to numerical conductor 1 (for keys M and C) or to numerical conductor 2 (for key D).

Figure 15:
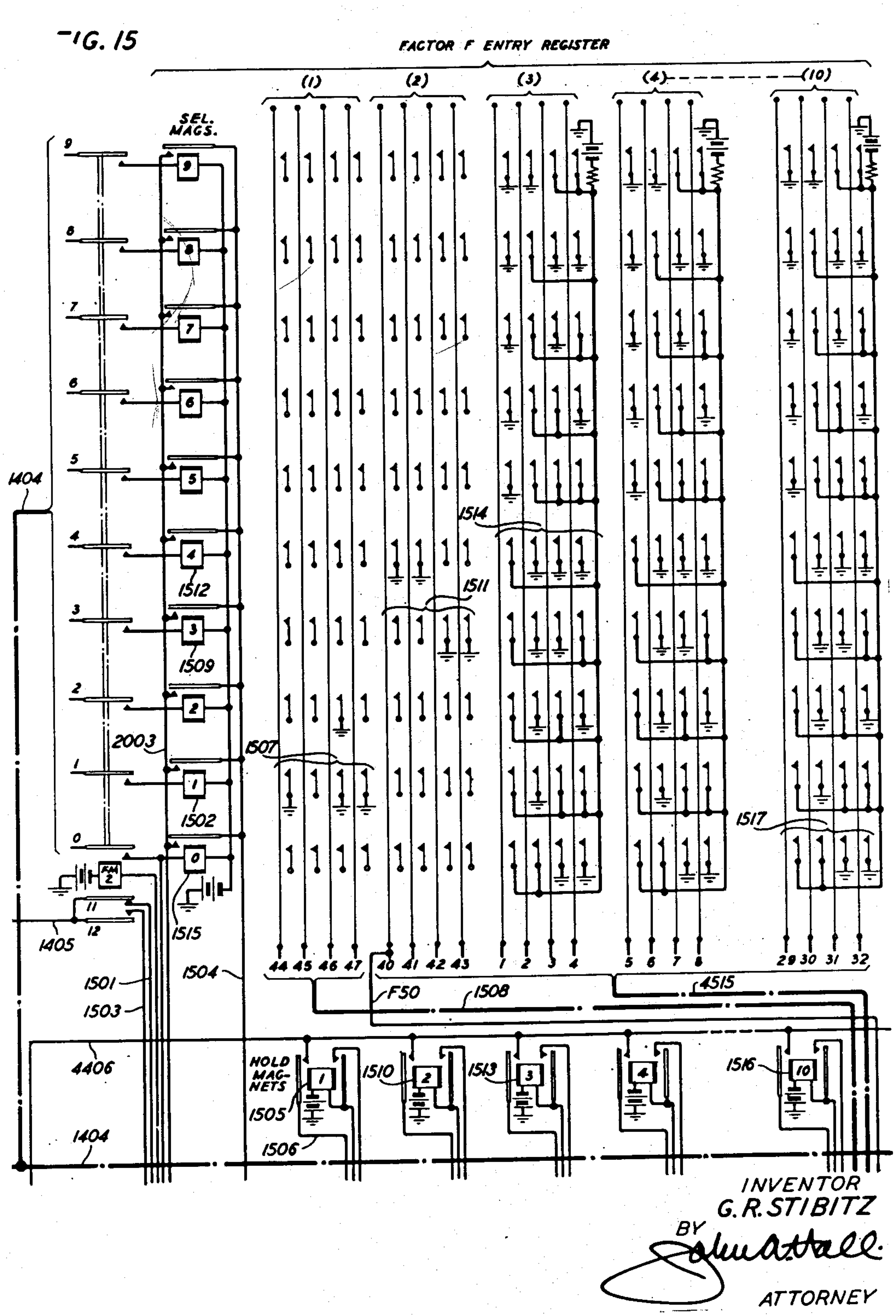
Figure 16:
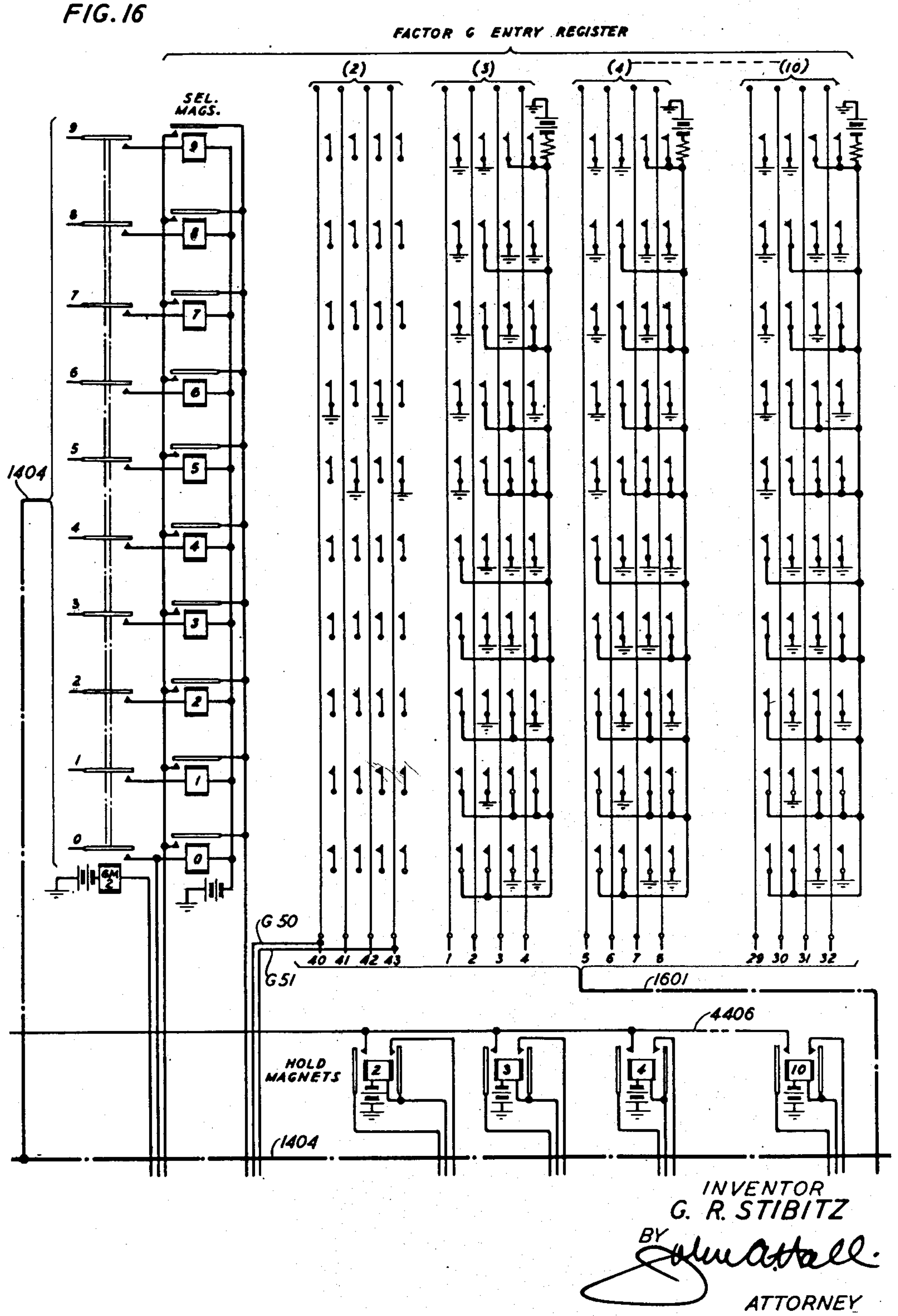
Figure 17:
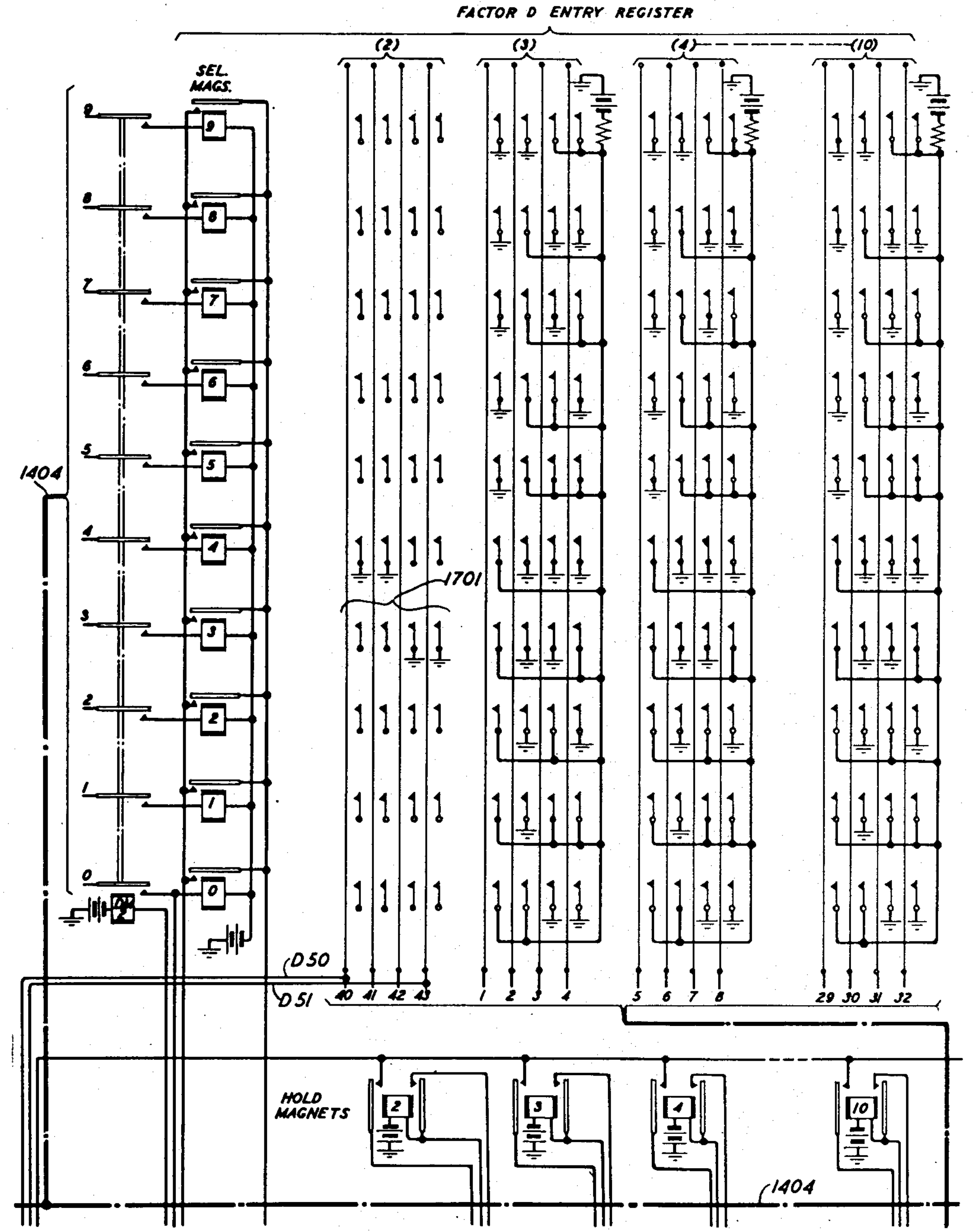
Figure 18:
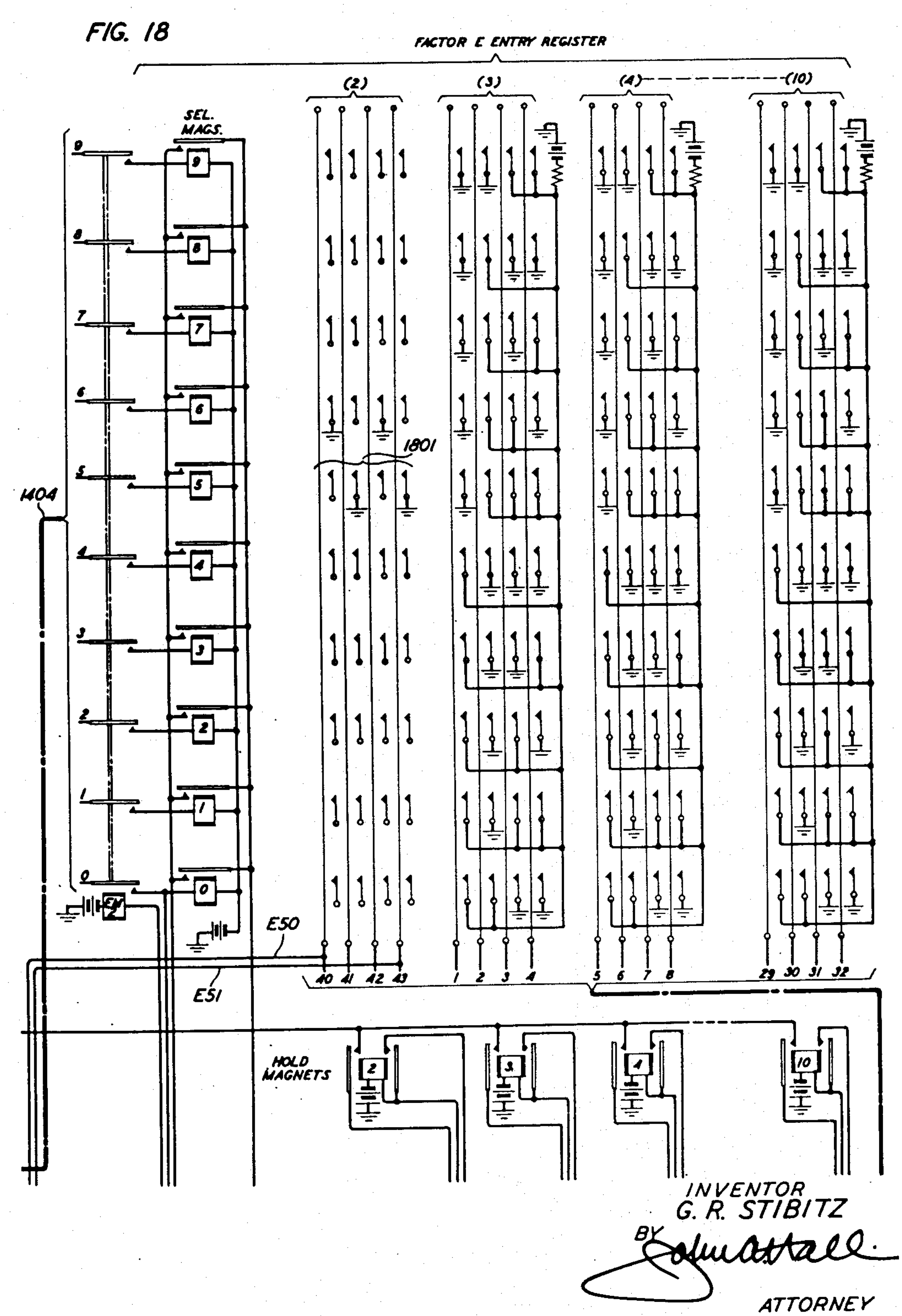

Relay FM1, through its armature 2 closes a circuit for relay FM2 so that the numerical conductor 1 (assuming key M to have been depressed) is now extended to the like numbered select magnet. Fig. 15 shows a cross bar switch and represents what is known as a four-wire ten by ten switch, meaning that the switch has one hundred sets of four pairs of permanently paired contacts arranged in ten horizontal rows and ten vertical rows. Vertical rows 1, 2, 3, 4 and 10 are shown and the remainder are merely indicated. These switches are arranged with a select magnet for each horizontal row which will prepare each set in that row for operation, and a hold magnet for each vertical row which will cause the operation of each set in such vertical row as has been prepared for operation. Any one set is operated by the operation of its select magnet, followed by the operation of its hold magnet. The select magnet is released as soon as the hold magnet has been operated. In the present case then the select magnet 1502 has been operated.

The ground on conductor 1405 is now transferred by the operation of FM2 from conductor 1501 to conductor 1503, whence it may be traced over the back contact and armature 4 of relay F1, front contact and armature 6 of relay FM1, conductor 2003, front contact and armature of select magnet 1502, conductor 1504, winding of relay FT to battery. Relay FT operates and places ground on the progress circuit conductor 2004 which now is extended over armature 2 and back contact of relay F1 (associated with vertical 1 of this F entry register) to the winding of hold magnet 1505. Hold magnet 1505 extends the ground for its own operation over its right-hand armature and front contact to the winding of relay F1 but F1 does not operate at this time because the other terminal of its winding is also connected to ground. When later FT releases, then relay F1 and hold magnet 1505 will be left in series with each other whereupon hold magnet 1505 will remain operated and relay F1 will become operated to advance the circuit to the next vertical.

In the meantime the hold magnet 1505 extends ground from conductor 4406 over its front contact and left-hand armature conductor 1506, back contact and armature 1 of relay F1, front contact and armature 3 of relay FM1, conductor 2005 to key release magnets 1406 and 1407. The keys of Fig. 14 are of conventional design and are arranged to be mechanically locked in a depressed position until released by the magnets 1406 and 1407. If the operator is not still depressing key M, it will release at this time and thereby remove the ground from conductor 1405 as a result of which relay FT is released so that hold magnet 1505 now holds in series with relay F1 which now operates. As select magnet 1502 was released this leaves the contact set 1507 held operated under control of hold magnet 1505

The *a*, *b*, *c* and *d* conductors of this first vertical, numbered 44, 45, 46 and 47 respectively, extend to the contact set in the printing cross bar switch, 0 level, fourth vertical. It will be noted that the *a*, *c* and *d* conductors, conductors 44, 46 and 47 respectively, are grounded and as these are connected to the first, third and fourth contacts respectively in the printing switch and as a ground is permanently applied to the second contact thereat, the times sign (+) is registered in the F factor register and consequently in the printing switch in accordance with the codes for X in Table 6.

Now let us suppose that some other key had been operated instead of the key M, say the number key 1 (since this is arranged to operate the same select magnet as key M). This key, depressed, would have no effect since the common conductor 1408 which is used to ground the number 1 conductor of the group 1404 and the common conductor 1409 is open at the front contact of armature 3 of the progress circuit relay F2. Hence if number key 1 had been depressed initially it would mechanically lock in its depressed position but would not have caused any circuit change. If with number key 1 depressed, key M is now depressed the number key 1 would be mechanically released and the key M would be mechanically locked in its depressed position until released by the operation of magnet 1407 as previously described. In the actual operation of the device the keys do not seem to be mechanically locked down since the registration is so rapid that it is completed and the release magnets 1407 and 1406 are operated almost before the finger can be taken off the key.

In like manner the circuits are arranged so that only the operation of a key of the proper class will become effective and if a key of another class is operated in error the problem will not be mutilated. Errors in operating the wrong key in the proper class cannot be guarded against except by the provision of a general release key. This may be found in the error key E, which when depressed will ground conductor 1410 leading to release relay RR (Fig. 44) whereby the device as a whole is released and returned to normal.

The initial registration of the mathematical sign ×, \, or + having now been made (the — sign for a problem in subtraction comes only from the next registration) the sign of the F factor will now be determined by the depression of either the + or the — key. Let it be assumed that the + key is now operated. A circuit may be traced from ground on conductor 2001, armature 5 and front contact of relay FM1, armature 3 and front contact of progress relay F1, armature 3 and front contact of progress relay F2, conductor 2006, key +, number 3 conductor of group 1404, like numbered armature of relay FM2, select magnet 1509 to battery, thus operating this select magnet. The plus key also extends ground over conductor 1412, back contact and armature 4 of relay F2, front contact and armature 4 of relay F1, front contact and armature 6 of relay FM1, conductor 2003, front contact and armature of select magnet 1509, conductor 1504, the winding of relay FT to battery. Relay FT operates and extends ground over armature 2 and front contact of relay F1, armature 2 and back contact of relay F2, winding of hold magnet 1510 to battery. This results in the operation of cross bar contact set 1511 and as before the inclusion of the progress relay F2 in a circuit which is not at this time effective. Ground on conductor 4406 is now extended over the front contact and left-hand armature of hold magnet 1510, back contact and armature 1 of relay F2, front contact and armature 1 of relay F1, front contact and armature 3 of relay FM1, conductor 2005 to release magnets 1406 and 1407 whereby the + key is released (as soon as the finger is removed). Upon the release of the + key the select magnet 1509 is released leaving the contact set 1511 operated under control of the hold magnet 1510.

Let it be assumed that the number 4 number key is the next to be operated. A circuit is now extended from ground on conductor 2001, through armature 5 and front contact of relay FM1, armature 3 and front contact of relay F1, armature 3 and front contact of relay F2, conductor 1408, contacts of number key 4, conductor 4 of group 1404, armature 4 of relay FM2, select magnet 1512 to battery to cause the operation of this select magnet. The ground on conductor 1408 is also extended through the key contacts to conductor 1409, front contact and armature 4 of relay F2, front contact and armature 4 of relay F1, front contact and armature 6 of relay FM1, conductor 2003, front contact and armature of select magnet 1512, conductor 1504, the winding of relay FT to battery whereby relay FT is operated. Relay FT in operating extends ground to conductor 2004 and thence over armature 2 and front contact of relays F1 and F2 to hold magnet 1513. The operation of hold magnet 1513 causes the operation of contact set 1514, the release of the number key and the operation of relay F3 to advance the pattern of the progress circuit.

In a similar manner and which need not be described in detail the remaining seven digits of the F factor may be registered. Thereafter either the $+i$ or the $-i$ key will be operated. As a first result of this operation a ground will be extended over conductor 1413, front contact and armature 5 of relay F2, back contact and armature 1 of F03, winding of F01 to battery. F01 operates and by opening the locking circuit of FM1 releases both FM1 and FM2. F01 causes the operation of F03 which locks to the main ground on conductor 2001 and opens the original circuit of F01. F01, however, has locked through the back contact and armature 2 of relay F02 to ground on conductor 4406 so that F01 and F03 will remain operated thereafter providing all eight digits have been registered.

Let it be assumed that only seven digits have been registered and that consequently relay F10 has not been operated. Now, upon the operation of relay F01, as described, a circuit will be established from ground on conductor 4406, armature 2 and back contact of relay F02, front contact and armature 3 of relay F01, armature 1 and back contact of F02, armature 1 and back contact of relay FT, back contact and armature 1 of relay F10, front contact and armature 1 of relay F3, armature 4 and front contact of relay F01, the 0 select magnet 1515 to battery whereby the select magnet for the 0 level is operated. This will close a circuit from ground traced to armature 4 of relay F01 over armature 5 and front contact of F01, conductor 2003, front contact and armature of select magnet 1515, conductor 1504, to the winding of relay FT. Relay FT in operating closes a circuit from conductor 2001 to 2004 which extends through the armatures 2 and front contacts of the progress relays to armature 2 and back contact of F10 and thence to hold magnet 1516 whereby contact set 1517 is operated to automatically enter a cipher in the last place in the F factor which was neglected as stated. Upon the operation of the hold magnet 1516 the circuit for operating the key release magnets is closed as usual except now that relay FM1 is released the ground is extended over the front contact and armature 1 of relay F01 to the winding of relay F02. Relay F02 operates and releases F01 and this in turn releases F02.

If this automatic action had taken place at any other than the last point, then when relay F02 released a circuit would be established from ground on conductor 2001, armature 1 and back contact of relay FM1, armature 1 and front contact of F3, armature 1 and back contact of F10, back contact and armature 1 of relay FT, back contact and armature 1 of F02, winding of relay F01 to battery so that the automatic entry of another cipher is accomplished in the same manner.

It may be noted that relay FT is somewhat slow to operate. This is a conventional provision in the operation of a cross bar switch and is made so that the operation of the hold magnet will not be made too soon after the operation of the select magnet for purposes fully described in the Reynolds patents, hereinbefore cited. Relay F02 is made slightly slow to release so that the interaction between relays F01 and F02 will not be too rapid. This again is a conventional arrangement in relay interrupting circuits.

From the above it will appear that when the +*i* or the −*i* key is depressed to characterize as + or − the next (G) factor, the first result is the automatic insertion of ciphers in the digital places of the preceding factor where no digital values were provided by the operator. When this action is complete, a circuit will be established from ground on conductor 2001, armature 5 and back contact of relay E2, conductor 2301, armature 5 and back contact of relay D2, conductor 2201, armature 5 and back contact of relay G2, conductor 2101, front contact and armature 5 of relay F1, back contact and armature 7 of relay FM1, front contact and armature 6 of relay F01, conductor 2007, windings of relay GM1 to battery and GM2 to battery. Relay GM2 connects the conductors of group 1404 to the select magnets of the "G" entry factor switch. Further description of the entry of factors is unnecessary as it would be a mere repetition of the operations already described.

The last act of the operator in writing up a problem is to depress the = key. This places a ground on conductor 1414, which will establish a circuit through the front contact and armature 2 of relay E1 to the winding of relay E01 with results similar to those hereinbefore described. If less than the full eight digits of the last factor E have been entered, then ciphers are automatically filled in. If the eight digits have been recorded then E01 operates and releases EM1 and EM2. The release of EM1 closes a circuit from ground on conductor 2001 through armature 5 and front contact of E2, back contact and armature 5 of EM1, front contact and armature 6 of relay E01, conductor 2302, the left-hand contacts of the = sign key to release magnets 1406 and 1407, to release this key. This key may also be released over conductor 2005 in the conventional manner upon the operation of the last hold magnet of the factor E register. In the case of multiplication and division the = sign will be automatically provided if the full eight digits of the E factor have been registered. If less than the eight digits are registered then it is necessary to depress the = key in order to automatically fill in the ciphers to eight places.

In the case of addition or subtraction the = key is depressed after two factors have been written up. Since in this case the key C has been operated, the C0 relay (Fig. 30) is operated, so that the ground on conductor 1414 is extended over group 2008 through the front contact and armature 8 of relay C0 to conductor 3014 which may be traced back through group 2008 to Fig. 21 where it connects with the front contact of armature 1 of relay GT to operate relay G01. Thus if the full eight places of this factor G have not been filled in the operation of G01 will cause the automatic insertion of ciphers to eight places as before. It will be noted hereinafter and may be traced from the schematic Fig. 10, that the = sign will not be printed in a problem in addition since with relay C0 operated the printing switch progress circuit is conditioned to skip the fourth, fifth and sixth verticals and to begin printing the product directly after the first two factors have been printed.

It is to be noted that in a problem in subtraction the data will be entered in exactly the same way as in addition with the exception that the signs of the two factors of the subtrahend are reversed.

The above description of the entry of the problem into the factor registers may logically be followed by a description of the printing of the registered information even though, as will be pointed out hereinafter, the calculation has begun before this data is completely entered.

*The printing of the problem*

It may be noted that as soon as the first character to be printed has been registered, the printing may start. Thus, as soon as the contact set 1514 for the first digit has been operated and the progress relay F3 has been operated to advance the circuit for the registration of the next numeral, a circuit is closed from relay FP1 over conductor 4901, group 4902 (Fig. 49 to Fig. 20) through armature 5 and front contact of relay F3, conductor 2009, group 4902 (Fig. 20 to Fig. 49), conductor 2009, back contact and armature 3 of relay FP2, back contact and armature 2 of P3, conductor 4903, back contact and armature 2 of relay RL1 to ground. Ground is maintained on this conductor 4903 by relay RL1 until removed for certain purposes to be hereinafter explained. Relay FP1 is operated as a result of this circuit operation. Thereupon the ground on conductor 4903 is extended over the armature 2 and back contact of relay P3, armature and back contact of relay P2, back contact and armature 2 of relay P1, resistance 4904, conductor 4905, armature 2 and front contact of relay FP1, conductor 4906, right-hand armature and back contact of relay PS1, winding of horizontal 1, select magnet 4501 to battery. Select magnet 4501 operates and establishes a circuit from the front contact and armature of magnet 4501 through the right-hand winding of relay PS1, conductor 4510, through the winding of P1 to ground on conductor 4912 derived from conductor 4903. This places the series circuit, of the right-hand winding of relay PS1 and the winding of P1, in parallel with the resistance 4904. The right-hand winding of PS1 is of comparatively low resistance and relay PS1 will not respond at present. However, P1 does operate and in doing so opens the original circuit through resistance 4904 and select magnet 4501. Select magnet 4501 is now placed directly in series with the right-hand winding of PS1 and the winding of P1 so that the select magnet and relay P1 are maintained operated and relay PS1 becomes operated since the shunt about its right-hand winding has been removed. The select magnet 4501 prepares all sets of contacts in the number 1 level for operation.

To help in following the description of the printing of the character + and the "space" signal automatically inserted before this mathematical sign, Fig. 52 is provided. Each interval is one representing graphically the time taken for a relay to operate or to release and is representative only. The main point is that this is a sequence chart depicting the dependent operations. Thus by way of example the select magnet 4501 is shown as operating during the first interval. As a result of this operation and as entirely dependent thereon the relay P1 is shown as operating in the second interval. In this manner the complete action for the transmission of the codes for "space" and +. is pictured. It will be realized that the intervals shown for the operation of the distributor are by way of example and have no particular relation to the intervals marked off for relay operation. It will be realized that while there are several relay actions dependent on the starting of the distributor these will all be completed long before the distributor arm has made a complete revolution and the relays will remain quiet during this revolution and only start their automatic and dependent operations again as the distributor arm reaches the stop segment. For that reason the chart has been shown broken during the operation of the distributor. It should also be noted that while the three printing relays PT2, PT3 and PT4 are all energized during both cycles, relays PT2 and PT4 are ineffective during the time relay SP1 is operated.

The operation of relay P1 opens the ground connection through the resistance 4904 so that with the transfer of conductor 4906 from select magnet 4501 to select magnet 4502 the latter of these will not become operated upon the operation of relay PS1. Relay P1 by its armature 1 now grounds conductor 4907 and thereby causes the immediate operation of hold magnets 4511 and 4512 of the first and second verticals of the printing switch respectively. Hold magnet 4511 is energized over conductor 4908 directly branched off conductor 4907 and hold magnet 4512 is energized over conductor 4909 reached from conductor 4907 through the armature 1 and front contact of relay FP1. The two contact sets controlled by select magnet 4501 and hold magnets 4511 and 4512 are simultaneously operated.

When the hold magnet 4511 and any one of the other hold magnets, in this case 4512, have operated a chain circuit is closed to enable the printing circuit shown in Figs. 44 and 49. This circuit may be generally described as a means to connect the five conductors 4521 to 4525, inclusive to the correspondingly numbered segments of the start-stop distributor which translates the code found on these five conductors into a corresponding time spaced code to which the printer at the distant end of the line, conductor 4405, will respond. The printing circuit consists generally of a set of print relays PT1 to PT10, inclusive which control the orderly sequence of operations starting with the lifting of the distributor clutch to allow the distributor arm 4408 to make one complete revolution and ending with the stopping of the said distributor arm at the end of such revolution. In general the relay PT7 responds to the starting signal consisting of the closure of the chain circuit by the hold magnets, relay PT8 responds to the completion of a full revolution of the distributor arm 4408, and relays PT1 to PT5, inclusive connect the five conductors 4521 to 4525 to segments 1 to 5, respectively of the distributor.

There are two release relays RL1 and RL2 which control certain special functions and insure that the codes for carriage return and line feed are transmitted at the end of the printing of every problem and its solution and whenever the calculator is released by the depression of the E key. The carriage return relay CR and the line feed relay LF cooperate in this release operation to automatically operate the proper PT4 and PT2 relays to send the code — — — + — for carriage return and — + — — — for line feed as set forth in Table 5.

There is also a set of relays SP1, SP2 and SP3 which respond to a ground on conductor 4522 to automatically send a space code signal whenever a mathematical symbol is to be printed, such space code signal always being interpolated in and before the transmission of the code for the mathematical symbol. It will be noted from the Table 5 that all mathematical symbols have a + in the second place and that all of the digits have a — in this place.

Lastly there is a set of relays CA1 to CA6, inclusive which provide for a special operation fully described hereinafter in the addenda. These relays control the transmission of the code for ∓ in certain positions in the solution of a problem and automatically cancel the usually transmitted code for space when the symbol ∓ is used since this symbol ∓ will be printed in what would otherwise be a blank space in the completed record.

With this general description of the functions of the relays in the printing circuit we may now return to the specific operations therein.

When both magnets 4512 and 4511 are operated a circuit is closed from ground armature and contact of magnet 4512, contact and armature of magnet 4511, conductor 4514, armature 1 and back contact of relay IP1, conductor 5001, armature 1 and back contact of relay SP2, conductor 4802, back contacts and armatures 3 and 2 of relays CA3 and CA4 respectively; conductor 4407, winding of relay PT7 to battery, resulting in the operation of relay PT7. When PT7 operates, a circuit is established from ground, armature 3 and back contact of relay PT6, front contact and armature 2 of relay PT7, back contact and armature 2 of relay PT10, back contact and armature 1 of relay RL1, conductor 4803 to the latch magnet CL of the telegraph distributor.

The magnet 1904 of the printer is connected over conductor 4405 to relay PT8 (Fig. 48) only when the distributor brush 4408 is on the "Stop" segment. When, in response to the operation of the latch magnet CL, the brush leaves the stop segment, relay PT8 releases and closes ground from its armature and back contact, over the armature 1 and back contact of PT9, to the winding of relay PT10. Relay PT10 operates and opens the circuit for the latch magnet and at the same time connects the winding of PT9 to the ground used to operate PT10. However, the other side of the winding of PT9 is connected through the normal contacts of armature 2 of relay PT6 and the front contact and armature 1 of relay PT7 to ground so that PT9 does not operate at this time. The latch of the distributor is thus released to stop the movement of the brush 4408 after it has made one complete revolution.

Now the circuit is arranged so that the printer will automatically space before each mathematical symbol and since the number 1 level, number 2 vertical contact set of the printing switch has been operated, advantage is taken of the fact that all such symbols have a mark pulse in the second place (see Table 5). In the present case then, regardless of whether a plus or a minus sign has been registered, this contact set will ground the *b* conductor 4522 which may be traced to armature 2 of relay SP3 (Fig. 48) thence over the back contact thereof to conductor 4801, back contact and armature 3 of relay CA5, winding of relay SP1 to battery. Relay SP1 at its armature 1, opens the ground connection which normally supplies ground to segments 1, 2, 4 and 5 of the distributor through the operation of any one or more of the print relays PT1 to PT5 inclusive, and by its armature 4 insures the operation of relay PT3 so that a single mark signal will be transmitted as the brush 4408 passes over No. 3 segment. By reference to Table 5 it will be seen that the five place code — — + — — is a space signal and will cause the printer to function accordingly.

When the distributor brush 4408 arrives at the "Stop" segment the circuit of relay PT8 is again closed so that this relay now operates to remove the shunt from about the winding of relay PT9. Relay PT9 now operates in series with relay PT10. A circuit is now established from ground armature and front contact of relay PT8, armature 2 and front contact of relay PT9, winding of relay PT6 to battery. Relay PT6 operates and locks to the ground supplied by armature 1 of relay PT7, at the same time opening the holding circuit of relays PT9 and PT10. Relay PT6 now establishes a circuit from ground armature 3 and front contact of PT6, conductor 4804, armature 2 and back contact of relay CA3, armature 2 and front contact of relay SP1, winding of relay SP2, to battery, thus operating SP2 and opening the previously traced circuit for relay PT7. Relays PT7 and PT6 now release and open the original operating circuit of relay SP2 but this relay now locks in series with its own armature 2 and front contact through the winding of relay SP2 to the ground on conductor 4522 supplied through the operation of the number 1 level, number 2 vertical contact set. Upon the operation of relay SP3 the circuit of SP1 is opened and this relay now releases to connect ground through resistance 4409, to conductor 4410 for producing mark signals in the first, second, fourth and fifth places of the telegraph codes. Relay SP1 in releasing also releases relay PT3.

The four wires numbered 40, 41, 42 and 43 connected to the first, fifth, third and fourth contacts of the operated set may be traced back over group 4515 to Fig. 15 where it will be seen that wires 42 and 43 are grounded through the operation of contact set 1511. Therefore conductors 4523 and 4524 will now be grounded (along with conductor 4522) so that relays PT2, PT3 and PT4 will be operated. Referring to Table 5 it will be seen that the code — + + + — will cause the printing of the symbols +. Ground on conductor 5001 may be traced over armature 1 and front contact of relay SP3, conductor 4802, back contact and armature 3 of relay CA3, conductor 4407 to winding of relay PT7. This relay starts the same train of operations previously described, lifting the latch by the latch magnet CL and allowing the brush 4408 to start another revolution during which the code — + + + — just described is transmitted. As the brush 4408 leaves the stop segment, relay PT8 is released and relay PT10 is operated as before. When the brush again reaches the stop segment, PT8 is operated thus allowing relay PT9 to operate to close the circuit for relay PT6 which opens the circuit for the latch magnet and places ground on conductor 4911. This may be traced from ground armature 3 and front contact of relay PT6, conductor 4804, armature 2 and back contact of relay CA3, armature 2 and back contact of relay SP1 to conductor 4911.

In the F entry register progress circuit the relay F3 has closed a circuit for relay P2 (Fig. 49) which may be traced from relay P2, conductor 4910, connected to each of the five vertical conductors of the first vertical of the printing switch, now through the first contact to conductor marked H1-1, group 4513 (to Fig. 20) armature 4 and front contact of relay F3, conductor marked FP2-X, in group 4902 (to Fig. 49), back contact and armature 1 of relay FP2, front contact and armature 4 of relay FP1, conductor 4911 and thence to the ground on armature 3 of relay PT6 whereupon relay P2 operates. Relay P2 operates and by opening the circuit of relay P1 releases P1 and the select magnet 4501. Relay PS1 remains locked to conductor 4912, the circuit being traced from ground, armature 2 and back contact of relay RL1, conductor 4903, back contact and armature 2 of relay P3, conductor 4912, left-hand armature and front contact of relay PS1 to battery. The release of relay P1 releases the hold magnets 4511 and 4512 and the printing switch is now normal except that the associated progress relay PS1 is operated. Ground removed from conductor 4522 now allows relays SP2 and SP3 to restore to normal.

It should be especially noted that whenever a printing switch contact set is operated which will ground the conductor 4522, that the printer will be caused to space before printing the mathematical sign. This may be illustrated by the following problem in which the letter S is inserted at each place where the automatic spacing operation is carried out:

$$S+.40000000S+i.50000000SXS+.20000000S+i.30000000S=S-0.7000000S+i0.22000000$$

This automatic spacing operation is carried out by the spacing relays SP1, SP2, and SP3.

In the description of the printing operation so far two telegraph codes have been transmitted during the interval that the contact sets in the number 1 level and the first and second verticals have been operated and the record now appears as +. This has occurred immediately after the first digit of the F factor has been entered in the F factor entry register and the progress relay F3 has been operated. Let it be assumed by way of example that the operator is entering the problem $$(+4+i5)\times(+2+i3)=$$

and that the M, the + and the four keys have been depressed and that thereafter the operator pauses. The printer has printed +. and will now print 4 after which the operation will be suspended until another digit of factor F is registered.

When ground is removed from conductor 4911 by the release of PT6, relay P2 releases and thereby establishes a circuit from ground armature 2 and back contact of relay RL1, conductor 4903, armature 2 and back contact of relay P3, conductor 4912, armature and back contact of relay P2, back contact and armature 2 of relay P1, resistance 4904, conductor 4905, armature 2 and front contact of relay FP1, conductor 4906, right-hand armature and front contact of relay PS1, right-hand armature and back contact of relay PS2, select magnet 4502 of the number 2 level, to battery thus operating this select magnet. In a manner similar to that heretofore described select magnet 4502 will connect the right-hand winding of progress relay PS2 in circuit with relay P1 so that this relay will operate and cause the operation of hold magnets 4511 and 4512, at the same time releasing the original circuit for the operation of the select magnet 4502 so that upon the following operation of PS2 the next select magnet will not be operated.

Now the conductors marked 1, 2, 3 and 4 are connected to conductors 4521, 4525, 4523 and 4524 respectively. These conductors come by way of group 4515 from the third vertical of the F factor entry switch (Fig. 15) where contact set 1514 is operated. Therefore, conductors 4523, 4524 and 4525 will be grounded and relays PT3, PT4 and PT5 will be operated. Since on the operation of the two hold magnets 4511 and 4512, the conductor 5001 is again grounded, the relay PT7 will be operated and another printing operation will be performed, this time the code − − + + + being transmitted, which according to Table 5 will cause the printing of the numeral 4. So far, then, the printer has recorded +.4, and here in accordance with our assumption the operation will stop.

Let it now be assumed that in time the operator wishing to write up the problem $$(+4+i5)\times(+2+i3)=$$

now operates the $+i$ key. Thereupon the F entry register will proceed as described to automatically enter seven ciphers so that the complete registration in this register will be ×+.40000000.

Now, as soon as the first cipher is entered and as relay F4 operates a circuit will be established from ground on conductor 4804, armature 2 and back contact of relay CA3, armature 2 and back contact of relay SP1, conductor 4911, armature 4 and front contact of relay FP1, armature 1 and back contact of relay FP2, conductor FP2-X in group 4902 to Fig. 20, front contact and armature 3 of progress relay F4, conductor H2-1 of group 4513 to Fig. 45 through the first contact of the set of number 2 level and the first vertical, conductor 4910 to the winding of relay P2. Relay P2, as before, opens the main ground on conductor 4912 to release relay P1 and the select magnet 4502. The release of relay P1 releases hold magnets 4511 and 4512 so that the number 2 level contact sets are released.

In this same manner the other select magnets 4503 to 4509 inclusive are operated successively so that the number 3 level to number 9 level contact sets are operated successively in both the first and second verticals. Each time a pair of these contact sets is operated the printer will be controlled to print the digit registered in the entry register. Assuming that the operator has again paused after operating the $+i$ key, the printer will record +.40000000 and then come to a stop until the operator continues to enter the digital values of the G factor.

When the select magnet 4509 is operated and then relay PS9 operates a circuit at the operation of relay PT6 may be traced from conductor 4911, back contact and armature 6 of relay IP1, conductor 5002, armature 1 and front contact of relay PS9, conductor 4516, back contact and armature 1 of relay P3, winding of relay P4 to battery. Relay P4 operates and causes the operation of relay P3 which in turn opens the circuit of relay P4. Relay P4 is slow to release and therefore holds relay P3 operated for a slight interval to insure that the operations controlled thereby will be properly completed.

Relay P3 in operating connects the ground on conductor 4903 to conductor 4913 and thence over armature 3 and front contact of relay FP1 to the winding of relay FP2. This relay locks to the main ground on conductor 4903 and transfers the progress circuit conductor 4912 from conductor 2009 to the armature 3 of the next relay GP2. When the ground is removed from conductor 2009 relay FP1 will release. When ground is taken from conductor 4912 all the PS relays (Fig. 45) will release so that when relay P4 finally releases relay P3 the circuit for operating P4 will not be found grounded. When P3 releases it again places ground on conductor 4912 so that now as soon as the relay G3 (Fig. 21) in the G factor entry register is operated the relay GP1 will respond.

In this manner after the operator has sequentially depressed the keys $$M \quad + \quad 4 \quad +i \quad 5 \quad + \quad 2 \quad +i \quad 3 \quad =$$

the printer will record the problem as $$+.40000000+i.50000000\times$$
$$+.20000000+i.30000000=$$

If the problem is a simple one and the multiplier digits are not large in value or many in number, the solution of the problem will appear with no perceptible pause and will be printed in the same manner as just described. No further description of the printing switch or its operation is necessary except in the case of special functions which will be described in due order.

*Calculation*

It will first be assumed that a problem in multiplication is to be performed and that key M has been operated and has operated relay MR (Fig. 39). Relay MR locks through its front contact and armature 3, the normal contacts of armature 7 of relay DJ to the master ground conductor 4412. It will also be assumed that the key NC is normal, that is, in the position shown in Fig. 19 whereby the result of a previously performed problem in multiplication will have been retained in the augend relays and will constitute an augend to which the new product will appear as an addend thus producing a new sum.

The process of calculation will start as soon as sufficient information has been registered. In the case of multiplication the first operation, as set out hereinbefore is to multiply the factor F in the real calculator by the factor D and the factor G in the imaginary calculator by the same factor D. Thus the signal to start calculating is given by relay D10 for it is this relay which operates on the registration of the last of the eight digits of factor D. Hence, when relay D10 operates a circuit is established from ground on conductor 4412, armature 2 and front contact of relay MR, conductor 3901, back contact and armature of relay C1, armature 2 and back contact of relay C5, conductor 4001, front contact and armature 4 of relay MR, conductor 1907, normally closed contacts of key NC, conductor 1909, back contact and armature 1 of relay UL2 (Fig. 30), conductor 3001, front contact and armature 5 of relay MR, conductor 3902, armature 2 and back contact of relay DC2 (Fig. 31), conductor DC2 leading through group 2008 to Fig. 20 thence to Fig. 22 where it appears on the front contact of armature 5 of relay D10, over conductor DC1 of group 2008, winding of relay DC1 to battery. Relay DC1 thus becomes operated as a result of the operation of relay D10. Through the operation of relay DC1 a circuit is closed from ground on the release conductor 4412, armature 3 and back contact of relay UL2, conductor 3002, armature 4 and front contact of relay DC1, conductor 3101, armature 2 and back contact of relay CR5, conductor 3903, back contact and armature 3 of relay ADV2, resistance 3003, conductor 3004, armature 2 and front contact of relay DC1, conductor 3103, armature 8 and back contact of relay C0, conductor 3005, left armature and back contact of relay CS2, conductor 2510, winding of select magnets 2502, 2702 and 2902 in parallel to battery. Select magnets 2502, 2702 and 2902 prepare for operation all contact sets in that horizontal row and it will be seen shortly that twenty-three of these sets will be operated, one for the D factor multiplier switch, eleven for the eleven verticals of the real column shift switch and eleven for the eleven verticals of the imaginary column shift switch.

Upon the operation of select magnets 2502, 2702 and 2902, the ground for their operation is extended over the front contact and armature of magnet 2702, conductor 2710, front contact and armature of magnet 2902, conductor 2910 to the winding of relay ADV2, the other side of which is now also connected to ground as described. This circuit is similar to that described hereinbefore with respect to the control circuit of the printing cross bar switch, that is, the resistance 3003 is in shunt with the winding of ADV2 and is of such a value that relay ADV2 derives enough current through the winding of the select magnets to operate. The select magnets will now be held through the armatures and contacts of magnets 2702 and 2902, while the original circuit for their operation is opened at the back contact and armature 3 of relay ADV2. This latter relay now connects the ground on conductor 4412 through the armature 3 and back contact of relay UL2, armature 1 and front contact of relay ADV2, conductor 3006, armature and front contact of select magnet 2502, the winding of relay CS2 to battery. Relay CS2 locks to conductor 3002, which derives ground from conductor 4412 over the armature 3 and back contact of relay UL2. Through the operation of relay ADV2 and the consequent removal of ground from conductor 3005 the ground is not advanced to the next select magnet 2503 when CS2 operates its armatures.

It might be well to note at this point the use of the three select magnets 2502, 2702 and 2902. Since the multiplier digit switch and the two column shift switches require a total of twenty-six verticals it has been found convenient to employ three standard ten by ten cross bar switches and hence it is required to operate three select magnets to prepare a given level for the operation of any or all contact sets therein. Any other equivalent arrangement would be acceptable.

It has been shown hereinbefore that the first to the eighth digits of each factor which are registered on the third to the tenth verticals of each factor register appear in the number 2 to number 9 level switches of each multiplier digit vertical (the number 0 level of these switches Figs. 25 to 29, inclusive, are not shown since they are not employed). The digit verticals of the F and G factor registers are connected through the contacts of relays M and DI to the slipped multiple of the real and the imaginary column shift switches. The connections are clearly indicated in several of the schematics and shown in detail in the detailed drawings now under description. With this arrangement a digit of the multiplier is connected to the counting relays at a time that the digits of the multiplicand are connected to the addend relays in the correct columnar relationship so that the multiplicand may be correctly added to the number held by the augend relays a number of times as determined by the digit of the multiplier. The cross-point sets of contacts of the column shift switches which are not arranged to be connected in any manner to the factor registers are provided with an electrical characterization of zero when the addend relays are set to respond to one condition and of nine (the nine's complement of zero) when the addend relays are set to respond to the alternative condition.

With this arrangement it is necessary to operate the multiplier vertical to register the multiplier digit on the counting relays and to release that vertical before calculation starts so as to permit the counting relays to count off the proper number of additions after which the column shift switches and the multiplier digit switch shift to the next digit of the multiplier by releasing the column shift verticals and repeating the cycle of operations with the next selecting magnet, thus shifting additions from digit to digit of the multiplier and correspondingly, shifting the mulitplicand one columnar space to the right for each successive digit of the multiplier.

When relay ADV2 operates, it connects ground on conductor 4412 through armature 2 and front contact of relay ADV2, conductor 3007, back contact and armature 3 of relay CR6, conductor 3904, armature 1 and front contact of relay DC1, conductor 3102, hold magnet 2511 to battery, thus operating the hold magnet 2511, operating the set of contacts jointly controlled by select magnet 2502 and hold magnet 2511 and connecting the four conductors 2512 (*a*), 2513 (*b*), 2514 (*c*) and 2515 (*d*) leading to the counting relays to the first digit vertical of the factor D entry switch.

At the same time, the ground placed on conductor 3007 by relay ADV2 is extended through armatures 6 and 7 of relay MR to the windings of relays IM and RM, respectively whereby these relays operate. Relay RM grounds conductor 3905 which may be traced directly to the hold magnets for the eleven verticals of the real column shift switch, Figs. 26 and 27. In like manner relay IM grounds conductor 3906 which may be traced directly to the hold magnets of the eleven verticals of the imaginary column shift switch in Figs. 28 and 29. When all of these twenty-two hold magnets have responded a chain circuit is closed from ground through the front contact and armature of hold magnet 2911 at the extreme right, thence in series through the contact and armature of each other such hold magnet in turn to conductor 2601, which is then connected through the front contact and armature of hold magnet 2511 of factor D, multiplier switch to conductor 2516 to relay ADV1 (Fig. 39) to battery whereby this relay ADV1 is operated. Relay ADV1 extends ground from conductor 4412 through the front contact and armature 1 of relay ADV1 to the winding of relay CR6, thereby causing this relay to operate to release the hold magnet 2511. The relay CR6 also establishes a direct connection between conductor 2516 and conductor 2601, by the front contact and armature 1 of relay CR6 whereby relay ADV1 is maintained operated after the multiplier digit switch hold magnet 2511 is released.

The ready circuits are now closed. Ground from conductor 4412 is extended over the front contacts and armatures 5 and 4 of relay ADV1 to conductors 3907 and 3908, respectively. Conductor 3907 may be traced to Fig. 43 where it extends through the back contact and armature 1 of relay HC', the back contact and armature of relay SR'2, conductor 4301 to the winding of relay CR2 and thence to battery. Conductor 3908 may likewise be traced to Fig. 42 where it extends through the back contact and armature 1 of relay HC, the back contact and armature 1 of relay SR2, conductor 4201 to the winding of relay CR1 and thence to battery. Thus, if the summing cycle control relays of the real calculator in Fig. 42 are ready, relay CR1 will respond, and if those of the imaginary calculator in Fig. 43 are ready, relay CR2 will respond. When both relays CR1 and CR2 are operated, then relay CR3 is operated from ground, armature 1 and front contact of relay CR1, armature 1 and front contact of relay CR2, key 3909 (used for maintenance testing) to the winding of relay CR3 and battery.

Relay CR3 now extends the counter conductor from the counting relays to the summing cycle control relays. This circuit may be traced from ground on conductor 4412, front contact and armature 2 of relay CR6, conductor 3910, armature 2 of relay $BS_a$ from which it is extended either by relay $BS_a$ or by relay $BS_b$ to the counter conductor 4002, thence over the back contact and armature 3 of relay DJ, armature 3 and front contact of relay ADV1, to the front contacts of armatures 2 and 3 of relay CR3. Armature 2 of relay CR3 extends the counter conductor over armature 1 and front contact of relay RM, conductor 3911, armature 1 and back contact of relay HB1 (Fig. 42) to the winding of relay SR2 to battery. Armature 3 of relay CR3 extends the counter conductor over armature 1 and front contact of relay IM, conductor 3912, armature 1 and back contact of relay HB'1 (Fig. 43) to the winding of relay SR'2 to battery.

It has been explained hereinbefore in connection with Fig. 7 that the counter conductor is effective whenever the counting relays are set at anything other than zero and that when the counting relays are counted down, this circuit will be opened when zero is reached.

In Figs. 42 and 43 certain conductors are marked augend lock, transfer and sum lock in accordance with the description of the schematics hereinbefore. Under ordinary conditions these three conductors from the real summing cycle relays will be connected to control the counting relays, the equivalent set of three conductors from the imaginary summing cycle relays being connected in controlling circuit only during the calculation of the imaginary factor of a quotient.

Thus, the augend lock conductor 4202, the transfer conductor 4203 and the sum lock conductor 4204, reach to the back contacts of armatures 3, 1 and 2, respectively, of relay CR4 as well as entering Figs. 32 to 37, inclusive, to control the real summing relays. The armature 3 of relay CR4 extends to the back contact and armature 1 of relay CR5 and thence over conductor 3913 to the front contact of the locking armatures of each of the BS relays whereby the BS relays are locked when they are set by the transitory operation of the multiplier digit switch. The armature 1 of relay CR4 extends to conductor 3914 which leads to the armature 1 of each CS relay whereby in the summing cycle the BS relays may be set in accordance with the setting of the CS relays. The armature 2 of relay CR4 leads through the back contact and armature 4 of relay CR5 to conductor 2915 to the locking armatures of each of the CS relays whereby these relays may be locked in while the BS relays are being offered release.

It has been shown hereinbefore how the counting relays are set by having the *a*, *b*, *c* and *d* leads, conductors 2512, 2513, 2514 and 2515, respectively, momentarily connected to the corresponding leads for one digit of the D factor which in multiplication is the first to be used as a multiplier. Now the F and the G factors are transmitted from the F and G entry registers over conductor groups 4515 and 1601, respectively. There are eight digits in each factor and each digit is transmitted by a four place code so that the conductors are conveniently numbered 1 to 32, inclusive. These conductor groups lead to the armatures of relay M in Fig. 24 as well as to the printing switch. Relay M has sixty-four armatures to care for the thirty-two conductors in the F factor and the thirty-two conductors in the G factor and each such armature has a back and a front contact connected in such a pattern that the back contact of each is connected to the front contact of the corresponding armature for the other factor. Thus the back contact of the first armature connected to conductor 1 of factor F (group 4515) is connected to the front contact of the armature connected to conductor 1 of factor G (group 1601). There are thus sixty-four conductors leading from the contacts of relay M to sixty-four back contacts of relay DI. Relay DI also has two groups of armatures from which conductors 1 to 32 lead to the real column shift switch and conductors 1' to 32' lead to the imaginary column shift switch. With relays M and DI both in their normal positions, therefore, factor F will be transmitted to the real column shift switch and factor G will be transmitted to the imaginary column shift switch. When the first calculations (in multiplication) have been made, then relay M will be operated and factor F will be transferred from the real to the imaginary column shift switch and factor G will be transferred from the imaginary to the real column shift switch. It will be shown hereinafter how the operation of relay DI will act to substitute a stored calculation in both the real and imaginary column shift switches for the factors F and G. At present it is to be noted, by way of example, that the first digit of factor F transmitted over conductors 1, 2, 3 and 4 of conductor group 4515 is extended over the first four armatures and their back contacts of relay M, the back contacts and correspondingly numbered armatures of relay DI, conductor group 2401 where the conductors 1, 2, 3 and 4 of this group are connected to the contacts of certain sets in the real column shift switch (Figs. 26 and 27), starting with level 1, vertical 6, and then advancing diagonally through level 2, vertical 7, level 3, vertical 8, and so forth. Thus when select magnet 2502 is operated and later the hold magnets of the column shift switches are operated, this first digit of the factor F will be connected to the conductors marked $A2_a$, $A2_b$, $A2_c$ and $A2_d$ leading over conductor group 2602 to the corresponding addend relays of the number 2 group of summing relays. It may be here noted that there are eleven decimal denominational orders, that the 0 group of summing relays represents the whole number (the single decimal denominational order to the left of the decimal point) and that groups 1 to 10, inclusive, represent the first to the tenth places to the right of the decimal point. Thus where the factor F has been registered as 4 and as described will be printed as .40000000 it will be represented on the summing relays in the first calculation as

| | | | | | | | | | | | |
|---|---|---|---|---|---|---|---|---|---|---|---|
| Group | 0 | 1 | 2 | 3 | 4 | 5 | 6 | 7 | 8 | 9 | 10 |
| Value | 0 | 0 | 4 | 0 | 0 | 0 | 0 | 0 | 0 | 0 | 0 |

whereby by virtue of starting on level number 2, the factor has been shifted one place to the right and now actually appears as

.04000000

It will be noted that the relay DI has an extra group of three armatures for each of the real and imaginary column shift switches marked 01, 02, 03 and 01', 02', 03', respectively. The conductors connected to armatures 01, 02 and 03 lead through conductor group 2402 to that contact set in each level of the real column shift switch to the left of the first digit of the F factor and would therefore represent the whole number of the factor. However, since no whole number can be registered in a factor entry register, this contact set is arranged to always represent 0 when the value transmitted to the real column shift switch comes over the back contacts of the armatures of relays DI. Now as all the contact sets in the second level of the switches in Figs. 26 and 27 are operated, the value transmitted to the addend relays of the verticals 5 and 6 will be representative of zero, that is, (0011) or (− − + +) in each case. The contact set vertical 5 is permanently wired for this code. The conductor $A1_a$ is permanently wired to battery and the conductor $A1_b$ is connected to conductor 01, which is connected through the back contact of armature 01 of relay DI to battery. Conductors $A1_c$ and $A1_d$ are connected over conductors 02 and 03, respectively, to ground over the back contacts of like numbered armatures of relay DI so that the value represented by the addend relays of set 0 and set 1 are both 0011. It will thus appear that the addend relays of the eleven sets of summing relays are not set in the real and imaginary calculators to represent the values 0.04000000 0.05000000 assuming again that the problem $$(4+i5)\times(2+i3)=$$

is to be solved. At the same time it may be assumed that the counting relays have been set to the value 2, that is, the BS relays are operated as follows:

| $BS_a$ | $BS_b$ | $BS_c$ | $BS_d$ |
|---|---|---|---|
| 0 | 1 | 0 | 1 |

Now it will be assumed that the record in the augend relays is zero although it was previously assumed that the NC key was in its normal position so that the results of some previous calculation might have been accumulated and now stood thereon. In the 0 and number 1 set of summing relays the addend relays, the augend relays and the sum relays will be operated as follows:

| | e | a | b | c | d | representing |
|---|---|---|---|---|---|---|
| Augend | | 0 | 0 | 1 | 1 | 0 |
| Addend | | 0 | 0 | 1 | 1 | 0 |
| Sum | 0 | 0 | 1 | 1 | 0 | 0 |

In the number 2 set of summing relays, the various relays will be operated as follows:

| | e | a | b | c | d | representing |
|---|---|---|---|---|---|---|
| Augend | | 0 | 0 | 1 | 1 | 0 |
| Addend | | 0 | 1 | 1 | 1 | 4 |
| Sum | 0 | 1 | 0 | 1 | 0 | 4 |

In the numbers 3 to 10 sets of summing relays the augend, addend and sum relays will be the same as in sets 0 and 1. In the imaginary calculator all sets of summing relays except the number 2 set will be the same as sets 0 and 1 of the real calculator. In the number 2 set (imaginary) the relays will be operated as follows:

| | e | a | b | c | d | representing |
|---|---|---|---|---|---|---|
| Augend | | 0 | 0 | 1 | 1 | 0 |
| Addend | | 1 | 0 | 0 | 0 | 5 |
| Sum | 0 | 1 | 0 | 1 | 1 | 5 |

The complete action of the summing cycle control relays, the summing relays and the counting relays has been described hereinbefore. It is therefore necessary at present only to outline the action which follows. After the two ready circuits have proved to be properly closed and relays CR1 and CR2 are energized, then the circuit through the armatures of these two relays in series is closed to connect the counting circuit to the summing cycle control relays SR2 and SR'2. Except in special cases the real summing cycle control relays control the counting relays and the imaginary summing cycle control relays act independently and only function to transfer the values registered on the sum relays to the augend relays. However, in order to keep the two summing cycle controls in step with each other, the two relays CR1 and CR2 are provided. As each control circuit starts on a cycle of its operation, the circuit for its relay CR1 or CR2 is opened so that another cycle cannot be started until both relays are again operated, the series circuit controlled thereby is reclosed and the counter circuits to the relays SR2 and SR'2 are again simultaneously closed. In this manner, and despite the fact that the two slow-releasing relays may not have exactly the same time characteristics, the real and the imaginary calculators are kept in step with each other.

The counting relays in this instance having been set to two will control the operations of the summing cycle control relays through two complete cycles at the end of which the augend relays in the real and imaginary calculators will be set to represent 0.08000000 0.10000000

When the counting relays reach zero, then the counting conductor 4002 is opened to prevent further operation of the relays SR2 and SR'2. At the same time a circuit is established from ground on conductor 4412, front contact and armature 2 of relay CR6, conductor 3910, armature 2 and back contact of relay $BS_a$, armature 1 and back contact of relay $BS_b$, armature 2 and front contact of relay $BS_c$, armature 1 and front contact of relay $BS_d$, conductor 4003, back contact and armature 2 of relay DJ, winding of relay CR5 to battery. Relay CR5 locks from ground on conductor 4412, front contact and armature 2 of relay ADV1 to the front contact and armature 3 of relay CR5. The operation of relay CR5 opens the circuit heretofore traced from ground to armature 2 and back contact of relay CR5 and thence over conductor 3903 to relay ADV2 whereby this relay ADV2 is now released. Relay CR5 also releases the BS relays so that they represent 13 in the augend-addend code when they are normal. The release of relay ADV2 releases the selecting magnet 2502 and the twenty-two holding magnets for verticals 5 to 26, inclusive, of the column shift switches. Relay ADV1, responsive to the chain circuit through the armatures and contacts of these hold magnets, now releases, and in turn releases relay CR6 and relay CR5.

The control ground on conductor 4412 through the armature 3 and back contact of relay UL2 on conductor 3002, thence through armature 4 and front contact of relay DC1, conductor 3101, is again closed through armature 2 and back contact of relay CR5 to conductor 3903. Relay ADV2 being now released, this ground will be extended through the back contact and armature 3 of relay ADV2, resistance 3003, conductor 3004, armature 2 and front contact of relay DC1, conductor 3103, armature 3 and back contact of relay C0, conductor 3005, armature 1 and front contact of relay CS2, armature 1 and back contact of relay CS3, winding of select magnet 2503 to battery. Thus select magnet 2503 (and its companions) are operated to condition all the contact sets in horizontal 3 for operation.

The operation from here on is the same as has been described. In this case the second digit of the multiplier factor (.20000000) is zero and since the counting relays will not be disturbed after they have been set to zero, there will be no operation of the summing cycle relays; that is, the counter conductor will not be grounded to operate the two slow-release relays and the conductor 4003 will immediately cause the operation of relay CR5 to recycle the control relays to advance to the next digit of the multiplier factor. This same operation will take place for each succeeding digit but as all the remaining digits of the multiplier are ciphers nothing further will be added to the values now held by the augend relays.

0.08000000 0.10000000

When the relay CS9 (for the last digit) of the multiplier factor is operated, the conductor 3005 is extended over armature 1 and front contact of relay CS9 to conductor 2517 so that after the operations controlled by the last digit of the multiplier have been completed and conductor 3005 is again grounded, this ground will be extended over the back contact and armature 2 of relay UL2, the winding of relay UL1 to battery resulting in the operation of the unlocking relay UL1. Relay UL1 energizes relay UL2 and through its slow-releasing characteristics holds relay UL2 energized long enough to be sure that all the relays locked up during the use of factor D as a multiplier will be properly released. During its energization, relay UL2 grounds conductor 3008 which causes the progress circuit relay DC2 to operate. This releases relay DC1, and advances conductor 3902 into association with relay EC1.

When relays UL1 and UL2 are released and then if the factor E has been fully entered so that relay E10 is operated relay EC1 will be operated. The circuit for this may be traced from ground, conductor 4412, armature 2 and front contact of relay MR, conductor 3901, back contact and armature of relay C1, armature 2 and back contact of relay C5, conductor 4001, front contact and armature 4 of relay MR, conductor 1907, normal contacts of key NC, conductor 1909, back contact and armature 1 of relay UL2, conductor 3001, front contact and armature 5 of relay MR, conductor 3902, armature 2 and front contact of relay DC2, armature 2 and back contact of relay EC2, conductor EC2 of group 2008 (to Fig. 23) front contact and armature 5 of relay E10, conductor EC1 of group 2008 (to Fig. 31) winding of relay EC1 to battery. Relay EC1 operates.

The device is now arranged for multiplying the factors F and G by the factor E in a manner similar to that just described except at this time a contact of relay EC1 will operate the M relay to transfer the factor F from the real to the imaginary column shift switch and the factor G from the imaginary to the real column shift switch. This circuit may be traced from ground, conductor 4412, armature 3 and back contact of relay UL2, conductor 3002, armature 6 and front contact of relay EC1, conductor 3104, to relay M and thence to battery. Relay M operates and transposes the appearance of the factors F and G in the real and imaginary column shift switches.

At this point it should be noted that the operation of the sign relays should be considered for after this transposition by relay M we approach that part of the problem where the algebraic transformation of the formula brings in a minus sign and requires the calculation of $$-GE \text{ and } +FE$$

We will therefore pause in the circuit description and insert at this point some consideration of the sign relays.

*The sign relays*

There are seven conductors leading from the sign verticals of the factor entry registers which are designated F50, G50, G51, D50, D51, E50 and E51, respectively. A casual examination will show that whenever a plus sign is entered the corresponding conductor 51 is grounded and whenever a minus sign is entered the corresponding conductor 50 is grounded. Practical considerations have eliminated the need for the eighth of these conductors, the one which on the basis of symmetry would be designated F51 and which would be grounded when the factor F was entered as a positive quantity.

The purpose of the relays SA1 to SA5 (Fig. 41) is to control the operation of the sign relays SN1 and SN'1, so that the number on the added relays will be added or subtracted as determined by the sign of that number. When the SN1 relay is normal the sign of the number is plus (+) and battery through a suitable resistance is connected to the addend relays which operate in accordance with the number as entered and thus the number will be added to the number represented by the augend relays. When the SN1 relay is operated the sign of the number is minus (−) and ground is connected to the addend relays which will then operate in accordance with the inverse of the number as entered. As previously described, this is not the true complement of the number but by reversing the carry the true complement is obtained. The carry is reversed by SN1 and SN'1. Thus subtraction will occur when the sign is minus as indicated by the operation of the SN relays and is accomplished in the summing relays by adding the complement of the number.

When the signs of F, G, D and E as entered are all plus (+), the answer becomes

For multiplication $(FD-GE)+i(GD+FE)$ and for division $\left(\frac{FD+GE}{F^2+G^2}\right)+i\left(\frac{-GD+FE}{F^2+G^2}\right)$ As previously stated the multiplying operation is the same for division as for multiplication due regard being given to the signs. This difference in signs is controlled by relay GC2. It will be remembered from the description of the schematic, Fig. 8, that in a problem in multiplication the progress circuit for the multiplier digit switches is entered at the relay DC2 and that therefore the relay GC2 is not operated. In division, on the other hand, the progress circuit for the multiplier digit switches is entered at the relay FC2 and therefore after the sum of the squares of F and G has been calculated and registered and the same multiplications as are performed in multiplication alone are to be performed, the relay GC2 will be found operated. Thus with all signs entered as plus, relay GC2 will control the sign relays during the multiplication stage to produce For multiplication $(FD-GE)+i(GD+FE)$ and for division $(FD+GE)+i(-GD+FE)$ When D is the multiplier, relay DC1 will be operated and conductor 3105 will be grounded to operate relay SA3 to connect conductors D50 and D51, one of which is grounded in the D factor entry register, to the SN relays as may be determined by signs of F and G. If F is minus SA1 is operated over conductor F50 and relay SN1 operates when D is plus by ground over conductor D51. If F is plus, SA1 will not operate and SN1 operates only when D is minus and ground is accordingly connected to conductor D50.

The sign of GD is dependent on the type of problem and ground over either conductor G50 or G51 controls relay SA2 over conductor 3109 in accordance with the position of armature 3 of relay GC2. For multiplication, GC2 is not operated and therefore relay SA2 operates from ground on conductor G50 only when G is minus and SN'1 of the imaginary calculator operates when ground is at this time connected to conductor D51 indicating a plus D. When relay SA2 is normal, indicating a plus G, then SN'1 operates from ground on conductor D50 indicating a minus D. If G and D are both plus SN'1 will not be operated. If the problem is one of division, relay GC2 is operated, the signs are reversed and SN'1 operates only when ground is connected to conductor G51 or D50 indicating a plus G and plus D or a minus G and a minus D.

Similarly the sign or GE is dependent on the type of problem and either conductor G50 or G51 is connected to relay SA2 over conductor 3109 as determined by the operation or non-operation of relay GC2.

The following tables show the operations of the various sign relays. In these tables the plus (+) and minus (−) symbols indicate the signs in those columns under "Signs" while under the heading "Relays" the plus (+) indicates an operated relay and minus (−) indicates a non-operated relay. The numbers under the heading "Conductors" indicate those which are connected to ground in the factor entry registers.

TABLE 7

[Multiplication—relay GC2 normal—conductor G50 effective.]

| Combination | Multiplier Digit | Sign | | | | Ground on Conductor | | | | SA1 | SA2 | SA3 | SA4 | SN1 | SN'1 |
|---|---|---|---|---|---|---|---|---|---|---|---|---|---|---|---|
| | | F | G | D | E | F | G | D | E | | | | | | |
| 1 | D | + | + | + | + | ---- | 51 | 51 | 51 | − | − | + | − | − | − |
| 2 | D | − | + | + | + | 50 | 51 | 51 | 51 | − | + | − | + | − | + |
| 3 | D | + | − | + | + | ---- | 50 | 51 | 51 | − | + | + | − | − | + |
| 4 | D | + | + | − | + | ---- | 51 | 50 | 51 | − | − | + | − | + | + |
| 5 | D | + | + | + | − | ---- | 51 | 51 | 50 | − | − | + | − | − | − |
| 6 | D | − | − | + | + | 50 | 50 | 51 | 51 | + | + | + | − | + | + |
| 7 | D | + | − | − | + | ---- | 50 | 50 | 51 | − | + | + | − | + | − |
| 8 | D | + | + | − | − | ---- | 51 | 50 | 50 | − | − | + | − | + | + |
| 9 | D | − | + | − | + | 50 | 51 | 50 | 51 | + | − | + | − | − | + |
| 10 | D | + | − | + | − | ---- | 50 | 51 | 50 | − | + | + | − | − | + |
| 11 | D | − | + | + | − | 50 | 51 | 51 | 50 | + | − | + | − | + | − |
| 12 | D | − | − | − | + | 50 | 50 | 50 | 51 | + | + | + | − | − | − |
| 13 | D | − | − | + | − | 50 | 50 | 51 | 50 | + | + | + | − | + | + |
| 14 | D | − | + | − | − | 50 | 51 | 50 | 50 | + | − | + | − | − | + |
| 15 | D | + | − | − | − | ---- | 50 | 50 | 50 | − | + | + | − | + | − |
| 16 | D | − | − | − | − | 50 | 50 | 50 | 50 | + | + | + | − | − | − |
| 17 | E | + | + | + | + | ---- | 51 | 51 | 51 | − | − | − | + | + | − |
| 18 | E | − | + | + | + | 50 | 51 | 51 | 51 | + | − | − | + | + | + |
| 19 | E | + | − | + | + | ---- | 50 | 51 | 51 | − | + | − | + | − | − |
| 20 | E | + | + | − | + | ---- | 51 | 50 | 51 | − | − | − | + | + | − |
| 21 | E | + | + | + | − | ---- | 51 | 51 | 50 | − | − | − | + | − | + |
| 22 | E | − | − | + | + | 50 | 50 | 51 | 51 | + | + | − | + | − | + |
| 23 | E | + | − | − | + | ---- | 50 | 50 | 51 | − | + | − | + | − | − |
| 24 | E | + | + | − | − | ---- | 51 | 50 | 50 | − | − | − | + | − | + |
| 25 | E | − | + | − | + | 50 | 51 | 50 | 51 | + | − | − | + | + | + |
| 26 | E | + | − | + | − | ---- | 50 | 51 | 50 | − | + | − | + | + | + |
| 27 | E | − | + | + | − | 50 | 51 | 51 | 50 | + | − | − | + | − | − |
| 28 | E | − | − | − | + | 50 | 50 | 50 | 51 | + | + | − | + | − | + |
| 29 | E | − | − | + | − | 50 | 50 | 51 | 50 | + | + | − | + | + | − |
| 30 | E | − | + | − | − | 50 | 51 | 50 | 50 | + | − | − | + | − | − |
| 31 | E | + | − | − | − | ---- | 50 | 50 | 50 | − | + | − | + | + | + |
| 32 | E | − | − | − | − | 50 | 50 | 50 | 50 | + | + | − | + | + | − |

TABLE 8

[Division—relay GC2 operated—conductor G51 effective.]

| Combination | Multiplier Digit | Sign | | | | Ground on Conductor | | | | SA1 | SA2 | SA3 | SA4 | SN1 | SN'1 |
|---|---|---|---|---|---|---|---|---|---|---|---|---|---|---|---|
| | | F | G | D | E | F | G | D | E | | | | | | |
| 1 | D | + | + | + | + | ... | 51 | 51 | 51 | − | + | + | − | − | + |
| 2 | D | − | + | + | + | 50 | 51 | 51 | 51 | + | + | + | − | + | + |
| 3 | D | + | − | + | + | ---- | 50 | 51 | 51 | − | − | + | − | − | − |
| 4 | D | + | + | − | + | ---- | 51 | 50 | 51 | − | + | + | − | + | − |
| 5 | D | + | + | + | − | ---- | 51 | 51 | 50 | − | + | + | − | − | + |
| 6 | D | − | − | + | + | 50 | 50 | 51 | 51 | + | − | + | − | + | − |
| 7 | D | + | − | − | + | ---- | 50 | 50 | 51 | − | − | + | − | + | + |
| 8 | D | + | + | − | − | ---- | 51 | 50 | 50 | − | + | + | − | + | − |
| 9 | D | − | + | − | + | 50 | 51 | 50 | 51 | + | + | + | − | − | − |
| 10 | D | + | − | + | − | ---- | 50 | 51 | 50 | − | − | + | − | − | − |
| 11 | D | − | + | + | − | 50 | 51 | 51 | 50 | + | + | + | − | + | + |
| 12 | D | − | − | − | + | 50 | 50 | 50 | 51 | + | − | + | − | − | + |
| 13 | D | − | − | + | − | 50 | 50 | 51 | 50 | + | − | + | − | + | − |
| 14 | D | − | + | − | − | 50 | 51 | 50 | 50 | + | + | + | − | − | − |
| 15 | D | + | − | − | − | ---- | 50 | 50 | 50 | − | − | + | − | + | + |
| 16 | D | − | − | − | − | 50 | 50 | 50 | 50 | + | − | + | − | − | + |
| 17 | E | + | + | + | + | ---- | 51 | 51 | 51 | − | + | − | + | − | − |
| 18 | E | − | + | + | + | 50 | 51 | 51 | 51 | + | + | − | + | − | + |
| 19 | E | + | − | + | + | ---- | 50 | 51 | 51 | − | − | − | + | + | − |
| 20 | E | + | + | − | + | ---- | 51 | 50 | 51 | − | + | − | + | − | − |
| 21 | E | + | + | + | − | ---- | 51 | 51 | 50 | − | + | − | + | + | + |
| 22 | E | − | − | + | + | 50 | 50 | 51 | 51 | + | − | − | + | + | + |
| 23 | E | + | − | − | + | ---- | 50 | 50 | 51 | − | − | − | + | + | − |
| 24 | E | + | + | − | − | ---- | 51 | 50 | 50 | − | + | − | + | + | + |
| 25 | E | − | + | − | + | 50 | 51 | 50 | 51 | + | + | − | + | − | + |
| 26 | E | + | − | + | − | ---- | 50 | 51 | 50 | − | − | − | + | − | + |
| 27 | E | − | + | + | − | 50 | 51 | 51 | 50 | + | + | − | + | + | − |
| 28 | E | − | − | − | + | 50 | 50 | 50 | 51 | + | − | − | + | + | + |
| 29 | E | − | − | + | − | 50 | 50 | 51 | 50 | + | − | − | + | − | − |
| 30 | E | − | + | − | − | 50 | 51 | 50 | 50 | + | + | − | + | + | − |
| 31 | E | + | − | − | − | ---- | 50 | 50 | 50 | − | − | − | + | − | + |
| 32 | E | − | − | − | − | 50 | 50 | 50 | 50 | + | − | − | + | − | − |

Relay SA5 is operated by the augend relays during the solution of a problem in division. If when division is to take place, the sign of the sum in either the real or the imaginary augend relays as left there by the multiplication is minus, there will be a ground on the complement lead 3204 or 3804 rather than the true number lead 3203 or 3803. If it is plus there will be ground on these latter conductors 3203 or 3803 and hence with SA5 operated, the sign relays will be operated. With a plus sum in the augend relays, the complement of the number must added. Ground on conductor 3203 or 3803 indicating such positive sign, will operate the sign relays and put the complement of the number registered in the $F^2+G^2$ register on the addend relays. On the other hand, if the sign of the sum left in the augend relays is minus, the sign relays SN1 and SN'1 will not be operated, thus satisfying the prescribed conditions. With this dissertation on the sign relays, then, we may return to the problem in multiplication.

*The second stage in multiplication*

In the first stage in our problem in multiplication where the factor D was used as a multiplier, it will be noted in combination 1 in Table 7 that the signs of all four factors having been registered as plus, that relay SA3 will be operated but that neither of the sign relays SN1 or SN'1 will have been operated. This is in accordance with the description so far. The stage has now been reached where the M relay has operated to transpose the appearance of the F and G factors in the column shift switches, the factor G appearing in the real column shift switch and the factor F in the imaginary column shift switch. The factor E is now to be used as a multiplier, so in accordance with combination 17 in Table 7, it will be noted that relay SA4 is operated over a circuit which may be traced from battery, winding of relay SA4, conductor 3106, front contact and armature 5 of relay EC1, conductor 3002, back contact and armature 3 of relay UL2 to the ground on conductor 4412. As a consequence thereof the sign relay SN1 is operated and relay SN'1 is left unoperated. It will therefore appear that conductor 4205 is switched from battery to ground so that the addend relays of the real calculator will now respond to battery rather than ground (the complement rather than the digit registered). Since under our assumption factor G (.50000000) has now been switched to the real calculator and factor F (.40000000) has been switched to the imaginary calculator, the response of the addend relays will now be 9.94999999 0.04000000

The summing cycle relays and the counting relays will operate as before and since factor E is .30000000, there will be three cycles completed after which the values standing on the augend relays will be 9.92999999 0.22000000

These values will be transmitted to the printing switch and printed as $$-0.07000000+i0.22000000$$

Several things occurring in this operation which have all been noted hereinbefore may now be restated for emphasis. Firstly, it will be remembered that the value standing on the augend relays of the real calculator at the end of the first operation was 0.08000000 so that now with sign relay SN1 operated, the addend relays will represent

−0.05000000 as 9.94999999 and the summing operation will be $$\begin{array}{r} 0.08000000 \\ 9.94999999 \\ \hline 10.02999999 \end{array}$$

Now since relay SN1 is operated, a circuit may be traced from ground, normal contacts of the armature of relay HB2, augend lock conductor 4202, armature 2 and front contact of sign relay SN1, back contact and armature 1 of sign relay SN3 to the carry 1 conductor 4206 which enters the chain of summing relays at relay A10d (Fig. 37). In the description above the sum has been stated as 10.02999999 eight places to the right of the decimal point being shown. There are in fact in the calculator, ten places to the right of the decimal point so that the record would be 0.0299999999 theoretically. This is stated in this manner to explain the theory of the operation. Actually, the ground on the carry 1 lead 4206 will, during the summing operation, affect the result so that the value transferred to the augend relays will be 0.03000000. Thus the mathematically conceived fugitive one is captured and returned.

On the second summing cycle, the addition is made as follows:

0.03000000
9.94999999
9.97999999

In this case the sign relay SN1 is operated as before but it will now be found that the other sign relay SN3 is also operated thus transferring the ground from the front contact of armature 2 of relay SN1 through the front contact of armature 2 of relay SN3 back to the carry 0 conductor 4207. The reason for the operation of relay SN3 in this case may be found in the fact that the whole numbers of the augend and of the sum are different, namely 0 and 9. Therefore (see Fig. 32); relay B0a will be released and relay C0a will be operated and a connection may be traced from ground, armature 7 and back contact of relay B0a, front contact and armature 1 of relay C0a, to the winding of relay SN3 and thence to battery. The various circuits controlled by the two relays SN1 and SN3 (and in like manner SN'1 and SN'3) have been explained hereinbefore in connection with Fig. 11 under the headings "Determination of signs" and "The problem."

During the third count of this operation, the fugitive one again appears since the addition appears to be 9.97999999
9.94999999
19.92999998

This time the sign relay SN3 is released, the reason being that the whole number of the augend as well as the sum is 9 and hence both relays B0a and C0a are operated thus failing to ground conductor 3201. Hence the carry 1 path, conductor 4206, is grounded and a one is added to the extreme right-hand order thus finally producing the registration in the augend relays of 9.92999999

*Printing of solution*

After the last digit of factor E has been used as a multiplier and relay EC2 (Fig. 31) has been operated (in the same manner as relay DC2) then a circuit is established from ground on conductor 4412, armature 2 and front contact of relay MR, conductor 3901, back contact and armature of relay C1, armature 2 and back contact of relay C5, conductor 4001, front contact and armature 4 of relay MR, conductor 1907, normal contacts of key NC, conductor 1909, back contact and armature 1 of relay UL2, conductor 3001, front contact and armature 5 of relay MR, conductor 3902, armature 2 and front contact of relay DC2, armature 2 and front contact of relay EC2, conductor 3107, armature 2 and back contact of relay C4, conductor 4004 in conductor group 4005 to (Fig. 50) the winding of relay P5 and thence to battery thus causing the operation of relay P5. Relay P5 extends the progress circuit of the printing switch from the front contact of armature 3 of relay EP2, through the armature and front contact of relay P5, the armature 3 and back contact of relay B2 to the winding of relay B1 so that relay B1 is now operated to cause the various contact sets of the seventh vertical to be operated and a printed record made of the values found thereon in code. It may be noted that prior to the operation of relay P5, the ground on its armature and back contact had been extended to the armature 3 and back contact of relay IP2 and thence to conductor 5004, but that the closure of this latter conductor to the winding of relay IP1 depended on relay DJ (Fig. 39) which up to this point in the description has not become energized.

Since the numerical values represented by the augend relays of the real calculator are now 9.92999999, it will be found that the B0a relay (Fig. 32) is operated and in consequence by the movement of its armature 6, the complement conductor 3203 will be grounded. This may be traced to relay RBN (Fig. 42) which now becomes operated. Relay RBN controls four conductors which pass as a group 4208 to the horizontal 0 set of contacts of the seventh vertical of the printing switch. Thus with RBN normal, it will be seen that conductors 4521, 4522 and 4524 will be grounded to cause "+" to be printed but with RBN operated, then conductors 4522, 4523 and 4525 will be grounded to cause "—" to be printed. Since armature 6 of relay B0a transfers ground from the true number lead 3204 to the complement lead 3203, it will be seen that wherever one of the B relays is not operated, it will transmit a ground to the printing switch. Thus in the 0 set relays B0a and B0b will be operated (to represent 9) and hence relays B0c and B0d will transmit grounds over their conductors B0c and B0d (to represent 0). Thus the printing switch will print the complement of the number stored in the augend relays and hence the printed record will appear as

—0.07000000+10.22000000

In the normal course of events, after the last digit of the product above is printed, relay B6 (Fig. 51) will become operated and ground on armature 3 of relay B6 will be extended to conductor 5101. This may be traced to the winding of the master release relay RR (Fig. 44) and thence to ground. Relay RR operates and by opening the various master ground leads will release all locked-up relays and substantially return the device to normal. The word substantially is used because there are exceptions to this general statement. The ground which is connected by the normal contacts of relay HB2 to the augend lock conductor 4202 is not affected by the operation of the release relay RR and hence the values registered in the augend relays are retained.

Relay RR through its armature 8 and front contact grounds conductor 4413 which may be traced through aramture 1 and back contact of relay LF, back contact and armature 1 of relay CR, conductor 4524 to operate relay PT4. A circuit will also be established from ground, armature 1 and back contact of relay PT7, conductor 4805, armature 9 and front contact of release relay RR, conductor 4414 to the winding of relay RL2 and thence to battery resulting in the operation of relay RL2. Relay RL2 locks to ground on armature 2 of relay RL1. Relay RL2 then closes a circuit from ground, armature 3 of relay PT6, armature 1 and front contact of relay RL2, winding of relay PT7 to battery. Relay PT7 starts the printing operation as described hereinbefore. Due to the operation of PT4, the code sent will be (— — — + —) which will cause the printer to function to return the carriage.

When relay PT6 places ground on conductor 4804, this will be extended through armature 4 and front contact of relay RL2, armature 3 and back contact of relay LF, winding of relay CR to battery. Relay CR operates and completes a circuit for relay LF which does not, however, become effective until ground is again shortly removed from conductor 4804. At this time relay LF locks in series with relay CR and shortly thereafter relay PT6 in releasing again starts the cycle of operations by operating relay PT7. This time the ground on conductor 4413 is extended over armature 1 and front contact of relay LF, conductor 4806, back contact and armature 2 of relay CA6 to relay PT2 whereby the next coded signal sent is (— + — — —) for line feed. After this signal has been sent and relay PT6 momentarily operates, the ground placed on conductor 4804 is extended over armature 4 and front contact of relay RL2, armature 3 and front contact of relay LF, winding of relay RL1 to battery. Relay RL1 locks to conductor 4804 and releases relay RL2 which, in turn, releases relay CR and relay LF. The operation of relay RL1 removes ground from conductor 4903 to which the release relay RR is locked, so that this master relay releases. When relay PT6 finally releases, relay RL1 is released and at this point the device is wholly released and returned to normal.

If the automatic wipe-out key NC is in its alternate position, where conductor 1907 would be connected to conductor 1908 instead of to conductor 1909, then the relays SR1 and SR'1 would be operated to set the augend relays to zero. Thus immediately that the key M is operated and the relay MR responds, a circuit may be traced from ground on conductor 4412, armature 2 and front contact of relay MR, conductor 3901, back contact and armature of relay C1, armature 2 and back contact of relay C5, conductor 4001, front contact and armature 4 of relay MR, conductor 1907, alternate contacts of key NC, conductor 1908 and thence in parallel to the windings of relay SR1 in the real summing cycle control circuit (Fig. 42) and relay SR'1 in the imaginary summing cycle control circuit (Fig. 43). Since the action of these two circuits is alike only one will be described in detail. Relay SR1 responds in the circuit just traced and at its armature 1 opens the circuit of relay HC so that this relay cannot operate as long as SR1 is operated. At its armature 2, relay SR1 closes a circuit for the operation of relay HB3 which in turn opens the transfer conductor 4203 so that now neither the transfer conductor nor the sum lock conductor may be grounded. At its armature 3 and front contact, relay SR1 closes a circuit through the back contact and armature 1 of relay BW1, armature 1 and back contact of relay HB1, winding of relay SR2 to battery whereby relay SR2 becomes operated. The operation of relay SR2 now can only open the augend lock conductor in its hereinbefore described cycle so that since the transfer conductor is open, this would result in the release of all the augend relays. However, relay SR2 grounds conductor 4209 and relay HB1 responds to this in the usual manner, this time closing a circuit from ground armature 2 and front contact of relay HB1, front contact and armature 4 of relay SR1, winding of relay BW1, which operates and locks to ground on conductor 4210 supplied by armature 2 of relay SR1. Relay BW1, through its armature 3, operates relay BW2. Relay BW2 grounds a conductor leading to each of the $B_c$ and $B_d$ relays so that the augend relays are now set to zero, that is the $B_a$ and $B_b$ relays will be released and the $B_c$ and $B_d$ relays will be operated. This may be seen by tracing ground through armatures 1 and 2 of relay BW2 to conductors *boc* and *bod* leading through conductor group 4211 to the lower windings of augend relay $B0_c$ and $B0_d$, respectively (Fig. 33). In this manner every set of augend relays is reset to represent zero —0011.

The operation of relay HB1 opens the circuit of relay SR2 so that in a short interval ground will be removed from conductor 4209 and relay HB1 will be released and in turn relay HB2 will release to again close through the augend lock conductor before relay BW2 is released. Relay BW1 remains locked under control of relay SR1 so that in time a circuit will be closed from ground, armature 2 and back contact of relay HB1, armature 3 and back contact of relay HB'1, front contact and armature 4 of relay BW'1, front contact and armature 4 of relay BW1, conductor 4212 to the winding of relay C5. Thus relay C5 responds when both the real and imaginary calculators have had their accumulators reset to zero. Relay C5, in operating, opens the original circuit for relays SR1 and SR'1 so that the summing cycle control circuits are now returned to normal. Relay C5 through its armature 1 grounds conductor 1909 directly in place of the ground connection heretofore traced from conductor 4001, front contact and armature 4 of relay MR, conductor 1907 and thence through the normal contacts of key NC. Therefore with ground placed on conductor 1909 by relay C5, it is evident that further operation of the device will be exactly as hereinbefore described.

With key NC left in its alternate position, then each time the key M is depressed to enter a new problem in multiplication, the augend relays will be automatically reset to zero.

*Division*

When a problem in division is to be performed, the key D is first depressed and then the factors of the divisor are entered first. It has been explained hereinbefore that the factor entry registers are arranged in the order F, G, D and E particularly to take care of the operations of the device when a problem of division is entered, because the first operation becomes the calculation of the sum of the squares of the factors of the divisor. Hence the problem $$\frac{(D+iE)}{(F+iG)}=\frac{(FD+GE)}{F^2+G^2}+i\frac{(-GD+FE)}{F^2+G^2}$$

is entered in the device by writing up the factors in the order F, G, D and E.

The operation of key D results in the operation of relay DR and this relay locks through its armature 4 and front contact, through the back contact and armature 3 of relay MR, the normal contacts of armature 7 of relay DJ to the ground on conductor 4412. With the operation of relay DR, a circuit is established from ground on conductor 4412, armature 3 and front contact of relay DR, conductor 3901, back contact and armature of relay C1, armature 2 and back contact of relay C5, conductor 4001, armature 5 and front contact of relay DR, conductor 1908 to relays SR1 and SR'1, resulting as described above in automatically resetting the augend relays to a representation of zero. Relay C5 will thus be left operated and conductor 1909 will be grounded so in the case of a problem in division, it makes no difference in which position the key NC is placed.

With relay C5 operated, a circuit may be traced from ground, armature 1 and front contact of relay C5, conductor 1909, back contact and armature 1 of relay UL2, conductor 3001, armature 6 and front contact of relay DR, conductor 3916, armature 2 and back contact of relay C3, conductor 4006, armature 2 and back contact of relay FC2, conductor FC2 of conductor group 2008, front contact and armature 5 of relay F10 (as soon as the last digit of factor F has been registered) conductor FC1 of conductor group 2008, winding of relay FC1 to battery. The operation of relay FC1 causes factor F to be multiplied by itself in exactly the same manner as has been previously described for multiplying F and G by D. At this time the relay RM is operated because this multiplication requires only the real calculator, there being no path closed for relay IM by relay DR. Thus although the select magnets of the multiplier digit switch and the column shift switches are operated, only the hold magnets of the real column shift switches will be operated during the calculation of $F^2$.

When the calculation of F times F is completed, relays UL2 and FC2 operate, FC1 releases and GC1 operates in a similar manner to that previously described. The progress circuit for the multiplier digit switches now causes the multiplication of factor G by itself, the result being added to the previous calculation so that at the end of this operation the value of $F^2+G^2$ will have been accumulated and registered in the augend relays.

In order to render the operations in a problem in division clear, let us assume that the following problem is entered in the device $$(4+i5)\backslash(-7+i22)=$$

The factors registered will then be $$F=+.40000000$$
$$G=+.50000000$$
$$D=-.07000000$$
$$E=+.22000000$$

The calculation performed in the real calculator in calculating $F^2+G^2$ is as follows:

0.00000000 Augend
0.04000000 Addend
0.04000000 Sum—translated to

Count 1—0.04000000 Augend
0.04000000 Addend
0.08000000 Sum—translated to

Count 2—0.08000000 Augend
0.04000000 Addend
0.12000000 Sum—translated to

Count 3—0.12000000 Augend
0.04000000 Addend
0.16000000 Sum—translated to

Count 4—0.16000000 Augend
0.05000000 Addend
0.21000000 Sum—translated to

Count 1—0.21000000 Augend
0.05000000 Addend
0.26000000 Sum—translated to

Count 2—0.26000000 Augend
0.05000000 Addend
0.31000000 Sum—translated to

Count 3—0.31000000 Augend
0.05000000 Addend
0.36000000 Sum—translated to

Count 4—0.36000000 Augend
0.05000000 Addend
0.41000000 Sum—translated to

Count 5—0.41000000 Augend

This value then is the sum of the squares of the F and G factors and this is now transferred to the $F^2+G^2$ register where it is held until needed later on in the calculation. The completion of the calculation of $F^2+G^2$ is followed in a manner similar to that heretofore described by the operation of relay GC2.

The operation of this relay in the multiplier digit switch progress circuit closes a circuit from ground, armature 1 and front contact of relay C5, conductor 1909, back contact and armature 1 of relay UL2 (now released, conductor 3001, armature 6 and front contact of relay DR, conductor 3916, armature 2 and back contact of relay C3, conductor 4006, armature 2 and front contact of relay FC2, armature 2 and front contact of relay GC2, conductor 3108, armature 7 and back contact of relay C0, conductor 3009, armature 2 and back contact of relay IR1, winding of relay IR2 to battery resulting in the operation of IR2. Without tracing the circuits which are believed to be obvious, relay IR2 operates relay IR3; relay IR3 operates relay IL, through the contacts of IR2; relay IL operates IR1 which now releases IR2 and IR1 locks to the ground extended over conductor 3009. In a short interval determined by its slow-releasing characteristics, relay IR2 will release, and will cause the release of relay IL. When relay IR2 releases, the circuit for IR3 will be opened but this relay being also slow to release will hold its armatures operated for a short interval. During this interval, a circuit will be established from ground, armature 2 and back contact of relay IR2, front contact and armature 2 of relay IR3, back contact and armature 2 of relay IL, winding of relay SI to battery whereby relay SI becomes operated. Relay SI (in actual practice a plurality of relays connected in parallel) now connects the augend relays to the I relays of the $F^2+G^2$ register. By way of example, the augend relays of the 0 set (whole number) in Figs. 32 and 33 are set at this time to represent 0, whereby relays $B0_a$ and $B0_b$ will not be operated and relays $B0_c$ and $B0_d$ will be operated. Relay $B0_a$ through its armature 6 will therefore ground the true number conductor 3204 whereby relays $B0_c$ and $B0_d$ will ground conductors $Bo_c$ and $Bo_d$ leading through conductor group 3202 and through armatures 02 and 03 of relay SI to relays $10_c$ and $10_d$. In a similar manner in the augend relays of group 1 (the first decimal order to the right of the decimal point and shown in Figs. 34 and 35) the digit 4 (code 0111) will be registered whereby relays $B1_b$, $B1_c$ and $B1_d$ will be operated. These relays will extend ground from conductor 3204 over conductors $B1_b$, $B1_c$, $B1_d$ leading through conductor group 3401, and armatures 2, 3 and 4 of relay SI to relays $I1_b$, $I1_c$, and $I1_d$. The operated I relays then lock to ground on conductor 4106, which may be traced from ground, armature 1 and back contact of release relay RR (Fig. 44) conductor 4415, back contact and armature 1 of relay IL to conductor 4106.

Now in a short interval relay IR3 releases and establishes a circuit from ground, armature 1 and back contact of relay IR3, front contact and armature 1 of relay IR1, conductor 4107, armature 1 and back contact of relay C3, conductor 4007, winding of relay C2 to battery. Relay C2 operates and extends this ground through its front contact and armature 1 over conductor 3917 to the winding of relay C3 but since the other terminal of relay C3 is grounded at this time, it does not operate. However, relay C2 extends ground from conductor 4412 through its front contact and armature 1, conductor 3918, back contact and armature 3 of relay C3 to the winding of relay C1 and thence to battery so that relay C1 operates and opens the locking circuit of relay C5 allowing this relay to release and remove ground from conductor 1909. This it will be remembered is the ground used for the original energization of relay IR2 and to which relay IR1 is locked, and which now being removed allows the release of relay IR1. Relay IR1 releasing opens the original circuit for relay C2 but this relay remains operated in series with relay C3 which now operates. Relay C3 operating, opens the circuit for relay C1 so that the control circuit through the armatures of relays C1 and C5 may be closed again.

A circuit may be traced from ground on conductor 4412, armature 3 and front contact of relay DR, conductor 3901, back contact and armature of relay C1, armature 2 and back contact of relay C5, conductor 4001, armature 5 and front contact of relay DR, conductor 1908 to the windings of relays SR1 and SR'1 whereby all the augend relays are reset to zero in the manner hereinbefore described. Relay C5 again operates and grounds conductor 1909 which now extends through the back contact and armature 1 of relay UL2, conductor 3001, armature 6 and front contact of relay DR, conductor 3916, armature 2 and front contact of relay C3, conductor 1401 and through the winding of relay MR to battery. Relay MR operates and locks as before, but in doing so opens the holding circuit of relay DR so that this relay now releases.

Relay C4 (Fig. 40) was operated through armature 1 of relay DR when DR was first operated and locked to ground on conductor 4412 so that now even though relay DR is released, relay C4 will remain operated for purposes which will appear hereinafter.

The operation of relay MR provides for the multiplication of factors F and G by D and E in the same manner as previously described with a small difference in signs. In multiplication the problem is $$(FD-GE)+i(GD+FE)$$

and in division it is $$(FD+GE)+i)-GD+FE)$$

By referring this time to Table 8, it will be seen that since the signs of the problem are plus for factors F, G and E and minus for factor D that combination 4 will control the operations during the first stage of the multiplication while D is being used as the multiplier and that combination 20 will control the operations during the second stage of the multiplication while E is being used as the multiplier. Therefore relay SN1 will be operated during the first stage of the multiplication and neither SN1 nor SN'1 will be operated during the second stage of the multiplication. Without further repetitious description then, the calculation during these two stages of the multiplication is as follows:

| | Real | | Imaginary |
|---|---|---|---|
| | 0.00000000 | Augend | 0.00000000 |
| | 9.99599999 | Addend | 0.00500000 |
| | 9.99599999 | Sum becomes new | 0.00500000 |
| Count 1 | 9.99599999 | Augend | 0.00500000 |
| | 9.99599999 | Addend | 0.00500000 |
| | 9.99199999 | Sum becomes new | 0.01000000 |
| Count 2 | 9.99199999 | Augend | 0.01000000 |
| | 9.99599999 | Addend | 0.00500000 |
| | 9.98799999 | Sum becomes new | 0.01500000 |
| Count 3 | 9.98799999 | Augend | 0.01500000 |
| | 9.99599999 | Addend | 0.00500000 |
| | 9.98399999 | Sum becomes new | 0.02000000 |
| Count 4 | 9.98399999 | Augend | 0.02000000 |
| | 9.99599999 | Addend | 0.00500000 |
| | 9.97999999 | Sum becomes new | 0.02500000 |
| Count 5 | 9.97999999 | Augend | 0.02500000 |
| | 9.99599999 | Addend | 0.00500000 |
| | 9.97599999 | Sum becomes new | 0.03000000 |
| Count 6 | 9.97599999 | Augend | 0.03000000 |
| | 9.99599999 | Addend | 0.00500000 |
| | 9.97199999 | Sum becomes new | 0.03500000 |
| Count 7 | 9.97199999 | Augend | 0.03500000 |
| | 0.05000000 | Addend | 0.04000000 |
| | 0.02200000 | Sum becomes new | 0.07500000 |
| Count 1 | 0.02200000 | Augend | 0.07500000 |
| | 0.05000000 | Addend | 0.04000000 |
| | 0.07200000 | Sum becomes new | 0.11500000 |
| Count 2 | 0.07200000 | Augend | 0.11500000 |
| | 0.00500000 | Addend | 0.00400000 |
| | 0.07700000 | Sum becomes new | 0.11900000 |
| Count 1 | 0.07700000 | Augend | 0.11900000 |
| | 0.00500000 | Addend | 0.00400000 |
| | 0.08200000 | Sum becomes new | 0.12300000 |
| Count 2 | 0.08200000 | Augend | 0.12300000 |

In the above calculation in the real calculator the return of the fugitive one has not been explained in detail but the calculation has been made with this operation included. For example, the figure produced at count 2 includes the return of the fugitive one as follows:

$$\begin{array}{r} 9.99599999 \\ 9.99599999 \\ \hline 19.99199999 \end{array}$$

This addition is what is apparently produced by simple arithmetic. However, since the addend here has a nine in the whole number, the sign relay SN1 will be operated. Since the whole number of the augend is a nine, the relay $B0_a$ will be operated and since the whole number of the sum is a nine (the 1 of 19 actually does not exist in the device since there is no apparatus in which it may be registered) the relay $C0_a$ will be operated. Since $B0_a$ and $C0_a$ are both operated, relay SN3 will not be operated and therefore the carry 1 lead will be grounded. Therefore the apparent number will be changed to the number at count 2 by the return of the fugitive one, thus $$\begin{array}{r} 19.99199998 \\ 1 \\ \hline 9.99199999 \end{array}$$

Other instances of this operation will be found at count 3, count 4, count 5, count 6, count 7, and at the first count 1 after the factors F and G have been transposed.

Now in accordance with the description hereinbefore, the remaining digits of the factors E (which in this example are all ciphers) will be used until each of the remaining levels (counting upward) of the multiplier digit switch and the column shift switches will have been operated after which the relay EC2 will operate to release relay EC1 and to advance the multiplier digit progress circuit.

Thereupon a circuit may be traced from ground, armature 1 and front contact of relay C5, conductor 1909, back contact and armature 1 of relay UL2, conductor 3001, front contact and armature 5 of relay MR, conductor 3902, armature 2 and front contact of relay DC2, armature 2 and front contact of relay EC2, conductor 3107, armature 2 and front contact of relay C4 (operated and locked under control of relay DR) conductor 4008 in conductor group 4005 (to Fig. 50), armature 4 and front contact of relay EP2 (division must not be started until all of the factors have been printed), conductor 5004 in conductor group 4005 back to Fig. 40, to the winding of relay DJ and thence to battery. Hence as a result of the operation of relay EC2 and if the printing of the problem as entered has been completed, the relay DJ will operate.

At this time the real and the imaginary relays hold the values 0.08200000 0.12300000 which are to be divided by the value 0.41000000 now registered in the $F^2+G^2$ register (the I relays, Fig. 41).

The operation of relay DJ closes a circuit for the operation of the DI relay (Fig. 24) whereby the values expressed by the I relays are now transmitted to the real and the imaginary column shift switches. This circuit may be traced from ground on conductor 4412, front contact and armature 5 of relay DJ, conductor 3920, winding of relay DI to battery.

The operation of relay DJ also unlocks relay MR at the normal contacts of armature 7 of relay DJ so that the action whereby the divisor is repeatedly subtracted from the dividend may proceed. The control of the summing cycle which controls the resetting of the counting relays is transferred to a back contact of relay CR7. This circuit may be traced from the armature 3 and front contact of relay DJ, the back contact and armature of relay CR8, the back contact and armature of relay CR7, conductor 3910 to armatures 1 and 2 of relay $BS_a$. Conductor 3910 leads through armature 1 of relay $BS_a$ eventually to conductor 4010 which is used to prevent a tenth attempt in division, and through armature 2 of relay $BS_a$ either to conductor 4302 which constitutes the counter conductor or to conductor 4003 which is used to signal the setting of the BS relays to represent 0. Thus at the end of each counting operation in multiplication when the BS relays have achieved a setting representing 0 and have therefore satisfied the circuit requirements so that a new multiplier digit may be used, then relay CR5 is operated whereby the augend lock conductor 3913 (as well as the sum lock conductor 3915) is opened. Thus the counting relays BS are all deenergized (representing 13 in the shifted binary code) and the CS relays are all operated (representing 12 in the shifted binary code). This is the normal position of these relays so that when the relay DJ is operated when the subtracting operation is to take place the counting relays are set to begin counting up. At that time the four code leads extending through conductor group 4011 to Fig. 46 are characterized to represent 0.

Relay CR7 is connected to the conductor 4010 through armature 1 of relay DJ so that it will be energized when the counting relays count up to nine to prevent a tenth attempt in the division and is likewise connected through the armature 8 of relays I1 and I'1 to conductors 3201 and 3801 respectively so that it will operate in parallel with SN3 or SN'3 respectively. The relay CR7 thus serves to stop the summing cycle relay operation either when the counting relays have counted nine or when the sum becomes negative thus indicating that the divisor is greater than the residue of the dividend.

Relay DJ also transfers the operating circuit of relay CR5 which controls the shift (that is, the operation of a higher level in the column shift switches) from contacts on the counting relays to the printer control circuit over conductor 3921 so that relay CR5 may be operated when the digit as indicated by the BS relays has been printed.

A contact (armature 9 and front contact) on relay DJ completes a circuit over conductors 5005 and 3922 to indicate to the printer that the circuits are in condition to begin the dividing operations.

It may now be noted that upon the operation of relay DJ a circuit is established from ground on conductor 4412, front contact and armature 4 of relay DJ, conductor 3923, armature 2 and back contact of relay I2, winding of relay I1 to battery, whereby relay I1 becomes operated. This arranges the circuits so that the value 0.08200000 in the real augend relays may be divided by the value 0.41000000 now in the column shift switches and therefore in the real addend relays. It will be found that since relay SN1 is now operated, the addend relays will respond to the complement of 0.41000000 and will therefore represent the number 9.58999999

The operation of sign relay SN1 may be traced to the operation of relay SA5, operated over conductor 3924 by armature 8 of relay DJ and since conductor 3204 (the true number lead) controlled by relay $B0_a$ is grounded (because the whole number of the augend 0.08200000 is less than five) the lead 4101 will be grounded. Therefore the values in the augend, addend and sum relays on the first summing cycle will be 0.08200000
9.58999999

---

9.67199999

The operation of the select and hold magnets of the real column shift switch is the same as previously described, the controlling circuits being closed by contacts on relay I1. In this case, however, the operation will start with the number one horizontal so that select magnet 2501 will be the first to be operated. The circuit may be traced from conductor 3004, armature 4 and front contact of relay I1, conductor 3010, armature 1 and back contact of relay CS1 (Fig. 25) to the winding of select magnet 2501. After the hold magnets of the verticals 5 to 15, inclusive, of the real column shift switch have been operated, then the sum above will appear in the summing relays. However, the whole number of the sum now appears to be a nine, relay $C0_a$ will be operated while $B0_a$ is not operated and since conductor 3201 is grounded as a consequence thereof relay CR7 will operate. The operation of relay CR7 starts the printing operation. A circuit may be traced from ground on conductor 4412, front contact and armature 2 of relay CR6 (operated by ADV1 which in turn is operated by the holding magnets, conductor 2601, front contact and armature 1 of relay I1, conductor 2516), armature and front contact of relay CR7, conductor 3925, back contact and armature 3 of relay P6 (Fig. 48), conductor 4807, back contact and armature 4 of relay SP3, back contact and armature 3 of relay SP1, conductor 5001, armature 1 and back contact of relay SP2, conductor 4802, back contacts and armatures 2 of relay CA4 and armature 3 of relay CA3 in parallel, conductor 4407, winding of relay PT7 to battery. Relay PT7 as described starts the printing operation.

It was hereinbefore pointed out that upon the operation of relay DJ a circuit was closed for relay IP1. Relay IP1 in operating starts the printing operation of the sign of the real component of the quotient in the manner hereinbefore described, it being necessary to note here only that the progress circuit for the select magnets of the printing cross bar switch is entered over conductor 5006 whereby select magnet 4502 of horizontal number 2 is the first to be operated so that when hold magnet 4601 is operated the number 2 level, vertical 6 set of contacts will be operated. Therefore, the relay RBN (Fig. 42) will control the code for the sign over the conductors of group 4208. In the problem on hand, the dividend 0.08200000 and the divisor 0.41000000 both being plus the sign of the quotient should be plus. Relay RBN is controlled over the complement conductor 3203 which will be grounded when the whole number in the augend relays is (five to) nine. Since the real number in this instance is zero, then relay RBN will not be operated and therefore conductors 1 and 4 of group 4208 will be grounded. Therefore, in the printing switch conductors 4521, 4522, and 4524 will be grounded whereby the code for the plus (+) sign is set up. In accordance with the previous description then upon the operation of relay DJ the sign cross-point of vertical 6 of the printing switch will be operated, the grounding of conductor 4522 will cause the code for "space" to be transmitted followed immediately thereafter by the transmission of the code for plus (+) so that on the record the notation will now be increased to +.40000000+*i*.50000000/—
0.07000000+*i*0.22000000=+

Thereafter the action of the printer will stop until the relay CR7 operates as described to start the next printing operation.

After the plus sign has been printed then by the action of relay PT6, as described, a ground is momentarily placed on conductor 4804 which may be traced over armature 2 and back contact of relay CA3, armature 2 and back contact of relay SP1, conductor 4911, armature 5 and front contact of relay IP1, armature 1 and back contact of relay IP2, conductor 5007 in group 4005 to Fig. 40 and thence to Fig. 25 where conductor 5007 is extended through armature 3 and front contact of relay CS1, conductor 2518, armature 2 and front contact of relay I1, conductor 3015, the fifth contact of the number 2 level contact set, now operated, conductor 4910 to relay P2 and thence to ground. This causes the release in the manner described of the presently operated select and hold magnets of the printing cross bar switch following which the next in order select magnet (for number 3 level) will be operated, followed again by the hold magnet 4601 whereby the contact set for the whole number of the real quotient will be operated. The ground temporarily applied to conductor 4911 will be extended over a circuit previously described to conductor 3921 for the temporary operation of relay CR5 with the result hereinbefore stated, the trial for the first operation in division ending with the operation of relay CR7 and then the operation of relay PT7. The ground placed on conductor 3925 besides causing the operation of relay PT7 is also extended through the contacts of the BS relays since a branch of conductor 3925 constitutes the quotient digit transfer conductor. This ground now is connected to the four code conductors constituting the group 4011 which extends to the contact set in the printing switch now operated. Since the trial produced a negative number the BS relays remain undisturbed (as will be more fully explained hereinafter) and it will be found that the code conductors express the value zero whereby in the printing switch the conductors 4523 and 4524 alone become grounded. Therefore, the code for zero is sent to the printer and it continues the printing of the quotient as +0.

Again, as before, when relay PT6 operates, ground is extended over conductor 3015 to cause the operation of relay P2, the release of the select and hold magnets of the printing switch, and eventually the operation of a new pair of sets of contacts in the printing switch, this time in the number four horizontal.

At this time a circuit is established from ground the second vertical conductor of vertical 6, conductor 4602 to relay P6. Relay P6 in operating opens the connection between conductor 3925 and conductor 4807 and connects the latter to conductor 4808 thence back over the front contact and armature 1 of relay IP1, conductor 4514, the front contact and armature of hold magnet 4511, the front contact and armature of hold magnet 4601 to ground. Thus, upon the operation of relay P6, the circuit will again be closed for the operation of relay PT7 to start another printing operation. This time conductor 4524 will be grounded through the operated cross-point contact set and conductor 4806 will be grounded by armature 2 of relay P6 so that the code for the decimal point (.) will be transmitted. At the end of this operation conductor 4804 will be grounded temporarily resulting as before in the operation of relay P2 whereby the operated select and hold magnets are released and relay P6 is returned to normal. Thereafter the select magnet for the number 5 horizontal of the printing switch is operated and contact sets in that horizontal and in the first and sixth verticals are operated.

In the meantime and upon the application of ground to conductor 4804 by relay PT6 after the whole number 0 had been printed, ground was applied to conductor 3921 for the operation of relay CR5. The momentary operation of this relay resets the counting relays (in this case no resetting is necessary as they have not changed—the count having been 0) and by opening conductor 3903 causes the release of the column shift switch so that upon its reoperation the addend will have been shifted one place to the right. The next digit calculation may then take place during the operations of the printing switch just described. This will result in the following calculation:

```
0.08200000
9.95899999
----------
0.04100000   Count 1
9.95899999
----------
0.00000000   Count 2
9.95899999
----------
9.95899999   Negative number trial—no count
```

In this instance, the ready circuits having operated relays CR1 and CR2, relay CR3 is operated and ground is extended from conductor 4412, front contact and armature 2 of relay CR6, conductor 3910, armature and back contact of relay CR7 (this relay having released when the column shift switch released and allowed the sum relays to release whereby relay $C0_a$ released), armature and back contact of relay CR8, front contact and armature 3 of relay DJ, armature 3 and front contact of relay ADV1, front contact and armature 2 of relay CR3 (relay IM is not operated), armature 1 and front contact of relay RM, conductor 3911 to operate relay SR2. This causes the summing cycle relays to perform one operational cycle whereby the following calculation is performed:

```
 0.08200000
 9.95899999
-----------
10.04099999
```

The sign relay SN1 being operated but sign relay SN3 being normal because both relays $B0_a$ and $C0_a$ are normal there will be a carry 1 whereby the sum will appear as 0.04100000

The summing cycle will change the ground connections of the augend lock, transfer and sum lock conductors to the counting relays as well as to the real summing relays so that the BS relays will now be counted down from 13 to 12 (the code in the conductor group 4011 has advanced from 0 to 1) and the CS relays have been changed from 12 to 11. At the completion of this cycle the next sum appears on the sum relays as follows:

```
0.04100000
9.95899999
----------
0.00000000
```

Simple arithmetic would apparently indicate the following:

```
0.04100000
9.95899999
----------
9.99999999
```

However, it must be remembered that the SN1 relay has been continuously operated and that at the end of the last summing operation and particularly during the period in which the hold magnets of the column shift relays were deenergized, that both relays $B0_a$ and $C0_a$ were deenergized and therefore SN3 was released. Hence, the carry 1 lead was grounded so that the fugitive 1 figuratively speaking advanced throughout this string of nines and changed them all to ciphers. Therefore, the $B0_a$ and $C0_a$ relays both being released the sign relay SN3 will not energize and the carry 1 will be firmly established by the operation of relay SN1 alone. Hence, the operation of the augend, addend and sum relays will be

```
0.04100000
9.95899999
----------
0.00000000
```

and the sum being a positive number the next summing cycle will take place. Thus, relay CR7 having failed to operate upon the completion of the first summing cycle the relay SR2 will again be operated and the counting relays will be operated to set up on the code conductors (group 4011) the representation of the digit 2 (count 2). At the end of this summing cycle the following values will appear on the summing relays:

```
0.00000000
9.95899999
----------
9.95899999
```

The sum now being negative (while the augend is positive) the relay $C0_a$ will be operated and therefore ground will appear on conductor 3201 resulting in the operation of relay CR7. Therefore, as before another printing operation will be started by the operation of relay PT7. This time, contrary to the description hereinbefore, relay P2 will not be operated so that the number 5 level contact sets in the first and sixth verticals will not be released. To anticipate, this release will not take place until the number 9 horizontal of the column shift switch has been operated (to calculate the ninth digit of the quotient) and a ground has been returned over conductor 2519, armature 3 and front contact of relay I1, and conductor 3016 for connection to conductor 4910. Hence, during the calculation and printing of the eight digits of the quotient following the decimal point the same sets of contacts in the printing switch will be used without release between digits.

Now the printer having printed the digit 2 the record of the solution of the problem appears as

+0.2

Relay CR5 is operated as before and the column shift switch is released and reoperated. The next sum which appears in the summing relays is as follows:

```
0.00000000
9.99589999
----------
9.99589999
```

This again is a negative number and the count becomes zero so that the record will now become

+0.20

In the same manner an attempt at calculation will be made for each of the remaining six places of the quotient and the final result will be the record

+0.20000000

Upon the printing of the last of these ciphers, ground will be returned over conductor 2519 and the printing cross-point contact sets will be released.

At the end of this printing operation, as previously described, the relay PT6 temporarily grounds conductor 4804, which may be traced over conductor 3921 to relay CR5. Relay CR5 unlocks the counting relays and prepares the circuits for the next operation. At its armature 2, relay CR5 opens the conductor 3903, whereby the advance relay ADV2 is released and the select magnets of the column shift switches are deenergized. Relay CR5 temporarily locks through its armature 3 and front contact and armature and front contact of relay ADV1 to ground on conductor 4412, but this relay ADV1 releases as soon as (any one of) the hold magnets of the column shift switch release, through the opening of conductor 3905. Now, upon the release of relay ADV1 and the release of relay PT6, relay CR5 releases and again applies ground to conductor 3903 whereby ground through resistance 3003 is extended over conductor 3004, armature 4 and front contact of relay I1, conductor 3010, armatures 1 and front contacts of relays CS1 to CS9 inclusive, in series, conductor 2517, back contact and armature 2 of unlocking relay UL2, winding of relay UL1 to battery. Relay UL1 operates UL2 which in turn opens the circuit for relay UL1. Relay UL1 is slow to release and, therefore, provides a short interval during which both UL1 and UL2 are operated and before both release. During this interval a circuit is established from ground conductor 4412, armature 3 and front contact of relay UL2, armature 5 and front contact of relay I1, winding of relay I2 to battery. Relay I2 locks to ground on conductor 4412. Thereupon the progress circuit over conductor 3923 is switched by armature 2 of relay I2 from the winding of relay I1 to the armature 2 of relay I'2 and thence to the winding of relay I'1. Hence relay I1 is released and relay I'1 is operated. Relay I'1 now controls the imaginary column shift switches and the imaginary summing relays in the same manner as relay I1 controlled the real column shift switches and summing relays. By its armature 7 and front contact, relay I'1 grounds conductor 3017 to operate relay CR4 to transfer the augend lock, transfer and sum lock conductors to the counting relays from the real summing cycle control relays to the imaginary summing cycle control relays. At the same time relay I'1 controls the operation of relay IM over conductor 3018, the relay RM having been released on the release of relay I1.

Thereafter, operations which will now be clear and which are similar to those described will take place. The value 0.12300000 in the imaginary augend relays will be divided by the value 0.41000000 in the $F^2+G^2$ register and the final record will appear as

+0.20000000+i0.30000000

After this has been printed the release relay RR will be operated, the carriage return and line feed signals will be transmitted as before and the apparatus will return to normal with no value remaining in the augend relays.

*Addition and subtraction*

The algebraic operations of addition and subtraction are exactly alike except that in subtraction the sign of each factor of the subtrahend is inverted as the problem is entered. The first operation in either of these operations is the depression of the key C, whereby the conductor 1403 is grounded and the relay C0 is operated and locked over conductor 3019, leading through the back contact and armature 5 of release relay RR, conductor 4903, back contact and armature 2 of relay RL1 (Fig. 48) to ground. The ground on conductor 1403 is also extended to the winding of relay C01 (Fig. 41) so that the real sign relay SN1 is directly responsive to a ground on conductor F50 and the imaginary sign relay SN'1 is directly responsive to the ground on conductor G50 (when GC2 is normal) or conductor G51 (when GC2 is operated).

The operation of relay C0 extends the ground for its operation or the ground which holds it through its armature 6 and front contact to conductor 1401 and thereby causes the operation of relay MR.

The key NC should be left in normal position so that after two factors (F and G) are entered their values may be retained to be added to another complex number. Should the key NC be placed in its alternate position, then the entry of a new number will wipe out anything left in the augend relays. We will assume that the key NC is left in normal position. We will then assume that it is desired to produce the sum $$\begin{array}{r} 4+i5 \\ 2+i3 \\ \hline 6+i8 \end{array}$$

After the key C is depressed, as stated, the following keys are depressed in this order + 4 +i 5 = whereupon the following record will be printed

+.40000000+i.50000000+0.40000000+i0.50000000 the first two factors are a printed copy of the information entered in the F and G factor entry registers and the last two are the values accumulated in the augend relays as a result of a single summing cycle operation

| | | | |
|---|---|---|---|
| | 0.00000000 | Augend | 0.00000000 |
| | 0.40000000 | Addend | 0.50000000 |
| | 0.40000000 | Sum | 0.50000000 |
| | | transferred to | |
| Count 1 | 0.40000000 | Augend | 0.50000000 |

The controls through which this is accomplished are as follows: The two factors having been entered, the depression of the "equals" key establishes a circuit from ground over conductor 1414, front contact and armature 8 of relay C0, conductor 3014, back contact and armature 1 of relay GT, back contact and armature 1 of relay G02, the winding of relay G01 to battery whereby the filling out of the factor G with ciphers if the full number of digits has not been registered is insured as before described. The F and G factors having been registered they are ready to appear in the added relays upon the operation of the column shift switches.

When the printing of the two factors has been completed, then in the manner hereinbefore described relay GP2 is energized and ground is extended from its armature 3 and front contact to armature 3 of relay DP2, thence over conductor 5008 (the circuit through the back contact of armature 3 of relay DP2 is open at this time) through group 4005, armature 4 and front contact of relay C0, conductor 3020, armature 2 and back contact of relay GC2, conductor GC2 of group 2008, front contact and armature 5 of relay G10, conductor GC1 of group 2008, winding of relay GC1 to battery, resulting in the operation of relay GC1.

Upon the operation of relay GC1 a circuit is established from ground on conductor 4412, armature 3 and back contact of relay UL2, conductor 3002, armature 4 and front contact of relay GC1, conductor 3101, armature 2 and back contact of relay CR5, conductor 3903, back contact and armature 3 of relay ADV2, resistance 3003, conductor 3004, armature 2 and front contact of relay GC1, conductor 3103, armature 3 and front contact of relay C0, conductor 3010, armature 1 and back contact of relay GS1, winding of select magnet 2501 to battery. Select magnet 2501 and its companions 2701 and 2901 become energized as a result of the closure of this circuit and prepare the contact sets of the number one horizontal of the multiplier digit switches and the two column shift switches for operation.

The ground for the operation of select magnet 2501 is extended over conductor 2520 to operate magnets 2701 and 2901, and through the front contacts and armatures of these magnets to conductor 2910 which may be traced to the winding of relay ADV2. The other terminal of this relay is connected to ground but due to the resistance 3003 sufficient current will flow through its winding to cause its operation as hereinbefore explained. Thus the original energizing circuit of the select magnets over conductor 3004 is opened but these magnets now hold in series with relay ADV2.

Upon the operation of relay ADV2 a circuit is established from ground on conductor 4412, armature 3 and back contact of relay UL2, conductor 3002, armature 1 and front contact of relay ADV2, conductor 3006, armature and front contact of select magnet 2501, winding of relay GS1 to battery. Thus the movement of the armatures of relay ADV2 which remove ground from the armature 1 of relay CS1 also cause the operation of relay CS1. It will be seen that this insures against false operation of select magnet 2502 upon the operation of relay CS1.

Upon the operation of relay ADV2 a circuit is established from ground on conductor 4412, armature 2 and front contact of relay ADV2, conductor 3007, front contacts and armatures 6 and 7 of relay MR to the windings of relays IM and RM, respectively. Relays RM and IM ground conductors 3905 and 3906, respectively, so that the eleven hold magnets of the real column shift switch and the eleven hold magnets of the imaginary column shift switch will all operate and in doing so will extend ground in a chain circuit beginning with the contact of hold magnet 2911 to conductor 2601. Now, ground on conductor 3007 will also be extended over the back contact and armature 3 of relay CR6, conductor 3904, armature 1 and front contact of relay GC1, conductor 3111, winding of hold magnet 2500. One function of magnet 2500 at this time is to extend the ground on conductor 2601 to conductor 2516 for the operation of relay ADV1. Relay ADV1 in operating closes a circuit for relay CR6 which opens the circuit for the hold magnet 2500 and at its armature 1 bypasses the contact of magnet 2500 by directly connecting conductor 2601 to conductor 2516, thus maintaining relay ADV1 operated by the column shift switch hold magnets.

During the momentary operation of hold magnet 2500 the contact set for the first level of the factor G multiplier switch is operated and a ground is connected to conductor 2513 thus operating relay $BS_b$ so that the counting relays are thus set at one (0100 or — + — —) whereby the F and G factors now extended through the column shift switches to the addend relays will be multiplied by 1. The manner by which this is accomplished is as follows: It has been shown that by the operation of relay MR that relays RM and IM were operated. Through the real summing cycle control relays the ready circuit is completed from ground on conductor 4412, front contact and armature 4 of relay ADV1, conductor 3908, back contact and armature 1 of relay HC, back contact and armature 1 of relay SR2, conductor 4201, winding of relay CR1. A similar circuit is established through the imaginary summing cycle control relays for relay CR2. Relays CR1 and CR2 establish a series circuit for relay CR3 and this relay closes the counter conductors through to the summing cycle control relays. This may be traced from the counting relays which as stated above have been set to represent the digit one. The circuit is closed from ground on conductor 4412 over the front contact and armature 2 of relay CR6, conductor 3910, armature 2 and back contact of relay $BS_a$, armature 1 and front contact of relay $BS_b$, conductor 4002, back contact and armature 3 of relay DJ, armature 3 and front contact of relay ADV1, front contacts and armatures 2 and 3 of relay CR3, and in one direction over armature 1 and front contact of relay RM, conductor 3911, armature 1 and back contact of relay HB1 (Fig. 42) winding of relay SR2 to battery, a similar circuit being completed to relay SR'2. These relays operate in accordance with the description given hereinbefore and cause the summing relays to operate through one cycle, whereby the augend relays represent the following values at this count 1:

| | | | | |
|---|---|---|---|---|
| | 0.00000000 | Augend | 0.00000000 |
| | 0.40000000 | Addend | 0.50000000 |
| | 0.40000000 | Sum | 0.50000000 |
| | | transferred to | |
| Count 1 | 0.40000000 | Augend | 0.50000000 |

Upon this summing cycle the counting relays also operate through one cycle and the BS relays change from a representation of one to a representation of zero whereby the circuit for the counter conductors for the operation of relays SR2 and SR'2 is opened by armature 1 of relay $BS_b$.

Now in accordance with previous descriptions the ground on conductor 3910 is extended through armature 2 and back contact of relay $BS_a$, armature 1 and back contact of relay $BS_b$, armature 2 and front contact of relay $BS_c$, armature 1 and front contact of relay $BS_d$, conductor 4003, back contact and armature 2 of relay DJ, winding of relay CR5 to battery. Relay CR5 besides opening the sum lock and augend lock conductors to the counting relays to return them to normal and thereby open the above-traced circuit to relay CR5 also opens the connection between conductors 3101 and 3903 whereby the relay ADV2 and the select magnets is opened to return these magnets and relays to normal.

Relay ADV2 in releasing releases relays IM and RM and these in turn release the hold magnets of the column shift switches whereby the addend relays are released. The release of the hold magnets opens the chain circuit through their armatures and contacts and thereby opens conductor 2516 whereby relay ADV1 is released. This in turn releases relays CR5 and CR6 so that ground is again applied from conductor 4412, armature 3 and back contact of relay UL2, conductor 3002, armature 4 and front contact of relay GC1, conductor 3101, armature 2 and back contact of relay CR5, back contact and armature 3 of relay ADV2, resistance 3003 to conductor 3004 and this may now be traced through armature 2 and front contact of relay GC1, conductor 3103, armature 3 and front contact of relay C0, conductor 3010, armature 1 and front contact of relay CS1 (Fig. 25), conductor 3005, front contact and armature 2 of relay C0, back contact and armature 2 of relay UL2, winding of unlocking relay UL1, to battery. Thus the counting relays having performed their function of steering the summing cycle control relays through one cycle to multiply the factors entered by one, the circuits are unlocked without going over the complete set of digital places in the multiplier digit switch to ground conductor 2517 as before.

Thereafter, the operations are exactly the same as described for a problem in multiplication. The unlocking relays, UL1 and UL2, cause the operation over conductor 3008 of relay GC2. Relay GC2 now extends the ground on the progress circuit of the printing switch over conductor 5008, conductor group 4005, through armature 4 and front contact of relay C0, conductor 3020, armature 2 and front contact of relay GC2, conductor 3108, armature 7 and front contact of relay C0, conductor 5003, group 4005 to armature 3 and back contact of relay B2, winding of relay B1 to battery whereby the printing switch is activated to print the values now registered on the augend relays. Since these operations have been previously described, no further description is now necessary. The printed record will be completed to produce the record heretofore described, the release relay RR will be operated, the printer will receive the function codes carriage return and line feed and the apparatus will return to normal.

Now the augend relays will have the following values registered therein

+0.40000000 +0.50000000

If it is now desired to add to this registration the complex number 2+*i*3 the keys will be manipulated again as follows:

C + 2 +*i* 3 =

As a result of this the following record will be printed (including the record just described)

+.40000000+*i*.50000000+0.40000000+*i*0.50000000
+.20000000+*i*.30000000+0.60000000+*i*0.80000000

And the last two factors of the lower line will constitute the solution of the problem (4+*i*5)+(2+*i*3)=

Thereafter any number of additions or subtractions may be made so long as the NC key is held in its normal position.

*Addenda*

There are two minor circuit operations that should be described for completeness. Firstly, it has been mentioned hereinbefore that since the addition or subtraction of complex numbers is not an arduous task, the device of the present invention is not primarily intended to perform these operations. Unless a large number of accumulations are made the whole number of the solution will never attain any great value and hence the circuits have been arranged so that the whole number as printed will not exceed the number four, and when the augend relays hold a whole number of five or greater the complement rather than the true number will be printed. This may be illustrated by placing the NC key at normal and then entering the following:

C + 9 9 9 +*i* 0 = six times, whereupon the following record will be printed

+.99900000+*i*.00000000
+0.99900000 +*i*0.00000000
+.99900000+*i*.00000000
+1.99800000 +*i*0.00000000
+.99900000+*i*.00000000
+2.99700000 +*i*0.00000000
+.99900000+*i*.00000000
+3.99600000 +*i*0.00000000
+.99900000+*i*.00000000
+4.99500000 +*i*0.00000000
+.99900000+*i*.00000000
−4.00599999∓+*i*0.00000000

It will be noted by simple arithmetic that the last addition should have produced the sum +5.99400000 but that the printed record appeared as the complement thereof. This is due as hereinbefore explained to the fact that the augend relays being set to represent +5.99400000 will include relay $B0_a$ in operated condition and this relay as explained will transfer ground from the true number conductor 3204 to the complement conductor 3203.

The second point to be noted is the appearance of the symbol ∓ after the last digit of the number

−4.00599999∓

It will be realized that the value 99 will also be registered in the other two decimal orders of the augend relays (sets 9 and 10). This symbol is intended to convey the information that if another digit of the result could be printed that it would be of a value of five of more. The means for doing this is indicated in Fig. 36 where within the rectangle used to indicate the ninth decimal order summing relays the relay $B9_a$ is shown. Since this relay will not be operated (the actual value registered in this decimal order is 0), the ground now on the complement conductor 3203 is connected through an armature of relay $B9_a$ to conductor 3601 which extends to a front contact of relay CA2 in Fig. 44. When the last digit of the result in a problem of multiplication or addition is being printed it will be noted that the zero level eighth vertical contact set of the printing switch is operated, whereby ground is connected to conductor 4701 for the operation of relay CA2. Therefore, if conductor 3601 is grounded, such a ground will be extended over the back contact and armature 6 of relay CA6, winding of relay CA3 to battery and relay CA3 will respond. Relay CA3 will cause the operation of relay CA5 to cause the operation of relay CA4. This relay in turn establishes a circuit for relay CA6 which becomes effective upon the release of relay PT6 and the removal of ground from conductor 4804. Relay CA4 and relay CA6 hold in series under control of relay CA2. The operation of relay CA6 causes the operation of relays PT2 and PT5 whereby the code (— + — — +) is now transmitted. This will be seen from table 5 to be the code for ∓.

The key E, when depressed, will ground conductor 1410 which will operate the master release relay RR and will stop all operations and return the device to normal.

The key T when depressed will operate the relay PRT whereby the segments of the transmitting distributor are connected to the key TST. If the right-hand contacts of this key are operated, the character Y will be repeatedly transmitted and if the left-hand contacts are operated the period will be repeatedly transmitted and printed. This is a test feature used to check the operation of the transmitter and the printer. The armature 6 of relay PRT may be traced to the clutch magnet CL so that as long as the key T is depressed the printer will either produce ........ or YYYYYY.

What is claimed is:

1. In a calculating device, a summing means comprising a plurality of pairs of relays, each said pair consisting of an augend relay and an addend relay, carry-over means controlled by said relays in a uniform circuit arrangement between each succeeding pair of relays and sum relays controlled by said augend relays and said addend relays, said augend, addend and sum relays being divided into groups each having a plurality of pairs of said relays and each said group representing a decimal denominational order, the relays of each said group being operated in accordance with permutation codes representative of the decimal digits.

2. In a calculating device, a summing means comprising augend relays for representing a numerical value to which another numerical value is to be added, addend relays for representing the latter said numerical value and sum relays for representing the resulting sum of said values, an electrical circuit system for each set of one augend, one addend and one sum relay including incoming carry 0 and carry 1 leads for alternatively electrically characterizing outgoing carry 0 and carry 1 leads, the outgoing carry leads of one set of said relays being connected to the corresponding incoming carry leads of the succeeding set of said relays, and means including said incoming carry leads and the augend and addend relays of a set for controlling the sum relay of said set.

3. In a calculating device, a summing means comprising augend relays for representing a numerical value to which another numerical value is to be added, addend relays for representing the latter said numerical value and sum relays for representing the resulting sum of said values, said relays being divided in groups each for a decimal denominational order, said augend and addend relays representing decimal digital values in a four-place permutation code and said sum relays representing decimal digital values in a different and five-place permutation code, said augend relays constituting an accumulator, means responsive to the selective operation of said addend relays for operating said sum relays to represent the sum of the value accumulated in said augend relays and the value represented by the operation of said addend relays, means thereafter operative for operating said augend relays to represent the lowest place decimal digital value represented by the said operated sum relays, means thereafter operative for releasing any of said augend relays theretofore operated which have not been operated by the said preceding means and means thereafter operative to release said sum relays.

4. In a calculating device, a summing means consisting of a set of augend relays, a set of addend relays, a set of sum relays, a pair of carry-in leads and a pair of carry-out leads, said sum relays and said carry-out leads being under the joint control of said augend relays, said addend relays and said carry-in leads, a summing cycle control comprising a relay having a set of continuity contacts controlling the sequence of effectiveness of an augend lock conductor, a transfer conductor and a sum lock conductor, said relay operating first to render said sum lock conductor effective to lock said sum relays, second to render said transfer conductor effective to transfer the record of said sum relays to said augend relays, and third to render said augend lock conductor ineffective so as to release such of those augend relays heretofore operated which are not at this time operated under control of said sum relays over said transfer conductor, said summing cycle control relay on its deenergization, first rendering said augend lock conductor effective, secondly rendering said transfer conductor ineffective and lastly rendering said sum lock conductor ineffective whereby said sum relays and said carry-out leads may be reoperated to express a new sum involving said previous sum now expressed as an augend.

5. In a calculating device, a summing means, comprising groups of augend relays for representing decimal digital values to which other decimal digital values are to be added, addend relays for representing said other decimal digital values and sum relays for representing the sum of said values, there being one more of the said sum relays in a group than the number of augend or addend relays in the said group, said additional sum relay being for representing a higher decimal denominational order than that represented by either the augend or the addend relays and means independent of said additional sum relay for effecting a carry-over into another of said groups of relays when said additional sum relay is operated.

6. In an electrical calculating device, a keyboard having a separate key for each digit of the decimal system of enumeration, mathematical signs, symbols and characters required for entering mathematical formulae, factor registers responsive to said keyboard, said registers comprising a plurality of sets of permanently paired contacts arranged in groups and subgroups, a group for a factor and a subgroup for each place of a factor including signs and digits, a set of conductors connected to the contacts of each subgroup and arranged to be electrically characterized by the operation of said contacts in accordance with a permutation code, a multiplier digit switch comprising a plurality of sets of permanently paired contacts arranged in groups, a group for the digits of each factor, a plurality of column shift switches each comprising a plurality of sets of permanently paired contacts arranged in groups, a group for each digital place of a factor, the corresponding sets of each group being connected in a progressively slipped pattern whereby the factor will be shifted one place to the right as the various corresponding sets are progressively operated, the code conductors of each digital subgroup of each factor register being connected to the sets of contacts of said multiplier digit switch, switching means for selectively connecting the code conductors of the digital subgroups of said factor registers to the contacts of said column shift switches whereby different factors may be selectively connected to said column shift switches, calculating means responsive to coded numerical information transmitted thereto through said column shift switches, means under control of said multiplier digit switches for controlling said calculating means, sign relays for further controlling said calculating means, certain of said sign relays being under control of said sets of contacts in said factor registers, and other sign relays being under control of said calculating means, whereby said calculating means may be controlled both by registered mathematical information and derived mathematical information.

7. In a calculating device, means for multiplying one number by another comprising a multiplier digit switch having a set of contacts for each decimal denominational order of a multiplier, a column shift switch having a plurality of rows of sets of contacts, one row being associated with each said set of contacts of said multiplier digit switch, each said row having a set of contacts for each decimal denominational order of a multiplicand, said sets of contacts of said column shift switch being diagonally multipled so that the digits of a multiplicand are shifted one place from row to row to correspond to the decimal order of said associated set of contacts of said multiplier digit switch, a counting means controlled by said multiplier digit switch in accordance with the value of the multiplier digits registered therein, a calculating means controlled by said counting means, sequence circuits for advancing the operation of said calculating means from row to row of said column shift switch and correspondingly from contact set to contact set of said multiplier digit switch, and an accumulator operated by said calculating means.

8. In an electrical calculating device, a keyboard having a separate key for each digit of the decimal system of enumeration, mathematical signs, symbols and characters required for entering mathematical formulae, factor registers responsive to said keyboard comprising a plurality of sets of permanently paired contacts arranged in groups and subgroups, a group for a factor and a subgroup for each place of a factor including signs and digits, a set of conductors connected to the contacts of each subgroup and arranged to be electrically characterized by the operation of said contacts in accordance with a permutation code, calculating means responsive to coded mathematical information transmitted over said sets of conductors from said factor registers, said calculating means comprising a plurality of sets of summing relays each including augend, addend and sum relays, carry means comprising a carry 0 conductor and a carry 1 conductor leading progressively through a chain of contacts controlled by said relays beginning with the extreme right-hand relays representing the code of the extreme right-hand factor digit, sign relays for controlling said carry 0 and carry 1 conductors, certain of said sign relays being controlled from said factor registers and certain other of said sign relays being controlled by said calculating means.

9. In a calculating device, a keyboard having a separate key for each digit of the decimal system of enumeration, factor registers responsive to the keys of said keyboard, said registers comprising a plurality of sets of permanently paired contacts arranged in groups and subgroups, a group for a factor and a subgroup for each denominational place of a factor, a set of conductors connected to the contacts of each subgroup and arranged to be electrically characterized by the operation of said contacts in accordance with a permutation code, calculating means consisting of denominational sets of summing relays for iteratively summing a multiplicand expressed by certain of said factors and a set of counting relays for controlling the number of said summing operations in accordance with a multiplier expressed by certain other of said factors for solving algebraic problems involving factors registered in said factor registers, said conductors from said subgroups of sets of contacts extendible into said calculating means, said calculating means including accumulators on which the factors of a solution may be registered, a set of conductors for each denominational place of a solution factor connected to said accumulators, a printing register comprising a plurality of sets of permanently paired contacts, each said set of conductors from a subgroup of contacts of said factor registers and from said accumulators being connected to a set of contacts in said printing register, a printing mechanism responsive to the electrical characterization of said sets of contacts in said printing register and means for sequentially operating said last sets of contacts whereby the digits of said problem and solution factors are printed one at a time.

10. In a computing system, means for simultaneously representing any decimal digit between zero and nine and the nine's complement thereof comprising four conductors, a plurality of means, one for each digit zero to nine, for placing ground on particular ones of said four conductors in accordance with a code in which the arrangement of grounded conductors represents the nine's complement of the digit represented in the same code by the arrangement of ungrounded conductors, and for placing a potential on the said ungrounded conductors, four electromagnetic devices, each having a terminal connected to one of said conductors, and means for selectively applying ground or potential to the other terminals of said devices whereby the said devices may be operated in accordance with the distribution of ground or in accordance with the distribution of potential on said conductors.

11. In a computing system, means for simultaneously representing any one of the ten decimal digits and the nine's complement thereof comprising four conductors, a means for each of the said ten digits for differently connecting ground to certain of said conductors and battery to the remainder thereof in accordance with a code in which the grounded conductors represent the digit and the remainder connected to battery represent the nine's complement thereof, four electromagnetic devices each having a terminal connected to one of said conductors, and means for selectively applying battery or ground to the other terminals of said devices to operate said devices to represent the digit or the nine's comlement thereof, respectively.

12. In an electrical calculating device, means for simultaneously representing a decimal digit and the nine's complement thereof, said means comprising four conductors, and a plurality of selectively operable devices, one for each possible decimal digit, for placing ground on particular ones of said conductors in accordance with a symmetrical binary notation system, and for placing battery on the ungrounded conductors to represent the nine's complement in the same binary notation system.

13. In a device according to the preceding claim, a plurality of digital entry keys, one for each decimal digit, and means controlled thereby for selectively operating said devices in accordance with the key depressed, whereby a representation of a decimal digit in a symmetrical binary code is obtained.

14. In a calculating device, a set of ten selectively operable switches, one for each of the ten digits of the decimal system, a set of four conductors multipled to said switches, each said switch being arranged to electrically characterize said conductors in a different combination, a relay terminating each of said conductors normally electrically characterized to respond to the electrical characterization furnished by said switches in one manner to represent the corresponding digit, and means to reverse the said normal electrical characterization of said relays to render said relays inversely responsive to the electrical characterization furnished by said switches to represent the nine's complement of the corresponding digit.

15. In an electrical calculating device, means for simultaneously representing any decimal digit and the nine's complement thereof, said means comprising four conductors and a plurality of selectively operable devices, one for each possible decimal digit, for placing ground and battery on said conductors in accordance with a symmetrical binary notation system, means responsive to grounded ones of said conductors for representing a digit and alternatively responsive to battery connected one's of said conductors for representing the nine's complement thereof.

16. In a calculating device, entry keys, factor registers for registering the digits of a factor responsive to the operation of said keys, a multiplier digit switch, means for transmitting numerical information from said factor registers to said multiplier digit switches comprising a set of conductors for each denominational place of a factor, a like set of conductors from said multiplier digit switch, means including said multiplier digit switch for interconnecting the conductors from said factor registers and said conductors from said multiplier digit switch, a set of counting relays, one connected to each of said last conductors, said counting relays controlling through their selective operation over said conductors the number of operations involved in a problem of multiplication.

17. In a calculating device, entry keys, factor registers for registering the digits of a factor responsive to the operation of said keys, a multiplier digit switch, means for transmitting numerical information from said factor registers to said multiplier digit switches in a four-place permutation code comprising a set of four conductors for each denominational place of a factor, a like set of four conductors from said multiplier digit switch, means including said multiplier digit switch for interconnecting the conductors from said factor registers and said conductors from said multiplier digit switch, counting relays, one connected to each of said conductors from said multiplier digit switch, for representing by their setting over said conductors a multiplier digit, means for performing multiplications through successive additions, means responsive to each of said successive addition steps for resetting said relays at one less than the previously established value represented thereby and a satisfaction circuit established by said relays when a fixed predetermined setting thereof has been established for stopping the said successive addition steps.

18. A computing device comprising three arrays of two-position devices, the first and second of said arrays each being operable to represent decimal numbers, means for entering numbers into the first of said arrays, the devices of the first array being non-locking and the devices of the second array being locking, the third array being automatically operated by the said first and second arrays to represent the sum of said different decimal numbers, means for locking the representation of the sum of said numbers in the third array, means for releasing the devices of said second array and reoperating them in accordance with said sum as registered in said third array, and means for releasing said third array to permit it to register the new sum of the numbers represented on the said first and said second arrays.

19. In an electrical calculating device, a summing means, counting means for determining the number of times said summing means performs a summing operation, said counting means comprising a first set of relays, a second set of relays, means for operating said relays of said first set to represent in code a number exceeding the maximum number to be counted, a first arrangement of electrical circuits cooperatively interconnecting said two sets of relays with each other and with said summing means to subtract one unit from the number represented in said first relay set for each operation of said summing means and a second arrangement of electrical circuits controlled by said relays to extend ground to certain ones of a plurality of terminals to represent in code the actual number of operations performed by said summing means whereby a recording device may be operated to record said number.

20. In a multiplying device, a product accumulating arrangement comprising three arrays of two-position devices, each array operating on a code basis to represent numbers in the decimal system of enumeration by the selective operation of said devices in their said two positions, means for setting the devices of the first array to represent a particular number, means for initially setting the devices of the second of said arrays to represent zero, means for operating the devices of the third of said arrays under control of the devices of said first and said second arrays to provide a sum representation, means for temporarily locking the devices of said third array in position to hold said sum representation, means for releasing the devices of said second array, means for reoperating the devices of said second array under control of the devices of said third array and in accordance with the sum representation held thereby, means for thereafter releasing the devices of said third array to prepare for another summing operation, counting means for repeating the said cycle of operations constituting a summing operation a number of times corresponding to a multiplier digit, and means for shifting the number represented in the said first array one columnar position to prepare for a new product accumulating operation by another multiplier digit.

21. In a calculating device, entry factor registers for registering the mathematical signs and digital values of a plurality of factors, multiplier digit switches permanently associated with corresponding factor registers, a plurality of summing devices, column shift switches for entering factors into said summing devices, counting means for controlling said summing devices, a factor printing register comprising a plurality of register switches certain of which are permanently associated with said factor registers, others of which are associated with said summing devices and others of which are associated with said counting means, a progress circuit associated with said factor printing register switches for sequentially operating said switches, means for simultaneously registering the digits of a calculated product or sum on a plurality of said factor printing register switches and means for sequentially registering the digits of a calculated quotient factor on a single one of said factor printing register switches.

22. In a calculating device, means for representing decimal digits in codes, each of which is the inverse of its nine's complement, entry registers for entering decimal numbers, code conductors extending therefrom, means in said registers for electrically characterizing said conductors combinationally in accordance with said codes to transmit thereover either the number or its nine's complement, and means at the distant end of said conductors selectively responsive to said electrical characterization for representing either said number or its nine's complement.

23. In a calculating device, means for representing decimal digits in codes each of which is the inverse of its nine's complement, said means consisting of a relay for each code order, a corresponding plurality of code conductors leading from said relays to a point of use, a true number lead, a complement lead, means controlled by said relays for connecting said corresponding code conductors either to said true number lead or to said complement lead and means for selectively rendering either said true number lead or said complement lead effective to transmit to said point of use either a number or its nine's complement.

24. In a calculating device, means for representing decimal digits in codes each of which is the inverse of its nine's complement, factor entry registers for entering numbers representing factors, code conductors extending therefrom to points of use, means in said entry registers for characterizing said conductors to simultaneously represent a number and its nine's complement, one of said points of use consisting of a printing switch, means associated with said printing switch for entering said codes as subcombinations of printing codes, a printer responsive to said printing codes for printing said factors entered in said factor registers, another of said points of use consisting of a set of summing relays comprising augend, addend and sum relays, means for extending said code conductors to said addend relays, means for selectively rendering said addend relays responsive to said code conductors to represent either said numbers or their complements, summing cycle control means for combining the operation of said addend relays and said augend relays to operate said sum relays and to thereafter transfer the record registered on said sum relays to said augend relays, code conductors extending from said augend relays to said printing switch, a true number lead and a complement lead and means controlled by each said augend relay for connecting either said true number lead or said complement lead to a corresponding code conductor, and means for selectively rendering either said true number lead or said complement lead effective whereby either a number or its complement is transmitted from said augend relays to said printing switch, the arrangements thereat for translating said codes into printing codes being like those for translating and printing said factors.

25. In a calculating device, means for representing decimal digits in codes each of which is the inverse of its nine's complement, entry factor registers for entering numbers representing factors, a set of code conductors extending therefrom to points of use for each digit of each factor, means in said registers for connecting certain conductors of each said set to a first pole of a battery and the remainder to a second pole of said battery according to the code of the number registered, responsive means at the point of use and pole-changing means controlling said responsive means to selectively control said responsive means to respond alternatively to said first or said second battery pole characterized conductors, printing means at another point of use, means thereat to respond to conductors characterized by connection to said first pole only, means controlled by said responsive means for performing mathematical calculations, a set of code conductors extending therefrom to said other point of use for each digit of the factors of a calculated result, and means controlled by said calculating means for connecting said first pole of said battery to certain conductors of each said set in accordance with the code of the numbers calculated or alternatively for connecting said first pole of said battery to the remaining conductors of each said set in accordance with the code of the complements of the numbers calculated.

26. In a calculating device, means for representing decimal digits in codes each of which is the inverse of its nine's complement, a code transmission line for each digit comprising four conductors, means at the originating end of said line for simultaneously transmitting the code for a digit and for its complement, said line extending to two points of use, means at a first of said points of use responsive only to the code for said digit, means at a second point of use alternatively and selectively responsive to the code for said digit and to the code for said complement, another set of code transmission lines extending from said second point of use to said first point of use, and means at said second point of use for alternatively and selectively transmitting over each of said other transmission lines either the code for a digit or the code for its complement.

27. A counting relay arrangement for selectively responding to a series of time spaced phenomena, such as a train of impulses, comprising a plurality of relays equal in number to the number of places in a permutation code and means responsive to the impulses of a series for successively operating said relays in accordance with the various combinations and permutations of said code.

28. A counting relay arrangement for selectively responding to a series of time spaced phenomena, such as a train of impulses, comprising a set of four relays one for each place in a four-place permutation code and means responsive to the impulses of a series for successively operating said relays in accordance with the various combinations and permutations of said code.

29. A counting relay arrangement for selectively responding to a series of time spaced phenomena, such as a train of impulses, comprising a plurality of relays equal in number to the number of places in a permutation code arranged in accordance with a series of numbers in the binary system of enumeration and means responsive to the impulses of a series for successively operating said relays in accordance with the various combinations and permutations of said code.

30. A counting relay arrangement for selectively responding to a series of time spaced phenomena, such as a train of impulses, comprising a plurality of relays equal in number to the number of places in a permutation code, means for selectively operating said relays in accordance with various combinations and permutations of said code, means thereafter responsive to a series of impulses for counting said relays down through various combinations and permutations of said code until a predetermined combination has been reached and a signal circuit established by said relays in said predetermined combination.

31. A counting relay arrangement for selectively responding to a series of time spaced phenomena such as a train of impulses, comprising a plurality of relays in a network of electrical connections having a first set of conductors over which said relays may be set in code to any given numerical value, a second set of conductors over which the setting of said relays in code at any time may be exhibited, a signal conductor which may be electrically characterized by said relays when the said relays are set at a particular numerical value and control conductors for causing said relays to successively assume different settings in order.

32. A counting relay arrangement for selectively responding to a series of time spaced phenomena such as a train of impulses, comprising a first set of code relays, a second set of code relays, circuit connections between the relays of said sets whereby the said second set is controlled by said first set to assume a setting in code one less in the code system of enumeration than the setting in code of said first set, means for releasing said first set and for thereafter resetting them under control of and in accordance with the setting of said second set, means for releasing said second set and for thereafter resetting them under control of said first set and at one less than the setting of said first set, and means for energizing said relays at a selectively predetermined setting and counting down by said resetting operations to a fixed predetermined setting.

33. A counting relay arrangement for selectively responding to a series of time spaced phenomena such as a train of impulses comprising two sets of mutually controlling relays, each set having a number of relays equal to the number of places in a permutation code, a first set of said relays operating to energize the relays of a second set in code at one less in the code system of enumeration and the said second set operating to energize the relays of the said first set in code at the same number in the code system of enumeration, means responsive to a train of impulses for alternately releasing each said set and resetting said released set under control of the other said set, a complete resetting cycle consisting of the sequential release and resetting of the first said set followed by the release and resetting of the second said set, whereby said relays are counted down in their code representation upon each resetting cycle, means for setting said first set of relays in code at any selectively predetermined representative value, means controlled by said first set of relays for transmitting a coded signal for each different setting thereof, and means controlled by said first set of relays for transmitting a satisfaction signal when said relays have been counted down to a fixed predetermined representative value.

34. A counting relay arrangement for selectively responding to a series of time spaced phenomena such as a train of impulses comprising two sets of mutually controlling relays, each set having a number of relays equal to the number of places in a permutation code, a first set of said relays operating to energize the relays of a second set in code at one less in the code system of enumeration and the said second set operating to energize the relays of the said first set in code at the same number in the code system of enumeration, means responsive to a train of impulses for alternately releasing each said set and resetting said released set under control of the other said set, a complete resetting cycle consisting of the sequential release and resetting of the first said set followed by the release and resetting of the second said set, whereby said relays are counted down in their code representation upon each resetting cycle, means for setting said first set of relays in code at the highest possible value which may be represented in the code employed, means controlled by said first set of relays for transmitting a coded signal for each different setting thereof starting with the code representation of zero when said relays are set in said highest possible value and counting up through the decimal digits one value at a time as said relays are counted down from said highest possible value, whereby the impulses of said train may be counted up as said relays are counted down.

35. In a calculating device, a set of relays for performing summing operations comprising augend, addend and sum relays, entry registers for registering factors entered into said device for calculation, switching means for selectively interconnecting certain of said registers and said addend relays for operating said addend relays in accordance with and to represent the values of factors registered therein, means for operating said augend relays in accordance with and to represent the values of other factors, a summing control means for operating said summing relays to calculate the addition of the value represented by the said operated addend relays to a value represented by said augend relays, and a proof circuit controlled by said switching means for controlling said summing control means, for insuring the complete operation of said switching means.

36. In a calculating device, a set of relays for performing summing operations comprising augend, addend and sum relays, a summing cycle control means for causing the value represented by the selective operation of said addend relays to be added to the value represented by the selective operation of said augend relays and to be represented by the consequent selectively responsive operation of said sum relays, means comprising a plurality of switches for selectively operating said addend relays, means for selectively operating said augend relays and a chain circuit controlled by said switches for controlling said summing cycle control circuit whereby the operation of said device is made to depend upon the operation of all of said switches without exception.

37. In a calculating device, calculating means having a plurality of decimal denominational orders and including addend means in each said order, a separate means for each of said orders for entering values for calculation into said addend means therein, a counting means for controlling the number of times the addend entered in said addend means is added to an accumulated value, a means for entering a multiplier digit value into said counting means and a proof circuit comprising a chain of contacts controlled by all said entering means for further controlling said counting means.

38. In a calculating device, factor receiving devices for storing the mathematical signs and digital values of a plurality of factors, multiplier digit selector switches permanently associated with corresponding receiving devices, an accumulator comprising a plurality of summing devices, column shift switches for routing factors into said accumulator, counting means controlled from said multiplier digit selector switches, auxiliary storage devices for storing intermediate results calculated by said accumulator, distributor means interposed in circuit between said receiving devices, said storage devices and said column shift switches for selectively entering factors from said factor receiving devices, and intermediate results from said storage devices through said column shift switches into the accumulator, and master multiplying, adding and dividing relays for selectively controlling the operation of said counting means and said distributor means.

39. In a calculating device, factor receiving devices for storing the mathematical signs and digital values of a plurality of factors, multiplier digit selector switches permanently associated with corresponding receiving devices, an accumulator comprising a plurality of summing devices, column shift switches for routing factors into said accumulator, counting means controlled from said multiplier digit selector switches, auxiliary storage devices for storing intermediate results calculated by said accumulator, distributor means interposed in circuit between said receiving devices, said storage devices and said column shift switches for selectively entering factors from said factor receiving devices and intermediate results from said storage devices through said column shift switches into the accumulator and master algebraic operation relays for controlling the operation of said counting means and said distributor means whereby said counting means and said distributor means control the selective entry of digital values into said accumulator and the counting of summing cycles thereafter performed through a single cycle for addition, through a plurality of cycles determined by the sum of the digits of a multiplier for multiplication and through a plurality of cycles determined by the sum of the digits of a quotient for division.

40. In a calculating device for performing the four fundamental algebraic operations of multiplying, dividing, adding and subtracting of two factors each of which comprises one numerical quantity known as the real component, and one numerical quantity multiplied by the square root of minus one known as the imaginary component, factor receiving devices for storing the mathematical signs and digital values of the four components of said two factors, multiplier digit selector switches permanently associated with corresponding receiving devices, a real and an imaginary factor accumulator each comprising a plurality of summing devices, a real and an imaginary column shift switch for routing factors into said accumulators, counting means controlled from said multiplier digit selector switches, auxiliary storage devices for storing intermediate results calculated by one of said accumulators, distributor means interposed in circuit between said receiving devices, said storage devices and said column shift switches for selectively entering factors from said factor receiving devices and intermediate results from said storage devices through said column shift switches into the accumulator, and master multiplying, adding and dividing relays for selectively controlling the operation of said counting means and said distributor means.

41. In a calculating device for performing the four fundamental algebraic operations of multiplying, dividing, adding and subtracting of two factors each of which comprises one numerical quantity known as the real component, and one numerical quantity multiplied by the square root of minus one known as the imaginary component, factor receiving devices for storing the mathematical signs and digital values of the four components of said two factors, multiplier digit selector switches permanently associated with corresponding receiving devices, a real and an imaginary factor accumulator each comprising a plurality of summing devices, a real and an imaginary column shift switch for routing factors into said accumulators, a common counting means for simultaneously controlling the cycle of operations of said real and said imaginary summing means controlled from said multiplier digit selector switches, auxiliary storage devices for storing intermediate results calculated by one of said accumulators, distributor means interposed in circuit between said receiving devices, said storage devices and said column shift switches for selectively entering factors from said factor receiving devices and intermediate results from said storage devices through said column shift switches into the accumulator, and master multiplying, adding and dividing relays for selectively controlling the operation of said counting means and said distributor means.

42. A counting relay arrangement for selectively responding to a series of time spaced phenomena, such as a train of impulses, comprising a plurality of relays equal in number to the number of places in a permutation code, means responsive to the impulses of a series for sequentially operating said relays in accordance with the various combinations and permutations of said code from a code representating zero up through higher order codes successively representing the numbers of the decimal system in order, means for selectively operating said relays in accordance with a code representing any predetermined decimal system number, and means for energizing said realys at a setting representing a high order decimal number and counting down by resetting operations to a lower order decimal setting.

43. A counting relay arrangement for selectively responding to a series of time spaced phenomena, such as a train of impulses, comprising a plurality of relays equal in number to the number of places in a permutation code, means responsive to the impulses of a series for sequentially operating said relays in accordance with the various combinations and permutations of said code from a code representing zero up through higher order codes successively representing the numbers of the decimal system in order, means for selectively operating said relays in accordance with a code representing any predetermined decimal system number, and means for energizing said relays at a fixed predetermined setting, counting down through successively lower settings by said resetting operations and exhibiting the number of said counting down operations completed.

44. A counting relay arrangement for selectively responding to a series of time spaced phenomena, such as a train of impulses, comprising a plurality of relays equal in number to the number of places in a permutation code, means responsive to the impulses of a series for sequentially operating said relays in accordance with the various combinations and permutations of said code from a code representing zero up through higher order codes successively representing the numbers of the decimal system in order, means for selectively operating said relays in accordance with a code representing any predetermined decimal system number, means for energizing said relays at a fixed predetermined setting, counting down through successively lower settings by said resetting operations and means controlled by said relays for transmitting outgoing codes from one representing zero when said relays are in said fixed predetermined setting through successively higher decimal numbers.

45. In an electrical circuit network calculator, means for multiplying one number by another comprising a multiplier digit switch having a set of contacts for the code representation of each digit of a multiplier, a column shift switch having a plurality of rows of sets of contacts, one row being associated with each said set of contacts of said multiplier digit switch, each said row having a set of contacts for the code representation of each digit of a multiplicand, said sets of contacts of said column shift switch being diagonally multipled so that the digits of a multiplicand are effectively shifted one place from row to row to correspond to the decimal order of said associated set of contacts of said multiplier digit switch, a set of counting relays controlled by said multiplier digit switch in accordance with the value of the multiplier digits, calculating means controlled by said counting relays and including addend means responsive to said column shift switch, sequence circuits for advancing the connection of said addend means from row to row of said column shift switch and the connection of said counting relays from contact set to contact set of said multiplier digit switch, augend and sum means included in said calculating means and means for transferring a derived sum from said sum means to said augend means.

46. In an electrical circuit network calculator, an array of contact sets each having a plurality of permanently paired movable and stationary contacts whereby upon operation a corresponding plurality of circuits may be closed, said sets being arranged in ranks and files, the corresponding stationary contacts in each said file being connected in multiple, one of said files acting as a multiplier digit switch and others of said files acting as a multiplicand column shift switch, the movable contacts of said multiplicand column shift switch being multipled in diagonal rows, a set in each file being connected to a set in a next succeeding file in a next succeeding rank, a set of counting relays being connected to the said file multiple of said multiplier digit switch, means for entering the succeeding digits of a multiplier in the movable contacts of said succeeding rank sets of said multiplier digit switch, means for entering the succeeding digits of a multiplicand in the succeeding diagonal rows of said multiplied contacts of said multiplicand column shift switches, means for simultaneously operating all contact sets of a given rank, means for successively operating said contact sets of succeeding ranks, a summing means including a set of addend relays each connected to a file multiple of said multiplicand column shift switch and a summing cycle control means responsive to said counting relays.

47. Electrically operated calculating equipment having means for indicating the digital value in a denomination of a number expressed in code which is the sum of two other numbers expressed in code comprising means for applying potential alternatively to two inlet wires to indicate tthe presence or absence in the summation of carry over from the next lower denomination, and two sets of change over contacts operable in accordance with the two respective digital values in the first mentioned denomination of the numbers to be summed for extending or not extending said potential to an outlet wire to indicate the required digital value.

48. Electrically operated calculating equipment having means for indicating the value to be carried over from one denomination to the next higher denomination in the summation in code of two numbers expressed in code comprising means for applying potential alternatively to two inlet wires to indicate the presence or absence in said summation of carry over from the next lower denomination and two sets of change over contacts operable in accordance with the two respective digital values in the first mentioned denomination of the numbers to be summed for extending said potential to one or other of two outlet wires to indicate the required value.

GEORGE R. STIBITZ.

References Cited in the file of this patent

UNITED STATES PATENTS

| Number | Name | Date |
|---|---|---|
| 1,982,020 | Read | Nov. 27, 1934 |
| 2,077,963 | Smith | Apr. 20, 1937 |
| 2,077,964 | Smith | Apr. 20, 1937 |
| 2,093,529 | Tauschek | Sept. 21, 1937 |
| 2,136,694 | Laiho | Nov. 15, 1938 |
| 2,176,932 | Smith | Oct. 24, 1939 |
| 2,191,567 | Hofgaard | Feb. 27, 1940 |
| 2,253,596 | Wright | Aug. 26, 1941 |
| 2,262,235 | Hofgaard | Nov. 11, 1941 |
| 2,266,366 | Heinze | Dec. 16, 1941 |
| 2,271,249 | Bryce | Jan. 27, 1942 |
| 2,293,127 | Fishack | Aug. 18, 1942 |
| 2,318,591 | Couffignal | May 11, 1943 |
| 2,344,885 | Kozma | Mar. 21, 1944 |